MESSAGE PROCESSOR
FIG. 9
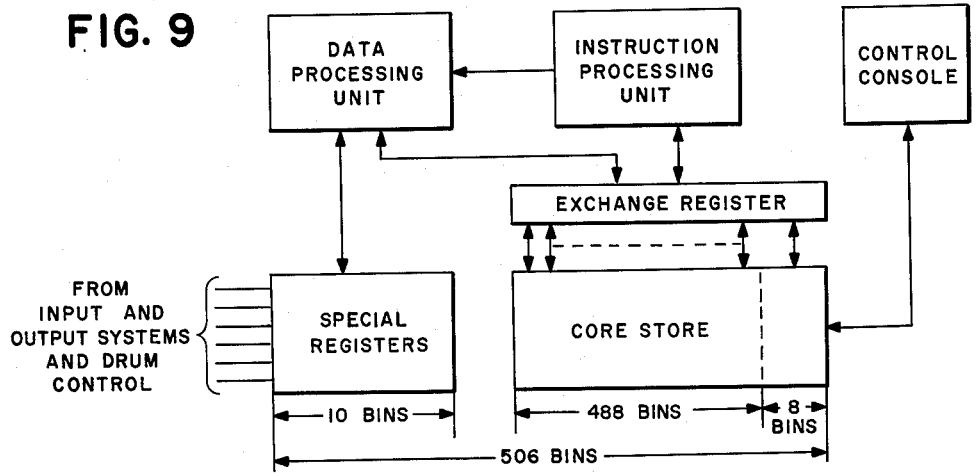
FIG. 12 (GENERAL FORM OF INSTRUCTIONS)
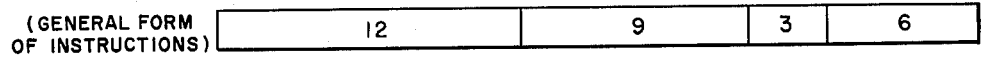
FIG. 29 (DETAILS OF PROGRAMMING INSTRUCTIONS)
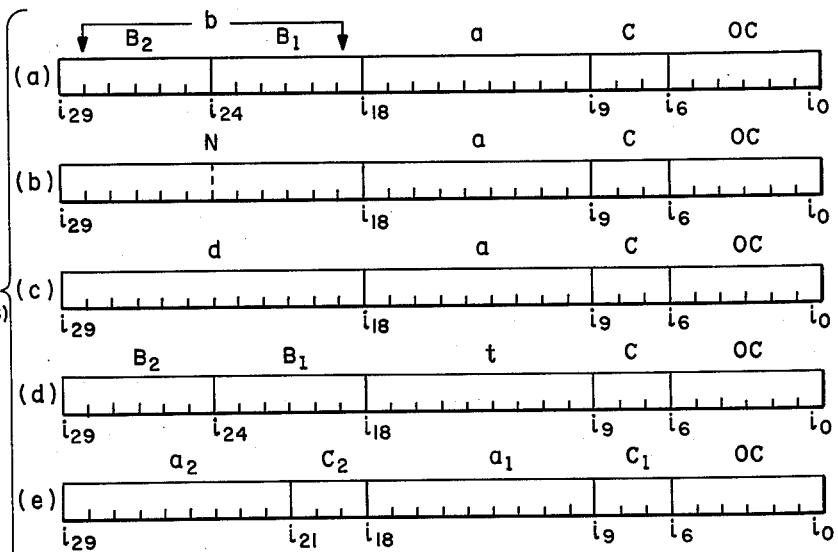

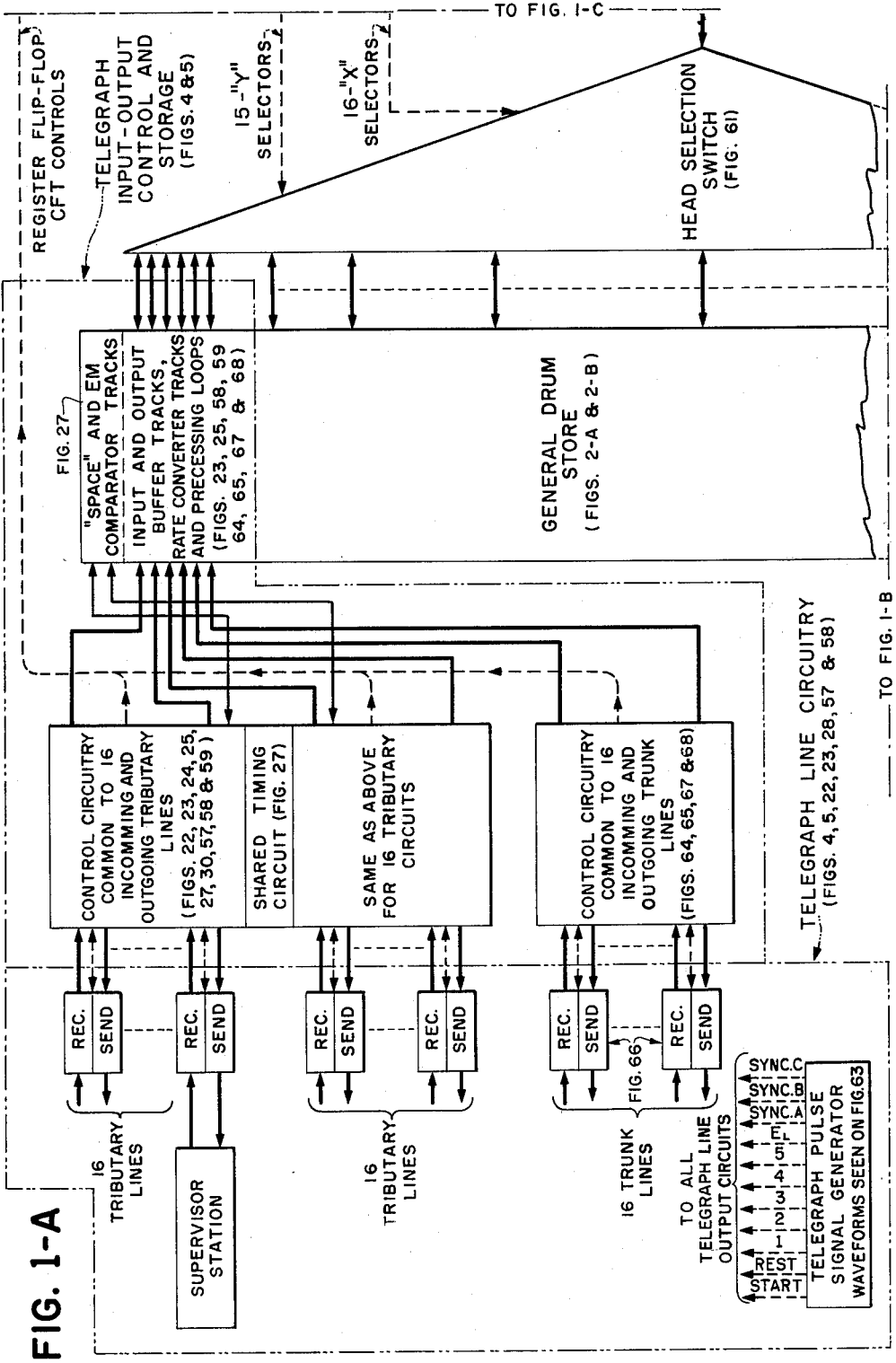

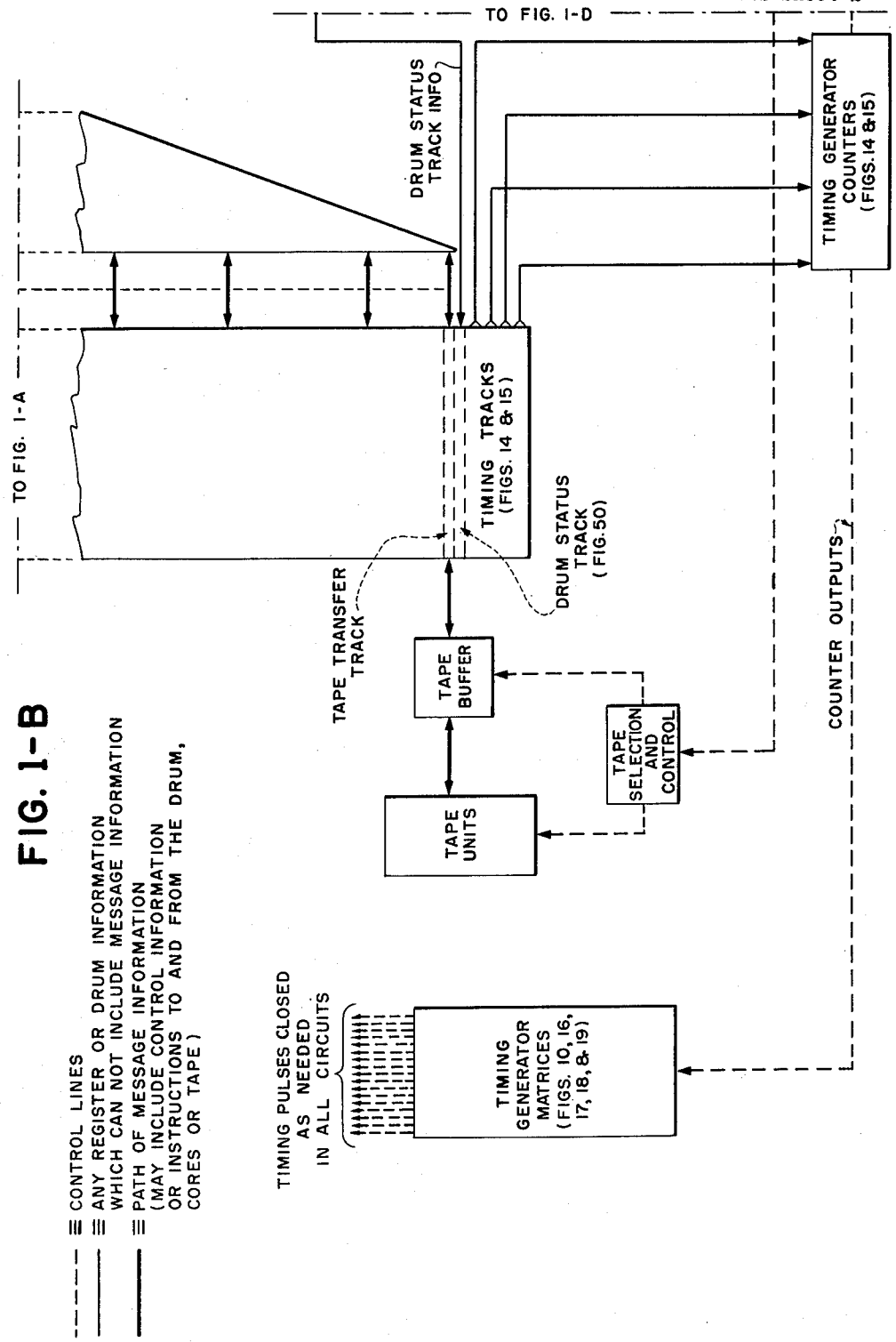

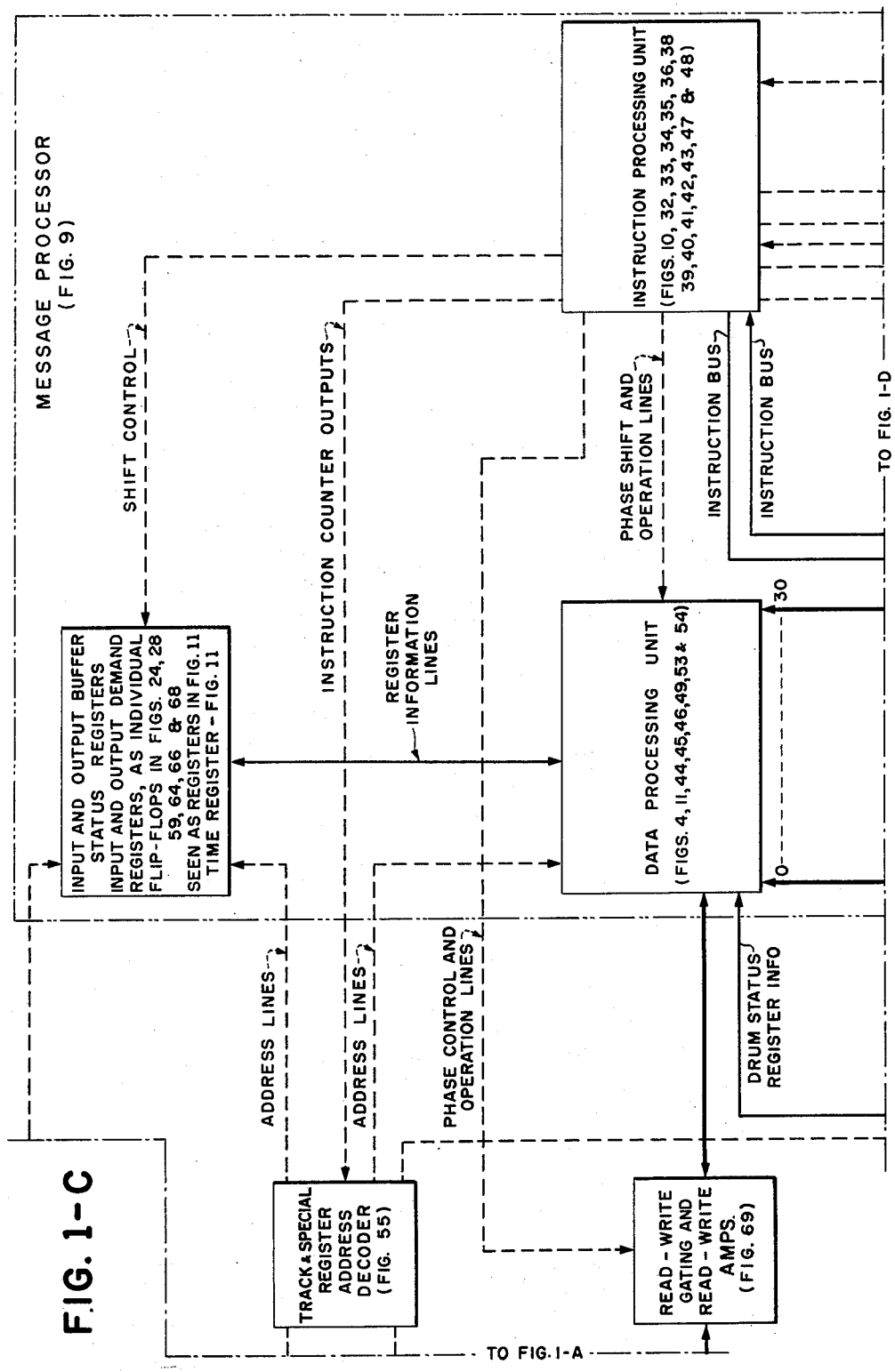

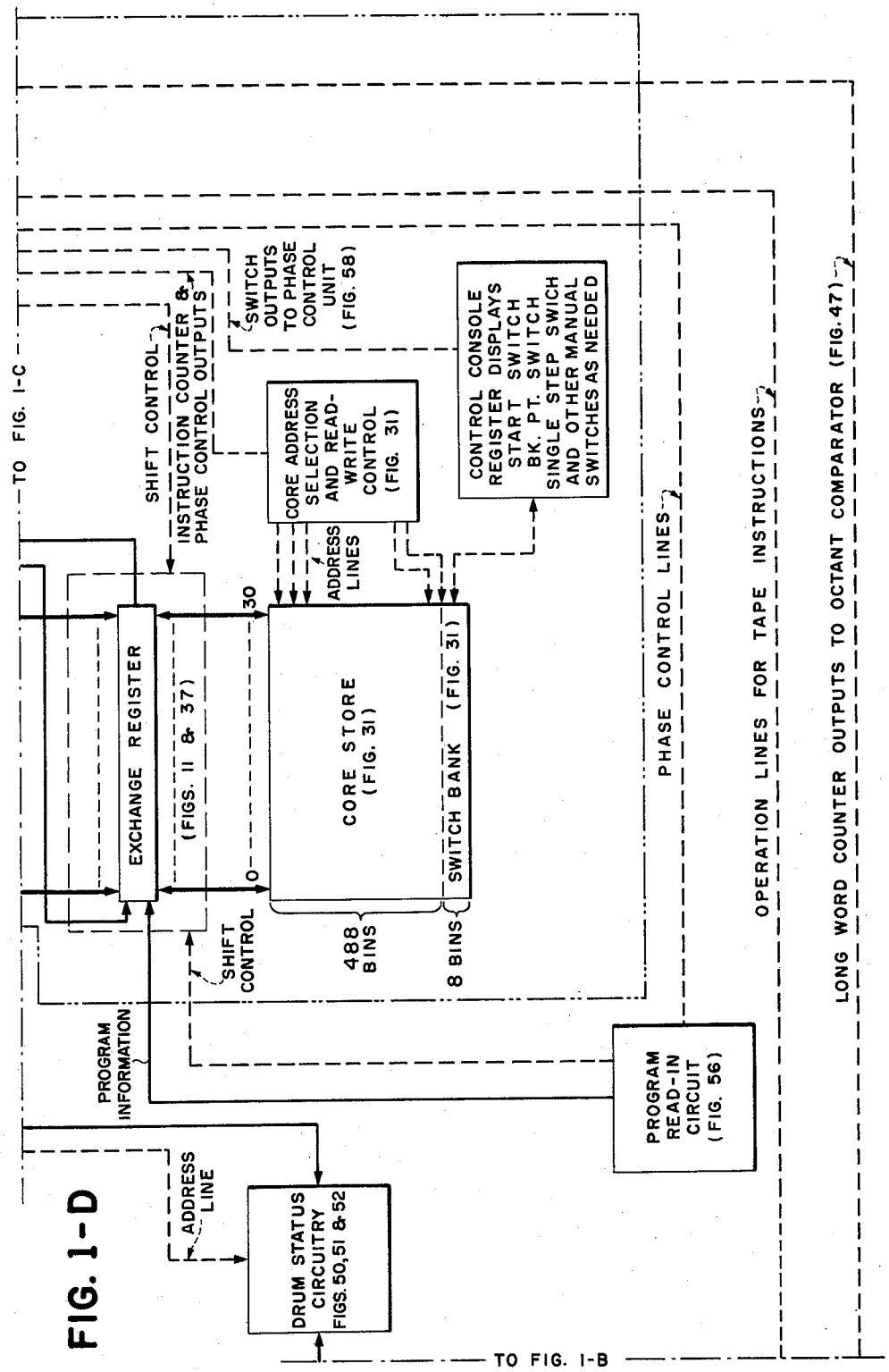

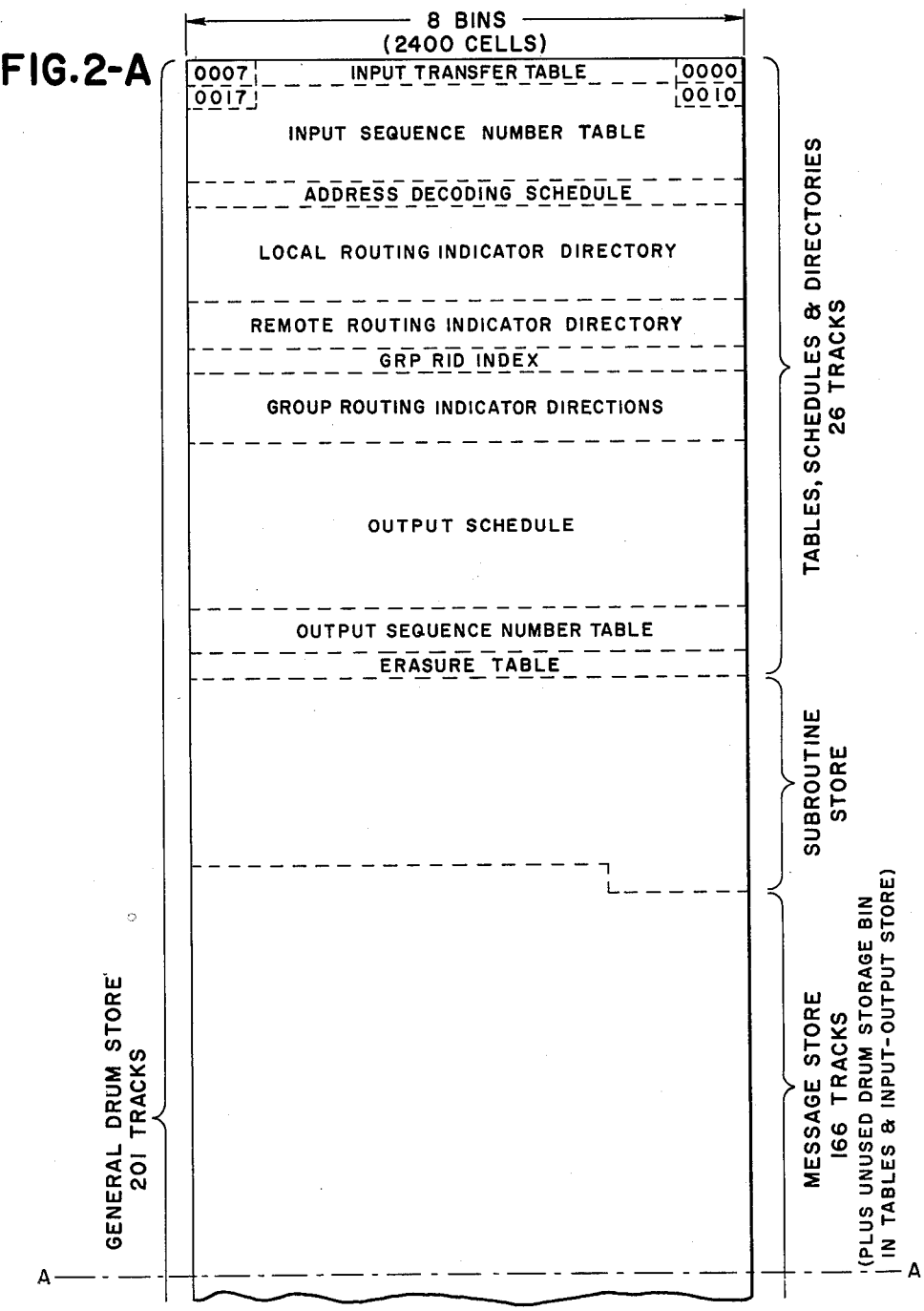
FIG.2-A

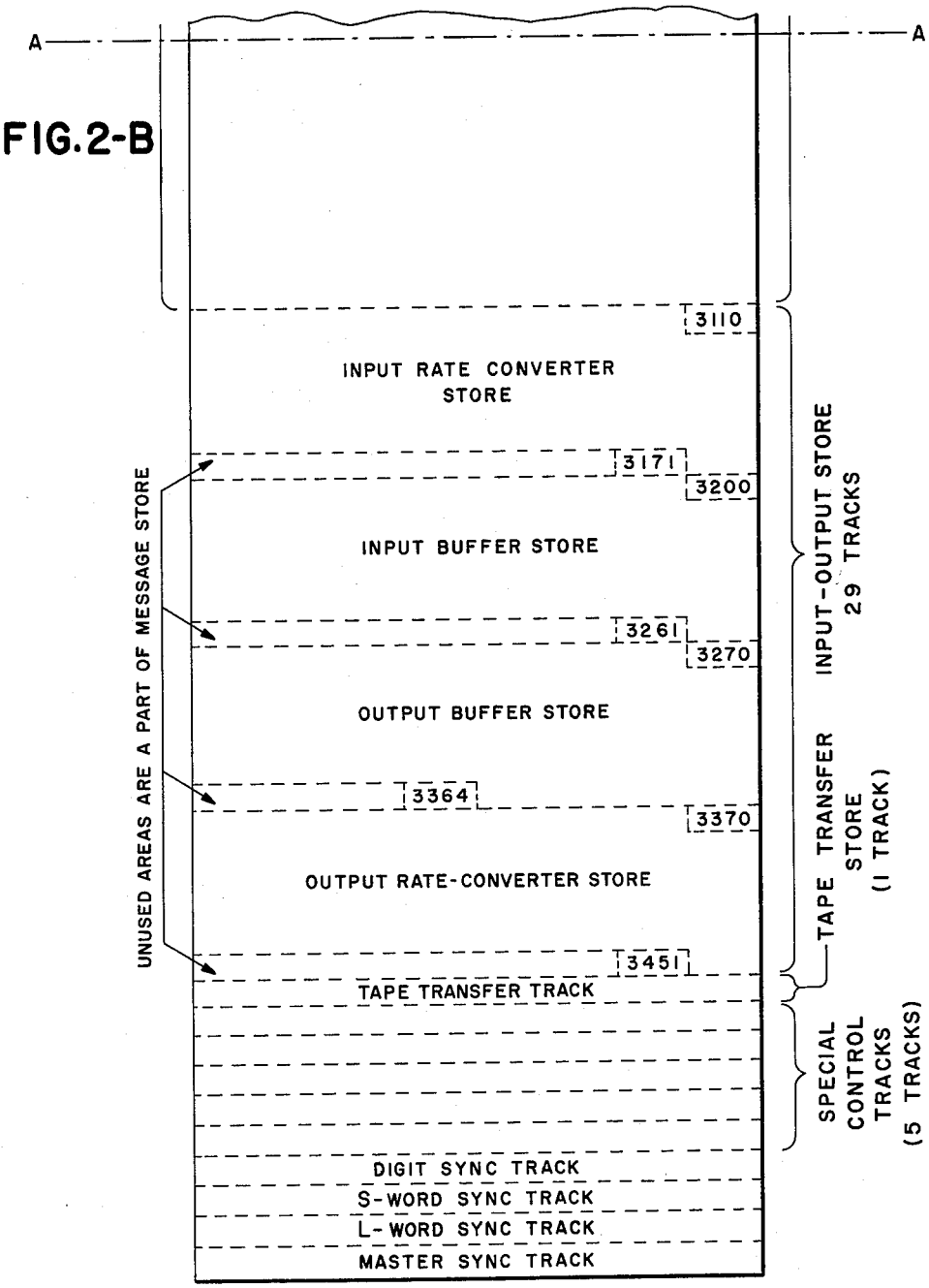

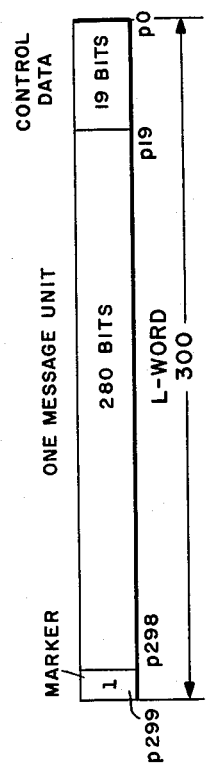
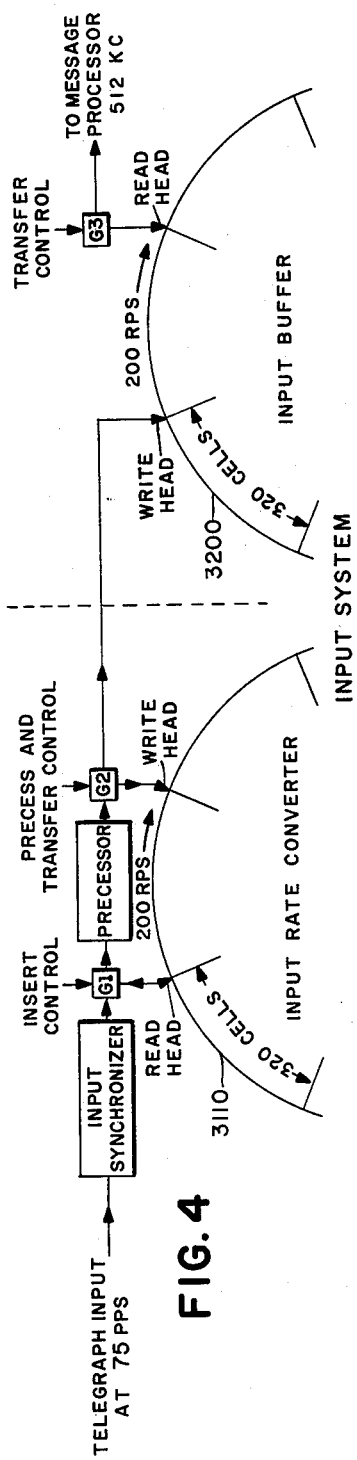
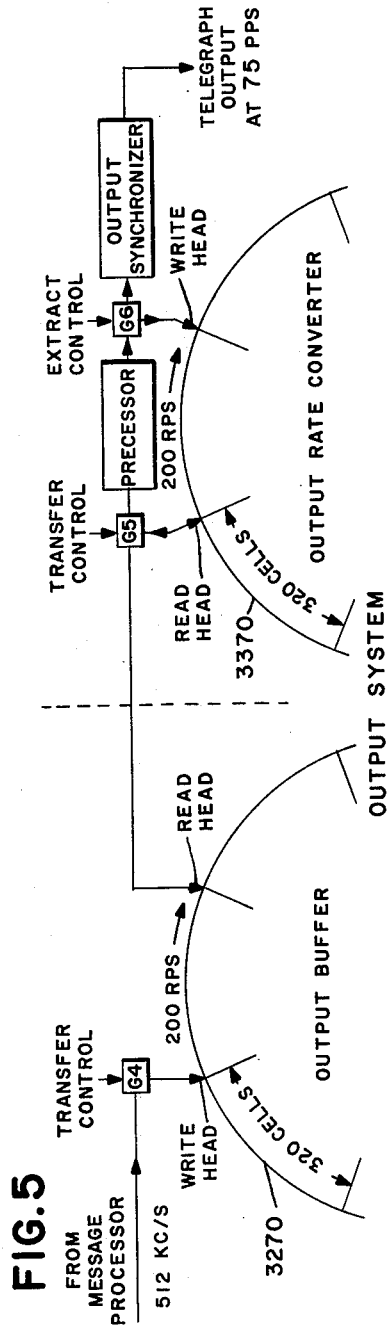
FIG. 3
FIG. 4
FIG. 5

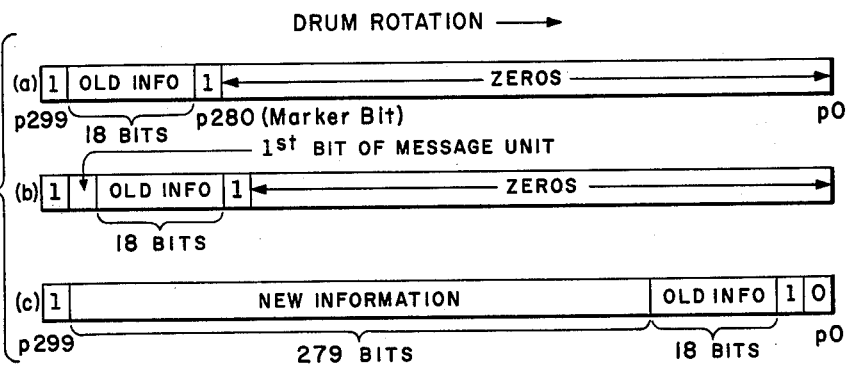
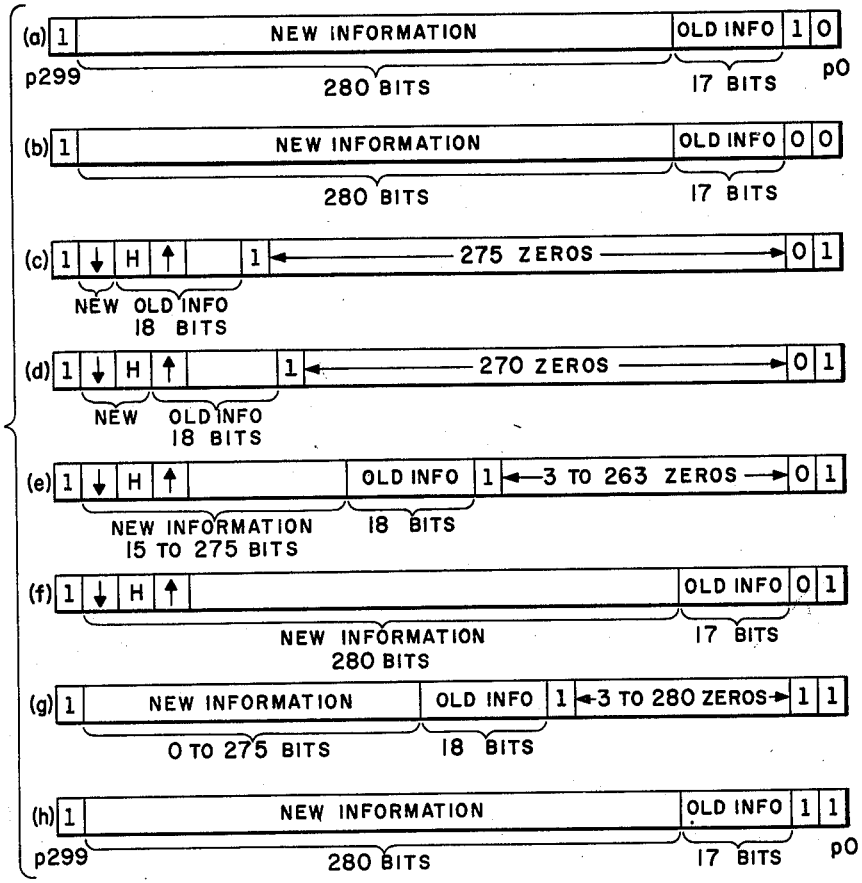
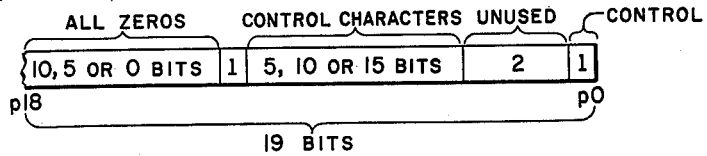

FIG. 13-A

PROGRAM CYCLE

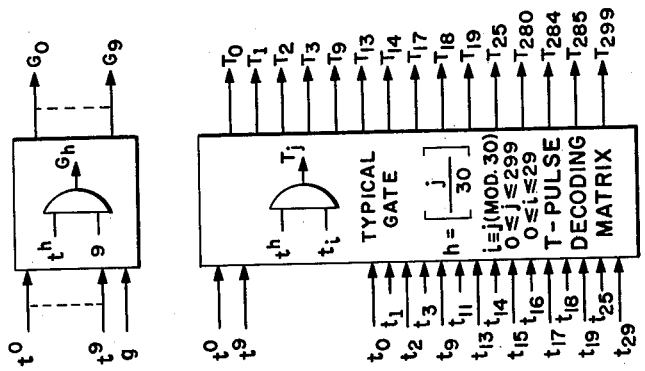
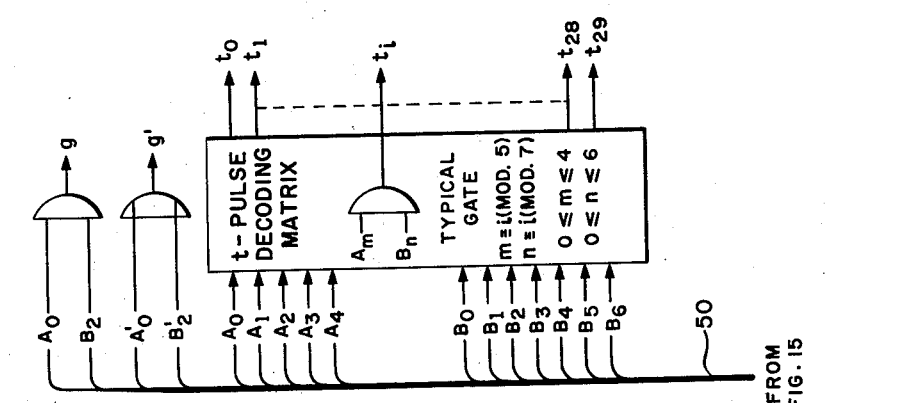
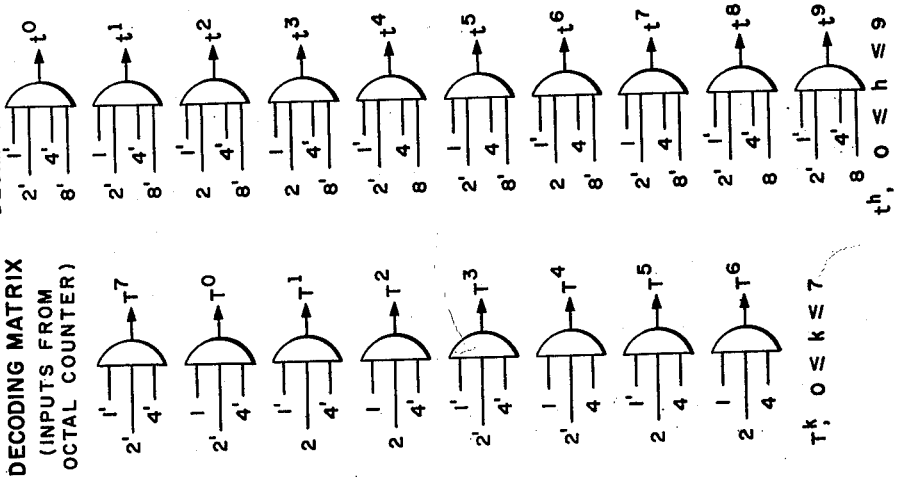

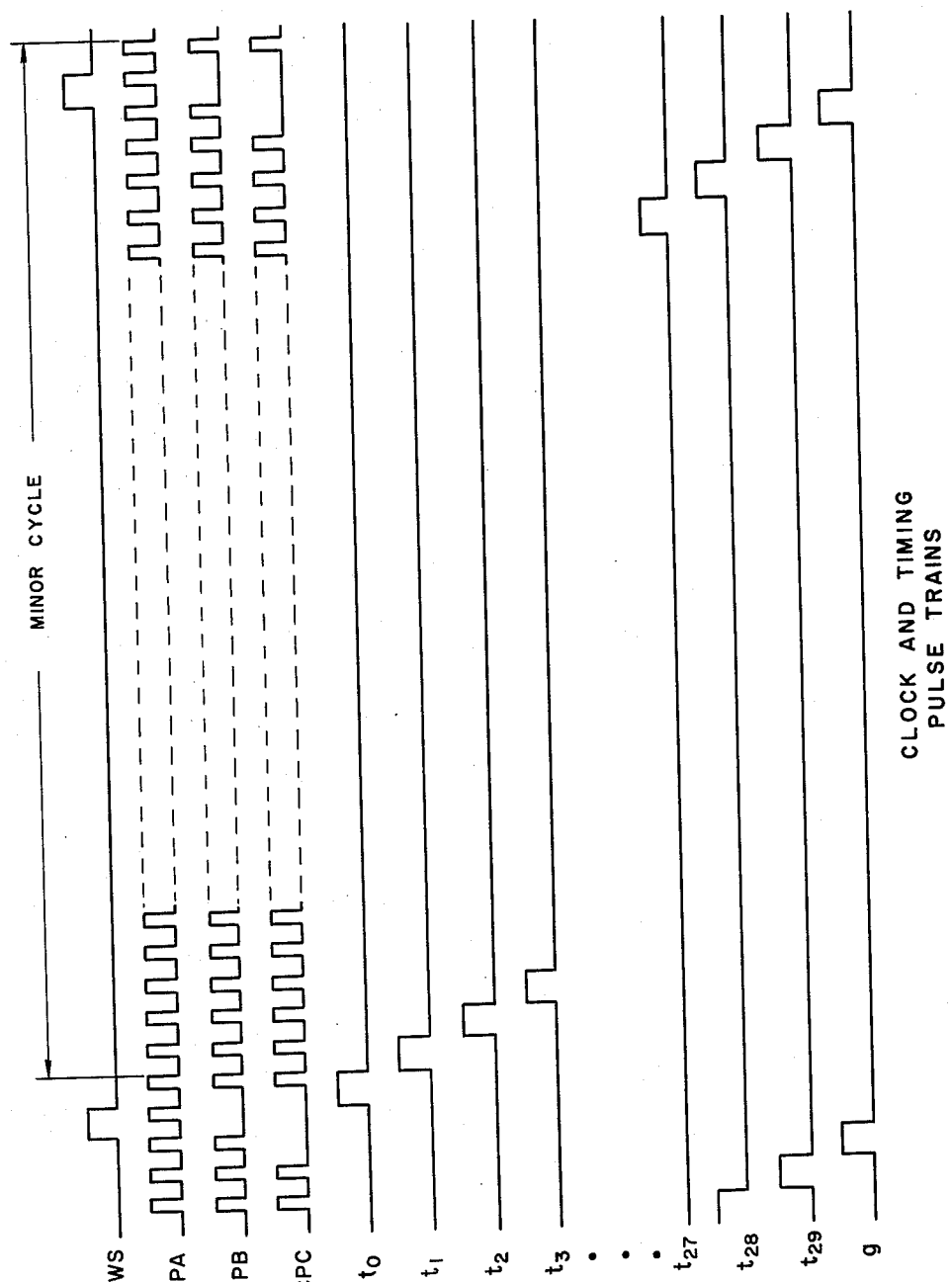

April 23, 1963 J. E. DE TURK ETAL 3,087,010
AUTOMATIC TELEGRAPH SWITCHING SYSTEM
Filed April 27, 1960 64 Sheets-Sheet 22

FIG. 25

TELEGRAPH RECEIVER PORTION WAVEFORMS

TRANSITION DIAGRAM FOR $SW_1$ AND $SW_2$

INSTRUCTION PROCESSING UNIT

INSTRUCTION PROCESSING UNIT

April 23, 1963  J. E. DE TURK ETAL  3,087,010
AUTOMATIC TELEGRAPH SWITCHING SYSTEM
Filed April 27, 1960  64 Sheets-Sheet 31

April 23, 1963  J. E. DE TURK ETAL  3,087,010
AUTOMATIC TELEGRAPH SWITCHING SYSTEM
Filed April 27, 1960  64 Sheets-Sheet 33
FIG. 37
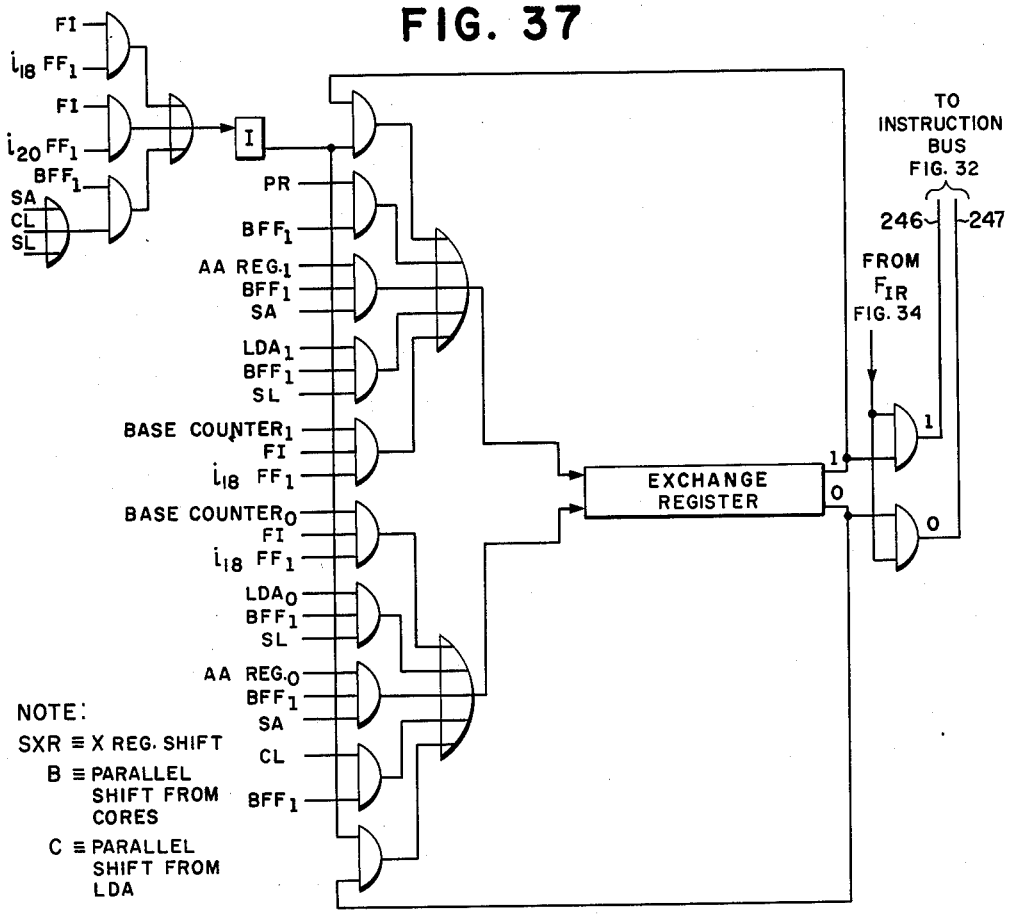
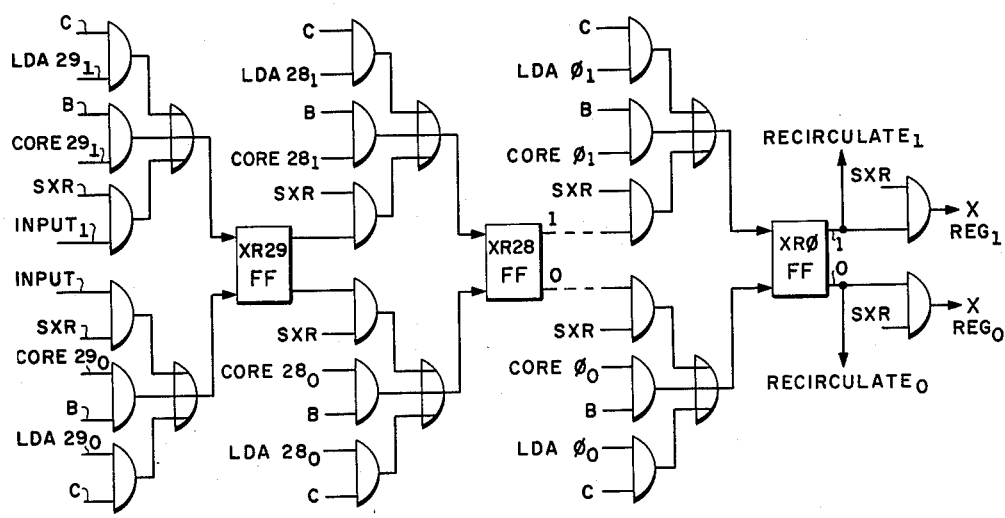
EXCHANGE REGISTER
INPUT GATING AND DETAIL

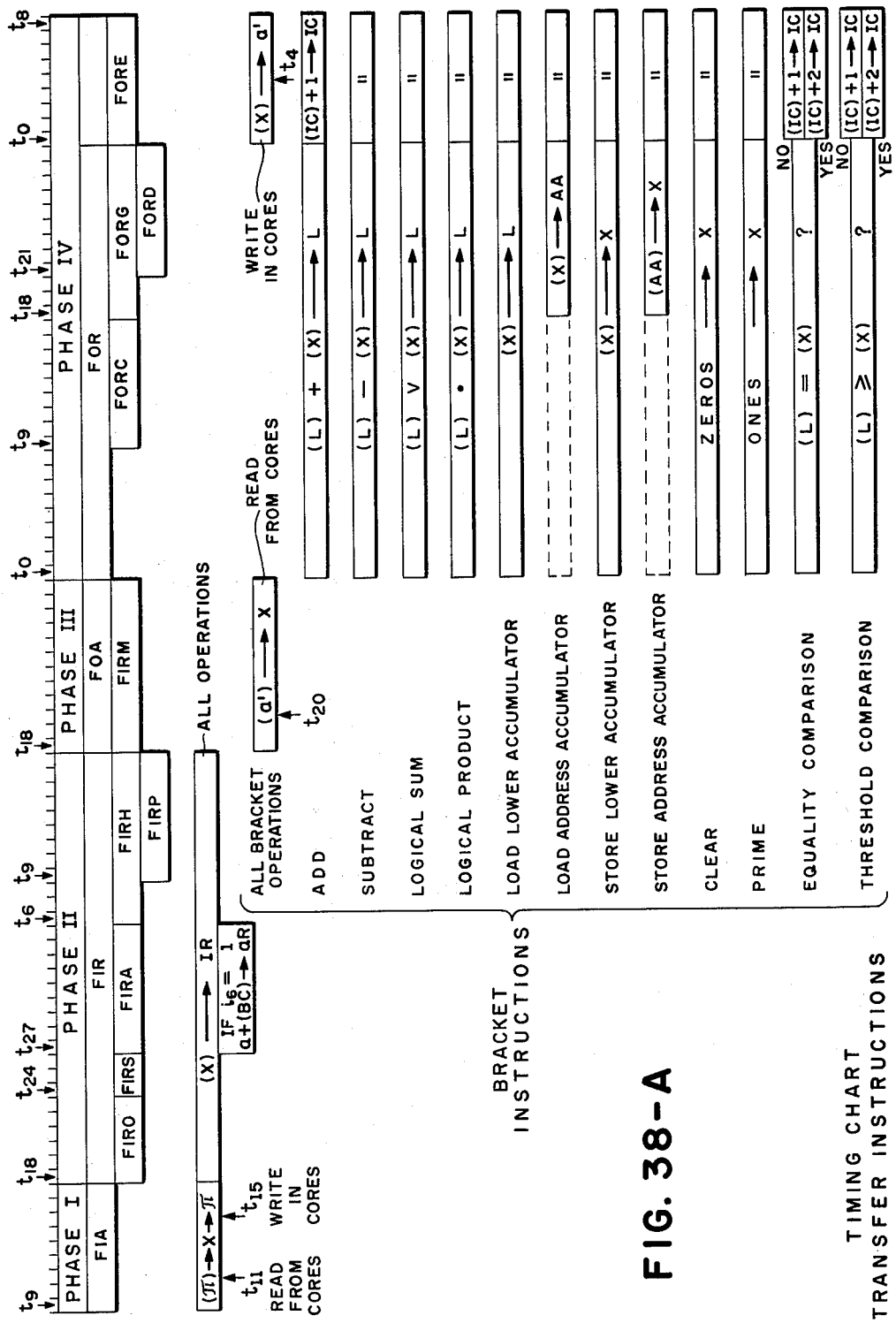
FIG. 38-A
TIMING CHART
TRANSFER INSTRUCTIONS

FIG. 38-B

TIMING CHART

| PHASE I | PHASE II | PHASE III | PHASE IV |
|---|---|---|---|
| FIA / FIR / FIRO | | | FORE |

$(\pi) \rightarrow X \rightarrow \pi$

ALL OPERATIONS

$(d') \rightarrow X$    IF $i_{18}=1$
             IF $i_{19}=1$ $t_{20}$ READ    IF $i_{19}=1$

FILE COUNTERS: $(BC) \rightarrow X$ ; ZERO'S $\rightarrow BC$ ; $a_2 \rightarrow IC$ ; IF $i_{20}=1$ $(IC)+1 \rightarrow X$ ; $(X) \rightarrow a'$

SET COUNTERS: $q_1 \rightarrow BC$ ; IF $i_{20}=1$ $a_2 \rightarrow IC$ ; IF $i_{20}=0$ $(IC)+1 \rightarrow IC$

BASE $\boxed{a+(BC) \rightarrow BC}$   $\boxed{(BC) \geq a \ ?}$   IF NO    $(IC)+1 \rightarrow IC$
                                                 IF YES   IF $i_{19}=1$ ZERO'S $\rightarrow BC$   $(IC)+2 \rightarrow IC$

CONTROL INSTRUCTIONS

ACCUMULATE BITS: RT. CIRC. SHIFT DA 60 CELLS    $(IC)+1 \rightarrow IC$

SHIFT: RT. CIRC. SHIFT ENTIRE DA N CELLS   $1 \leq N \leq 59$    $(IC)+1 \rightarrow IC$

NORMALIZE: RT. CIRC. SHIFT ENTIRE DA UNTIL A "1" APPEARS IN p0 OF LDA. ACCUMULATE # OF CELLS SHIFTED IN AA
   IF # CELLS SHIFTED $\leq 59$    $(IC)+1 \rightarrow IC$
   IF # CELLS SHIFTED $> 59$    $(IC)+2 \rightarrow IC$

CHARACTER SEARCH: RT. CIRC. SHIFT ENTIRE DA UNTIL $(A_0 \cdots A_4) = i_{18} \cdots i_{22}$
ACCUMULATE # OF CELLS SHIFTED IN AA
   IF SEARCH IS SATISFIED    $(IC)+1 \rightarrow IC$
   IF SEARCH IS NOT SATISFIED    $(IC)+2 \rightarrow IC$

MOVE TAPE FORWARD: SELECT TAPE TRANSPORT / SELECT TAPE TRANSPORT / N→TAPE CONTROL    $(IC)+1 \rightarrow IC$

MOVE TAPE BACK: N→TAPE CONTROL    $(IC)+1 \rightarrow IC$

POSITIONING INSTRUCTIONS

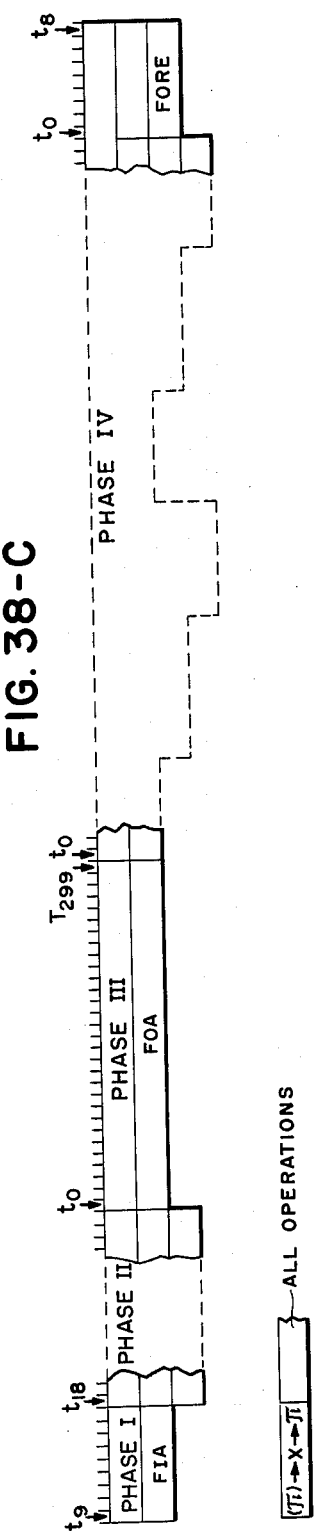
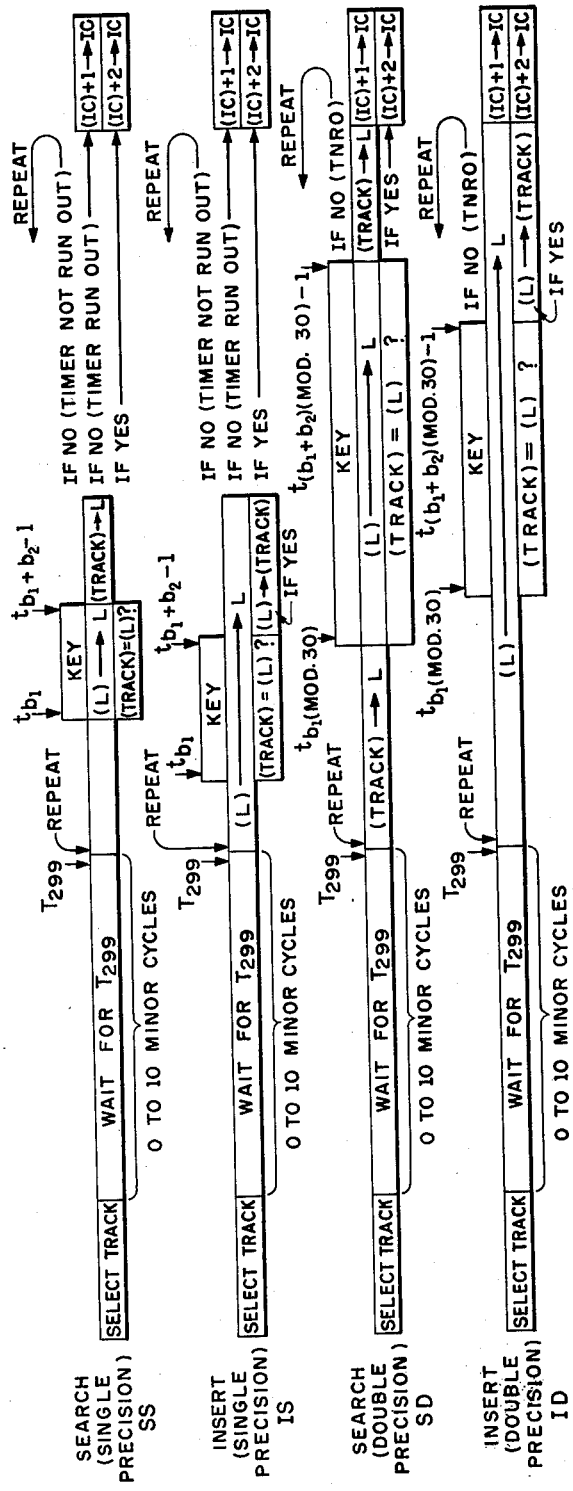
FIG. 38-C
TABLE MAINTENANCE INSTRUCTIONS

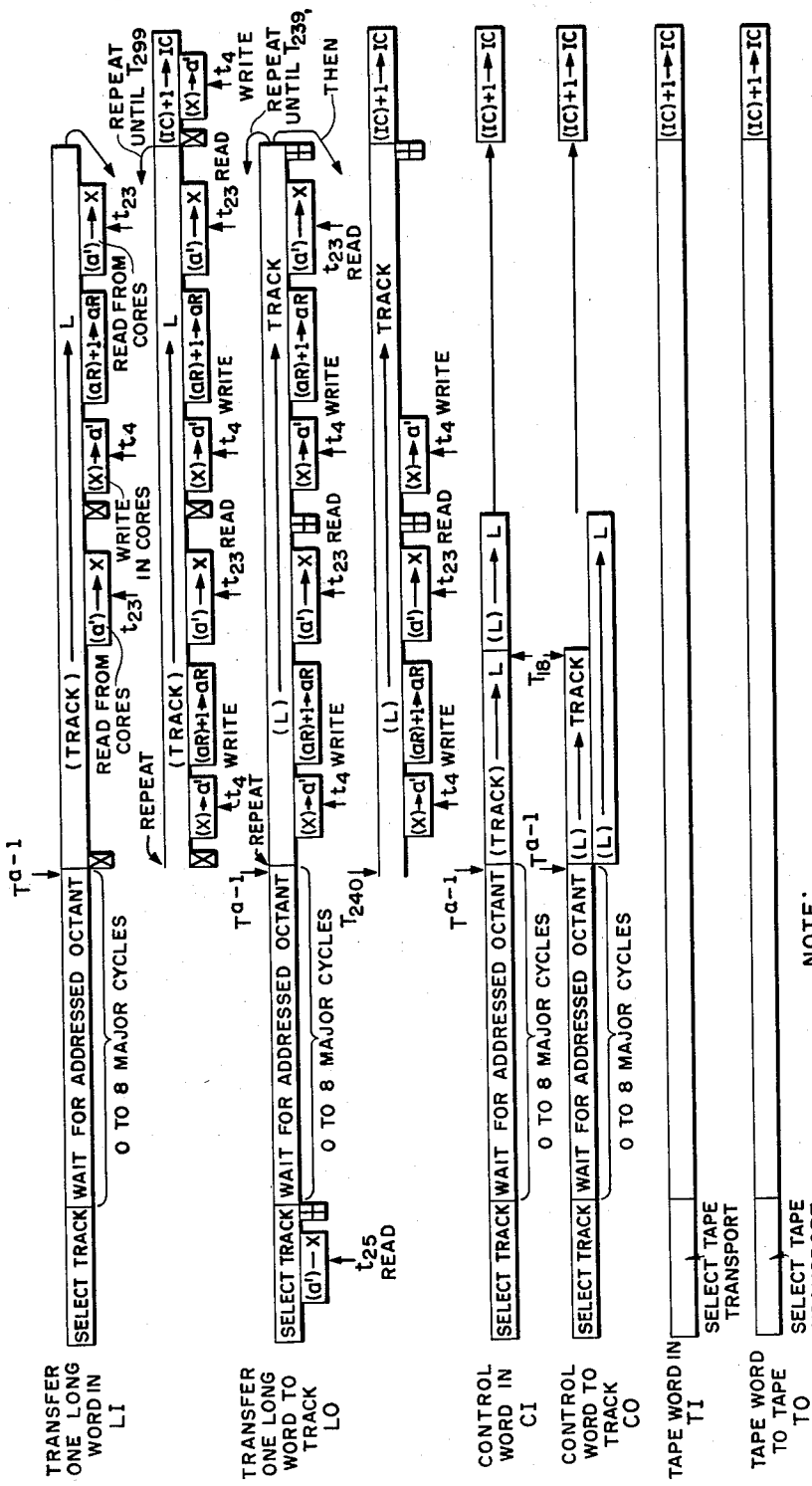
FIG. 38-D
TIMING CHART — TRANSFER INSTRUCTIONS

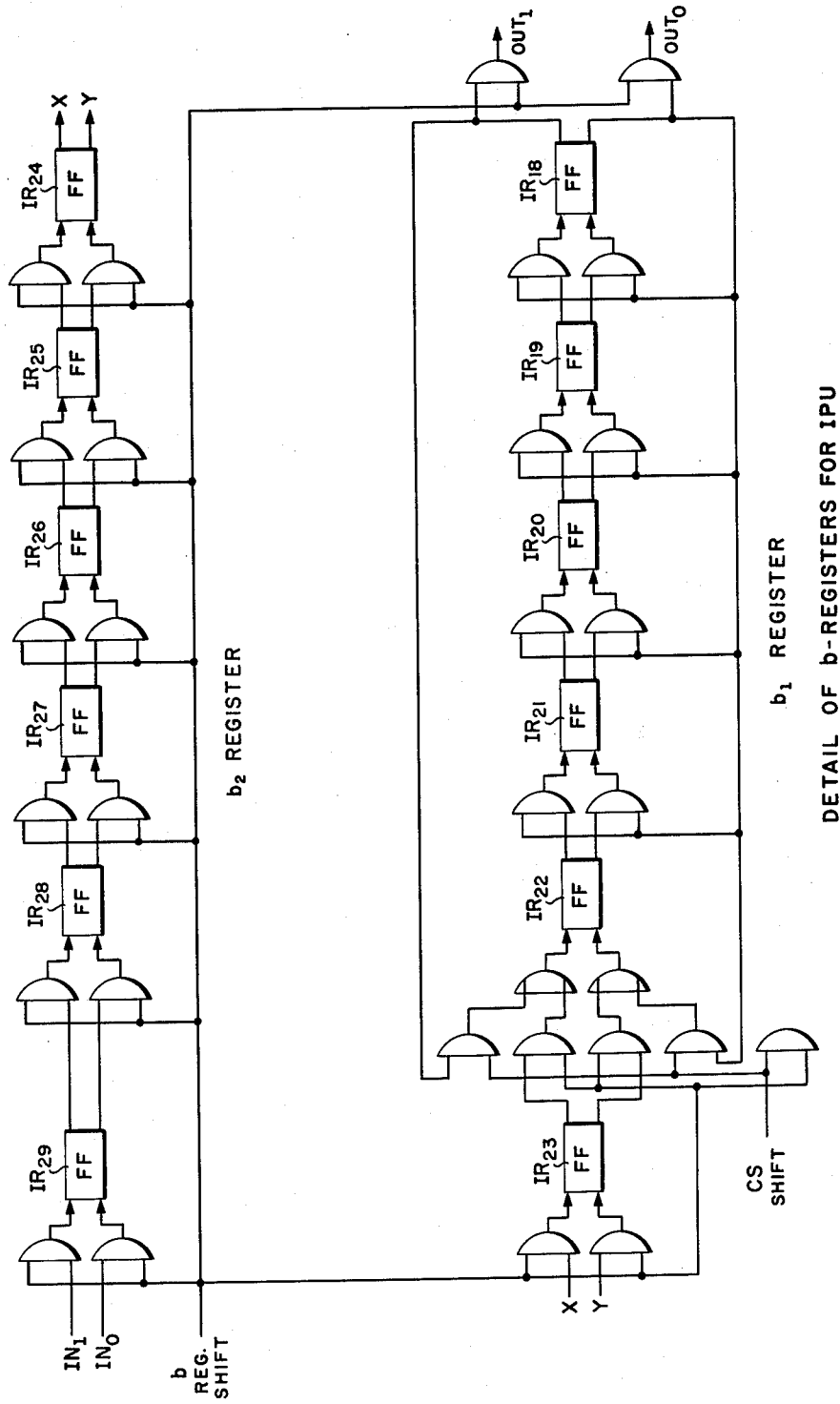

April 23, 1963  J. E. DE TURK ETAL  3,087,010
AUTOMATIC TELEGRAPH SWITCHING SYSTEM
Filed April 27, 1960  64 Sheets-Sheet 39

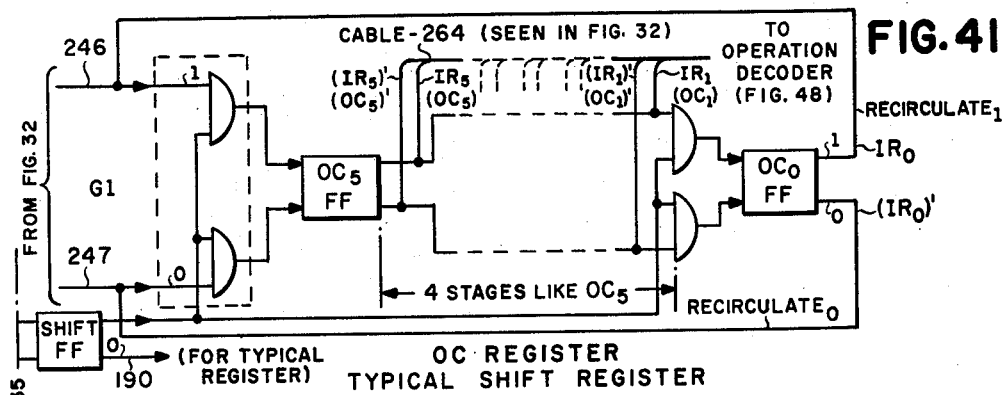
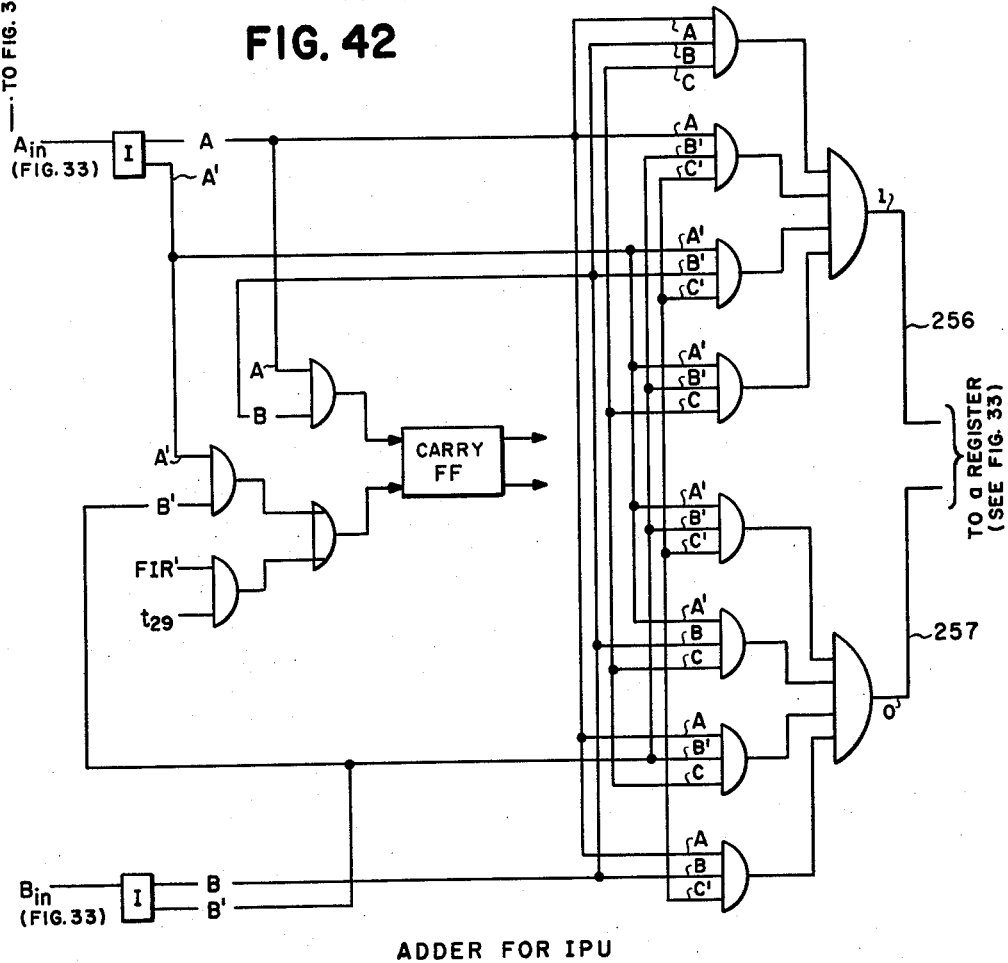

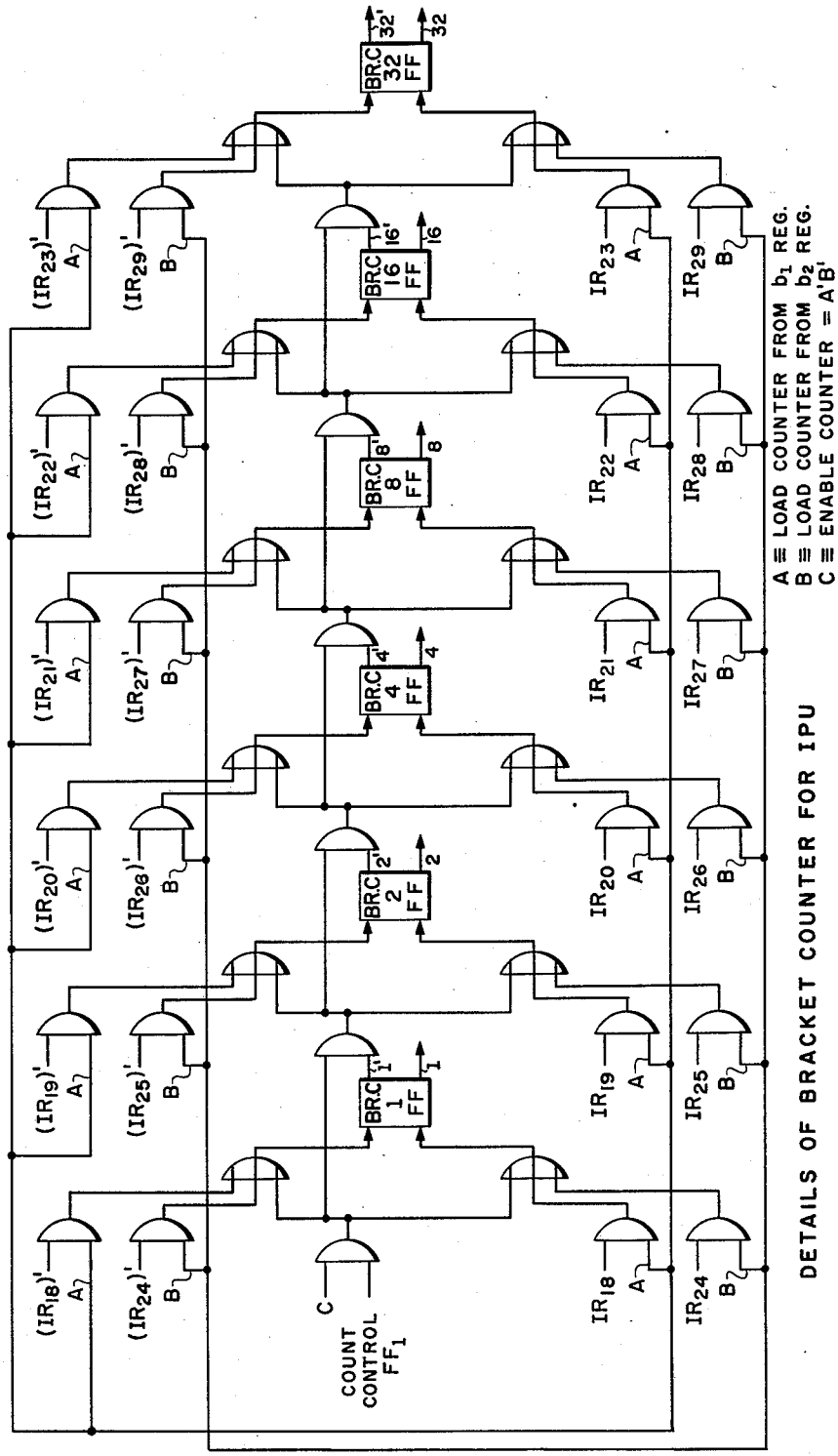
FIG. 43 DETAILS OF BRACKET COUNTER FOR IPU

April 23, 1963  J. E. DE TURK ETAL  3,087,010
AUTOMATIC TELEGRAPH SWITCHING SYSTEM
Filed April 27, 1960  64 Sheets-Sheet 42

UPPER DATA ACCUMULATOR
DETAIL OF UDA 5 TO UDA 29 IS THAT OF A TYPICAL SHIFT REGISTER

LOWER DATA ACCUMULATOR
DETAIL OF LDA 2 TO LDA 29 IS THAT OF A TYPICAL SHIFT REGISTER

ADDRESS ACCUMULATOR REGISTER-COUNTER
DETAIL OF DPU REGISTER

FIG. 46-A
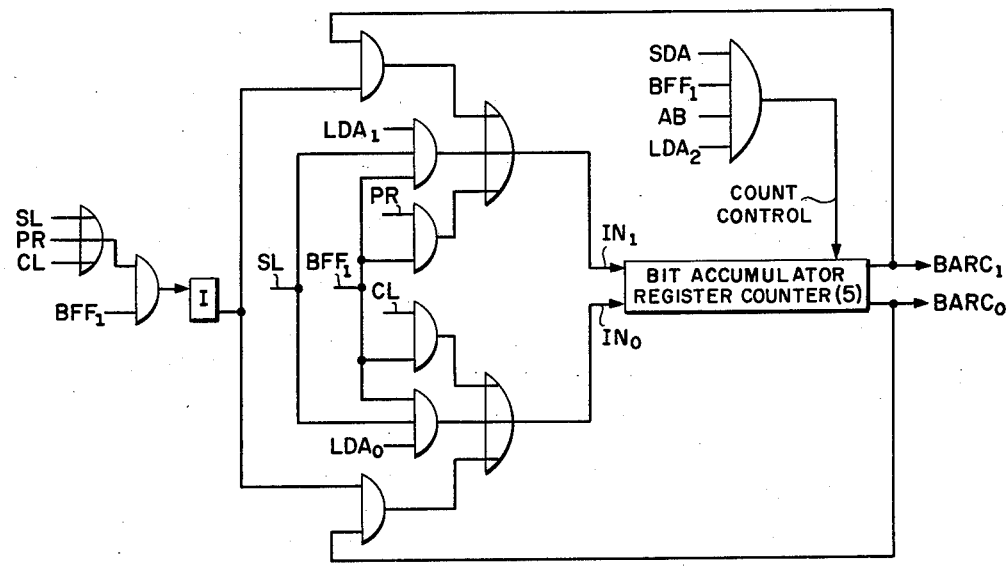
BIT ACCUMULATOR REGISTER-COUNTER
DETAIL OF REGISTER COUNTER
SAME AS THAT OF AA REGISTER (FIG. 46), MODIFIED FOR 5 STAGES
FIG. 56
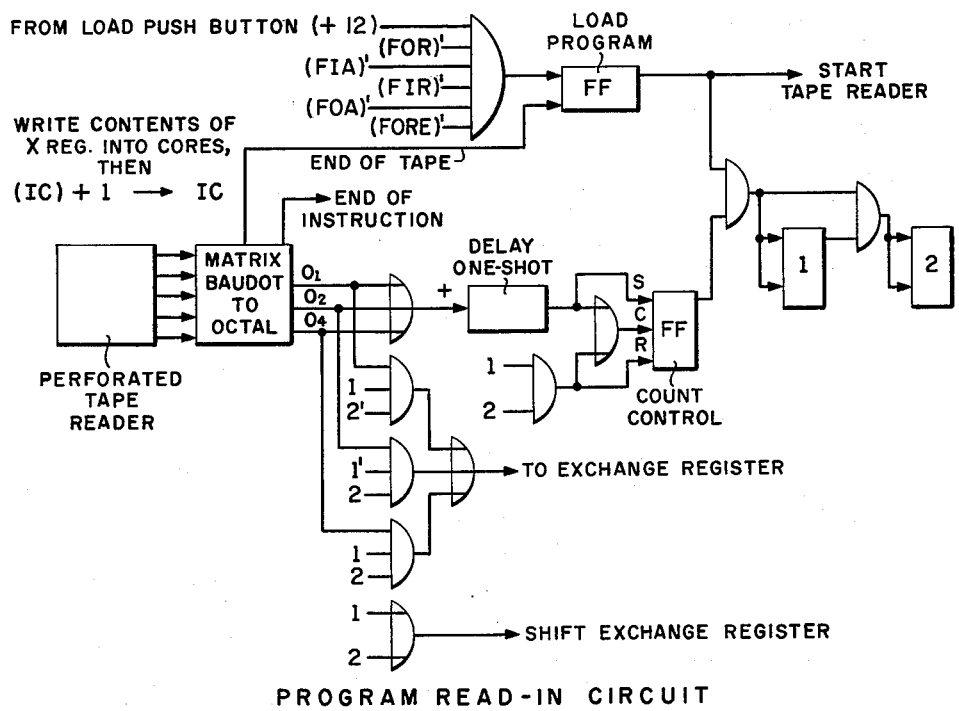
PROGRAM READ-IN CIRCUIT

OCTANT COMPARATOR

OPERATION DECODER

DATA PROCESSING UNIT

DATA PROCESSING UNIT

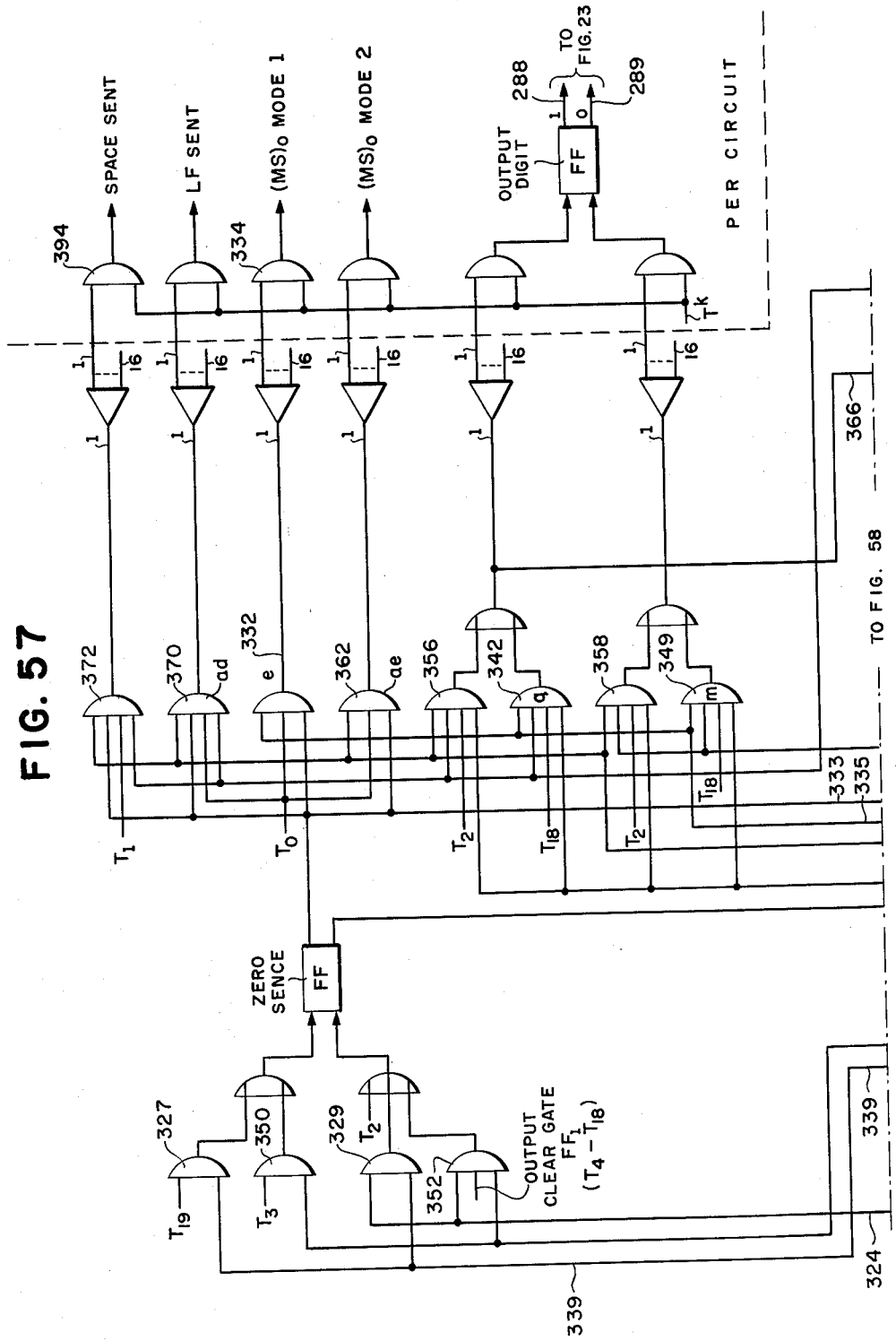

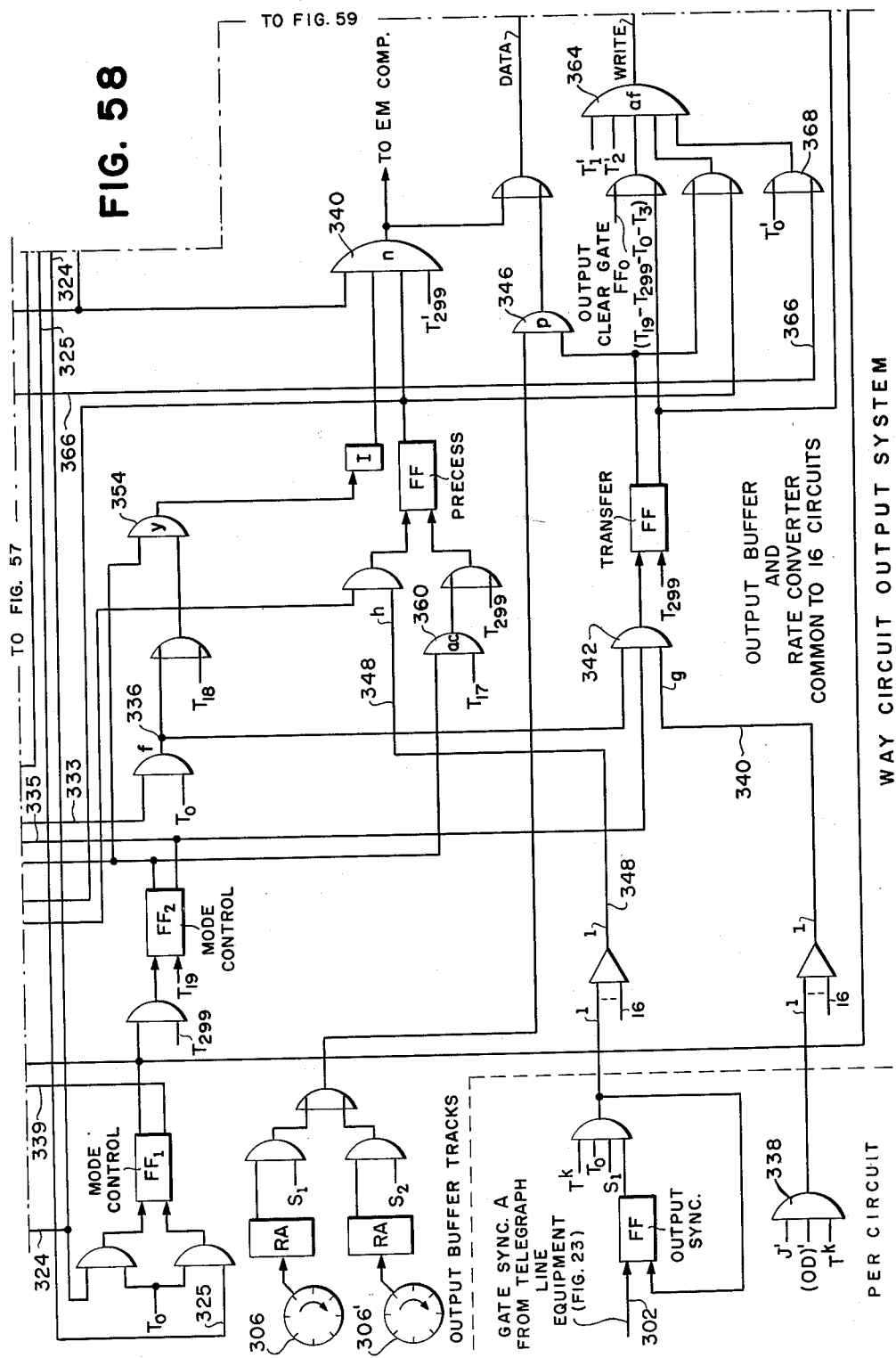

HEAD SELECTION SWITCH
HEAD SUBSCRIPTS ARE OCTAL

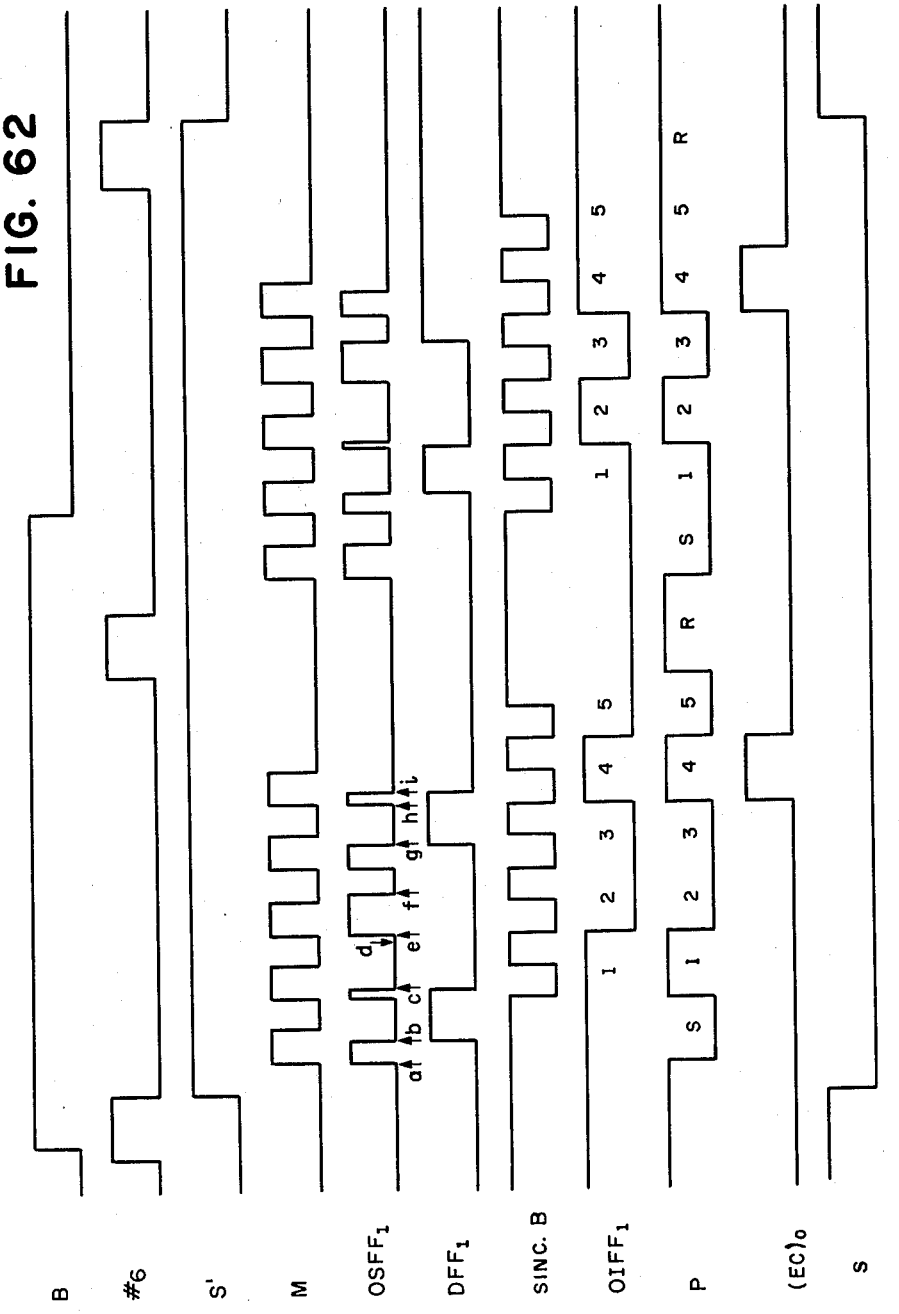

April 23, 1963  J. E. DE TURK ETAL  3,087,010
AUTOMATIC TELEGRAPH SWITCHING SYSTEM
Filed April 27, 1960  64 Sheets-Sheet 58

TELEGRAPH PULSE GENERATOR WAVEFORMS
SCALE: 27 MILLISECONDS PER INCH

TRUNK CIRCUIT OUTPUT SYSTEM

DRUM READ AND WRITE GATING

United States Patent Office 3,087,010
Patented Apr. 23, 1963

3,087,010
AUTOMATIC TELEGRAPH SWITCHING SYSTEM
John E. De Turk, Wellesley, Mass., William G. Brown, Morton Grove, Ill., James R. McReynolds, Ann Arbor, Mich., and Robert L. Snyder and Lewis Fulkerson, New York, N.Y., assignors to The Western Union Telegraph Company, New York, N.Y., a corporation of New York
Filed Apr. 27, 1960, Ser. No. 25,033
12 Claims. (Cl. 178—2)

CONTENTS OF SPECIFICATION

| | Column |
|---|---|
| Objects of Invention | 2 |
| GENERAL DESCRIPTION | 4 |
| Processing According to Type of Information | 5 |
| Functional Organization | 6 |
| Magnetic Drum Store | 6 |
| Core Storage System | 7 |
| Magnetic Tape Store | 8 |
| GENERAL DESCRIPTION OF OPERATION OF THE SWITCHING SYSTEM | 9 |
| The Input System | 11 |
| Precessing Operation | 11 |
| Tributary Input Control | 13 |
| Tributary Output System | 15 |
| Mode 1 Transmission | 16 |
| Mode 2 Transmission | 16 |
| Output System Trunk Circuits | 17 |
| Tributary Selection and Control | 18 |
| The Message Processor | 18 |
| Special Registers | 19 |
| Instruction Processing Unit | 20 |
| The Instruction Cycle | 21 |
| The Instruction Counter; Base Counter | 21 |
| The Instruction Register; Operation Decoder; Selection Matrices; Instruction Cycle and Timing Control Units; Program Interrupt Flip-Flop | 22 |
| The Data Processing Unit | 22 |
| The Control Console | 22 |
| Control Switches | 22 |
| Start-Stop Selector Switch | 23 |
| The Display Panel | 23 |
| The Input-Output Station | 23 |
| Supervisor Station | 24 |
| Message Specifications | 24 |
| Scheduling Internal Operations | 25 |
| The Program Cycle | 25 |
| Demand Operations | 25 |
| Routing Operations | 26 |
| Route Selection | 26 |
| Output Scheduling | 27 |
| Interruption in the Invitation Cycle | 27 |
| Premature Termination of a Message | 28 |
| Improper Message Headings | 28 |
| Errors in Input Sequence Numbers | 28 |
| Improper Routing Indicators | 28 |
| Errors in Trunk Transmission | 29 |
| Selected Station Failing To Acknowledge Receipt of a Message | 29 |
| Overflow | 29 |
| Tracing a Message | 30 |
| CIRCUIT DESCRIPTION | 30 |
| Timing Generator | 31 |
| t-Pulses | 31 |
| T-Pulse Codes | 31 |
| Minor Cycles and Major Cycles | 32 |
| Tributary Input Circuit | 33 |
| Transfer to the Input Buffer | 36 |
| End Message Recognition | 37 |
| Full Warning and Alarm | 38 |
| Head Selection Switch | 39 |
| Drum Status Circuit | 39 |
| OPERATION OF THE INSTRUCTION AND DATA PROCESSING UNITS | 40 |
| Programming Instructions | 40 |
| Bracket Instructions—Composition | 40 |
| Description of Bracket Instructions | 41 |
| Positioning Instructions | 42 |
| Transfer Instructions | 42 |
| Table Maintenance Instructions | 43 |
| Control Instructions | 43 |
| Instruction Cycle | 44 |
| Phase I and Phase II Operations | 45 |
| Bracket Instructions | 47 |
| Add | 47 |
| Subtract | 48 |
| Logical Sum | 48 |
| Logical Product | 48 |
| Load Lower Accumulator | 48 |
| Store Lower Accumulator | 48 |
| Load Address Accumulator | 49 |
| Store Address Accumulator | 49 |
| Clear | 49 |
| Prime | 50 |
| Compare Equality | 50 |
| Compare Threshold | 50 |
| Positioning Instructions | 50 |
| Shift | 50 |
| Accumulate Bits | 51 |
| Normalize | 51 |
| Character Search | 52 |
| Move Tape Forward | 52 |

OPERATION, ETC.—Continued
Positioning Instructions—Continued

| | Column |
|---|---|
| Move Tape Back | 52 |
| Transfer Instructions | 52 |
| Tape Word In | 52 |
| Tape Word Out | 52 |
| Transfer One L-Word In | 53 |
| Transfer One L-Word Out | 53 |
| Control Word In | 54 |
| Control Word Out | 54 |
| Table Maintenance Instructions | 55 |
| Single Search Precision | 55 |
| Search Double Precision | 56 |
| Insert Single Precision | 57 |
| Insert Double Precision | 58 |
| Control Instructions | 58 |
| File | 58 |
| Set Counters | 59 |
| Base | 59 |
| TRIBUTARY OUTPUT SYSTEM | 60 |
| Mode 1 Transmission | 60 |
| End of Message Recognition | 61 |
| Mode 2 Transmission | 61 |
| Output Demand Conditions | 62 |
| Telegraph Transmitter Circuit | 63 |
| CONTROL CIRCUITRY | 64 |
| Stop Request FF | 64 |
| Allow Stop FF | 65 |
| Transmitter Control FF | 65 |
| Start Inhibit FF | 65 |
| Stepping Switches | 66 |
| Termination Word Procedure | 68 |
| Timers Tl₁–Tl₄ | 68 |
| Demand Procedure | 68 |
| TRUNK CIRCUIT INPUT-OUTPUT SYSTEM | 69 |
| Input System | 69 |
| Operation of the Sum Checker | 70 |
| Input Control Equipment | 70 |
| Functions of Demand Flip-Flops | 71 |
| Output System and Control | 71 |

OBJECTS OF INVENTION

This invention relates to telegraph switching systems, and more particularly to a high speed switching system wherein the character code pulses of a number of telegraph messages respectively transmitted over a plurality of incoming channels may simultaneously or concurrently be received and temporarily stored in pulse storage devices at a telegraph switching center and automatically checked, processed and switched to desired outgoing channels. The incoming and outgoing channels may, for example, comprise teleprinter sending and receiving way station circuits or other tributaries and also trunk circuits extending between two or more telegraph switching centers.

In general it is an object of the invention to provide an automatic telegraph switching system in which the use of perforated tape and analogous mechanical signal storage elements at the switching center are obviated, and in which the signal pulses are applied to and read from signal storage sections by means of electronic circuitry; more particularly the storing, checking, processing and switching operations at the switching center are all automatically effected or controlled by electronic circuits.

It is also an object of the present invention to convert, at the switching center, the incoming telegraph message input rates to a higher internal, or intra-office, pulse rate to thereby expedite the automatic checking, processing and switching operations, and enable a greater number of incoming and outgoing telegraph channels to be served in much shorter intervals of time than with telegraph switching systems of the types heretofore employed.

Still another object of the invention is the provision of a telegraph switching system in which the signal pulses of the messages received from incoming channels and switched to proper outgoing channels are stored as binary digits, or bits, on sections of magnetic or analogous storage mediums during the checking, processing, switching and other operations.

An additional object is to provide a system of the character described in which the characters of each incoming message at the switching center are automatically grouped into successive unit length groups in order to facilitate the storage, transfer and switching operations.

A more specific object is to employ signal storage equipment in which certain storage sections thereof respectively are individual to the incoming and outgoing telegraph channels for storing at any one time a portion of each of the telegraph messages, and which equipment has random access storage sections available to any of the incoming and outgoing channels for storing complete messages, thereby to utilize more efficiently the available signal storage space.

A further object is to provide a switching center having means for storing signals representing various series of programmed functions for controlling the internal sequence of operations of the switching center to effect the desired operating routines and to expedite the flow of traffic, as distinguished from wired-in functions, thereby to reduce the cost of the equipment and provide flexibility in the operations which may readily be altered to suit a particular use or kind of service and different traffic conditions, and in which the address portion of a stored instruction may designate the address of stored numerical data, message data or the address of another instruction.

Numerous other objects and advantages will be apparent from the following detailed description of a telegraph switching system embodying the principles of the instant invention, taken in connection with the accompanying drawings in which:

FIGS. 1-A, 1-B, 1-C and 1-D collectively show in schematic form a switching system in accordance with the invention;

FIGS. 2-A and 2-B collectively are a developed view of the recording surface of a magnetic storage drum employed;

FIG. 3 diagrammatically shows a drum bin having 300 signal bit storage cells for accommodating a message unit of 280 information bits and also control and marker data;

FIG. 4 is a functional diagram of a signal bit precessing system in the input portion of the switching center;

FIG. 5 is a functional diagram similar to FIG. 4, in the output portion of the switching center;

Figure 10:
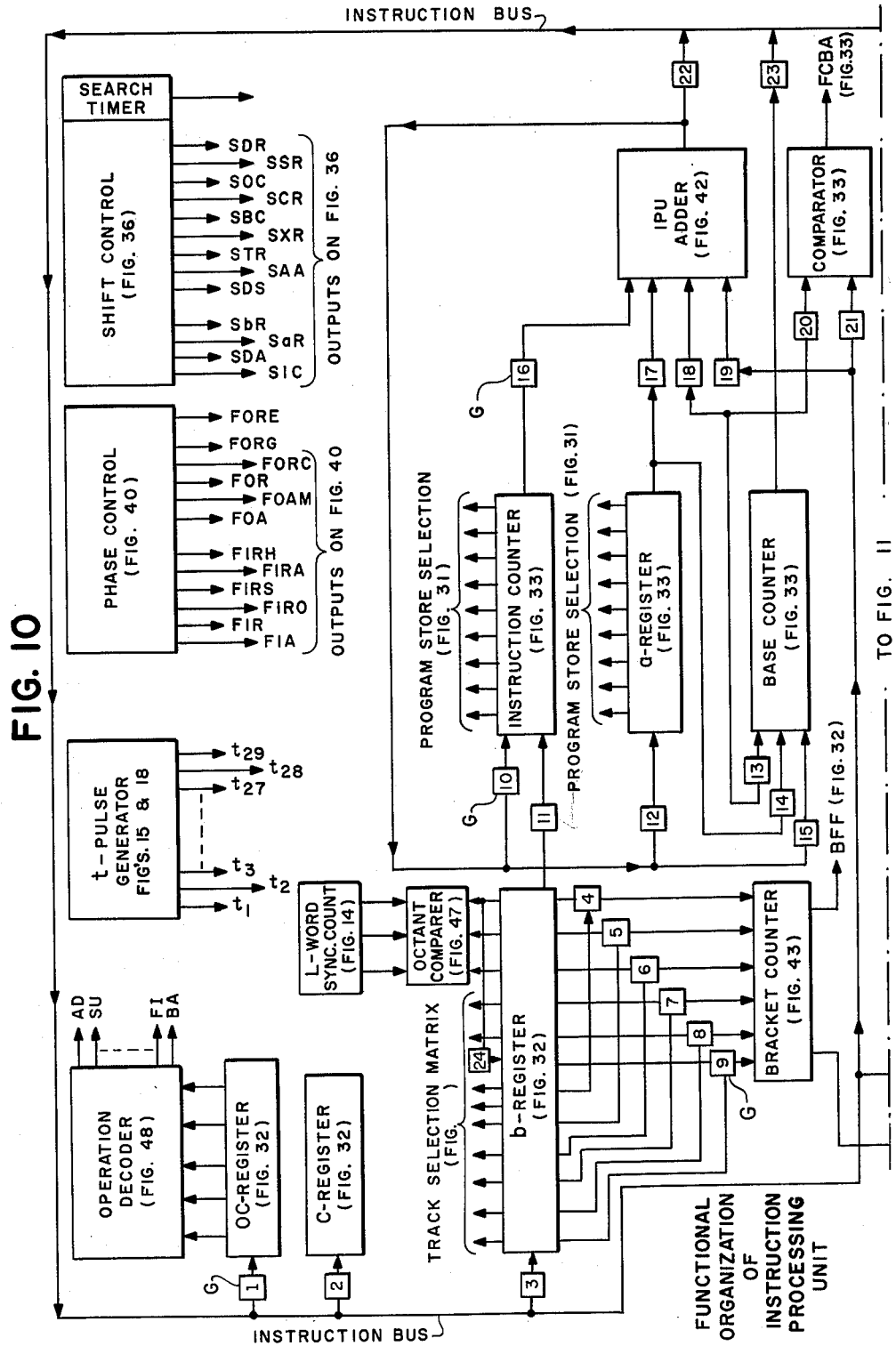
Figure 11:
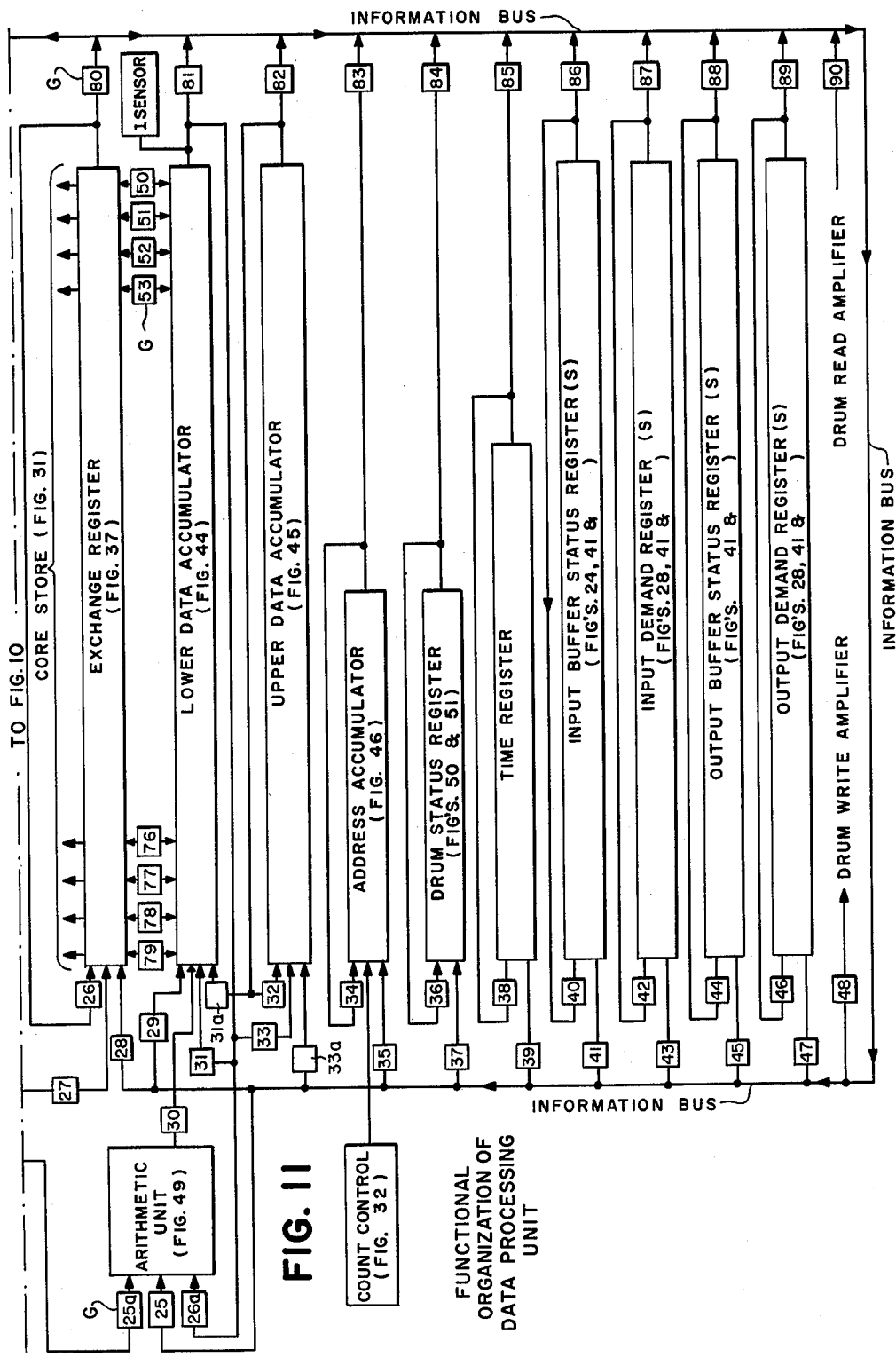
Figure 12:
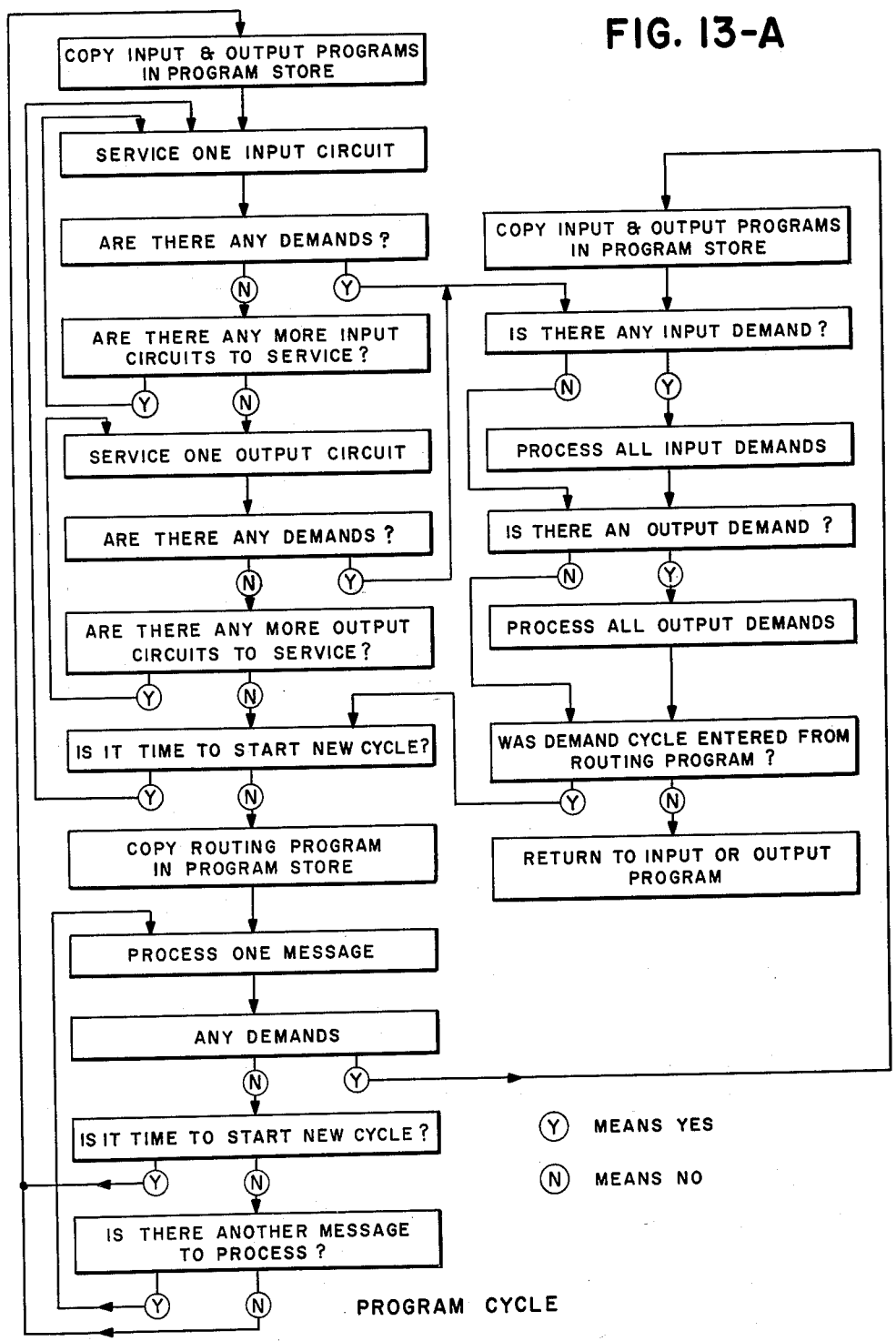
Figure 13:
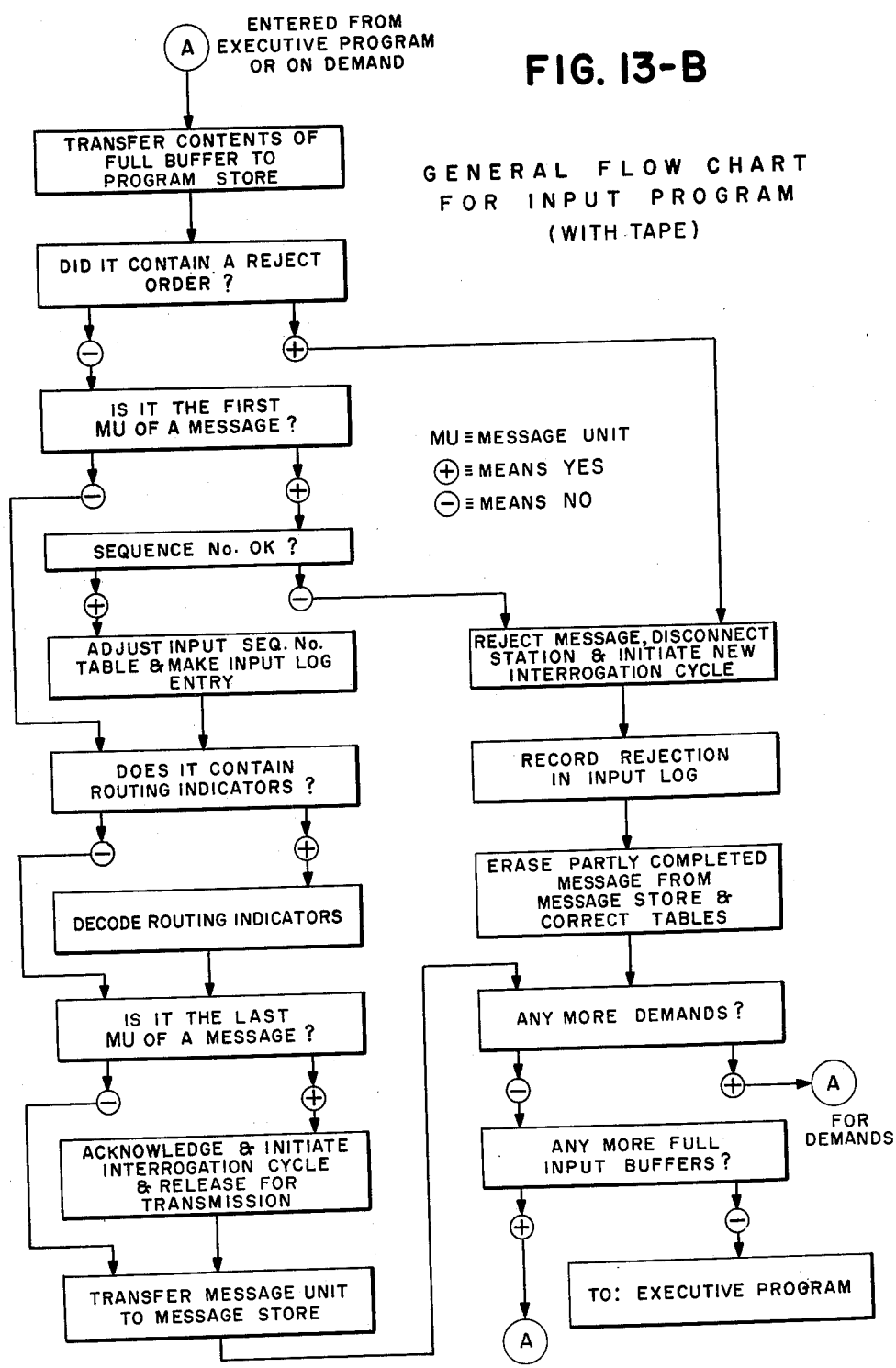
Figure 14:
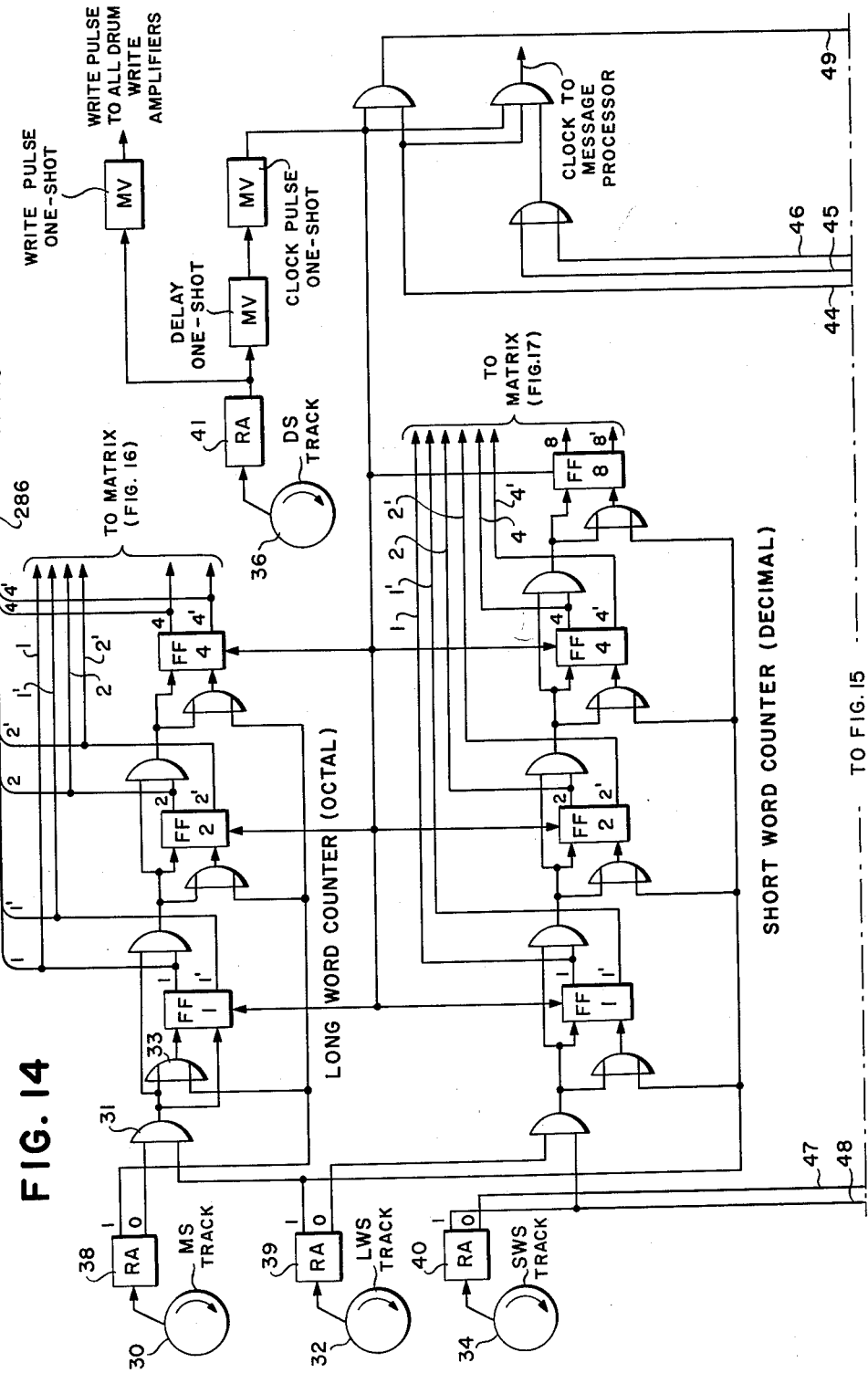
Figure 15:
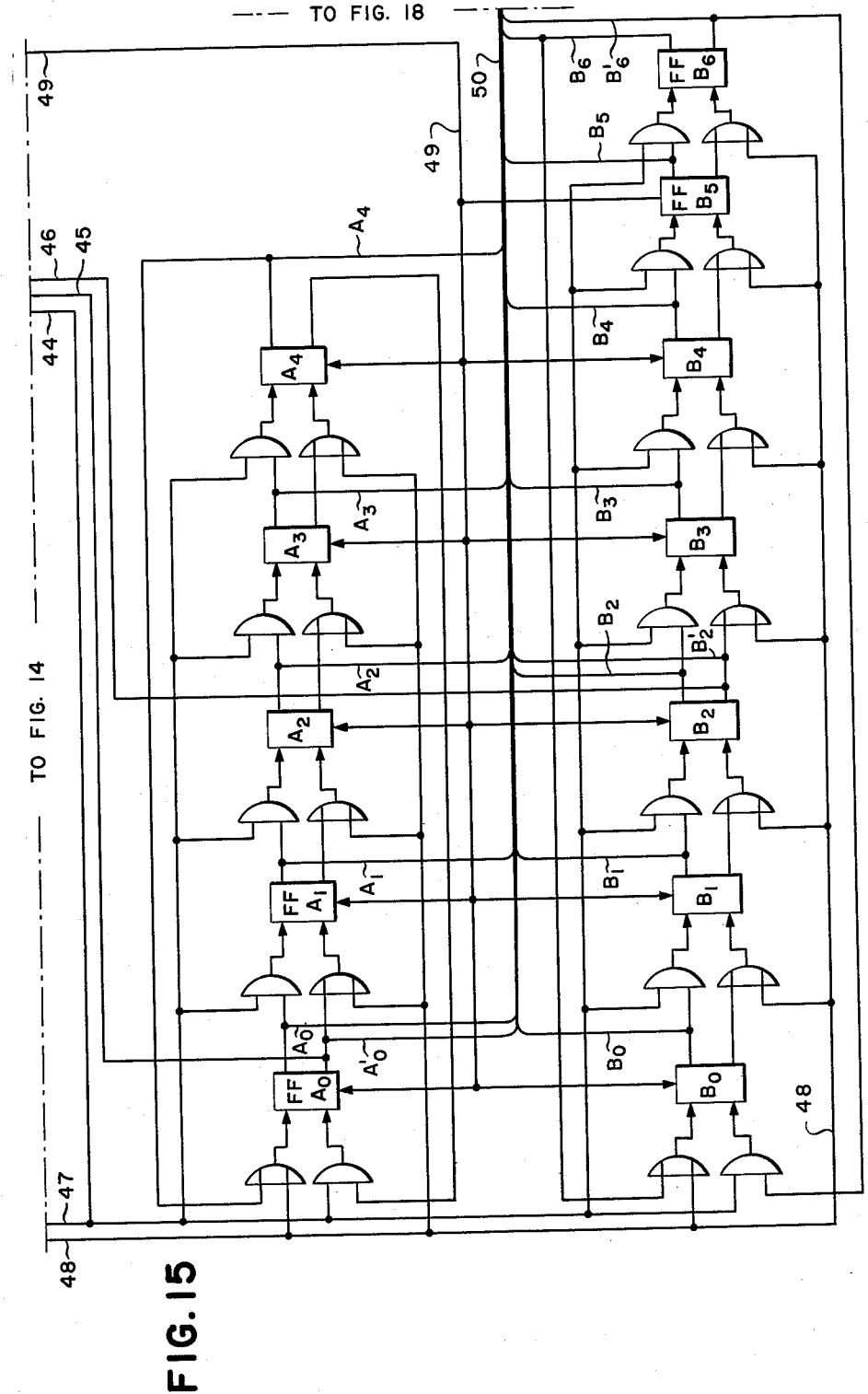
Figure 21:
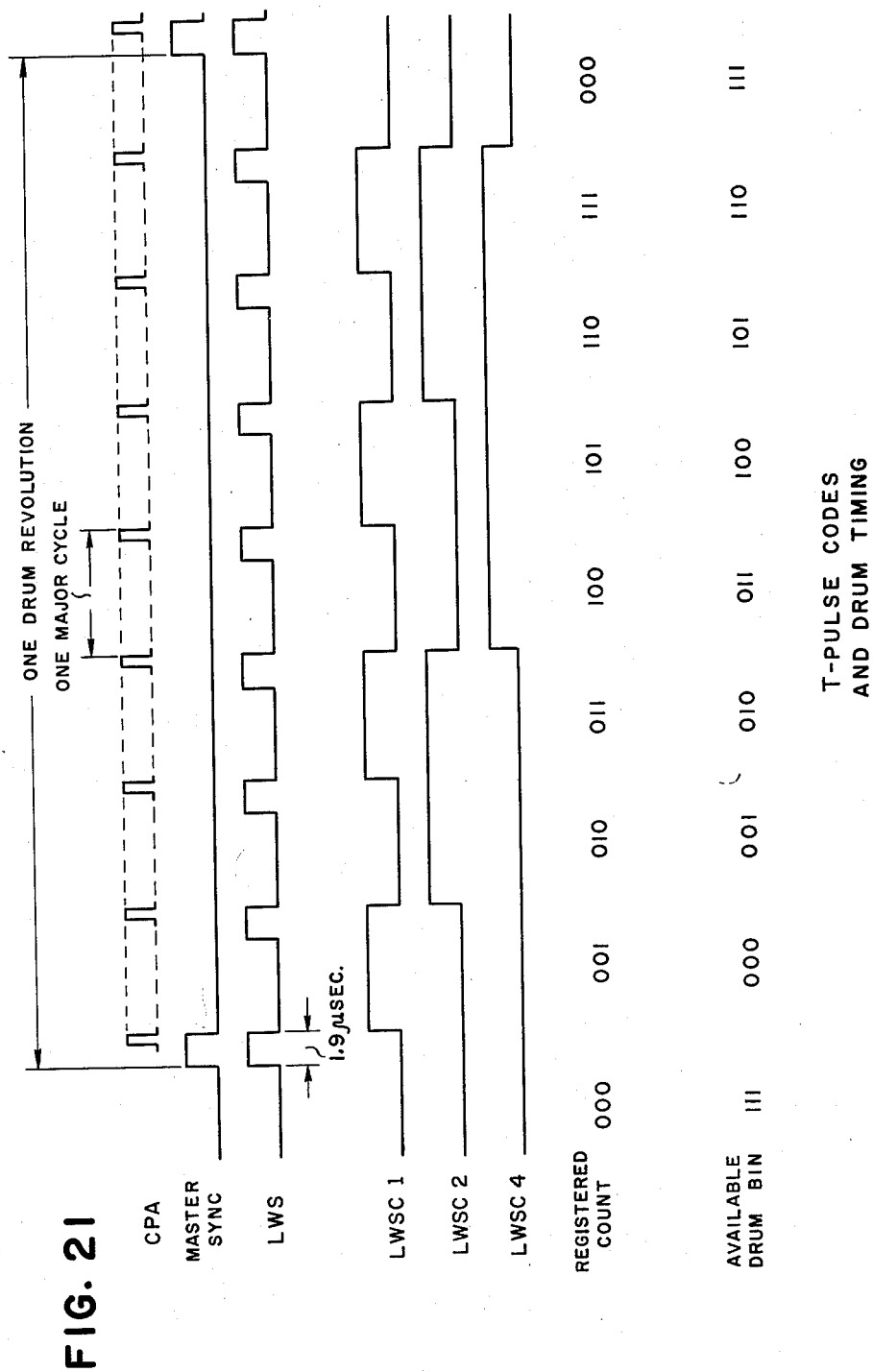
Figure 26:
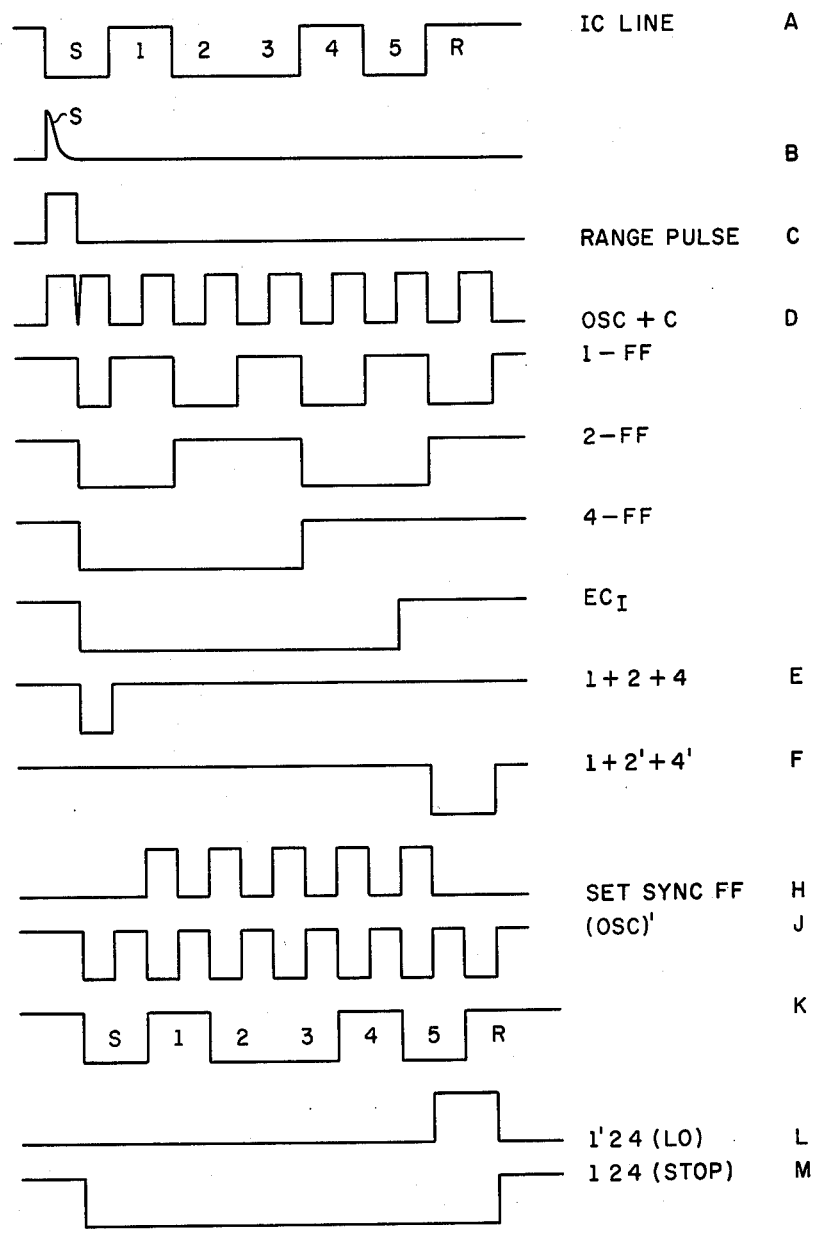
Figure 27:
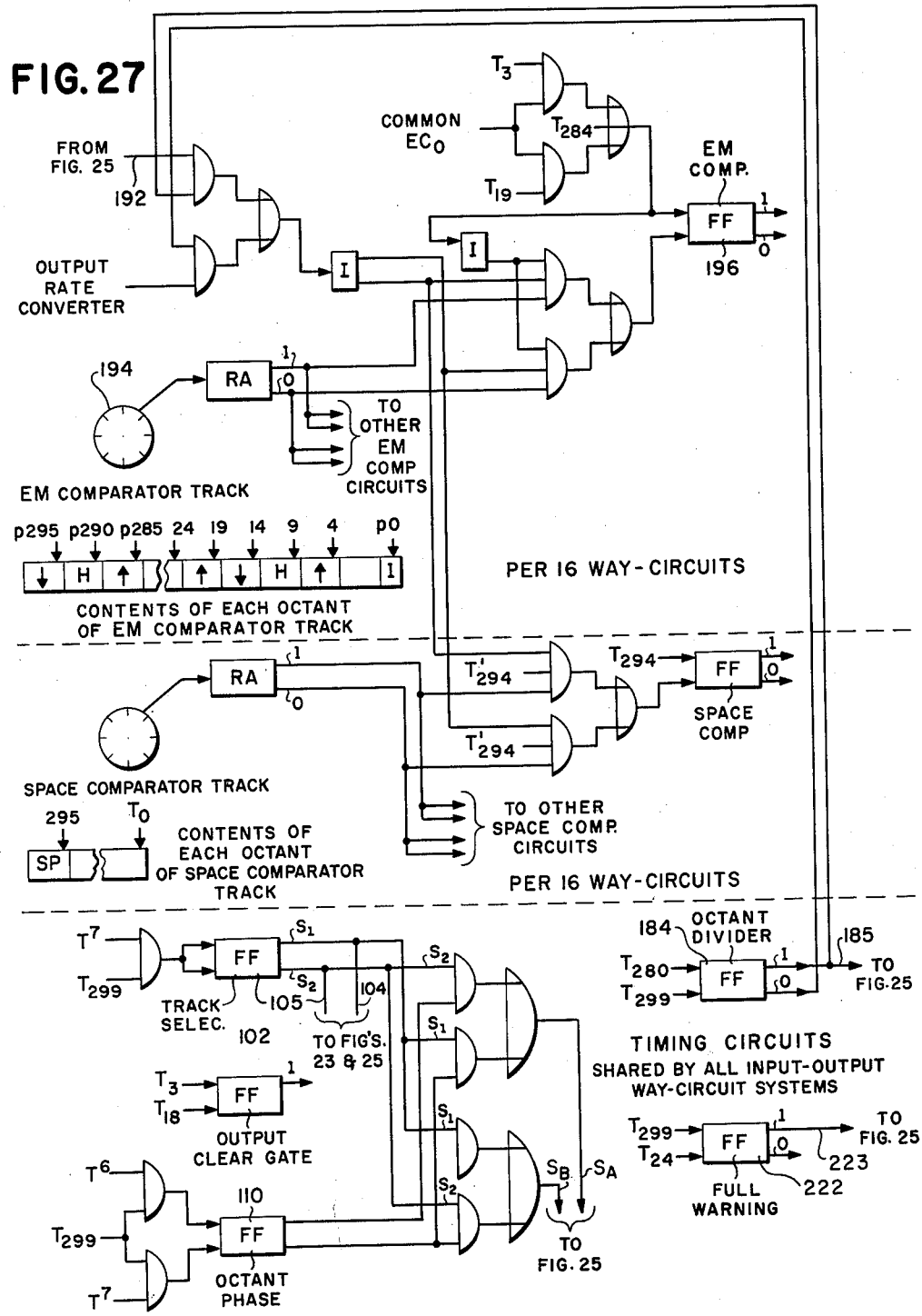
Figure 28:
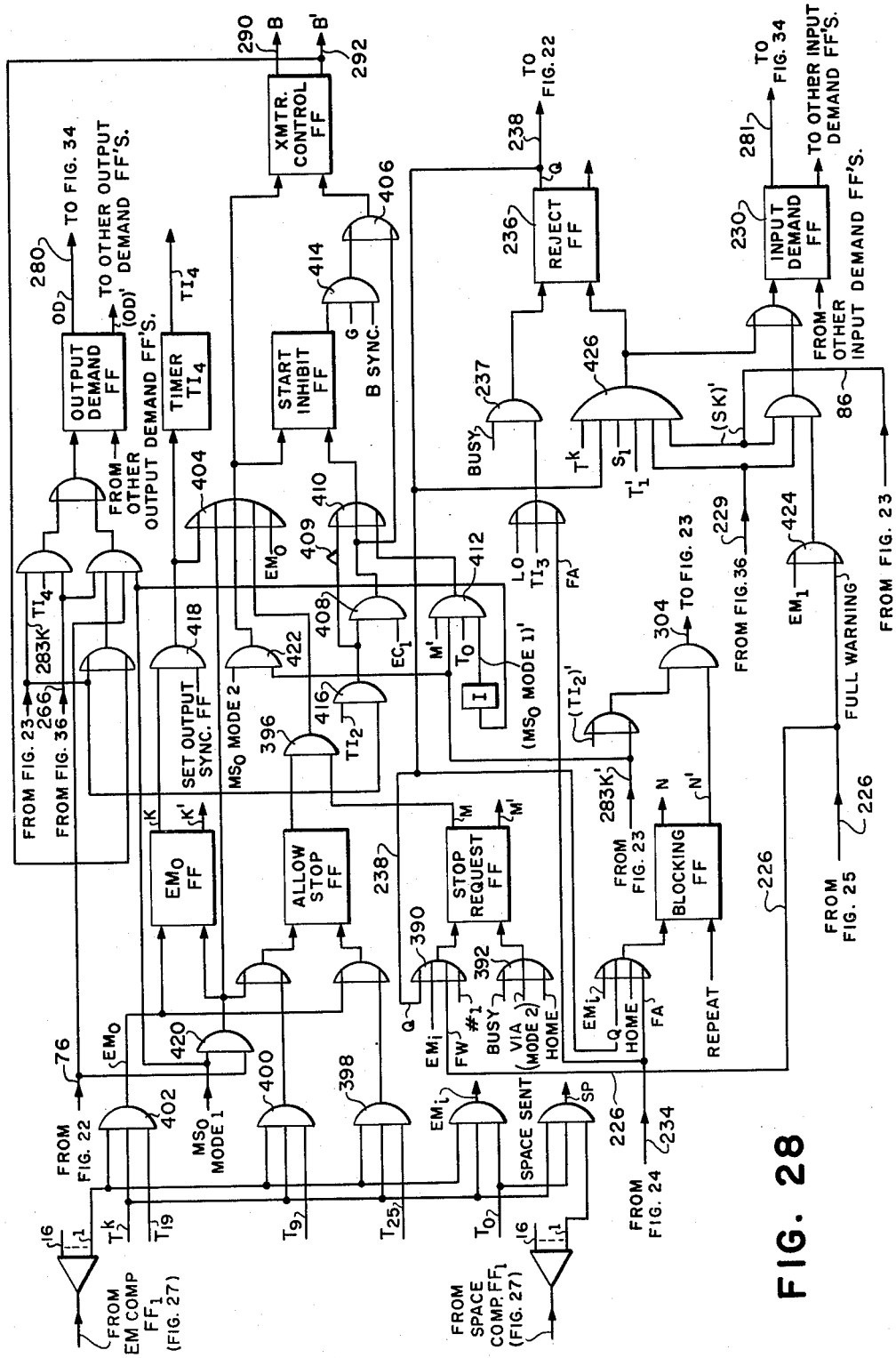
Figure 30:
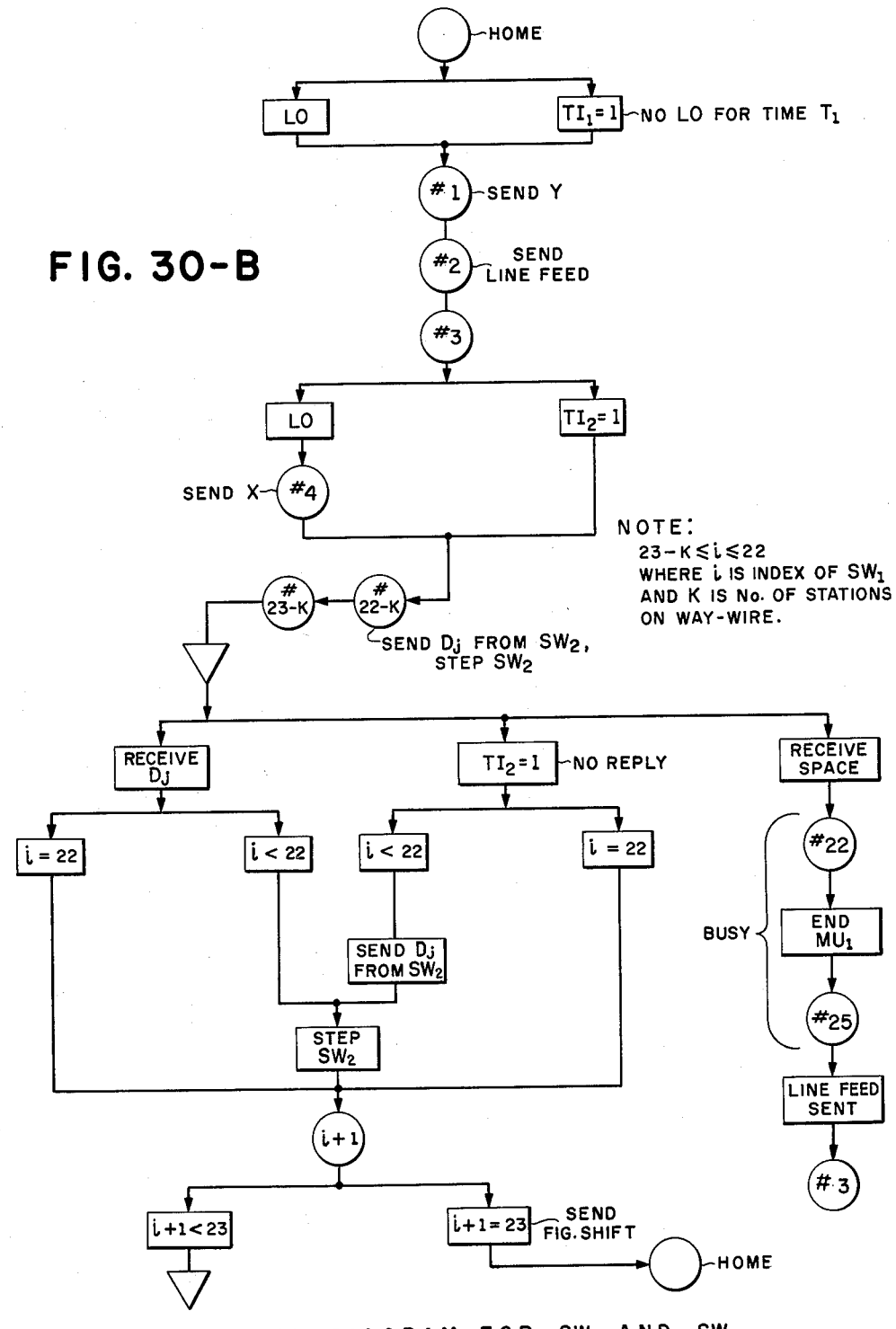
Figure 31:
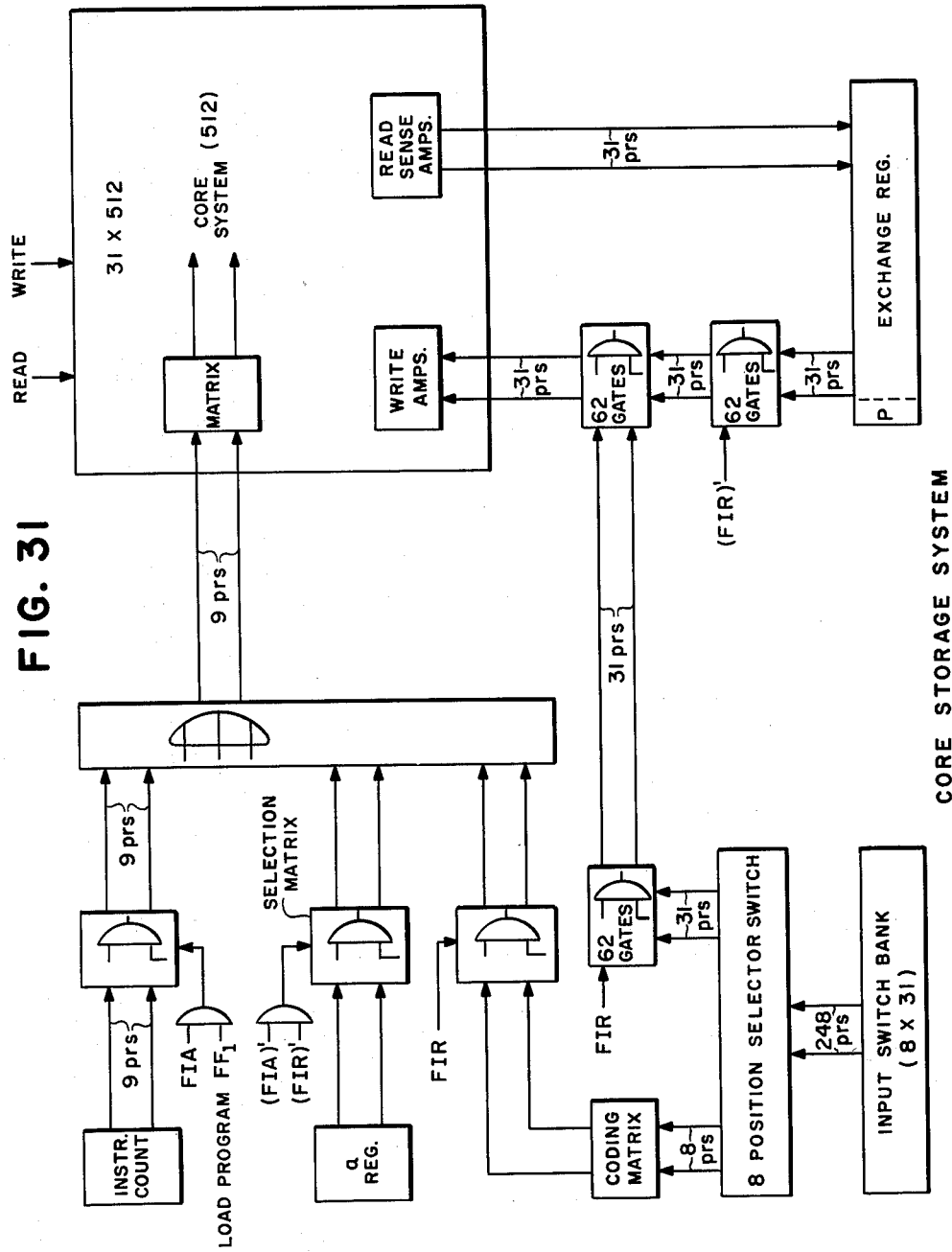
Figure 32:
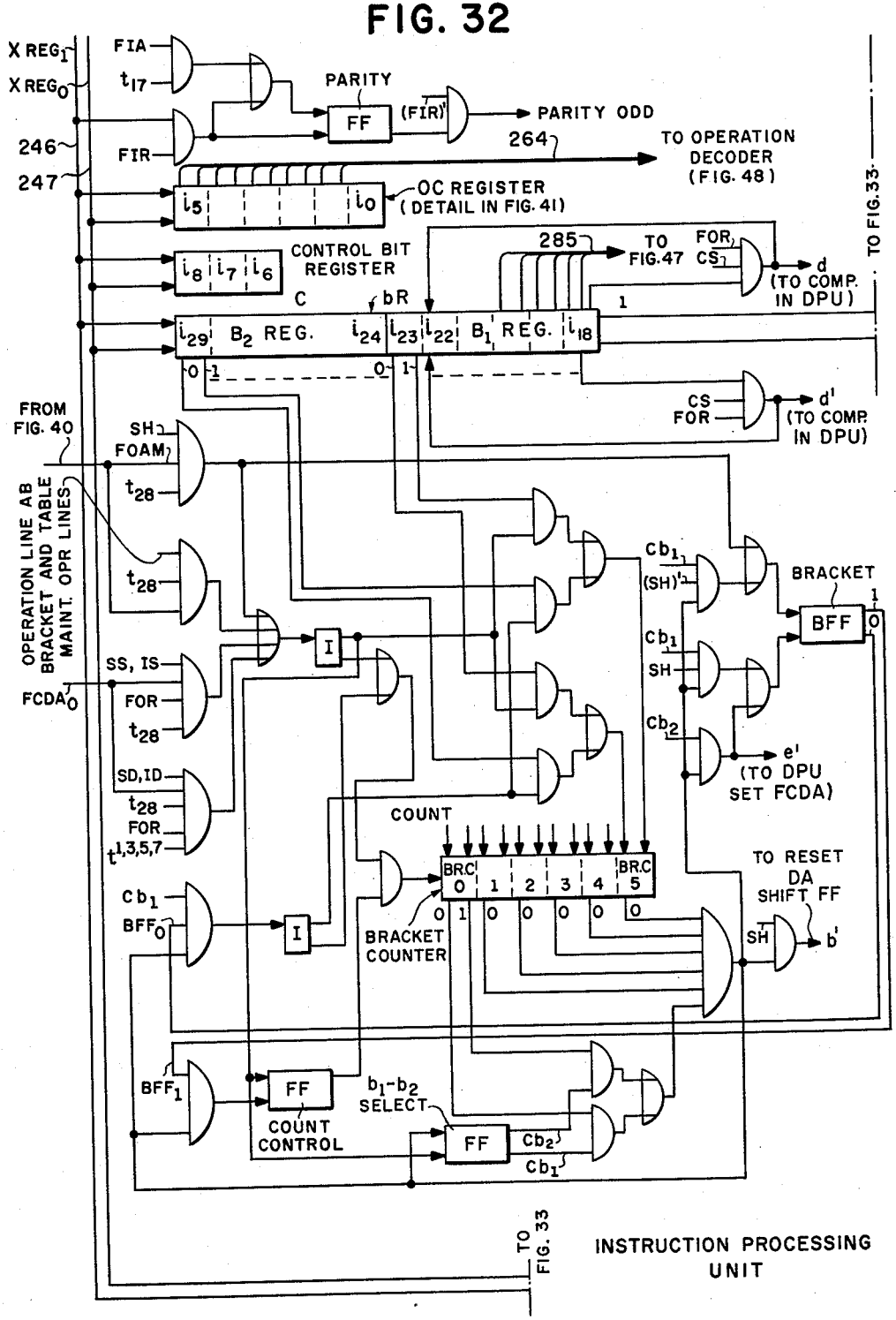
Figure 33:
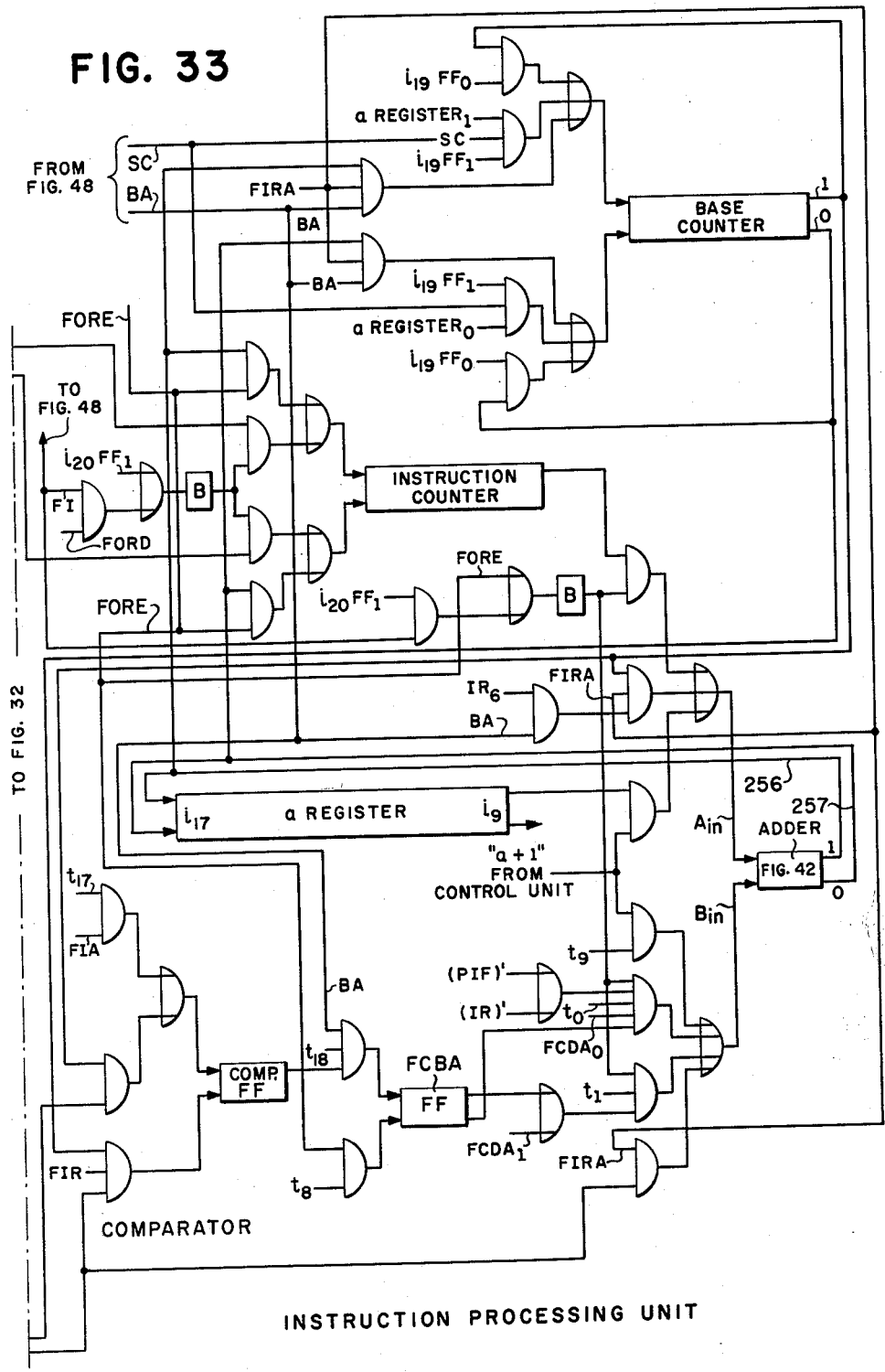
Figure 34:
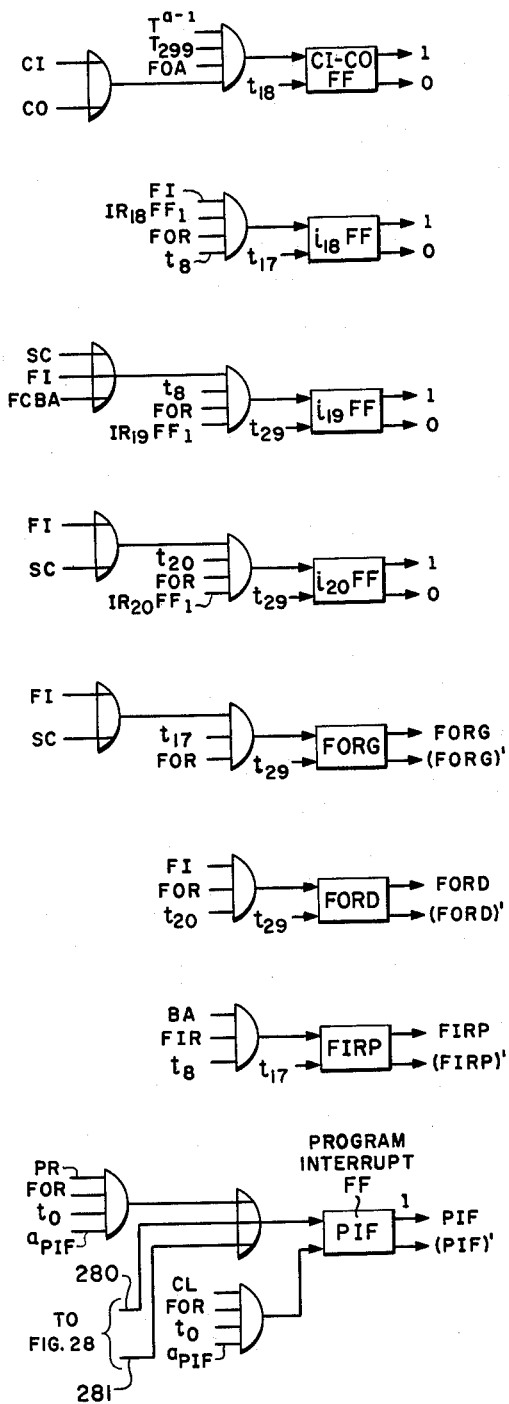
Figure 35:
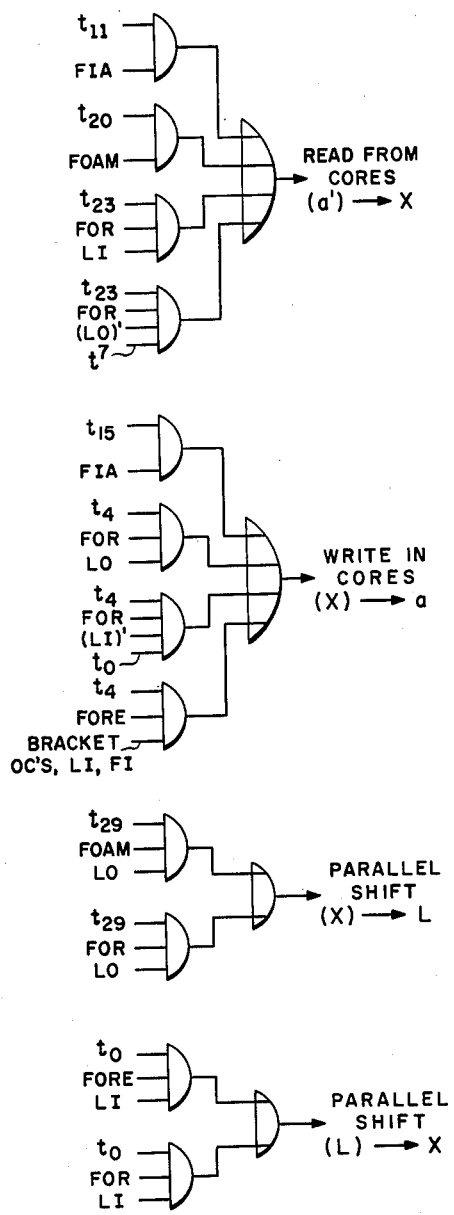
Figure 36:
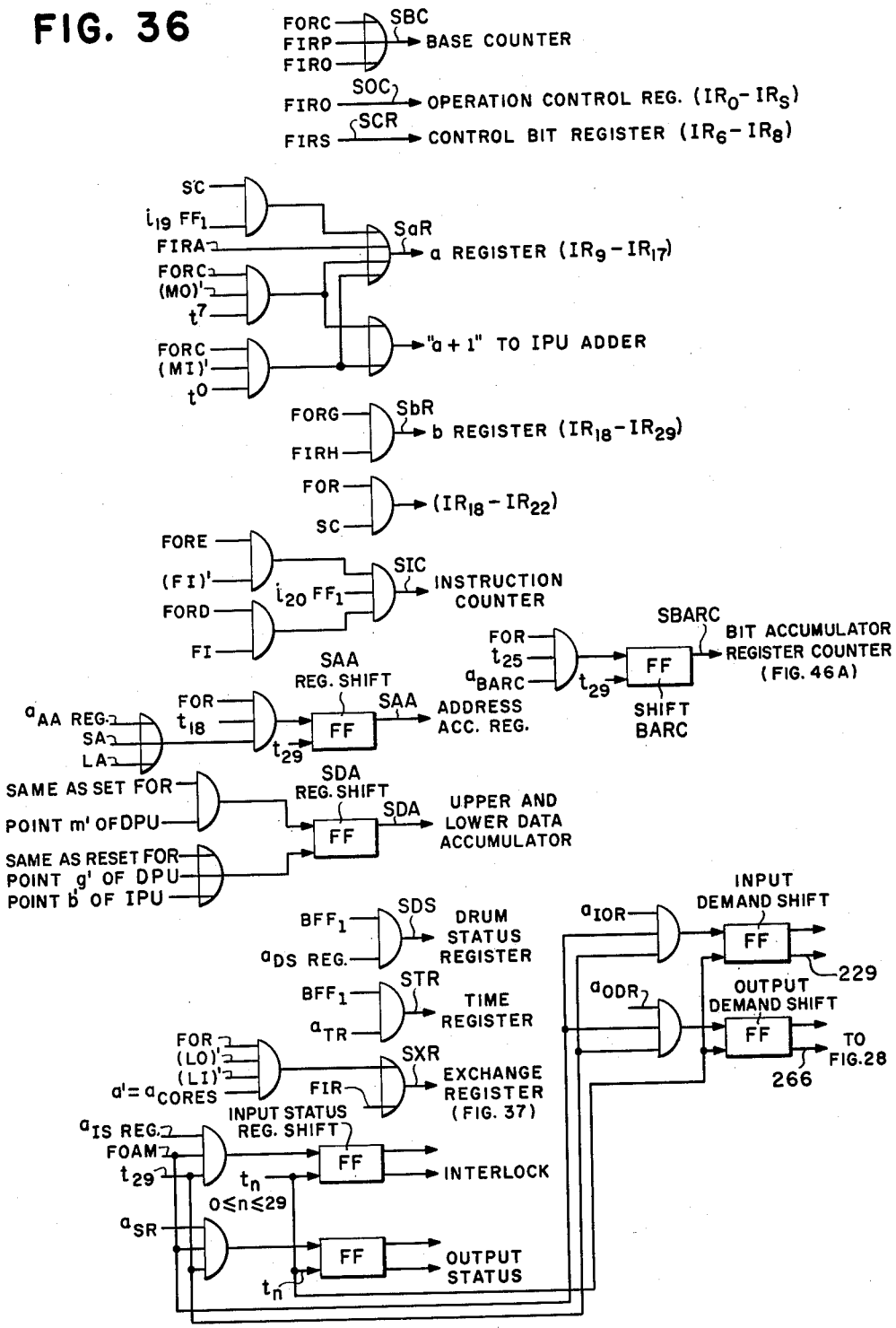
Figure 40:
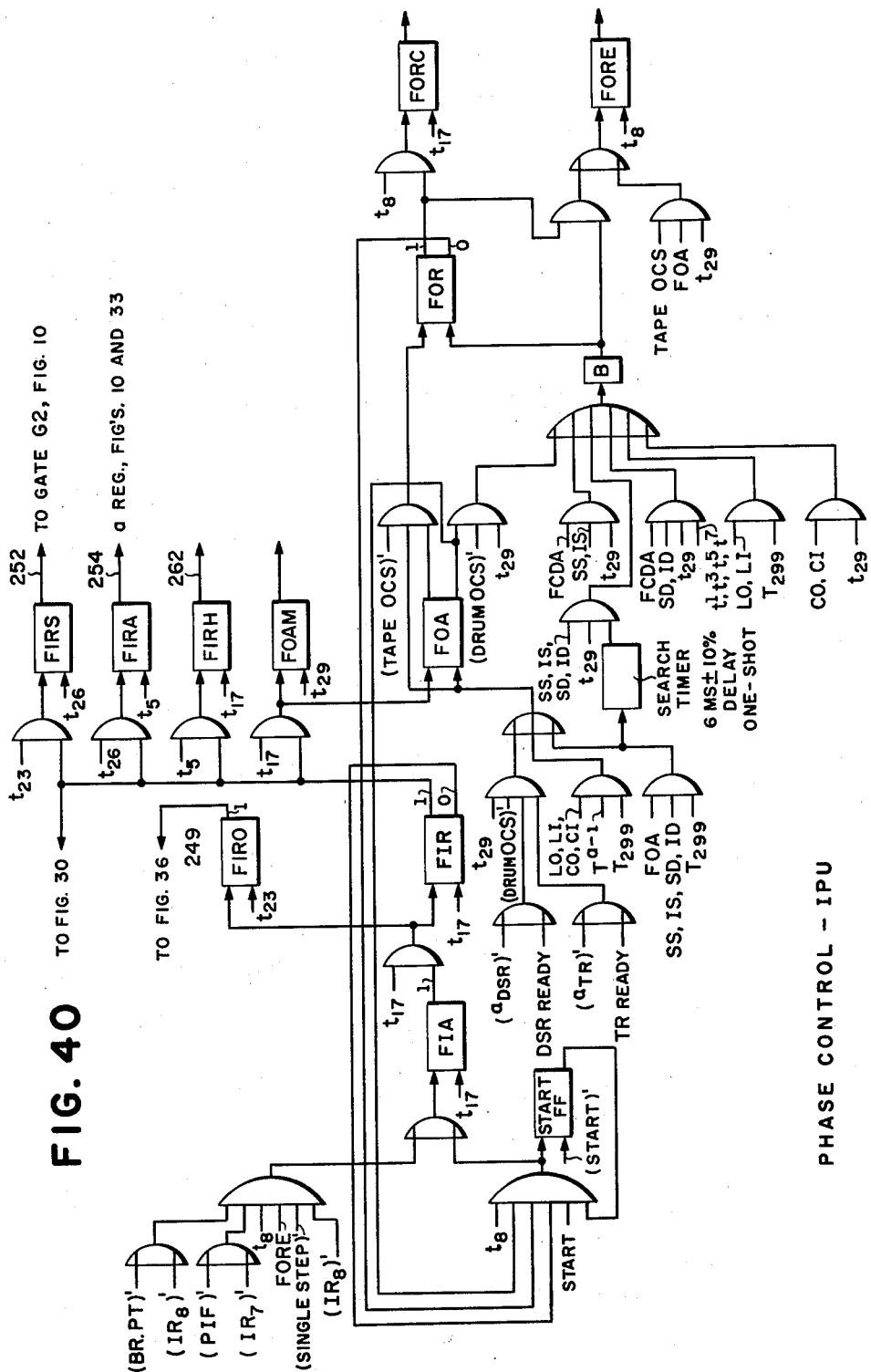
Figure 45:
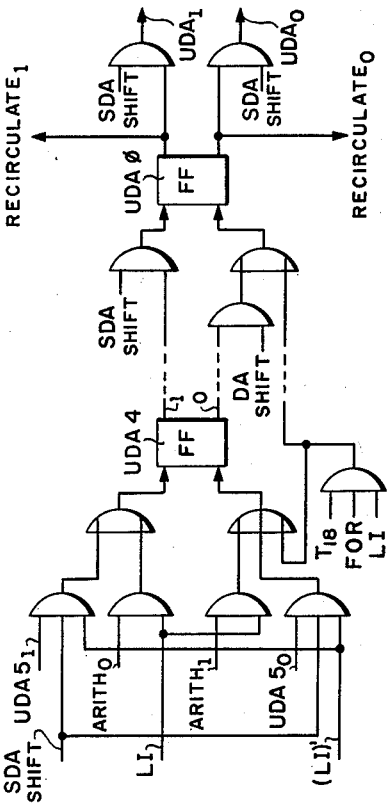
Figure 44:
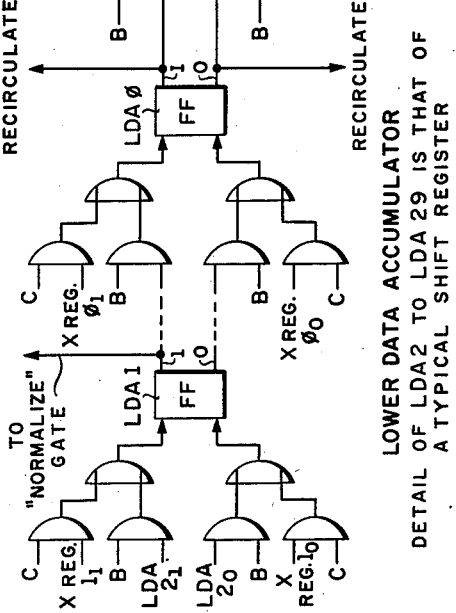
Figure 46:
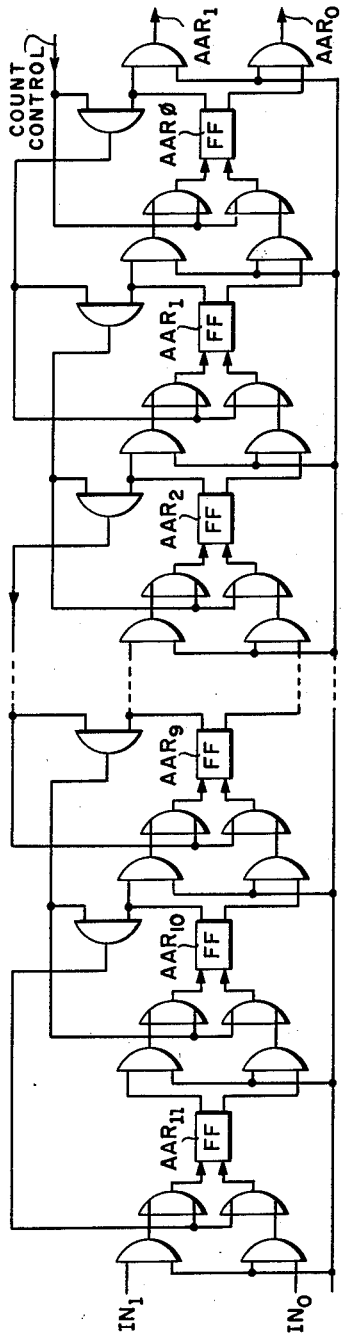
Figure 47:
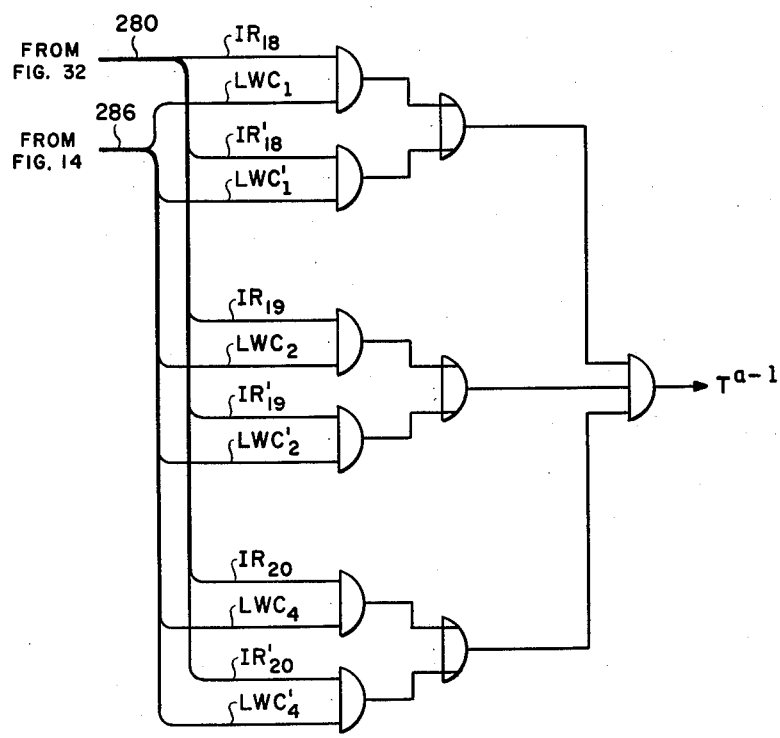
Figure 48:
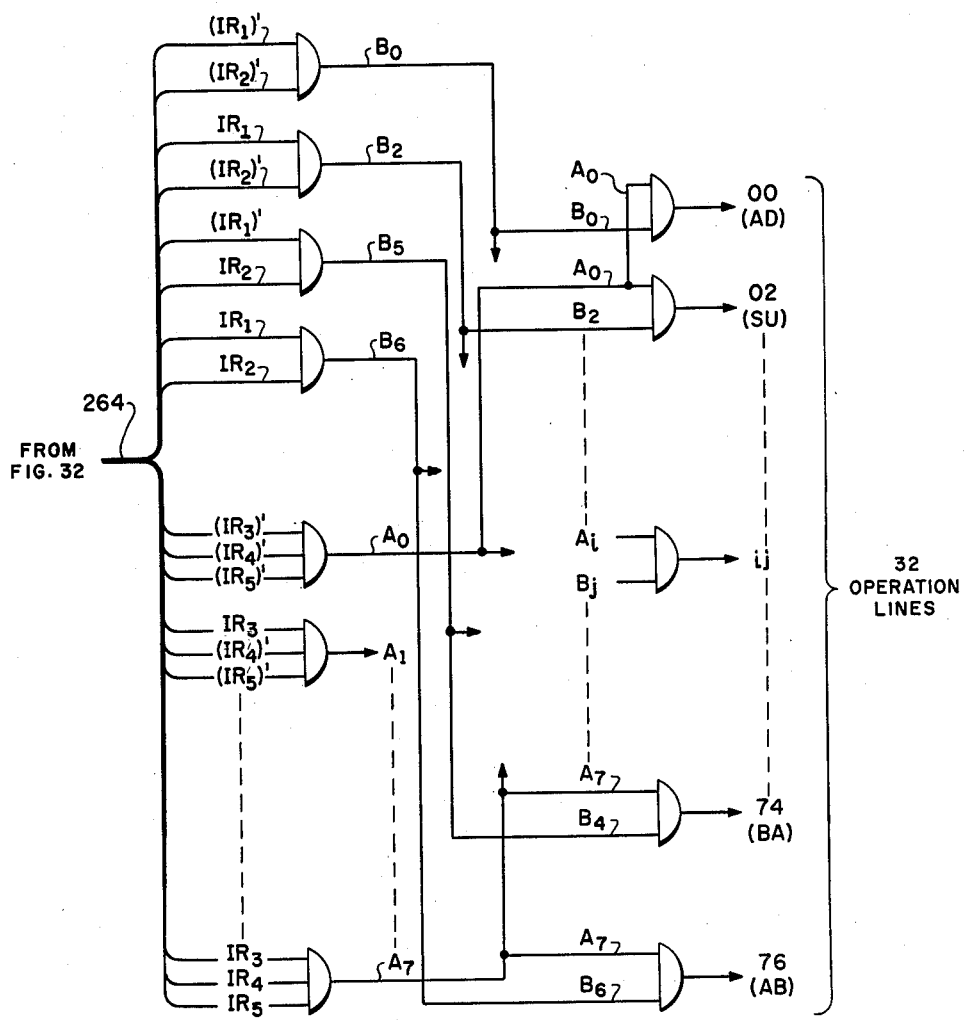

FIG. 6(a) to (c) diagrammatically shows the contents of an input rate converter drum storage bin in three stages of operation;

FIG. 7(a) to (h) diagrammatically shows the contents of an input buffer drum storage bin under different conditions;

FIG. 8 diagrammatically shows the control portion of an output rate converter drum storage bin;

FIG. 9 diagrammatically shows the functional organization of a message processor;

FIGS. 10 and 11 collectively show the functional organization of instruction processing and data processing units;

FIG. 12 schematically shows the form of instructions in an "S-word" as stored in a bin in core store;

FIG. 13-A is a flow chart showing a program cycle;

FIG. 13-B is a general flow chart for an input program;

FIG. 14 is a circuit diagram showing a "long word" counter (octal) and a "short word" counter (decimal);

FIG. 15 is a circuit drawing of "t-pulse" generator counters;

FIG. 16 is a decoding matrix for the octal counter of FIG. 14;

FIG. 17 is a decoding matrix for the decimal counter of FIG. 14;

FIG. 18 is a decoding matrix for producing "t-pulses" for timing purposes;

FIG. 19 is a decoding matrix for producing "T-pulses" for timing purposes;

FIG. 20 shows waveforms of clock and timing pulses;

FIG. 21 shows waveforms of "T-pulse" codes and drum timing pulses;

FIGS. 22, 23, 24 and 25 collectively show tributary input and output circuitry at the switching center;

FIG. 26 shows certain wave forms produced in a telegraph receiver portion of the switching center;

FIG. 27 shows timing and end-of-message control circuits for tributary way stations;

FIG. 28 shows other control circuits for way stations;

FIG. 29(a) to (e) is a graphical representation of certain programming instructions;

FIGS. 30-A and 30-B, respectively, are circuit and functional diagrams of stepping switch apparatus employed during an interrogation cycle of a way circuit;

FIG. 31 is a schematic of a core storage system;

FIGS. 32 and 33 collectively show the circuits of an instruction processing unit;

FIGS. 34, 35 and 36 show various control circuits for the instruction processing unit;

FIG. 37 shows input gating and details of an exchange register;

FIG. 38-A is a timing chart for bracket instructions;

FIG. 38-B, when aligned with FIG. 38-A, is a timing chart for control instructions and positioning instructions;

FIG. 38-C is a timing chart for table maintenance instructions;

FIG. 38-D, when aligned with FIG. 38-C, is a timing chart for transfer instructions;

FIG. 39 shows details of the b-Register employed in the instruction processing unit;

FIG. 40 shows a phase control circuit for the instruction processing unit;

FIG. 41 shows a typical shift register employed as an operation code register;

FIG. 42 is a circuit diagram of an adder for the instruction processing unit;

FIG. 43 shows details of a bracket counter for the instruction processing unit;

FIG. 44 is a circuit diagram of the lower data accumulator;

FIG. 45 shows the circuit of an upper data accumulator;

FIG. 46 shows details of an address accumulator register-counter;

FIG. 46-A shows a bit accumulator register counter;

FIG. 47 is a circuit diagram of an octant comparator;

FIG. 48 is a circuit diagram of an operation decoder.

Figure 49:
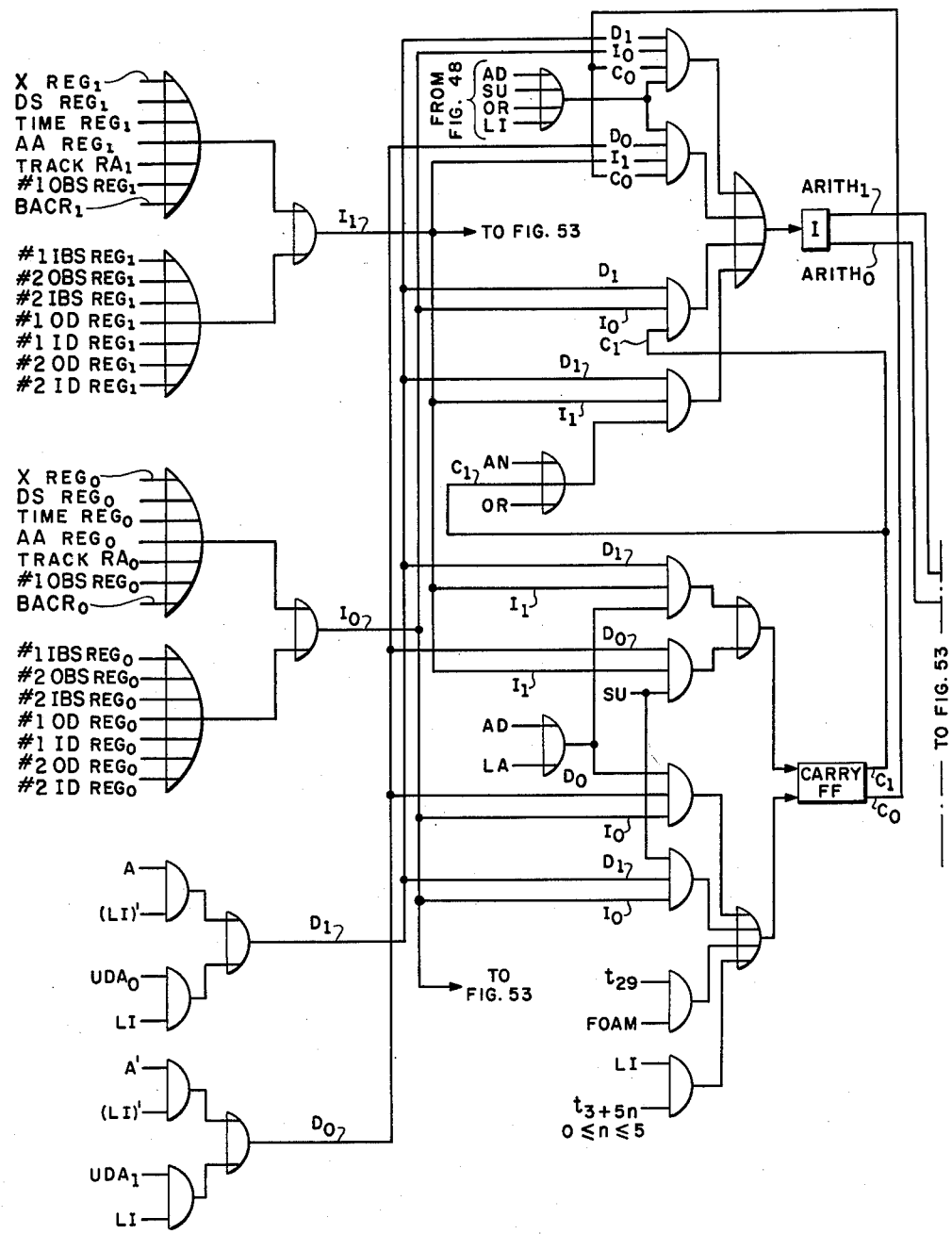
Figure 50:
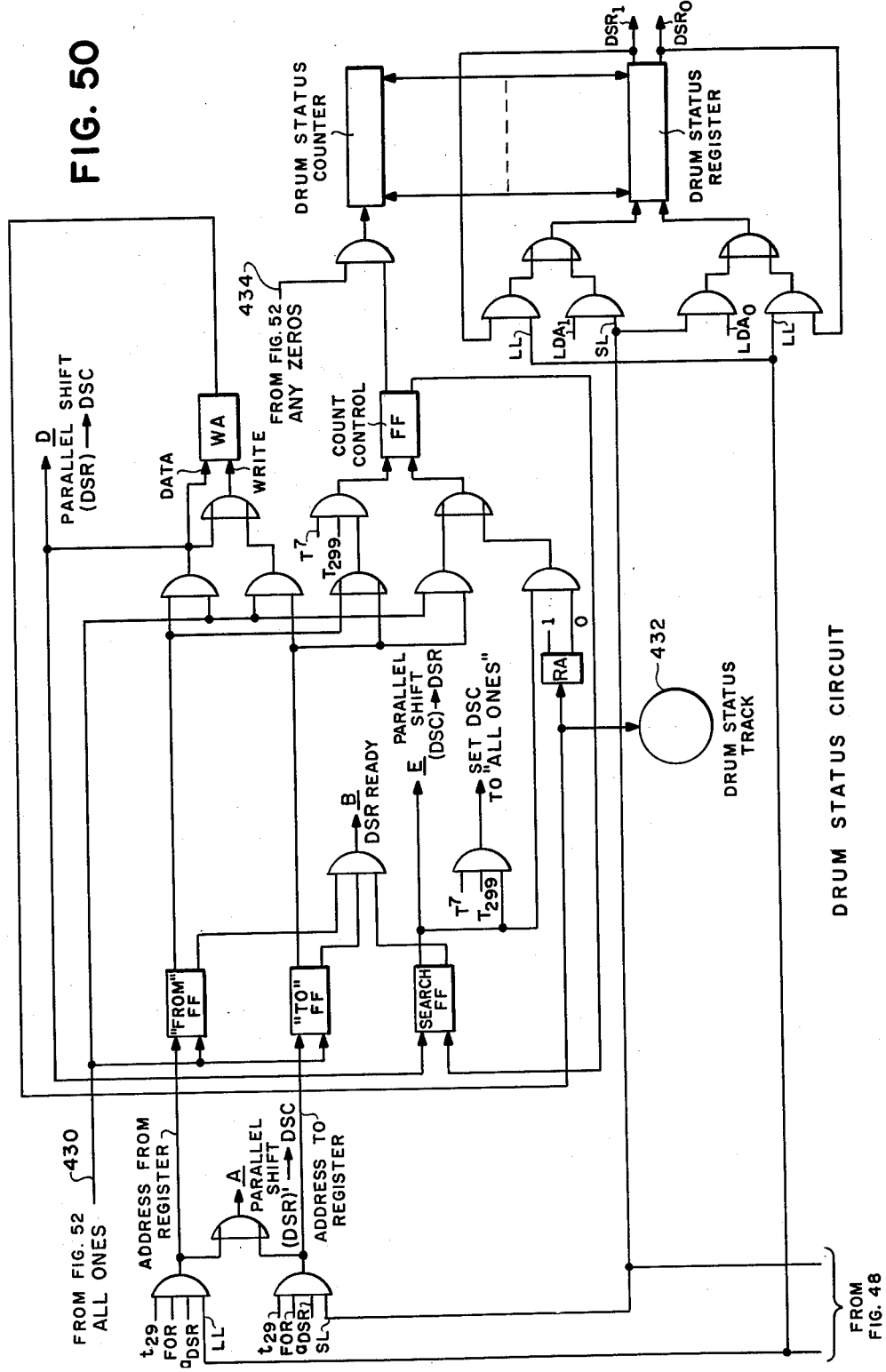
Figure 51:
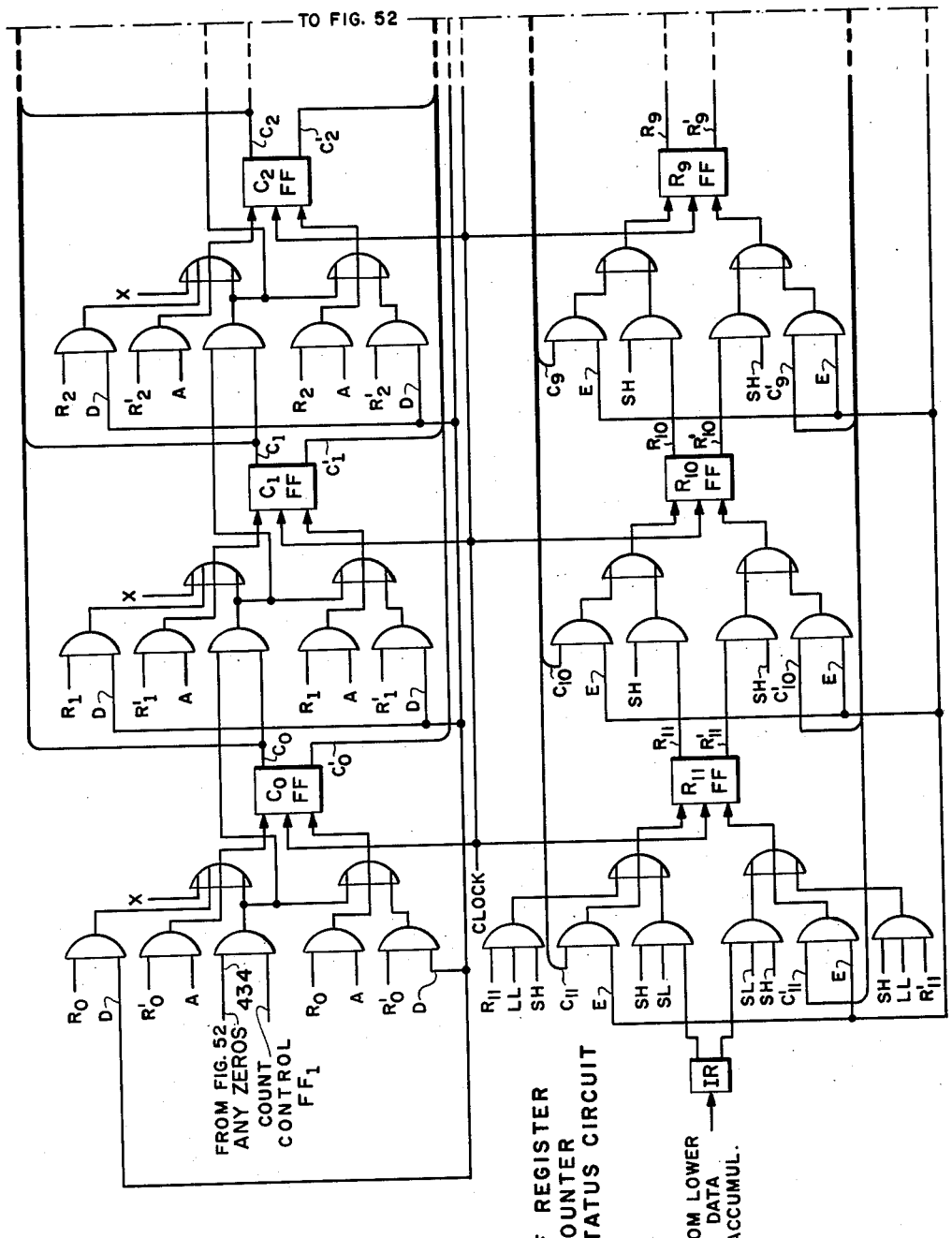
Figure 52:
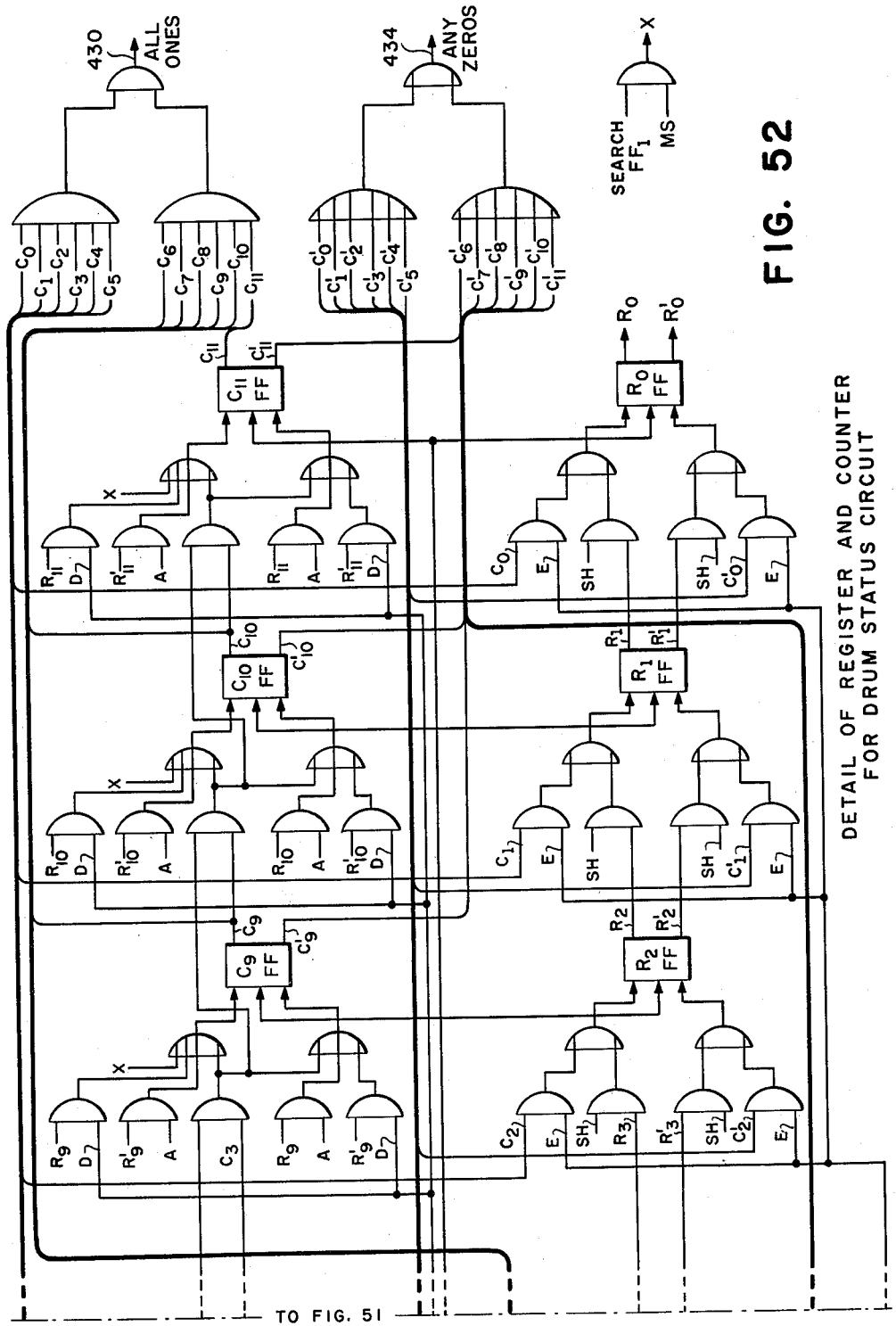
Figure 53:
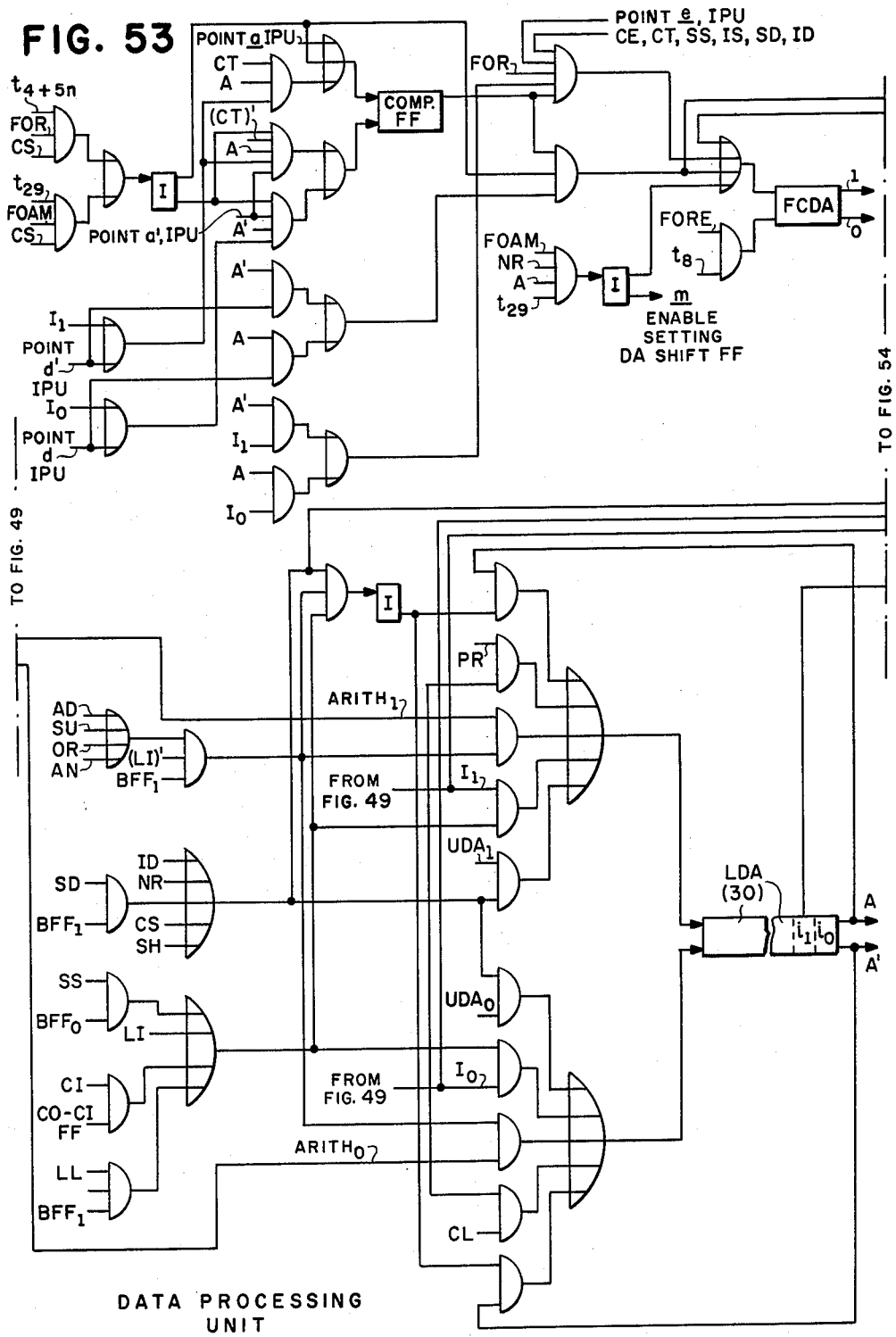
Figure 54:
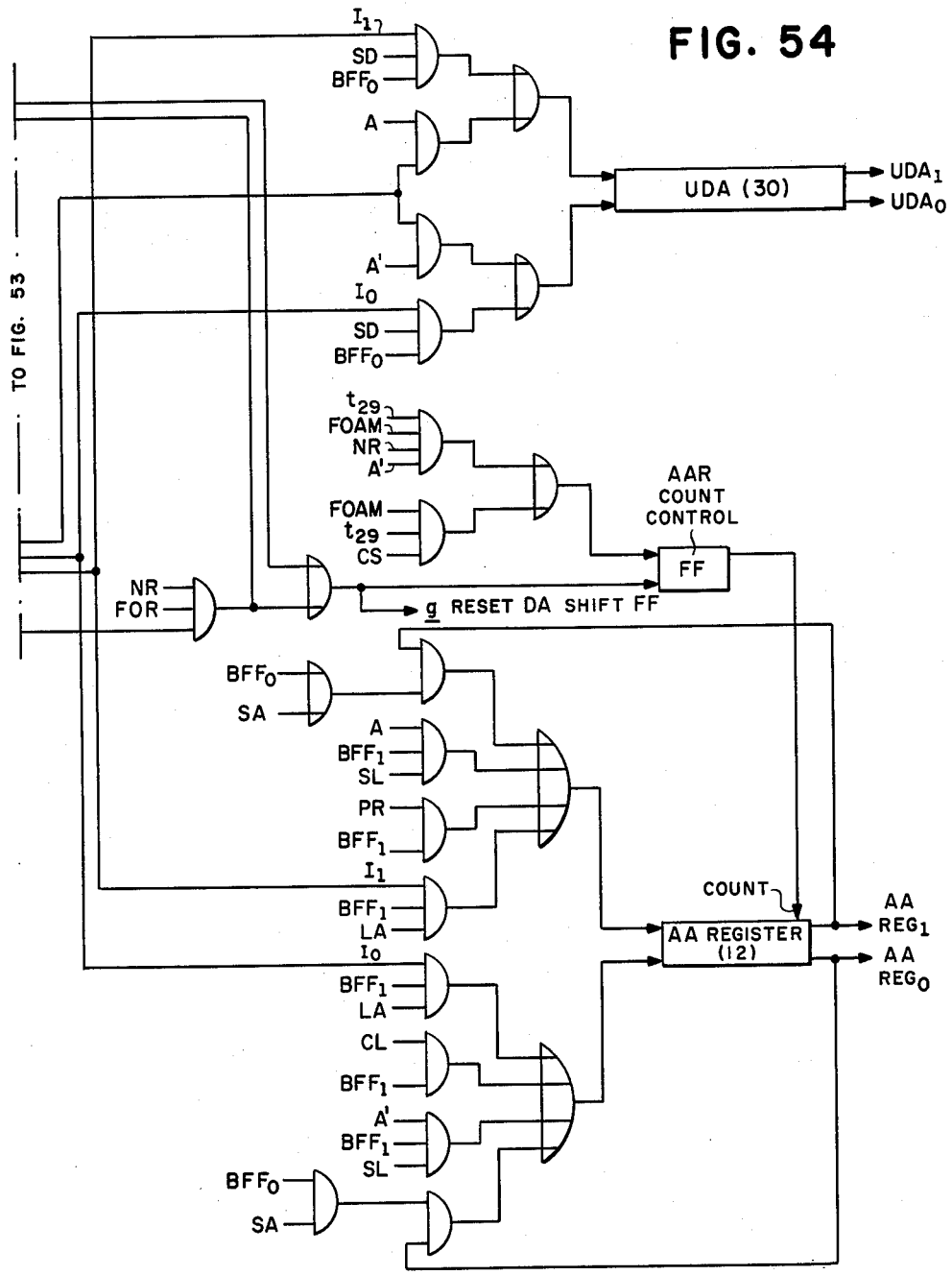
Figure 55:
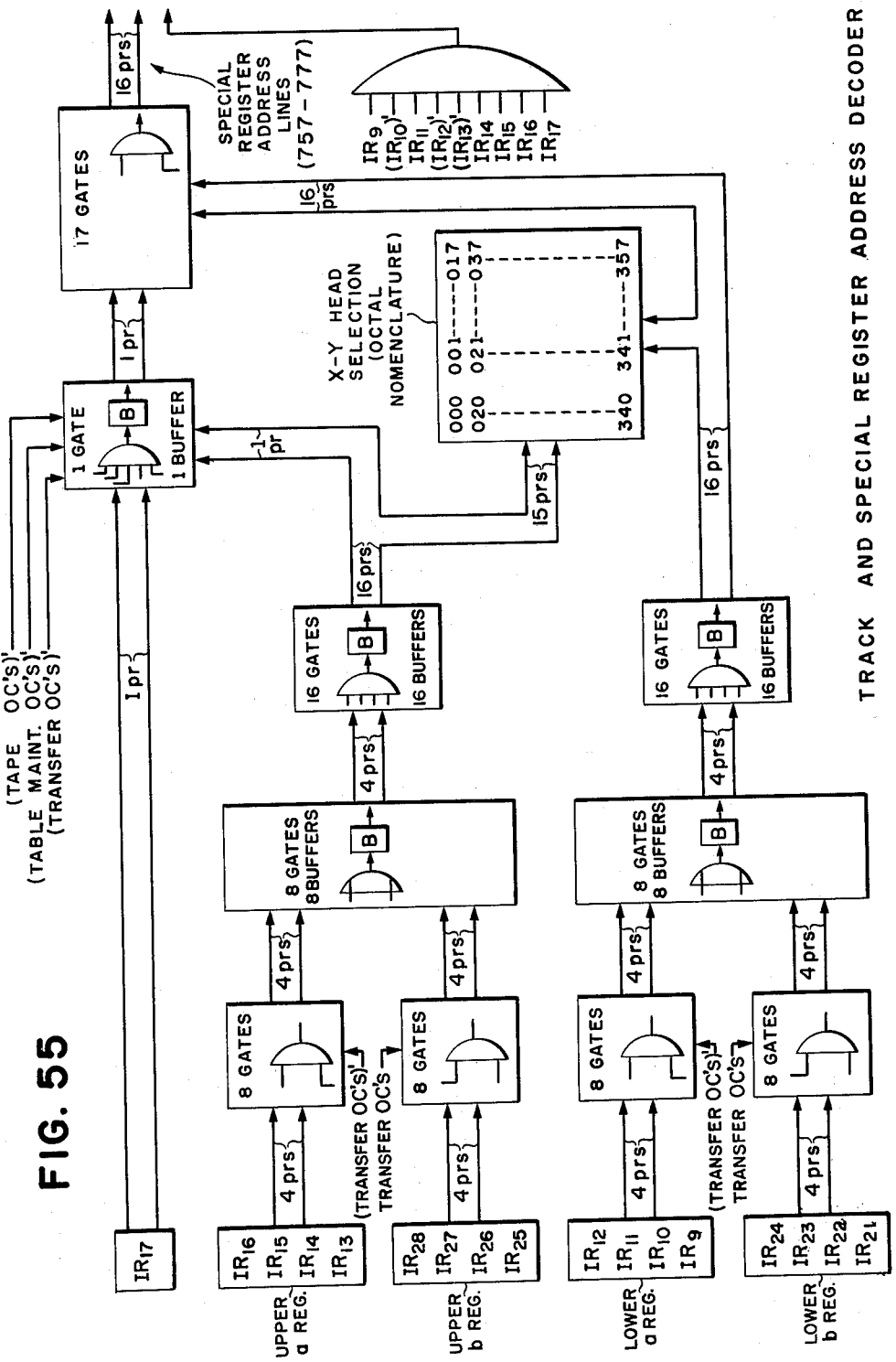
Figure 59:
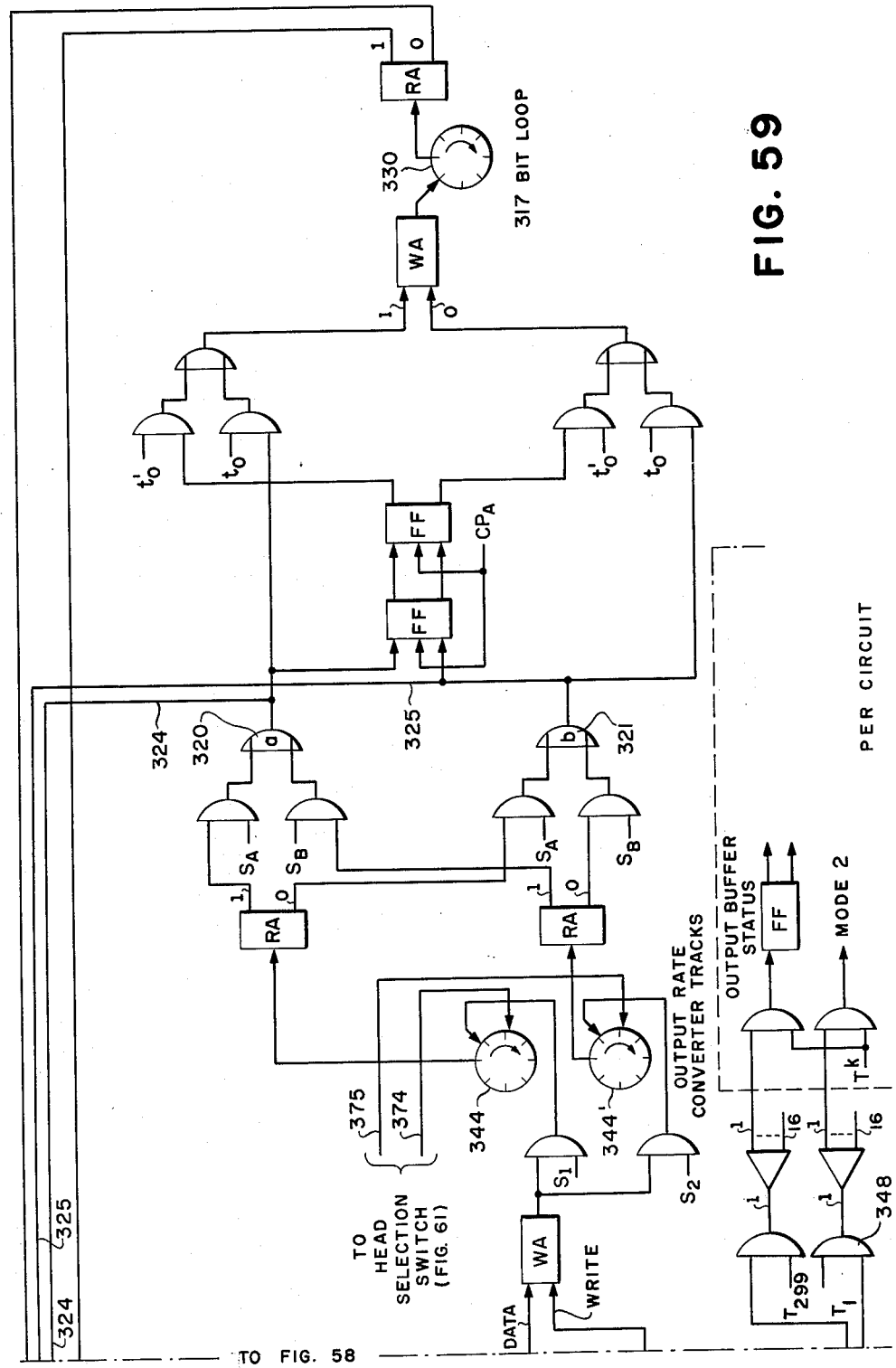
Figure 61:
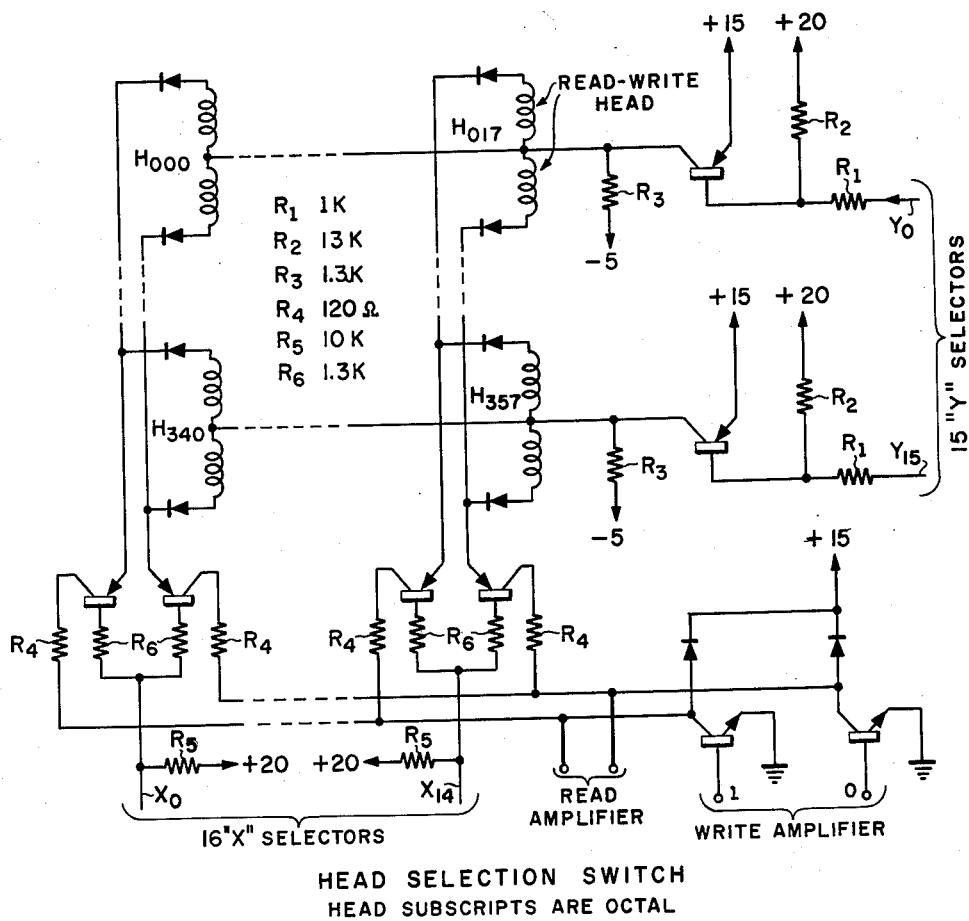
Figure 63:
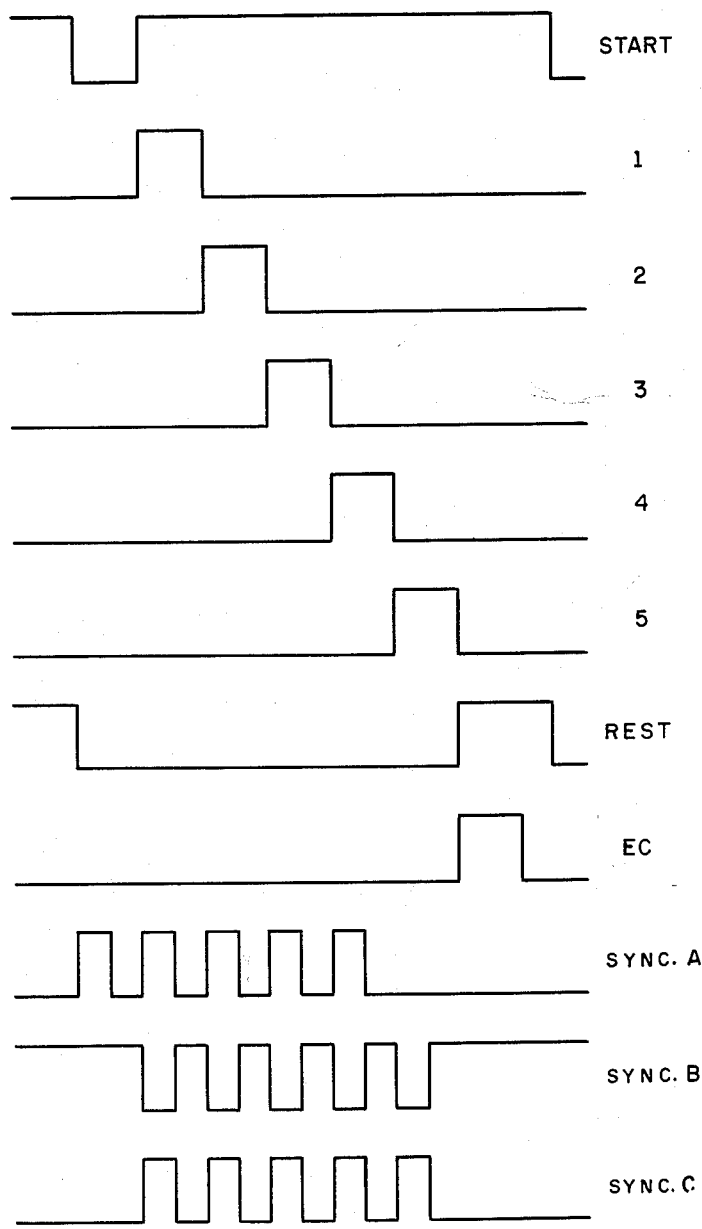
Figure 64:
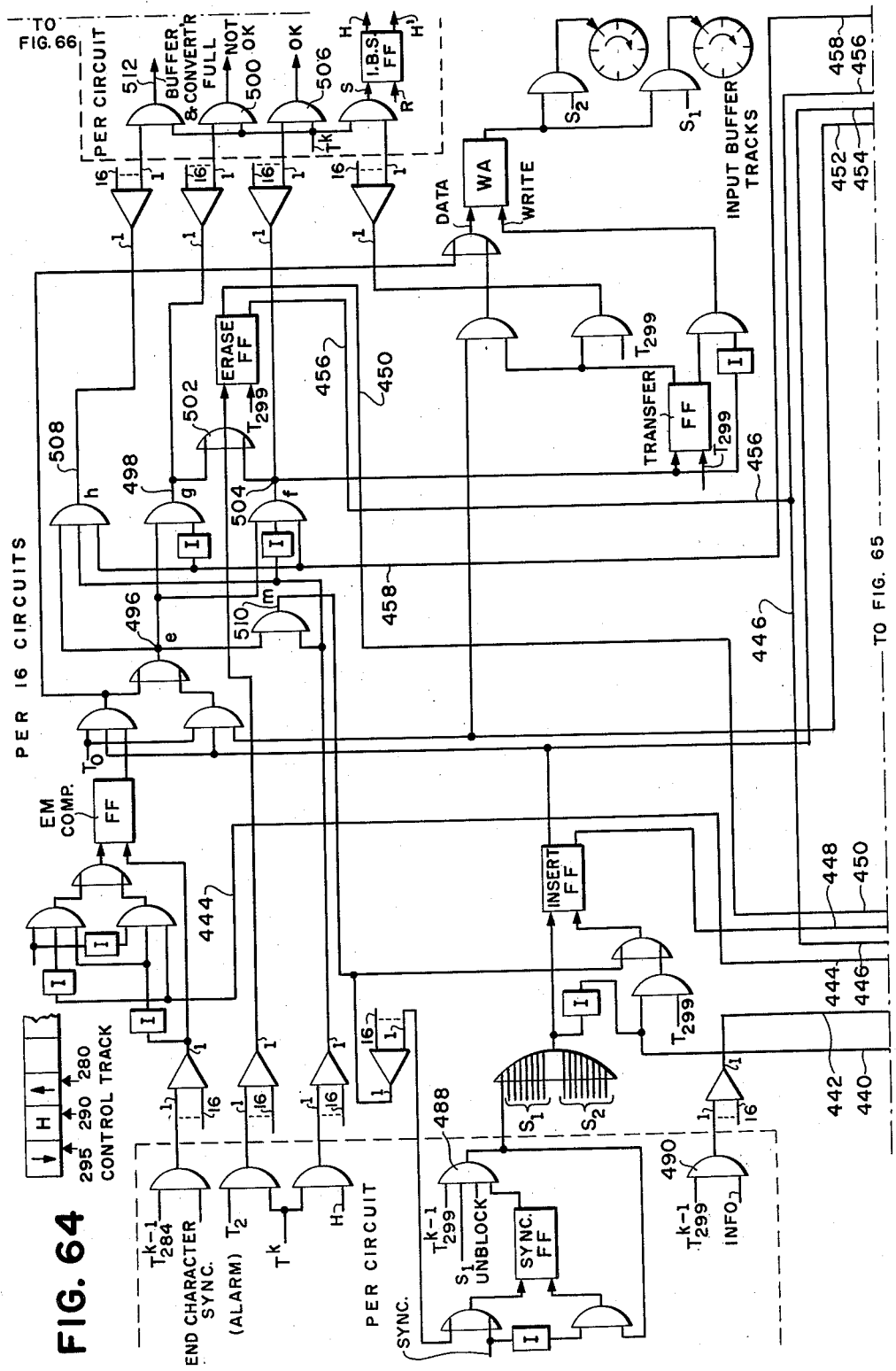
Figure 65:
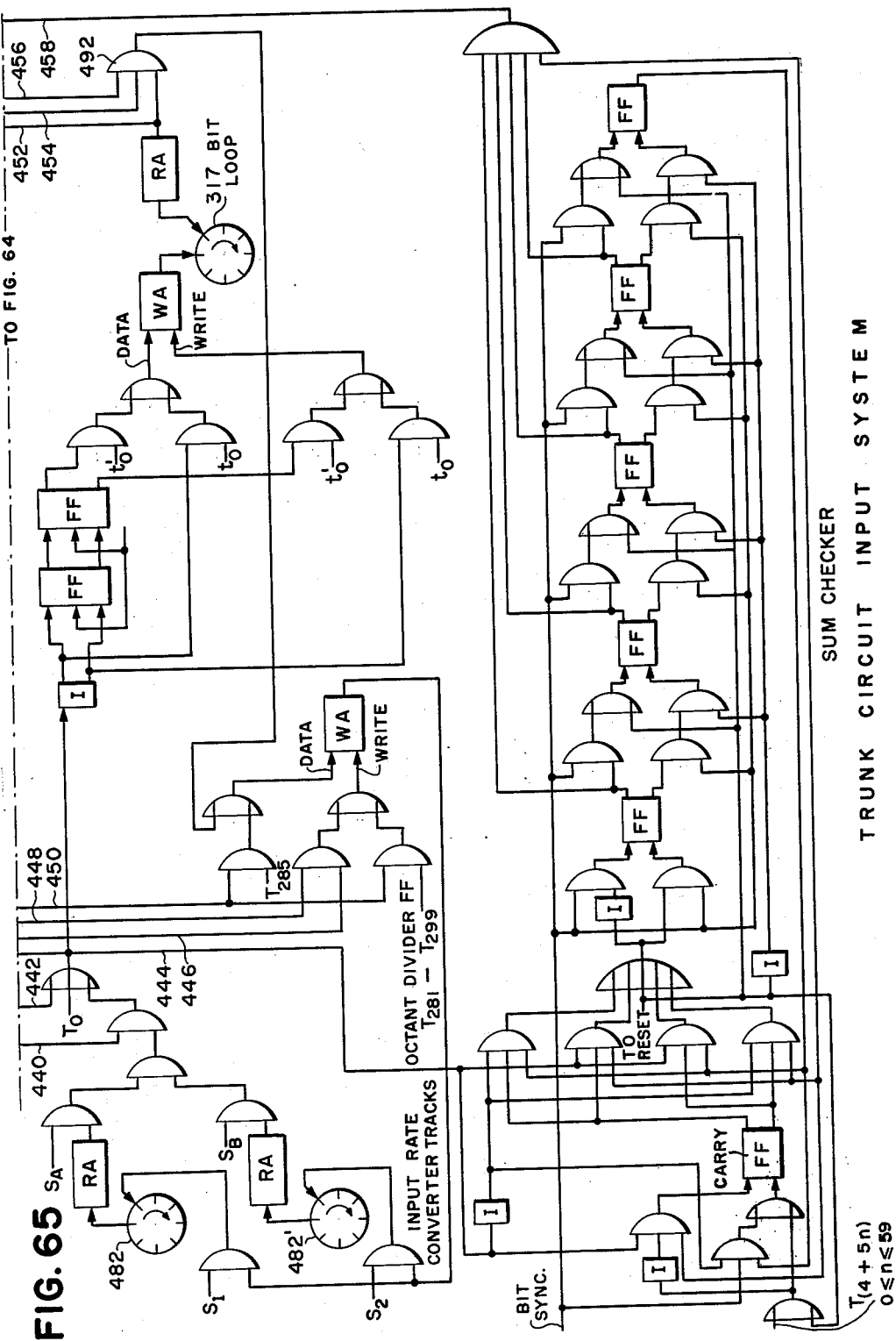
Figure 66:
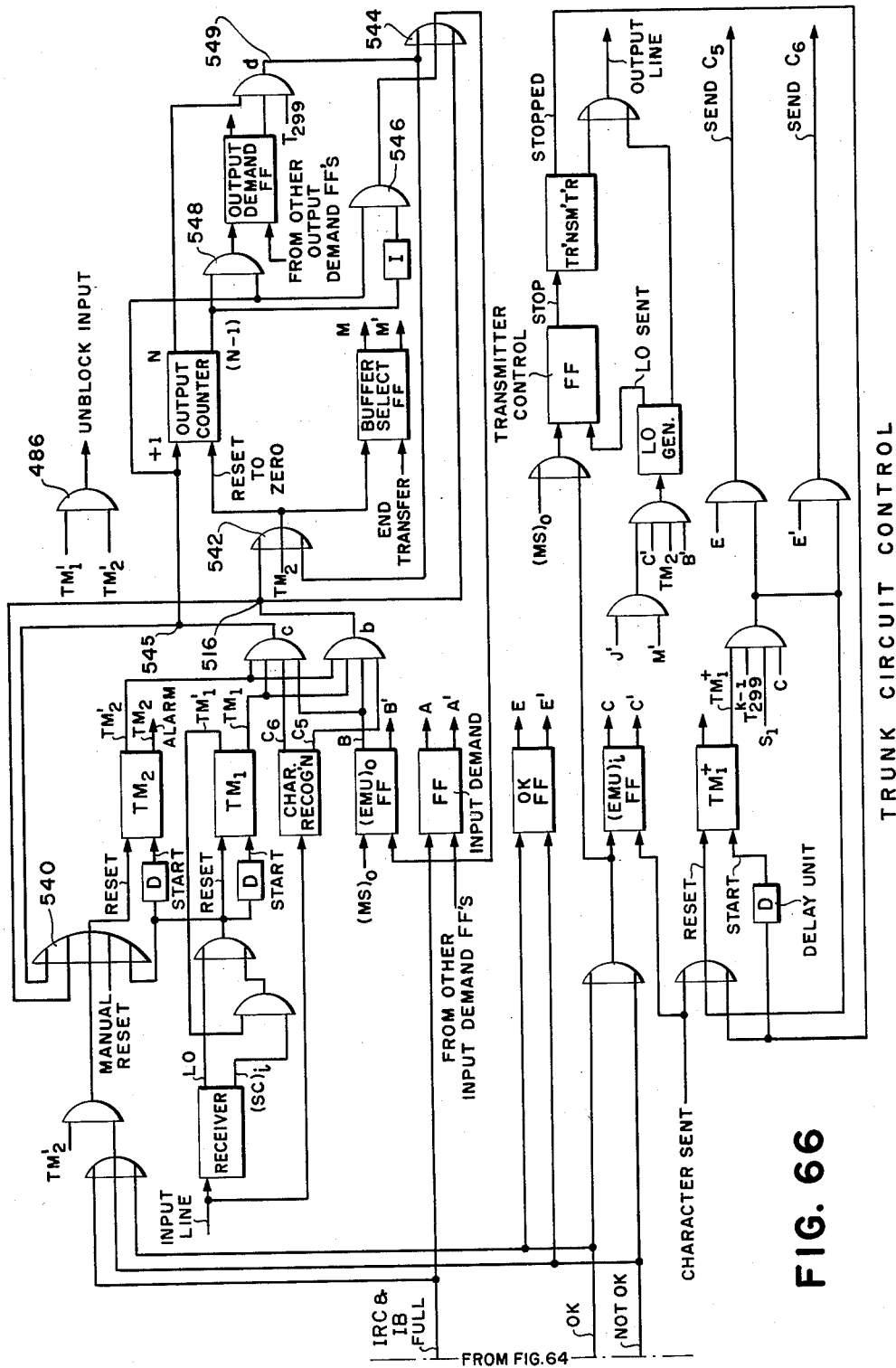
Figure 67:
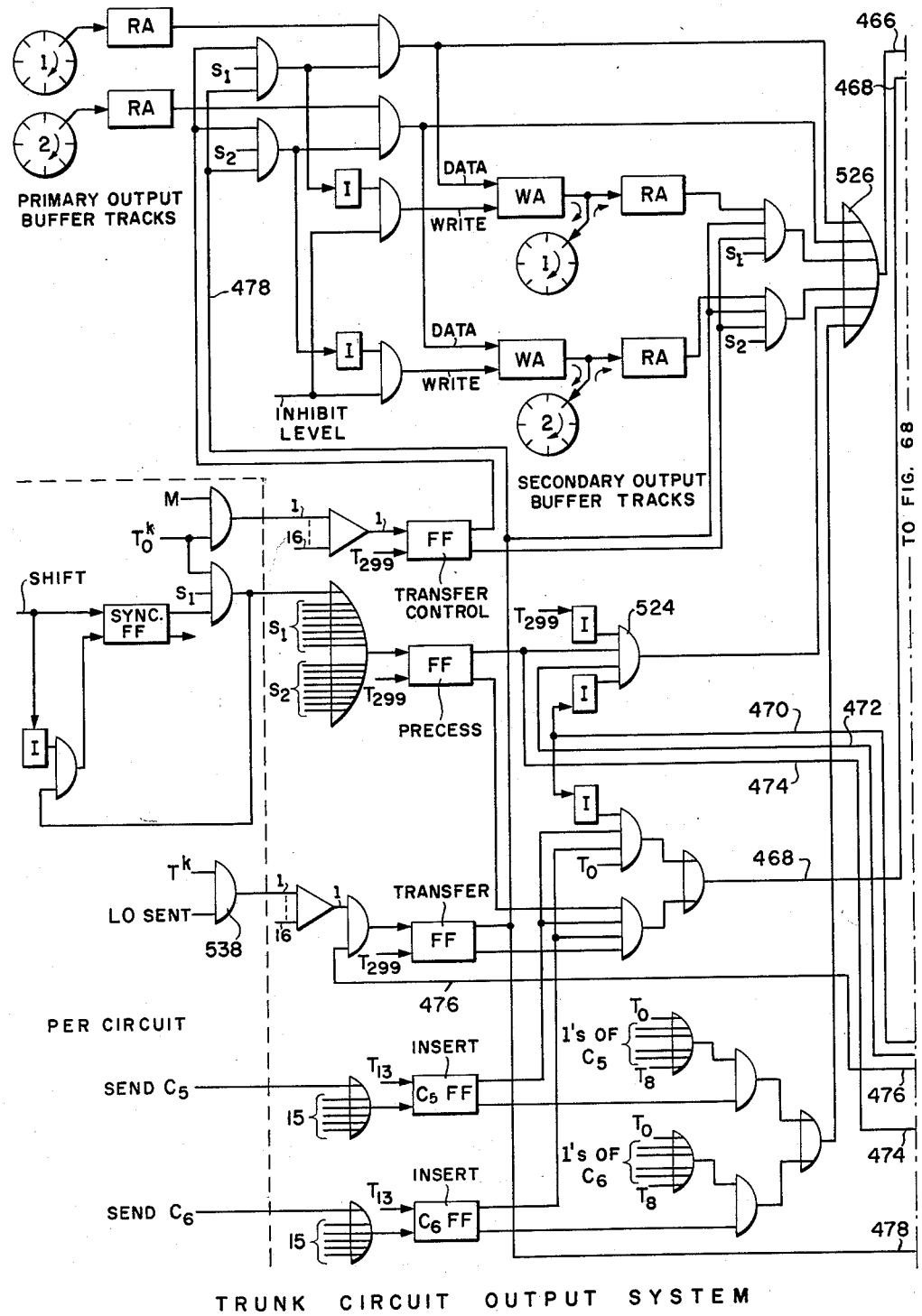
Figure 68:
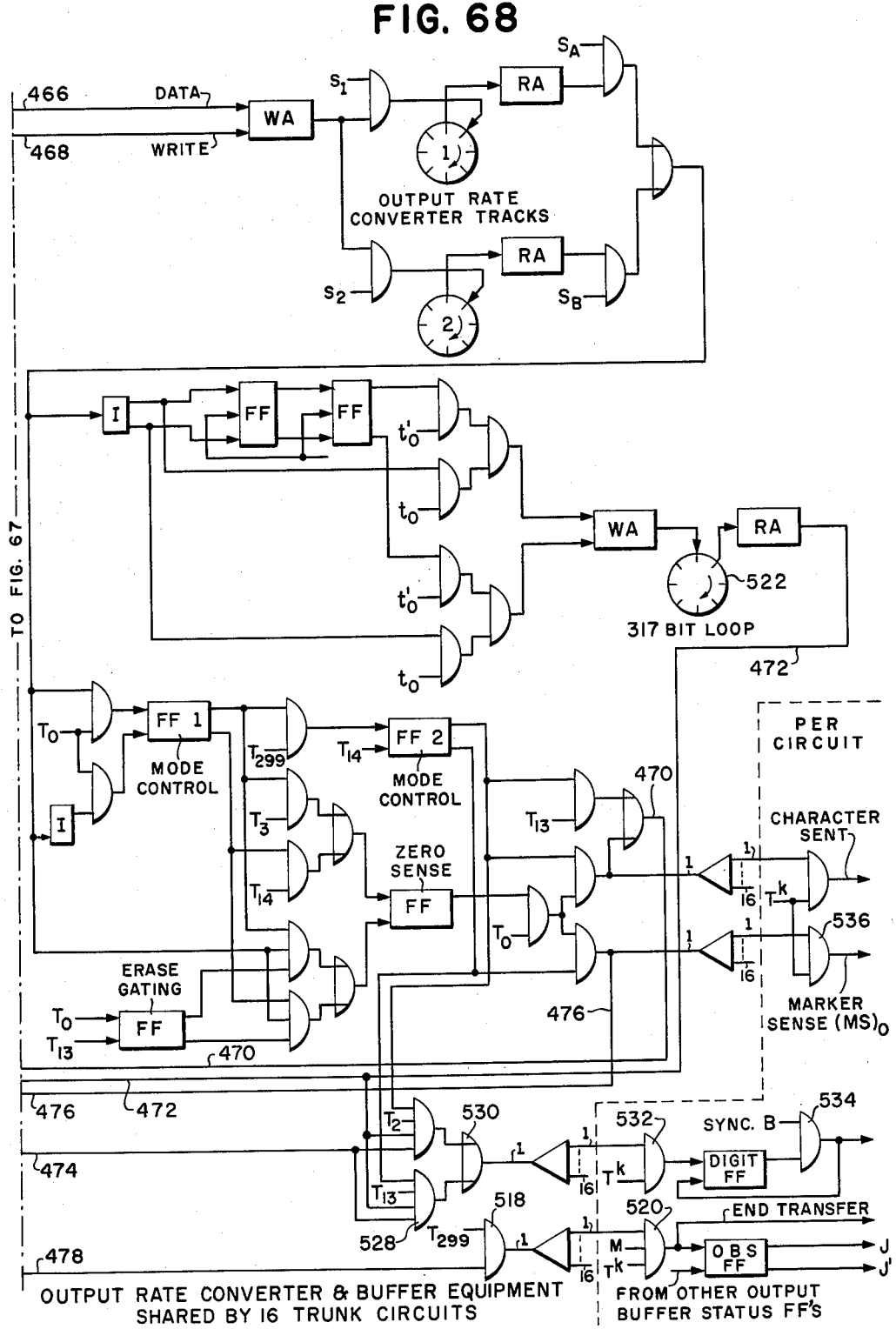
Figure 69:
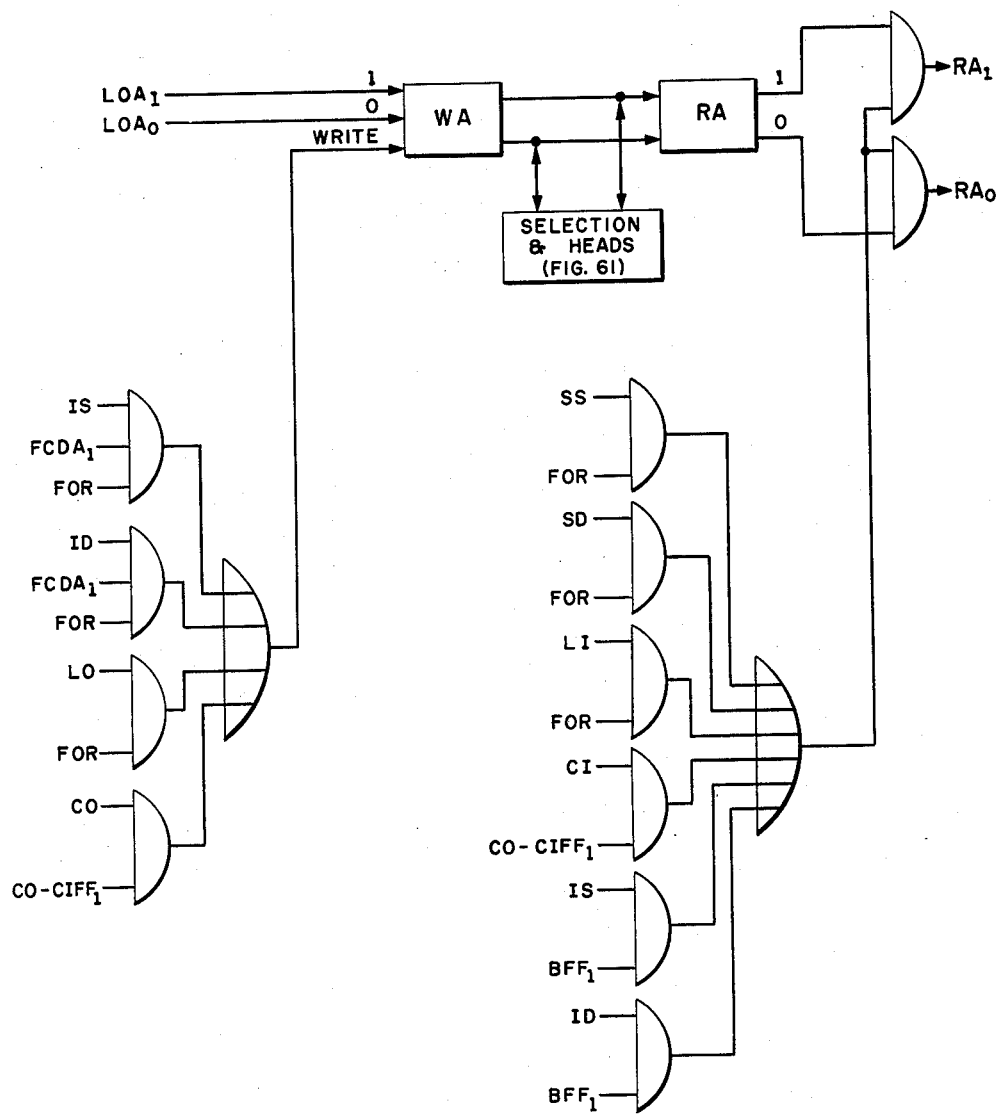

FIG. 49 shows certain details of the data processing unit and including an arithmetic unit;

FIG. 50 is a diagram of a drum status circuit;

FIGS. 51 and 52 show details of a register and a counter for the drum status circuit;

FIGS. 53 and 54 show the data processing unit;

FIG. 55 is a schematic diagram of a drum track and special register address decoder;

FIG. 56 is a program read-in circuit diagram;

FIGS. 57, 58 and 59 collectively show a way circuit output system;

FIG. 60(a) to (c) diagrammatically shows the contents of an output rate converter bin;

FIG. 61 is a circuit diagram of a head selection switch;

FIG. 62 shows waveforms produced in a telegraph transmitter portion of the switching center;

FIG. 63 shows telegraph pulse generator waveforms;

FIGS. 64 and 65 together comprise a circuit diagram of a trunk input system;

FIG. 66 is a diagram of a trunk control circuit;

FIGS. 67 and 68 together comprise a circuit diagram of a trunk output system; and FIG. 69 shows a drum read-write gating circuit.

GENERAL DESCRIPTION

It will be helpful to have a general understanding of the principles of operation of the illustrative embodiment of the system disclosed herein prior to a more detailed consideration of the circuitry and components employed. FIGS. 1-A to 1-D, when placed together in the manner indicated on the drawings, comprise a functional diagram of the various units of the system in operative relationship with each other: The units bear legends which indicate their various functions and also refer to their corresponding detailed figures. FIGS. 1-A to 1-D provide a ready reference with respect to the following general description of the system.

The principal functions of the basic system are of two types. The first type, referred to as primary functions, include way station or other tributary invitation and selection, temporary storage of telegraph messages, routing-indicator decoding, message sequence number checking, etc. The second type of function, referred to as derivative functions, are those which derive from the particular way in which the primary functions are performed. Derivative functions include conversion of incoming telegraph pulse rates to higher internal or intra-office rates, decomposition of messages of nonstandard lengths into "message units" of standard length and format, status table maintenance for scheduling internal operations, etc. The primary and derivative functions of the system are implemented in one of two ways. The first way is by sets of wire-in operations, and these become fixed features of the system. The second way is by sequences of stored instructions which are programmed features of the system and hence are flexible and easily altered.

In general, most of the wired-in functions are connected with the Input and Output Systems which operate semi-independently from the remaining parts of the system. The programmed functions extract messages or message units from the input system; execute the address decoding, routing, and transfer operations necessary to switch messages cross-office, and then insert them in the output system. These programs are composed of sets of subroutines, such as those for decoding routing indicator characters in the initial portion of a message; for checking message sequence numbers; for priority handling when desired; for emptying the input system; etc. The subroutines in general are executed in a fixed order called the "Program Cycle," so set that all of the operations required are executed within the proper time intervals and in the correct sequence. By appropriately sequencing elementary operations, the programmed functions centralize and reduce the amount of equipment required, in contradistinction to wired-in functions, and also provide flexibility in the operations which may readily be altered to suit a particular user and different traffic conditions. Changes in policy in regard to message formats, priority doctrines, routing responsibility at switching centers, etc., may readily be accommodated by alteration of the stored program.

*Processing according to type of information.*—There are five distinct types of information stored and processed by the system. These are (1) telegraph messages, (2) way station control information, (3) instructions, (4) system parameters, and (5) status information. This information varies in length and format. Errors in different types of information have different degrees of importance with regard to message loss and overall system reliability, and thus it is desirable that different types of information be stored, processed, and checked in distinctly different ways. However, information is stored and transferred most efficiently by the system if it has a fixed length and is processed most efficiently if it has a fixed format. In the instant embodiment, a compromise between these two conflicting considerations has been reached by causing the system to store and transfer information usually in either one or two "word lengths" and to operate on variable length information sequences. Preferably the two fixed word lengths are (*a*) the 300-bit word (referred to hereinafter as long words, or "L-words," for convenience) and (*b*) the 30-bit wood referred to hereinafter as short words, or "S-words," for convenience.

Message data is stored in, and usually transferred to and from the Storage System as L-words. Instructions are S-words. Actually each S-word comprises 31 binary digits (bits) of which 1 bit may be used, if desired, for "parity check" purposes well known in the telegraph art. An L-word comprises 10 S-words each of which is separated from its adjacent S-word by 1 cell which carries no information but provides a timing interval. The other types of information (e.g., routing indicators in a Routing Indicator Directory, sequence numbers, status information, etc.) do not lend themselves to any one fixed length or format. However, this information breaks down into significant sequences that are usually less than 60 bits and frequently less than 30 bits so that in most cases it is possible to fit the information into one or two S-words and to transfer and store it on this basis. In addition, there are two special words—the 19-bit way station control words (C-words), and the 2400-bit tape words (T-words) for use with the tape storage hereinafter referred to.

*Functional organization.*—There are five major units in the Stored Program System. These are the Input System, the Storage System, the Message Processor, the Output System, and the Supervisor Station. The input system converts the pulse rate of incoming telegraph data to the higher internal pulse rate of the storage system and the message processor. The storage system is used to store messages, status tables, directories, etc. The message processor carries out the transfer and processing operations necessary to switch messages cross-office and to maintain a steady flow of messages to the output system. The output system executes certain way station control functions, reconverts pulse rates from the internal rates to the proper telegraph line rates, and transmits messages over the output circuits. The supervisor's station is a monitoring station for the switching center and has the necessary displays and manual controls for carrying out special and emergency operations; various types of supervisor, or monitor, stations are well known in the art and for the sake of brevity the supervisor station is shown diagrammatically in FIG. 1–A of the drawings and identified by a legend.

The storage system may comprise one large storage unit, for example, a magnetizable drum or a series of magnetizable discs, or electrostatic or other analogous storage, for storing binary digits (bits), but it is more economical to utilize two or more types of storage respectively for storing different kinds of information. In the illustrative embodiment disclosed herein, magnetic drum storage is employed for general message storage, magnetic core storage for effecting the program functions above referred to, and preferably, although not necessarily, magnetic tape storage for strong overflow message material and log information. However, the particular types of available signal storage mediums and the division of the different kinds of information among such signal storage mediums may be varied as desired. The 2400-bit tape words hereinbefore referred to are used in storing and transferring information to and from the tape storage when such overflow storage is desired, and are never presented to the input or output systems or the message processor.

*Magnetic drum store.*—The most important unit in the storage system in the embodiment illustrated herein is the magnetic drum. Such a drum may conveniently be any of a number of types commercially available and commonly used in computer systems. A drum suitable for the purpose may, for example, have a capacity in excess of 600,000 bits, with speeds up to 12,000 r.p.m. and which may be operated up to 512 kc. or more. The recording surface of the drum comprises a high density ground magnetic oxide coating in which a high packing factor in bits per inch is possible. FIGS. 2–A and 2–B of the drawings together show a developed view of the recording surface of such a drum; an example of programmed divisions on the drum are indicated by dot-and-dash lines on the drawing, with the nature of the signals stored therein identified by legends, although the physical size and arrangement of these divisions may be varied as desired. The surface of the drum shown is divided into 240 bands or tracks, and preferably, although not necessarily, each track in turn is divided into 2560 bit spaces which include 2480 storage cells, where each such storage cell has a capacity for magnetically storing one bit of information (either a "0" or a "1" depending upon the magnetic polarity of the stored signal). Appearing from top to bottom, as viewed in the figures, there are a number of tracks for storing tables, schedules and directories, other tracks for subroutine storage, a number of tracks for general message storage, input and output rate converter and buffer storage tracks, a tape transfer track, a group of special control tracks, and lastly, four sync-tracks for synchronization purposes. It is to be understood that the size and speed of the drum and the packing factor employed may be varied within wide limits depending upon the volume of traffic, the desired internal pulse rate, and other considerations.

The four sync tracks, FIG. 2-B, are the digit sync track, the S-word sync track, the L-word sync track, and the master sync track, identified by legends. The digit sync track has a "1" recorded in each of its 2560 cells. The pulse repetition rate of the bits as they are read off the track defines the internal pulse rate of the system, and if the drum revolves at 12,000 r.p.m., the digit sync repetition rate, and consequently the internal operating rate is 512 kc./s. The S-word sync track has 80 "1's" recorded on it, and these are spaced evenly on the track so that each pair of "1's" is separated by 31 empty cells (i.e., cells containing "0's"). The time interval between S-word sync pulses defines a minor cycle; the repetition rate of the S-word sync pulses will be 16,000 p.p.s. The L-word sync track contains 8 evenly spaced "1's" which are aligned with the ones on the S-word sync track so that an L-word sync pulse occurs concurrently with every tenth S-word sync pulse, and the repetition rate of the L-word sync pulses is 1600 p.p.s. The master sync track has one "1" recorded on it, and two consecutive appearances of this "1" under the reading head associated with the track defines one drum revolution. One drum revolution is equal to 8 major cycles, 80 minor cycles, and 2560 digit sync pulses. The remaining drum tracks are each divided into eight groups of 320 consecutive cells, referred to as drum bins; each drum bin thus has a capacity of one L-word of 300 cells, of which 280 are used for message data, and 20 cells may be employed for control purposes; the additional 20 cells are used for S-word parity check and S-word separator purposes.

Every drum bin is assigned a unique four digit octal number as its address. The address of the first bin on the first track will be 0000 (octal). The remaining bins are addressed consecutively so that the three higher octal digits designate the track and the low octal digit designates the relative position of the bin on the track. For example, address 0043 is the address of bin No. 3 on track No. 004. Disregarding the ten special tracks and the four sync tracks shown at one end of the drum, the drum contains 1840 addressed storage bins. Not all of the 1840 storage bins can be used for storing messages since two bins, for example, bins designated 3110 and 3200, FIG. 2-A, are reserved for each telegraph input circuit for temporary storage of incoming message data, and two bins, for example, bins designated 3270 and 3370, FIG. 2-B, are reserved for each output circuit for temporary storage of outgoing message data. Thus a 48 circuit system would require 192 bins for input-output functions leaving 1648 bins of general drum storage. More generally, the number of bins in general drum storage is 1840—4N, where N is the number of duplex circuits serviced by the system.

*Core storage system.*—The core storage system, shown in FIG. 31, of the size illustrated herein has 512 storage bins for a capacity of 512 words each 31 bits long, of which one bit is for parity check purposes, and is of a type well known in the art. Henceforth, for convenience, each S-word will be regarded as comprising 30 bits, and similarly each L-word will be regarded as comprising 300 bits. The bits of each word are loaded and unloaded in parallel. A group of ten of these bins are used for each L-word when transferred thereto from an input buffer bin. The Exchange Register, diagrammatically shown in FIGS. 1-D, 9 and 31, and in detail in FIG. 37, serves as a buffer between the message processor and the core memory.

Core addresses are 000 to 757 octal (495 addresses). Address information is furnished to the core memory from any one of three places, the Instruction Counter (010–757) FIG. 33, the *a* Register (010–757) FIG. 33, and the Input Switch Bank (000–007) FIG. 31. The address information is furnished as binary inputs on 9 pairs of address lines, FIG. 31.

When a "read" pulse is furnished to the core system, the contents of the 30 bit word core bin designated by the combination on the address lines is transferred to the Exchange Register. When a "write" pulse is furnished, the contents of the Exchange Register is transferred to the 30 bit word position, or bin, in the cores designated by the address lines. The address is never changed between "read" and "write" pulses because of the nature of coincident-current recording (i.e., only a "read" pulse can change a "1" to a "0" in a core, and only a "write" pulse can change a "0" to a "1"). Thus the 30 bit S-word must be cleared to all zeros before writing, and reading is the only method of setting the cores of a bin to all zeros.

*Magnetic tape store.*—As hereinbefore stated tape units (of which there are various types well known in the art) may economically be used for storing input and output log maintenance, storing overflow information, and storing infrequently used subroutines. In the instant system a plurality of magnetic tape units, for example, eight, may be employed, and the three-digit octal numbers in the range 770–777 used as their addresses. Each tape is divided into 8 channels. Five of the channels are used for recording information which is stored in the channels in blocks of 2400 bits arranged in a parallel-serial array with five bits across the tape and 480 bits per channel along the tape. Each five bit parallel group may, if desired, have an associated parity check bit which is computed during the recording of the five bit group and written on the sixth channel. The seventh channel contains the digit sync pulses, and the eighth channel contains block markers which signal the beginning and ending of the 5 x 480 information blocks. The block markers are permanently recorded on the tape, while the digit sync pulses are recorded each time information is written on the tape. Pulse density within an information block is sufficiently high, for example, 200 bits per linear inch per channel for suitable operation. The tapes have a suitable length, for example, 2500 feet, and may be rewound in about 1.5 minutes by means of commercially available tape transducer and rewind apparatus, for example, and by way of illustration only, an Ampex FR200A Tape Transport manufactured by the Ampex Corporation, 860 Charter Street, Redwood City, California.

All tape operations are under the control of the stored programs. Transfer of information to and from the tape units will always take place via the tape transfer track shown on FIG. 2-B. The tape transfer control is designated so that tape operations may be carried out concurrently with the operations of the other parts of the system, and it is necessary to utilize a buffer unit, for example a magnetic core array or a shift register, both of which are well known in the art, between the tape transfer track and the foregoing Ampex tape unit to effect rate conversion. Only one tape unit can be read from or written on at one time, and only one tape can be positioned at one time. However, it is possible to position the tape in one tape unit while information is being transferred to or from another tape unit. Checking of information during the record and playback operations is automatic.

There are two status flip-flops associated with the tape units—one, called a transfer flip-flop, which is set to "1" when a tape transfer is being executed, and the other of which, called a positioning flip-flop, is set to "1" when a tape positioning operation is being executed. By inspecting the state of the flip-flops, the program is able to tell when a tape operation has been completed and when another can be initiated. The transfer flip-flop and the positioning flip-flop will be cells 0 and 1, respectively, of a 2-bit shift register. The address of the shift register is 776. The system is also provided with an interlock so that it will be impossible to execute two transfers or two positioning operations concurrently.

GENERAL DESCRIPTION OF OPERATION OF THE SWITCHING SYSTEM

Each intelligence bit, or pulse, of an incoming signal over a telegraph tributary circuit is temporarily stored on a flip-flop in an Input Synchronizer until it is transferred to an Input Rate Converter bin on the magnetic drum, which bin is permanently associated with the incoming line. When 280 incoming intelligence bits of the new message have been stored in the input rate converter bin, preferably by a precessing operation hereinafter described, these bits are then transferred serially (during one revolution of the drum) to an Input Buffer bin on the drum and which also is permanently associated with the incoming line. A Status Flip-Flop embodied in a shift register, and individual to the incoming line, indicates when the Input Buffer bin is full; it is controlled by the transfer from the input rate converter bin to the input buffer bin. Each such status flip-flop is continually scanned by the Program Equipment which then copies, under control of a gate circuit G3, FIG. 4, the contents of the input buffer bin into the program core storage of the aforesaid Message Processor. The first two bits of each L-word, which bits are put in at the time the word was inserted in the input rate converter bin, tells the program equipment what to do, i.e., whether the L-word is the first L-word, or an intermediate L-word, or a last L-word, or a part of a message which has to be rejected. If the first two bits represent the first "message unit" (280 bits) of a new incoming message, the message sequence number inserted by the sending station is checked. If the number checks with a record maintained at the switching center, a log entry is inserted in one of the magnetic tapes; if the sequence number does not check, this information is put into the log and typed out on a monitor printer to notify a supervisor at the switching center. Either the first portion of the message or the entire message may also be recorded in one of the tapes, and in the event that the sequence numbers do not check a notation to this effect is recorded in the tape.

Assuming that the message sequence numbers check, the equipment under program control transfers the L-word from the program core storage, during one revolution of the magnetic drum, to an idle random access bin in the main message storage portion of the drum. The programming equipment keeps a record of the particular bin to which the L-word has been transferred; it picks out the address of the bin from a drum status shift register, and also puts this address in an Input Transfer Table which is on a portion of the drum, FIG. 2-A. At the same time another empty bin in the main storage of the drum is picked for the next incoming L-word and also in the Input Transfer Table on the drum before the transfer is made. Each L-word has an address of 12 bits and each short word (S-word) bin of the input transfer table contains two addresses which are (1) the address of the first L-word of the message and (2) the currently changing address of each subsequent L-word of the message. This is continued until the entire message has been inserted in the main message storage portion of the drum. Each L-word as inserted in the drum general storage thus has a "tag" representing the bin address of the succeeding L-word to be stored on the drum so that the proper sequence of the stored message units will be maintained.

When the last L-word containing the end-of-message characters is received, it is not necessary to tag this word. The addresses of the first and last L-words in the input transfer table are rewritten into an Address Decoding Schedule from core storage, the decoding schedule being stored on the drum. These addresses remain in the address decoding schedule until the program equipment has checked the status of Demand Flip-Flops; there is a demand flip-flop for each incoming line and which normally operates on an end-of-message signal or a pause in transmission. If no demand flip-flop is set, the program equipment looks to see if there are any more full input buffer bins to be transferred to main drum storage, and if so it transfers these in the manner above described.

The program equipment now examines an Output Status register to determine which output buffer bins on the drum are available for transfer from general drum storage. If an output bin is available the program equipment inspects the Output Schedule stored on the drum to determine whether there is an L-word waiting to be transmitted over the output circuit associated with its output buffer bin. After all the output circuits are thus processed, the routing program (permanently stored on an available portion of the drum) is entered into program core storage and execution of the program is started.

Assuming that an output line is available for transmission, the program equipment finds the Output Schedule entry on the drum for the particular output circuit. The address of the next L-word to be transmitted is coupled into program core storage and the address of the first L-word in the output schedule is then changed to insert the drum address of the second L-word. The first L-word is transferred serially, under control of a gate circuit G4, FIG. 5, into the associated Output Buffer on the drum and then is transferred, through a gate circuit G5, a Precessor and a gate circuit G6, to an associated Output Rate Converter bin and from there is transmitted, through the gate G5, the Precessor and gate G6 to the Output Synchronizer which converts the pulses into groups of five and Start and Rest pulses are inserted, as by means of a distributor, for transmission over the outgoing telegraph circuit. Each group of five pulses is read out during alternate revolutions of the drum. The second and succeeding L-words of the message are likewise successively transferred to the output rate converter bin and from there are transmitted to output apparatus as above described.

Referring to FIG. 2–A there are shown a number of other storage areas on the drum. The area entitled Input Sequence Number Table includes a 60-bit word for each tributary input station served by the switching center, and keeps a running inventory of the message sequence number of each incoming message over each incoming tributary circuit whereby a comparison may be made between the sequence number in the incoming message and the proper sequence number for that message. A Local Routing Indicator Directory includes a 60 bit storage area for each local station serviced by the switching center; the information includes the routing indicator, circuit number, station designator, and an indication of whether this circuit is a single or multiple channel circuit.

The area entitled Remote Routing Indicator Directory includes a storage bin of 30 bits for each remote switching center, the information including the name of the city, trunk circuit number, and whether a single or multiple channel circuit is involved. The area entitled "GRP RID" index includes one 60 bit bin per group address, and includes a character designating the address as a group routing address, the address of the first L-word in directions, and the number of L-words involved. The area entitled Group Routing Indicator Directions includes storage space for as many L-words as are necessary for each group address, each such L-word or groups of L-words containing one or more circuit numbers, a station designator and the designation of each station on the particular circuit.

The area entitled Output Sequence Number Table includes an area for storing a 30 bit word for each local station serviced by the switching center, and causes the proper sequence number to be inserted in regard to each outgoing message to a local station. The area entitled Erasure Table includes a 30 bit bin for each message transmitted over all of its outgoing circuits, each bin including information designating the order number in which messages were handled, the message storage address of the last message unit to be erased and the address of the next message unit to be erased, the addresses being those of the bins in general drum storage in which the message is presently stored.

*The input system.*—The principal functions of the input system are to convert the telegraph input rates to the 512 kc./s. internal pulse rate and to put messages into a standard form for storing and processing. Messages are first decomposed into sets of 280 bit "message units." As diagrammatically indicated in FIG. 3, each message unit is embedded in a 300-bit L-word with the first bit of a message unit occurring in pulse position $p19$ of the L-word and the last bit occurring in position $p298$. Twenty bit positions of the L-word are reserved for control and other information used in processing and storing the message unit of 280 bits. Control information changes during the various phases in the passage of the message unit through the switching center; the message unit itself is never altered. Codes represented by the first two bits in positions $p1$ and $p0$ designate the type of message unit. These are respectively: 10 First message unit of a message; 00 Intermediate message unit; 01 Last message unit of a message; and 11 Message unit to be rejected.

Each input tributary has two drum bins, an Input Synchronizer, and a certain amount of control equipment permanently associated with it. It shares with other input tributaries equipment which assembles the message unit and converts the telegraph input rate to the internal pulse rate. Telegraph information appears at the synchronizer input circuit at the telegraph line rate; for example, if transmission over the tributary circuit is effected at 100 words per minute, the incoming rate will be approximately 75 bauds, or pulses, per second. The start and rest pulses of each character are deleted at this point and the system is presented with pure telegraph data.

*Precessing operation.*—When a bit of data appears at the input, it is temporarily stored in the input synchronizer. The functional diagram of this system is shown in simplified form in FIG. 4, and FIG. 6(a) to (c) diagrammatically shows the contents of the input rate converter bin in three stages of operation. As cell number $p0$ in the drum bin associated with the circuit (for example bin No. 3110) appears under its Read Head, an associated control gate circuit G1 is opened and the contents of the bin are read serially into a Precessor, except that the signal pulse in cell $p299$ (FIG. 6) is disregarded by the gating circuit and instead the gate causes the binary digit "1" invariably to be inserted in the precessor so that this digit will remain in cell $p299$ for the purpose hereinafter explained. The telegraph bit to be inserted is still in the input synchronizer.

S-words are separated by two cells as hereinbefore described, and hereinafter referred to as "holes." Since the actual length of a rate converter bin is 320 cells, the total delay in the precessor loop, if one cell precession is desired, must be 319 cells. Since the two holes must remain stationary in the rate converter bin, these must not be precessed along with the information. Instead, the information must be effectively precessed "around" the holes. This may be effected by making the loop 317 bits in length, and providing two units of delay with two flip-flops at the entrance in the loop, which flip-flops are embodied in the gate circuit G1, seen in FIG. 4. In such case all pulse positions are fed to the flip-flops, but position $p0$ is inserted directly into the precessing loop while at the same time the output from the two-unit delay is inhibited. 319 digit sync pulse times later, the first bit in $p0$ of the bin, FIG. 6(a), read off the drum by the Read head appears at the output of the precessor. It is one pulse time too early to be rerecorded in cell $p0$ of the drum bin and is erased or blocked by means of a gate circuit G2, FIG. 4, and shown in detail in FIG. 25. The second bit read off the drum, however, appears at the drum Write Head simultaneously with the cell $p0$ of the bin and is recorded in the cell. Similarly, the third bit is coincident with cell $p1$, etc. The precessor conveniently may comprise a bin of 319 successive pulse positions in one of the special control tracks on the drum. All information is thus advanced towards the right by one cell for each incoming bit of message data, and the $p0$ has also been advanced by three cells and thus has been "jumped" around the blank positions or holes. The $p0$ also appears as the second "blank," but this is irrelevant since the value of bits in the blank positions is not important.

For parity bit checking purposes a circuit, FIG. 25, hereinafter described, is included in the input system to generate a parity bit for each 30 bits transferred to the input buffer pin. This is done at the input of the buffer Write Amplifier circuit included in the gating circuit G2, FIGS. 4 and 25, and thus the parity is correct even for the first S-word that contains variable control information of positions $p0$ and $p1$.

One digit-sync time after the 299th data bit was read from the drum bin into the precessor, the telegraph bit in the synchronizer is inserted into the precessor. 319 pulse times later it appears at the precessor output in time to be written in information cell 298 of the bin, as seen in FIG. 6(b). For simplicity, only those cells which contain data are designated in FIG. 6. The digit 1 above referred to is rewritten in cell $p299$. The net result of the process is that the bit in cell $p0$ of the drum bin has been erased; the entire contents of the bin, with the exception of the "1" rewritten in cell $p299$, have been displaced one cell to the right; and a new bit of telegraph data has been inserted in cell 298. The process is repeated for each telegraph bit until 279 bits have been recorded consecutively, beginning with cell No. 20 in the bin, FIG. 6(c), and the 280th telegraph bit has been received and stored in the input synchronizer. The entire contents of the bin and the 280th bit are then transferred at 512 p.p.s. through the precessor to the input buffer storage bin, for example, bin No. 3200. The rate converter bin is now empty with the exception of information in cells $p0$ through $p19$ and the "1" stored in cell $p299$, and the assembly of another message unit is begun.

FIG. 7 diagrammatically indicates the contents of the input buffer bin under different conditions. In 7(a) the bin is shown as containing the first message unit, as noted by the code 10 in cells $p1$ and $p0$. In 7(b) the bin contains an intermediate message unit of a message, as noted by the code 00 in cells $p1$ and $p0$. In 7(c) to (f) the bin is shown as containing the four possible last message units of a message, as noted by the code 01 in $p1$, $p0$. The arrow pointing upward in $p296$ indicates a Figure Shift signal, and the arrow pointing downward in $p298$ indicates a Letter Shift signal; the two arrows with H interposed represent an end-of-message sequence. In 7(g) and (h) the bin is shown as containing two possible message units to be rejected, as indicated by the code 11 in $p1$, $p0$.

The time to assemble one full message unit is approximately 5.6 seconds, and hence it is necessary for the program to empty the buffer before the 5.6 second interval has elapsed so that the message unit in the buffer is not destroyed. One bit of telegraph data can be inserted in each of eight bins of a track in one drum revolution. Since one drum revolution takes 5 milliseconds and since the interval between telegraph pulses at 100 words per minute is approximately 13 milliseconds, it is possible to share the precessing equipment between sixteen standard telegraph circuits.

Figure 24:
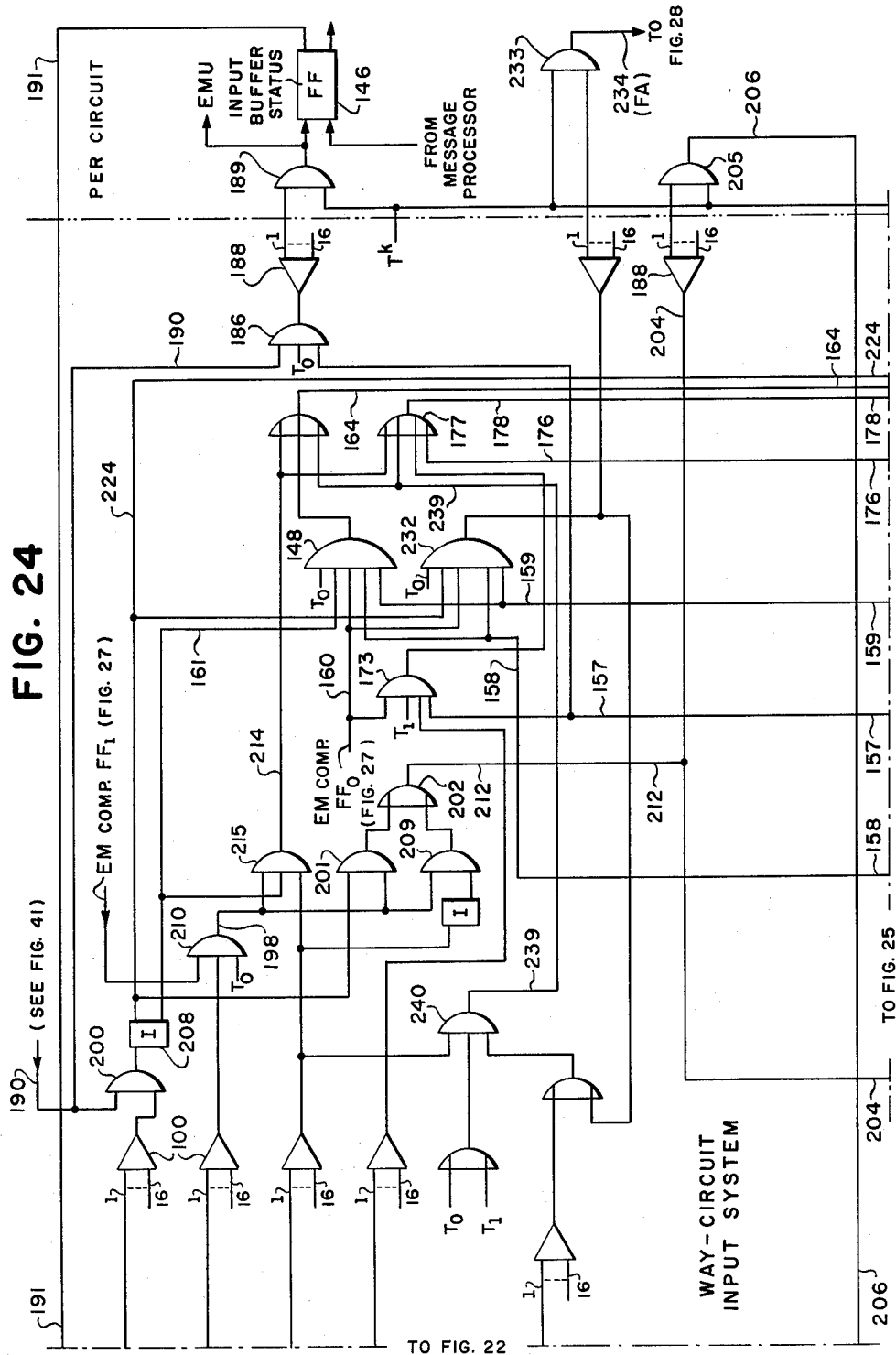

In addition to the rate conversion and storage equipment, each input circuit has two "status flip-flops" permanently associated with it. One of these, indicated at 146 in FIG. 24, is the input buffer status flip-flop which is set whenever the input buffer storage bin is full. The program is able to tell by inspecting the flip-flop whether or not the associated buffer must be emptied. The other flip-flop, indicated at 230 in the lower right hand portion of FIG. 28, is the input demand flip-flop which is set whenever the circuit needs special attention, e.g., when an end-of-message character sequence has been sensed by input control equipment. This may, and frequently will, occur before a complete message unit (280 bits) has been assembled since only infrequently will a message be divisible into an integral number of message units. Each input circuit is also supplied with a timer $TI_1$, FIG. 30-A, to detect improper pauses in incoming transmission and to set the input demand flip-flop when this occurs.

The input system for trunk circuits is similar to the input system for tributaries except that 285 bits of telegraph data are assembled in the input rate converter before its contents are transferred to the input buffer. The additional 5 bits are employed as a check sum, and when 285 bits have been assembled in the input rate converter bin, the sum for the 280 bit message unit is computed and compared against the check sum. If the comparison is satisfactory, the message unit is released for processing. Otherwise, the distant transmitting switching center is requested to retransmit the message unit. The checking equipment is associated with the precessor and shared between input trunk circuits.

*Tributary input control.*—The input tributary circuit may be any of various types well known in the art and operated either on a half-duplex or a full duplex basis. For example, it may comprise a single send and receive telegraph printer station or it may comprise a way circuit with a number of way stations on the same circuit. In the illustrative embodiment herein the signals are of the start-stop type in which the intelligence pulses comprising each character, usually five pulses, are preceded by a start pulse and terminated by a rest pulse. Preferably, although not necessarily, the rest pulse is longer, for example, 1.42 times the length of each of the other pulses. Such signals are commonly referred to as a 7½ unit printer code. Other known codes may be employed depending upon the kind of equipment and the nature of the information transmitted. The particular kind of apparatus and circuitry employed as a tributary station does not per se form a part of the instant invention. The signals at such stations may be generated by manually operated keyboard transmitters although in the case of way station circuits it is preferable, although not essential, to employ a keyboard perforator and transmit the signals by means of perforated tape and a tape transmitter, thereby to more efficiently utilize the line time of the way circuit. The nature of these operations will, of course, depend upon established operating routines.

In the case of way circuits, each station preferably has two "request keys," one of which is for a "high priority" request. If the line circuit is idle, pushing either request key generates a "long-open," for example, a 25 millisecond open, over the transmitting leg of the circuit and this, when recognized by the switching center input system, indicates that a station on the circuit has a message to transmit. Each station on the way circuit is assigned a particular telegraph character or characters as its designator. For example, the first station on a way circuit may be assigned "A" as its designator; the second station on the circuit may be assigned "B" as its designator, etc.

There are usually three conditions which can cause a way circuit invitation cycle to start. First, a station on the circuit may have set its request key which generates the long open signal to indicate to the switching center that one of the stations on the circuit is requesting permission to transmit. The station itself is not uniquely identified at this time since all stations on the way circuit use the same request signal. Second, an incoming message has been received, and the switching center has acknowledged and disconnected the transmitting station. It is now necessary for the switching center to initiate the invitation cycle since all requests were inhibited during the transmission of the previous message. Third, the way circuit has been idle and no requests have been received by the switching center for a certain interval of time. In this case an invitation cycle is initiated by the switching center to insure that no station has been requesting and has been overlooked, and also to test the operating condition of the circuit. The sequence of operations following each of these conditions is as follows:

(a) Transmission over the outgoing leg of the duplex circuit is interrupted (except when end-of-message or termination sequence is being transmitted, in which case the invitation cycle is not started until outgoing transmission is completed). Interruption of transmission places the receiving station or stations on the circuit in a non-print (but still selected) mode. Input to the Input Rate Converter was blocked when the previous message was completed.

(b) In the First and Third conditions, a request lockout character, for example, the character Y, is sent by the switching center and inhibits all subsequent request "opens" to insure that the cycle will not be interrupted by any requests. Then, a release character, for example, a Line Feed, is sent, and this will cause any station that has a high-priority request registered by its high priority request key to send a long open, so that such station will take precedence over a station having a low priority message to send. In the Second condition above mentioned, the acknowledgment or rejection character was followed by the Line Feed character. Thus, the procedure for all three of these cases is uniform from this point on.

(c) Following the foregoing Line Feed character, if a long open is received from a station which has a high-priority message to send, a high priority tag character, for example, the character X, is sent by the switching center over the way circuit to instruct all stations to interpret designators as high priority interrogations only. Step *e* below is then carried out.

(d) After the Line Feed character was sent, if a long open is not received within a given time interval, step *e* below is carried out directly.

Figure 22:
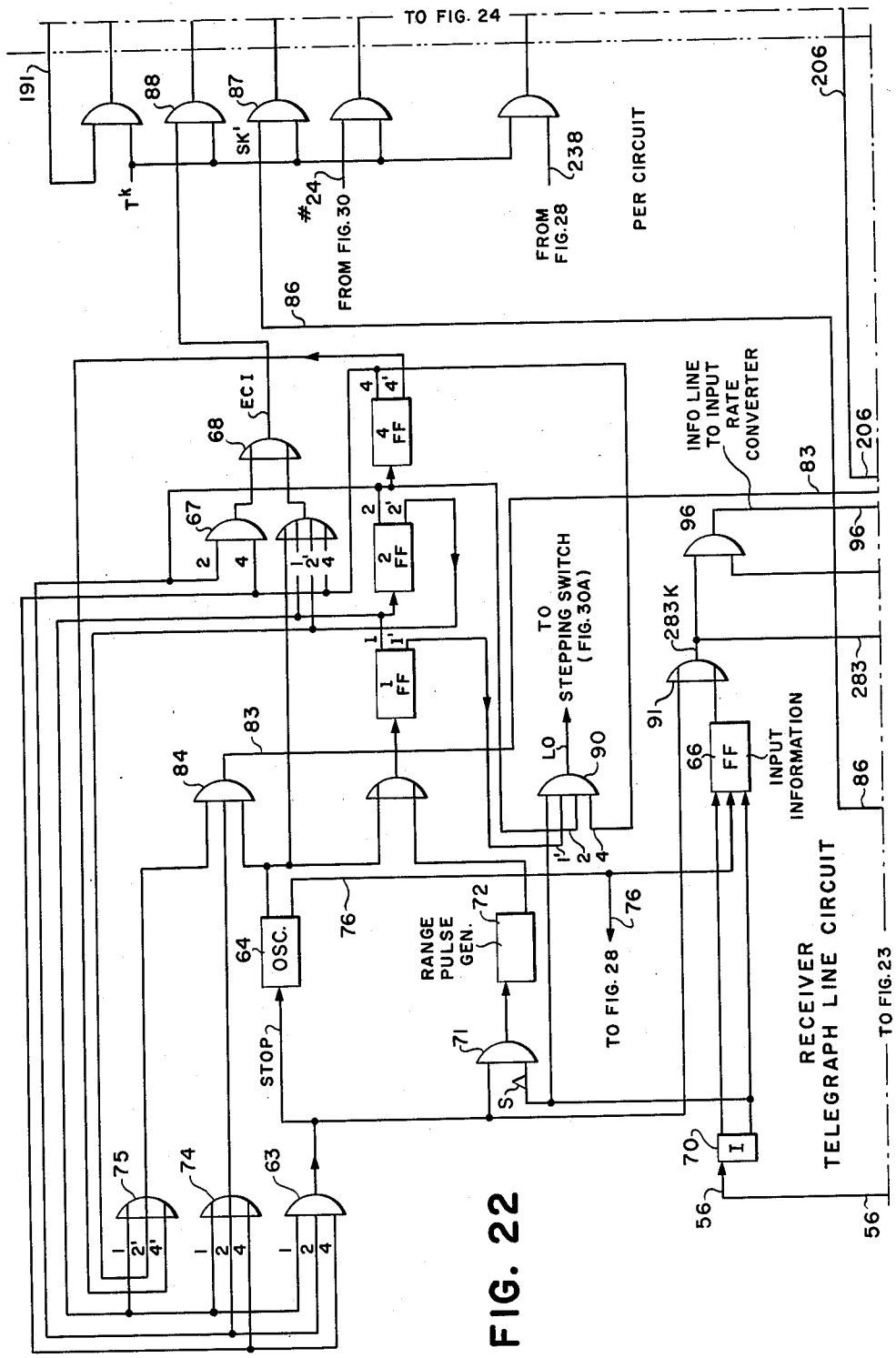

(e) The incoming leg of the way-circuit is connected to the outgoing leg through a regenerative repeater gating circuit, FIG. 22, creating, in effect, a half-duplex circuit and the Input Rate Converter is unblocked.

(f) The station designator of the first station on the circuit to be interrogated is transmitted. Because of the half-duplex circuit, this character is entered into the Input Rate Converter. This character may be either the designator of the first station on the circuit (e.g., A) or the designator of the station on the circuit following the station whose message was just received; for example, if station E had just completed transmission of a message, then designator character F would be sent.

(g) If the first station (e.g., A) has a message to send (high priority if X has been received by the way station, low priority if X has not been received) it will reply with a Space character, followed immediately by the message. In some way-wire systems if station A does not have a message to send, then after a short interval the switching station will send the designator for the next station in the series, etc. In other way-wire systems, if station A does not have a message to send, it will respond with the designator of the next station on the circuit (e.g., B) which interrogates that station, as in the arrangement of the U.S. application of Light and Wichtendahl, Serial No. 683,624, filed September 12, 1957, and assigned to the assignee of the instant case. In either event the roll call is continued until either a ready station is found, in which case it responds with a Space character and its message, or all stations have been interrogated with no affirmative responses. In the latter case a request lock-out release character (for example, Figure Shift) is sent, which enables all of the request keys on the circuit.

(h) If a Space character is sent by a station, it is detected at the switching center and by all the other way stations on the circuit. Any way station which currently has been receiving a message over the receiving leg of the duplex circuit is returned to print condition and the station that sent the Space will start transmitting. In the meantime at the switching center the circuit is returned to full duplex operation and the Input Rate Converter is cleared, with only the last three characters received being retained. The last two of these characters are the designator of the sending station and Space, and serve to "tag" the first message unit of every message.

(i) The incoming information is now entered into the Input Rate Converter, assembled into message units, and transferred to Message Store in the normal way, and this process continues until the end-of-message signal, such as the sequence Figure Shift, H and Letter Shift, is sensed by the Input System, initiating the following sequence of events: The Input Rate Converter is blocked, the outgoing transmission is stopped, and the input demand flip-flop 230, FIG. 28, is set to "1." Predetermined characters, for example U and Line Feed are sent, under program control, via the Output Rate Converter. The first of these characters is interpreted by the station which just transmitted the message as an acknowledgment and its Message Sent Counter is advanced either manually or automatically, as desired. The Line Feed is interpreted by all stations as a high priority request release, and the cycle is repeated starting with step c hereinbefore referred to.

There are two aspects of the foregoing invitation cycle that require further consideration. First, it may happen that one of the stations on a way circuit was not turned on or that it is not functioning properly. In the invitation cycle, the station would not recognize its designator and hence would not respond, causing a break in the chain of responses. The switching center commonly has a timer and a stepping switch or equivalent means, such as the switch of FIG. 30–A, to continue the chain in this contingency in well known manner. The stepping switch is automatically advanced with each response so that it is always set to a position corresponding to the responding station. If there has been no response within a predetermined timer interval (as set in the timer) the stepping switch is automatically advanced by one step and the station designator of the station following the station that failed to respond, is transmitted from the stepping switch, thus filling the gap. The stepping switch also functions as a storage device which remembers the station designator of the last station which transmitted a message so that the next station on the circuit will be interrogated at the beginning of a new invitation cycle.

Second, if transmission of an incoming message should be interrupted before the message was completely received (except for interruptions caused by stopping of outgoing transmission), the Input Demand Flip-Flop is set to "1" so that the program can take the proper action; e.g., reject the message, disconnect the station, and initiate a new invitation cycle.

*Tributary output system.*—The main functions of the output system are to convert the 512 kc./s. internal pulse rate to the telegraph rate for transmission over telegraph output circuits and to bracket each outgoing 5-bit telegraph character with the proper start and stop pulses. Output data may be either message data or control data.

Corresponding to these two types of data there are two modes of transmission; these are, respectively, Mode 1 transmission and Mode 2 transmission.

As hereinbefore stated, the output for each tributary has two drum bins, and an output synchronizer and certain control equipment permanently associated with it. The output rate converter storage bin, for example, bin No. 3370, FIGS. 2 and 5, is divided into two parts; cells $p19$ through $p298$ store the data for Mode 1 transmission, and cells $p0$ through $p18$ store data for Mode 2 transmission.

*Mode 1 transmission.*—In Mode 1 transmission the message units are transferred to the output buffer storage bin, such as bin No. 3270, FIGS. 2 and 5, at the 512 kc./s. rate by the program, usually at intervals equal to, or less than, 5.6 seconds.

When the output rate converter storage bin is empty, the contents of the buffer are transferred to the output rate converter storage bin via the Precessor diagrammitically shown in FIG. 5. The first bit of the message unit (i.e., the bit which occupied cell $p19$ in the output buffer storage bin) is inserted by the synchronizer and is ready for transmission over the telegraph output circuit. It is always the first bit of a telegraph character. The entire message unit (including the bit copied in the synchronizer) is copied in the output rate converter bin but is shifted one cell position to the right so that the bit which occupied cell $p19$ of the buffer now occupies $p18$ in the rate converter, the bit which occupied cell $p20$ in the buffer now occupies $p19$ in the rate converter, etc., also zeros are inserted into cell $p0$ and cell $p299$ of the rate converter. (The zero in the first cell indicates to the control equipment that transmission is Mode 1.) Its contents immediately after the transfer have the form diagrammatically shown in FIG. 6(a) or 6(b) in connection with the input buffer.

Immediately after the bit stored in the synchronizer has been transferred over the telegraph circuit, the contents of the output rate converter storage bin are read into the precessor. The bit which originally occupied cell $p19$ in the output buffer is inserted into the synchronizer and the contents of the rate converter are shifted one place to the right (including the bit copied into the synchronizer) from its previous position; the bit which originally occuped cell $p1$ is erased; and zeros are inserted in otcells $p0$ and $p299$ of the bin. This process is repeated until one complete message unit (or the final fragment) has been transmitted, at which time the contents of the output rate converter storage bin have the form diagrammatically shown in FIG. 6(a). The marker bit in cell $p280$ preceded by 280 zeros indicates that the bin is empty and that it is ready to receive another message unit. The 18 bits of old information serve a special function which is discussed hereinafter.

It takes approximately 5.6 seconds to empty the rate converter storage bin and during this time the program will have inserted another message unit in the buffer so that it is ready to be transferred immediately and outgoing telegraph transmission is not interrupted. One bit of telegraph data can be extracted from each of eight rate converter storage bins in one drum revolution. Since one drum revolution takes approximately 5 milliseconds and since the interval between telegraph pulses is approximately 13 milliseconds, it is possible to share the precessing equipment between 16 standard telegraph circuits.

*Mode 2 transmission.*—In this transmission, one, two or three telegraph characters are transmitted from cells $p3$ to $p17$ of the output rate converter storage bin without disturbing the contents of cells $p19$ to $p299$. This mode of transmission is used primarily for the transmission of special way station or other tributary instruction characters, such as the reject character or the acknowledgment character. In these cases, the output buffer is not used and information is inserted directly into the first 19 cells of the output rate converter by a special instruction in the program. This information will have the form shown diagrammatically in FIG. 8 in which the control portion of an output rate converter bin is seen. The "1" in cell p0 specifies that Mode 2 transmission is requested. One, two or three characters fill cells p3–p7, p3–p12, or p3–p17, according as one, two or three characters are to be transmitted. The last character to be transmitted is always followed by a "1," and the remaining cells must always be filled with zeros.

Transmission from these cells is similar to Mode 1 transmission and proceeds as follows: Information is read into the precessor beginning with cell p0 and ending with cell p18. The bit which occupied cell p3 in the bin is inserted into the synchronizer. All of the 19 bits are shifted one position to the right and recopied into the bin; a "1" is inserted in cell p0 and a "0" is inserted in cell p18. The contents of cells p19 through p299 (not seen in FIG. 8) are unaltered since recording stopped with the insertion of the "0" in cell p18. When the bit stored in the synchronizer has been transmitted over the output circuit, the process is repeated so that a new bit from cell p3 is inserted in the synchronizer and the contents of the first 19 cells of the rate converter are again shifted one cell to the right in the rate converter, etc. The process is repeated until cells p4 through p18 all contain zeros and there is a "1" in cell p3. This state signifies that all of the control characters have been transmitted. The "1" in the cell p0 is erased and Mode 1 transmission is automatically resumed.

There are two "status flip-flops" associated with each output circuit. These are the Output Buffer Status Flip-Flop seen in the lower right hand portion of FIG. 59, and the Ouput Demand Flip-Flop seen in the upper right hand portion of FIG. 28. The output buffer status flip-flop is set to "1" whenever the associated output buffer is empty. This signals to the program that it should transfer another message unit to the output buffer. The output demand flip-flop is set to "1" whenever the output circuit needs special attention. It is then necessary for the program to transfer the contents of the first 19 cells of the associated rate converter storage bin to program store. By inspecting the transferred data the program interprets the nature of the demand and effects the necessary action. For example, if the bits in positions p14–p18 are a station designator, then the program knows that that station did not acknowledge receipt of the message just transmitted.

*Output system trunk circuits.*—The output system for trunk circuits is similar in all major respects to the output system for tributaries with the following differences; First, a message unit for a trunk circuit consists of 280 bits of telegraph information and a 5-bit check sum, so that 285 bits are transmitted via Mode 1, and Mode 2 transmission is limited to a maximum of two telegraph characters. Second, each output trunk circuit has three storage bins associated with it. These are the Primary Buffer Bin, the Secondary Buffer Bin, and the Rate Converter Bin, all located on the drum. The primary buffer and the rate converter bins are analogous to the buffer and rate converter bins of the tributary circuits. The secondary buffer has a unique function. When a message unit is transferred from the primary buffer to the rate converter, a duplicate of the transferred message unit is stored in the secondary buffer. If the receiving switching center acknowledges receipt of the message (i.e., if transmitted and computed check sums agree at the receiving end) the duplicate in the secondary buffer is ignored. However, if the receiving switching center rejects the transmitted message unit, then the duplicate is copied in the rate converter and the message unit is resent. If this copy is also rejected, then the demand flip-flop associated with the circuit is set to "1" to alert the program of the error so that corrective action can be taken. Third, Mode 2 transmission is used to transmit "accept" and "reject" characters for message units received over the input leg of the trunk circuit instead of the way station control characters as in the case of the tributary circuits.

*Tributary selection and control.*—Tributary stations, including way stations, for which the switching center has traffic are selected by the transmission of a "selection sequence" prefaced to the message. This sequence is formed by the program into L-words on the basis of the routing tables stored on the drum. The form of this sequence in the case of way stations generally comprises a pilot character, for example, W, that switches all way stations on the line from an idle mode to a selection mode. The pilot character is followed by a character representing the station designator which causes the station to go into conditional print case so that the station will then print its sequence number. An unshift signal (Letter Shift) now causes the station to shift into nonprint case; it is still selected but will not print again until the restart character Space is received. The Space also returns all unselected stations to a nonselection mode; this mode is different from the initial one in that a W will not act as a pilot character. The selection sequence is sent from the output rate converter by Mode 1 transmission, and is followed by the message. When the end-of-message sequence, Figure Shift, H, Letter Shift, is detected at a selected station, it will cause the station to go out of print case and into an acknowledgement mode. When received at a sending way station, the end-of-message sequence will stop transmission of an incoming message. Any unselected stations will be returned to the original idle mode.

When incoming traffic stops at the switching center, the input rate converter is blocked and a termination sequence is transferred to the output rate converter. The sequence is sent one character at a time by Mode 2 transmission; each station designator causes the corresponding station to send the acknowledgement character Line Feed if it received the end-of-message sequence and is otherwise operating properly. Receipt of the Line Feed at the switching center will cause the next character of the termination sequence to be sent. If the Line Feed is not received within a certain time interval, the output demand flip-flop associated with the circuit is set to "1." The program transfers the contents of the first 19 cells of the output rate converter to program store. The station designator of the station failing to respond is contained in the transferred data. The program then initiates suitable action. It also restarts transmission of the termination sequence by inserting 19 bits of control data into the first 19 cells of the output rate converter. This information is not transmitted but automatically restarts Mode 1 transmission, and hence transmission of the termination sequence. If the end-of-message sequence stopped any incoming traffic, the Space will restart transmission of the interrupted message at the way station and will unblock the input rate converter. Outgoing traffic may be interrupted to send control characters relating to incoming traffic unless a termination or the end-of-message sequence is being sent.

The Message Processor

As hereinbefore set forth, most of the primary functions such as sequence number checking, routing indicator decoding, output scheduling, station selection, etc., are implemented by means of stored programs. The purpose of the Message Processor, shown diagrammatically in FIGS. 1–C and 1–D and in FIG. 9, is to store and execute the programs which perform these functions. The message processor is divided into four units. These are: (1) Program Store, which comprises the Core Store and Special Registers, (2) the Instruction Processing Unit, (3) the Data Processing Unit, and (4) the Control Console. Operation of the first three units is completely automatic. The fourth unit contains the necessary displays for monitoring automatic operation of the message processor. It also contains all of the manual controls required to check out programs, to carry out manual or semiautomatic emergency procedures, to read programs into program store, etc.

Except for some minor differences, operation of the message processor is not unlike the operation of typical single-address digital computers. Internal operations of these units are (with one exception) serial operations on 30-bit words. Instructions are transferred in sequence from program store, through the Exchange Register, to the instruction processing unit where they are interpreted and the proper control circuits are set up. The operand is then transferred from program store, through the exchange register, to the data processing unit where the operation is completed. The result of the operation usually remains in the data processing unit.

The program store has two parts: the coincident-current magnetic Core Storage system, and the group of Special (status) Registers. As hereinbefore stated, the core storage system provides the message processor with 512 31-cell bins of parallel storage. The core address bins 000–007 (octal) are directly coupled to an input switch bank on the control console so that the only input source of these bins is the console itself, although information may be transferred from these bins to any part of the system. These bins constitute the primary vehicle for manual control of the message processor. The remaining 504 bins are used to store the subroutines, program constants, parameters, etc., that are needed for the various programmed operations.

A 31-bit Exchange Register is associated with the core store. In transferring information from core store, it is first copied into the exchange register in parallel and then shifted serially out of the exchange register to its selected destination at the 512 kc./s. rate. In storing information in core store, it is first shifted into the exchange register serially at the 512 kc./s. rate and then copied in the proper bin in parallel. Copying between core store and the exchange register is standardized at 8 digit sync pulse times. (This includes regeneration of information in the cores during the read cycle.)

Information is transferred from the drum to program (core) store as L-words where it is stored in ten consecutive storage bins. Information transferred from program store to the drum will be taken from ten consecutive bins in core store in sequence and stored as one L-word on the drum. A data Accumulator Register in the Data Processing Unit is used as a buffer register for these transfers. FIGS. 10 and 11 together show the functional organization of the Instruction Processing Unit and the Data Processing Unit, the circuits are indicated by one-line diagrams and do not purport to show the number of individual circuits since these appear on other detailed circuit drawings hereinafter referred to.

*Special Registers.*—There are six special registers in Program Store, FIGS. 10 and 11. These are: (1) the Drum Status Register, (2) the Time Register, (3) the Input Buffer Status Register, (4) the Input Demand Register, (4) the Input Demand Register, (5) the Output Demand Register, and (6) the Output Buffer Status Register.

(The last four registers are really parts of the Input and Output Systems, but have been included here since they are assigned program store addresses and are used by the programs.) The Drum Status Register, FIG. 50, always contains the address of an empty drum bin; it is used to locate bins in General Drum Store for storing message units. It is controlled by the Drum Status Track and is assigned address 760. The Time Register of known type, seen diagrammatically in FIG. 11, stores a binary representation of clock time in tenths of seconds. It is permanently assigned address 761. Access is immediate. Its principal use is to ensure that the subroutine cycle is completed within the allotted time interval. It is also used in maintaining Input and Output Logs and as a secondary facility for identifying messages.

Each Input Buffer Status Register has an associated "status" flip-flop 146, FIG. 24, which is automatically set to "1" when a message word is transferred from the input rate converter to the input buffer. The status flip-flops are arranged in the form of a (double length) shift register. The number of flip-flops in the register is equal to the number of telegraph input circuits (e.g., in a 48-circuit system, the input status register will contain 48 flip-flops). Address 762 is permanently assigned to the low order part of the input status register; 763 is reserved for the high-order part used only in systems with more than 30 circuits. Addresses of the input buffer registers are consecutive and associated with the input status register cells in such a way that the low order cell of the input status register is set when the input buffer having the lowest address is filled; the second cell is set when the input buffer having the second lowest address is filled, etc. Transfer of information from the input status register is program-controlled and is non-destructive so that after the transfer has been completed and the message word in an input buffer removed, the program must set the associated input status register cell to "0".

Each input circuit will have an associated "demand" flip-flop 230, seen in the lower right hand corner of FIG. 28, which is set to "1" whenever the circuit requires special attention and is set to "0" otherwise. Conditions which set the demand flip-flop to "1" are: (*a*) conditions have arisen which require rejection of an incoming message; (*b*) the input rate converter contains the end-of-message character sequence; and (*c*) input rate converter and input buffer bins for a given circuit are both full.

The demand flip-flops are arranged in the form of a double length register, i.e., the input demand register. The low-order part is assigned address 764; the high order part is assigned address 765. Association of the cells in the input demand register with their input rate converters is the same as in the input status register so that the low order cell of the input demand register corresponds to the input register with the lowest address, etc.

Each output buffer has an associated output buffer status flip-flop, FIG. 59, which is set to "1" if the output buffer is empty or to "0" if it contains information. The arrangement of these flip-flops and association with their buffers is the same as the input status register and input demand register. The output status register has addresses 766 and 767 permanently assigned to it. Access is immediate.

Each output demand register has an output demand flip-flop, FIG. 28, associated with it in exactly the same way that the input registers do. Conditions under which a demand flip-flop is set to "1" are: (*a*) an output rate converter and its associated output buffer are simultaneously empty; (*b*) addresses of a message do not acknowledge its receipt; and (*c*) all stations have acknowledged and the circuit is available for transmission of the next message. Addresses 770 and 771 are assigned to the output demand register. Access is immediate.

Transfer of information from the Special Registers to the Data Processing Unit is serial at the 512 kc./s. rate. The Exchange Register is not used in the transfer.

*Instruction processing unit, FIGS. 32 and 33.*—Instructions are stored in core stores as 30-bit S-words (excluding the parity bit). Typically they will have the form shown in FIG. 12. The 6-bit positions labelled OC contain the operation code. There are many different operations possible, and each operation is specified by a unique 6-digit binary number. A few typical examples of instructions are: add, substract, shift right, transfer one L-word from drum to core store, transfer one L-word from core store to drum, search drum track, etc. The 3-bit positions labelled C in FIG. 12 are used to specify particular control functions (i.e., relative addressing, break-point for testing purposes, and program interrupt). The 9-bit positions labelled A will usually contain the address of an operand in core stores. The 12-bit positions labelled B serve different purposes according to the particular operation specified by the operation code. Frequently they designate a subsequence of digits in an S-word which are to be operated on, so that part of an S-word can be altered by the operation, leaving the remainder unchanged. In other cases the digits in B designate the address of a bin on the drum where information is to be transferred or retrieved. In the shift instruction, B specifies the number of digit positions a word is to be shifted, etc.

*The instruction cycle.*—The execution of each stored instruction, except for some minor variations, follows a fixed pattern called the Instruction Cycle. The instruction cycle is divided into four phases. During Phase I (also called the Instruction Access Phase) the next instruction to be executed is located in core store and copied into the Exchange Register. During Phase II (also called the Instruction Read-In Phase) the instruction is transferred serially at the 512 kc./s. rate from the exchange register to a stored register (called the Instruction Register) in the instruction processing unit. The instruction is then interpreted and the necessary control circuits for selecting the operand and carrying out the operation, as specified by the operation code in the instruction, are set up.

Operations during Phases III and IV of the instruction cycle differ according as the instruction being processed requires accesses to both drum store and core store or requires an access to core store only. In the latter case the following sequence of events occurs: During Phase III (the Operand Access Phase) the operand is located in core store and copied into the Exchange Register. During Phase IV (also called the Operand Read-In Phase) the operand is transferred to Data Processing Unit and the operation called for by the instruction (e.g., addition) is actually carried out. The result remains in the Data Processing Unit. If it is desired to transfer the result to core store, a "store" instruction must be executed. The major difference between the execution of this instruction and the process just described is that during Phase IV the word is transferred to the Exchange Register and then stored in the bin (selected during Phase III) in core store.

If the instruction is a drum transfer instruction (i.e., requires accesses to both drum and core store) a slightly different sequence of events occurs during Phases III and IV. During Phase III the source and destination bins are selected. During Phase IV the transfer is made. If the transfer is from drum to core store, the 300 bits in an L-word are read serially into the data processing unit at the 512 kc./s. rate. As soon as 31 bits are accumulated, they are transferred in parallel via Exchange Register to the selected bin in core store. As soon as another 31 bits have been accumulated, they are transferred in the same way to the core store bin having the next higher address. The process is repeated until the complete L-word in one 300-cell drum bin has been copied into 10 consecutive 31-cell bins in core store. The process for transferring data from core store to the drum requires the same Phase IV operations but in the reverse order.

Usually the instruction cycle will take three or four minor cycles, unless the instruction requires a drum access in which case it may take as long as 82 minor cycles or as few as 12 minor cycles. The differences in durations of instruction cycles are effected by extending Phase III or Phase IV the requisite number of minor cycles.

The Instruction Counter, FIG. 33, is a well-known modulo 512 counter which always contains the address of the next instruction in program store to be processed. Usually the instruction counter is advanced by one at the beginning of the instruction cycle so that the normal mode of operation is to extract and process instructions in the order in which they are stored in program store. However, there are two special control instructions (File Counters and Set Counters) which may be used to set the instruction counter to any desired value so that it is possible to by-pass or to repeat a sequence of instructions if desired. The Base Counter also is a modulo-512 counter. It serves two purposes: (1) as a tally to determine the number of times a subroutine has been executed; and (2) as a storage bin for an additive constant for address modification.

The Instruction Register, FIG. 32, is a 30-cell storage register which receives the instruction during Phase II of the Instruction Cycle and stores it while the various pieces of the instruction are interpreted and the various control circuits set up. The Operation Decoder, FIG. 48, determines the operation called for by the instruction (e.g., addition, comparison, etc.). The two Selection Matrices, FIGS. 31 and 55, decode the A and B parts of an instruction and select the storage bins in which the operand is stored or to which information is to be transferred. The Instruction Cycle, FIG. 40, and Timing Control Units, FIGS. 16 to 19, control the four phases of the instruction cycle and generate the special timing pulses used to time the various operations of the input and output systems and the message processor. The Program-Interrupt Flip-Flop of FIG. 34 is set to "1" whenever a "1" is inserted in either the Input Demand Register or the Output Demand Register. The programmer is able to select points in the program where it can be interrupted for the execution of demand subroutines as requested by the flip-flop which is assigned address 772.

*The data processing unit, FIGS. 44, 45, 49, 53, 54.*— The principal parts of the data processing unit are the 60-cell Data Accumulator Register, FIGS. 44 and 45, the 12-cell Address Accumulator Register, FIG. 46, and the Arithmetic-Logic Unit, FIG. 49. The data processing unit executes the processing operations called for by the instruction processing unit, FIG. 10, i.e., operations Phase IV of the instruction cycle. These operations may comprise add, subtract, shift, logical sum, logical product, equality comparison, threshold comparison, etc. All of the operations require two operands. One of these operands is always stored in the data accumulator by some preceding operation; e.g., a "load data accumulator" instruction; the other (designated by the part of the instruction) has previously been transferred to the exchange register during Phase III of the instruction cycle. During Phase IV the two operands are shifted serially at the 512 kc./s. rate through the Arithmetic-Logic Unit where the operation is performed. The result is then stored in the data accumulator. Phase IV usually takes one or two minor cycles. The data accumulator also acts as buffer storage in the transfer of L-words between the drum and program store.

*The control console.*—The control console, shown diagrammatically in FIG. 1-D, is the manual control and monitoring station for the message processor. It is, in all essential respects, similar to the control consoles of most general purpose digital computers. It has the usual set of control switches, the display panel, and the input-output equipment for inserting programs and reading out pertinent operating and control data.

*Control switches.*—The Input Switch Bank is a set of eight groups of thirty conventional 2-position toggle switches, or thirty-one such switches if parity check is included. Each group of thirty switches can store one S-word and is assigned a unique three-digit octal number as its address. These eight addresses are 000–007. The switch bank may be used for storing program constants, parameters, or short subroutines such as the subroutine to read information into program core store from the console input tape reader. They constitute the primary vehicle for manual control of the message processor. The Break-Point Selector Switch is a 3-position rotary selector switch, the outputs of which are utilized in the Phase Control Circuit of the Instruction Processing Unit, FIG.

40. The three positions are: (1) Single-Step, (2) Break-Point, and (3) Run. When the switch is set to "Single-Step," the message processor executes one instruction and stops in Phase I of the next instruction cycle, immediately after "1" has been added to the instruction counter. This switch, in conjunction with the Start-Stop switch, allows the operator to proceed through a subroutine or sequence of instructions one instruction at a time. When the switch is set to "Break-Point," the message processor will proceed through a sequence of instructions in the normal way without interruption until it comes to an instruction in the program that contains "1" in the break-point control position of an instruction. It will process this instruction and then stop in Phase I of the next instruction cycle immediately after "1" has been added to the contents of the instruction counter. The message processor will not begin processing again until the start button has been depressed.

The break-point and single-step positions are used in checking out message processor subroutines. The third position, which is the one for normal operation of the switching center, is the "run" position. In this position, operation of the message processor is fully automatic.

*Start-stop selector switch.*—A start-stop switch in the Control Console allows the operator to start and stop the operation of the message processor manually. The message processor will always stop in Phase I of the instruction cycle with the instruction counter set to the address of the next instruction to be processed in program core store. If the operator wants to alter the contents of the instruction counter, he must do so by setting an appropriate instruction in the first row of switches in the input switch bank and clearing the contents of the instruction counter (i.e., by setting it to zero). In starting the message processor, the address of the first instruction to be processed must be set in the instruction counter; operation will always start in the middle of Phase I of the instruction cycle. There are three "clear" switches. These are used to clear the contents of core store, the contents of the instruction counter, and the contents of the Base Counter.

*The display panel.*—The control console, which may be any well-known type and hence is shown diagrammatically, has a display panel consisting of an array of indicator lamps. There is one row of lamps for each special register in program store and for certain selected registers in the data processing and instruction processing units. These registers are the Drum Status Register, the Time Register, the four Input-Output Status and Demand Registers, the Data Accumulator, the Address Accumulator, the Instruction Register, the Instruction Counter, and the Base Counter. There are as many lamps in each row as there are cells in the associated register so that the complete contents of each register can be displayed simultaneously. Presentation is purely binary.

*The input-output station.*—The input-output station is supplied with a conventional telegraph send and receive set. The station serves a dual function. It can be used as a tributary input-output station, and in this mode, input and output can be simultaneous and will proceed through the input and output systems in the same way as with the other out-stations.

The first mode of operation is standard. The second mode of operation is somewhat unique since the message processor does not operate in standard telegraph code, although subroutines will be prepared in standard telegraph code. In this mode, the input-output equipment may be coupled to the message processor through a bi-directional translation matrix which converts input telegraph code into the pure binary language of the message processor and which reconverts the pure binary language of the message processor into telegraph code on output. Also, input in this mode proceeds one short word at a time and the data accumulator is used as the buffer register. Input and output of data is controlled by the input-output subroutines which may be stored either in core store or in the input switch bank. The input-output equipments are assigned addresses 774 and 775 respectively. Selection between the two modes is made manually by a selector switch on the control console.

*Supervisor station.*—The supervisor's station is the station is the monitoring and control station for the switching center. It contains the control console for the message processor. It also contains one (or more) telegraph send and receive sets. The station has sufficient facilities for handling contingencies that are expected to arise. Consistent with current digital computer operating procedures, the burden for alerting the supervisor to abnormal situations, errors, etc., is placed upon the program. This alert may take the form of an "error printout" at the computer output printer. Error printouts may vary in degree of complexity from a simple code word to an elaborate description of the situation. By programmed techniques it is also possible to make corrective action automatic if it is desired. The efficacy of programmed handling of abnormal situations depends on the message processor's operation; programmed methods are satisfactory only so long as the operation of the message processor itself is satisfactory. Thus, the supervisor's station preferably is supplied with supplementary nonprogrammed alarms of indicators.

*Message specification.*—In the illustrative embodiment disclosed herein all messages are prepared in the standard 5-level telegraph code and have a standard format. Such a format will begin with a Start Message Flag, which for example, may comprise the combination of Carriage Return and Line Feed characters, and these are followed by the calling station identification designated by several characters, after which the input sequence number appears. Next is a Begin Routing Indicator "Flag" which, for example, may comprise the functional characters Carriage Return and Line Feed, followed by the first Routing Indicator code (first destination address code) which may comprise several characters. If there are several routing indicators these will be separated by a routing indicator separator signal which, for example, may be a Space character. An End Routing Indicator Sequence Flag follows the indicator (or indicators) and may comprise an arbitrary code combination such as Figure Shift, M, Letter Shift. The text next appears, and at the end of the text an end-of-message signal which usually is Figure Shift, H, Letter Shift.

Singular routing indicators contain several characters. For example, the first three characters forming a first routing indicator may designate a city, the next two characters forming a second routing indicator may designate a particular tributary or station in that city, etc. Group Routing Indicators are also several characters long, the first character designating the routing indicator as being a group, and the following characters specifying the particular group, i.e., the particular collection of stations. Multiple routing indicators may contain any number of singular and group routing indicators in any combination and order.

All messages are assigned a three-character input sequence by the originating station, which sequence number in conjunction with the station identification code serves to identify the message uniquely. Each station introduces into the system in the order of the input sequence numbers. The switching center checks the input sequence number of each message as it is received, and every message whose sequence number does not check is rejected and the transmitting station can be disconnected from the line. The switching center maintains an output sequence number talley for every station, and each outgoing message from the switching center preferably is prefixed by a selection sequence containing the output sequence number. Each station acknowledges receipt of a message upon its termination. If desired, a printed and punched copy of each non-acknowledged message may be presented to the supervisor for manual attention.

As hereinbefore stated, each switching center may maintain an input log which contains an entry for every message received over the switching center input circuits. It also maintains an output log with a separate entry for each copy delivered so that there will be as many entries for the message in the output log as there are singular addresses in a multiple-addressed message or as there are receiving stations specified for broadcast messages.

Scheduling Internal Operations

*The program cycle.*—The programmed operations required to switch a message cross-office fall into three groups; first, the operations which service the input circuits; second, the operations which service the output circuits; and third, the operations which translate routing indicators, select routes, and schedule outgoing transmission. The subroutines which carry out these operations are collected into three groups referred to respectively as the Input Program, the Output Program, and the Routing Program.

As hereinbefore set forth, the internal operations follow a cyclic pattern called the Program Cycle. Fig. 13–A is a flow chart showing the Program Cycle and the entrance and exit procedure to and from the demand operations; it is to be understood that the function designated by each of the rectangles is executed by appropriate sequences of stored instructions hereinafter described, and this is likewise true of FIG. 13–B referred to below. First, the input and output programs are copied into program store. Second, all of the input circuits that require servicing are serviced; FIG. 13–B is a general flow chart for a typical Input Program. Third, all of the output circuits that require servicing are serviced. Fourth, the routing program is copied into program store. Fifth, translation, routing and scheduling operations are carried out. The cycle is then repeated.

The period of the program cycle is divided by the time interval between two servicings of a single input circuit, this being the time (approximately 5.6 seconds) required to fill the input rate converter storage bin with one complete message unit when transmission rate is 75 bauds. At times, however, this 5.6 second period can not be maintained on the basis of the number of messages and the message units processed. The Time Register is used for this purpose. At the beginning of each cycle the contents of the time register diagrammatically seen in FIG. 11, are copied in a bin in program store. At the completion of the output operations, the contents of the time register are compared against the time stored in program store. If the difference between the two times is less than five seconds, the routing program is copied into program store and one message is processed. The stored time is again compared against the contents of the time register. If there is not enough time to process another message, the input and output programs are read into program store, and a new cycle is initiated; otherwise another message is routed. This process is repeated for each execution of the routing program, thus ensuring that the elapsed time within a program cycle does not exceed 5.6 seconds.

*Demand operations.*—There has been one important oversimplification in the preceding discussion of the program cycle. That is, there are conditions which necessitate two servicings of an input circuit in less than 5.6 seconds. Consider the case in which the end-message flag has just been received and sensed by the input system. Both incoming and outgoing transmission have been stopped. If the circuit were serviced in the normal way by the program, there is the possibility that the circuit would be idle for as long as 11.2 seconds. To minimize the effect of such contingencies, situations which require immediate attention have been classified as demand situations. Facilities, such as the input and output demand registers and the demand flip-flop in the Instruction Processing Unit, are provided to alert the message processor to the existence of the demand situations so that the program cycle can be interrupted and the demands attended to before the normal cycle of operations is continued.

The demand situations for the input system are: (1) end-of-message flag has been recognized by the input system; (2) transmission of an incoming message has stopped prematurely; and (3) input buffer and input rate converter are both full. Demand situations for the output system are: (1) transmission of a message has been completed and one or more receiving stations have failed to acknowledge receipt of the message; (2) transmission of a message has been completed and it is necessary to start a new message; and (3) output buffer and output rate converter are both empty and transmission of a message has not been completed.

The input and output systems have sets of interlocks so that an unattended demand situation will not cause the loss or mutilation of a message. The only effect that unattended demands have is to decrease circuit utilization on the neglected circuits.

*Routing operations.*—The Routing Indicator Directories are kept in general drum store, as hereinbefore stated. Each entry is composed of a routing indicator (code combination) together with its circuit number and a station designator. The tables are organized so that all routing indicators on a track T are less than all routing indicators on track T–1 (considering routing indicators as binary numbers). In program (core) store there is a much smaller table, the Routing Indicator Directory Index, which contains the first routing indicator on each track in the directory and the associated track address.

At some future time (as determined by the routing indicator decoding schedule) the routing indicators of the message are decoded. This is done in the following way: The first message unit of the message is transferred to program store and the first routing indicator is isolated for translation. For simplicity, assume that the routing indicator is singular (i.e., not group). The translation is then accomplished by a table hook-up in two steps. The program examines the isolated routing indicator, selects the appropriate track by equal-to-or-greater-than comparisons against entries in the Index and then, using the routing indicator as a key, searches the selected drum track. The results of the search will be the desired output circuit number and station designator.

If the isolated routing indicator is a group routing indicator (or an indicator designating a station having a multichannel input), the results of the search will be a set of circuit numbers and designators. The translation procedure here is basically the same as the translation procedure for singular routing indicators except that the Group Directory Index is much larger since it contains an entry for every group routing indicator. This is necessary since each group of circuit numbers and station designators requires one drum bin and the search procedure is not suitable for finding information containing more than 60 bits. The group index is stored on the drum. It is searched to find the address of the bin containing the routing directions for the routing indicator. When the address of the bin is found, the contents of the bin are copied in program store, and the translation is complete.

If the message contains more than one routing indicator, the process is repeated until circuit numbers and station designators have been obtained for every routing indicator in the message and stored in program store. This will require transferring additional message units of the message to program store if the string of routing indicators is not terminated in the first message unit.

*Route selection.*—The program now inspects the collection of circuit numbers. If there are any multiple routes the proper route is selected at this time. If there are multiple channels in a single route, the channel with least backlog is selected and the backlog tally for that channel augmented by the number of message units in the message. Finally, the collection of circuit numbers is scanned to see if there are any duplications. If there are, the duplicates are erased and all of the station designators associated with duplicate circuit numbers are collected into one group and appended to an unduplicated circuit number. This ensures that multiple copies of the same message will not be transmitted over the same output circuit.

*Output scheduling.*—The program now adjusts the output schedule for each circuit the message was assigned to. If it was assigned to only one station (e.g., Station $D_j$ on $C_1$), the program does the following: First, it transfers the entry in the output schedule for $C_1$ to program store. Then it finds the first unused portion of the entry and inserts the address of the bin containing the first message unit of the message and the station designator $D_j$ into the entry. Finally, the updated entry is reinserted into its proper bin in the output schedule on the drum.

If the message was a multiple or group addressed message a slightly different procedure is followed. First, a storage bin in general drum store is located and reserved for all of the circuit numbers and station designators in the complete translation. Second, these are copied in the selected bin(s). The address of the first message unit of the message is also copied in the bin. Next, the entry for an assigned circuit in the output schedule is copied in program store; the address of the first message unit and the address of the bin containing all circuit numbers and station designators are inserted in the entry; and finally a single character is inserted (in place of the station designator in a singular routing indicator message) which indicates there is more than one copy to be transmitted (i.e., distinguishes the address of the output directions from the address of a message unit). The output schedule entry for the circuit is reinserted in its assigned bin in the output schedule on the drum.

This process is repeated until the output schedules for each circuit the message was assigned to have been adjusted. Internal processing of the message is now complete.

*Interruption in the invitation cycle.*—It will be recalled that in the invitation cycle, each station on a way circuit either responded with a Space character if it had a message to transmit or with the call letter of the next station on the way-circuit if it had no message. If one of the stations was not turned on or otherwise failed to recognize its call letter, the invitation chain would be broken unless special action were taken. This contingency is recognized at the switching center by the setting of a timer. If a period over a predetermined limit elapses without a responding character, an alarm signal is generated by the input system. This advances the stepping switch, FIG. 30-A, which has been keeping track of the call letters received so that it registers the call letter of the next station on the circuit. This character is then transmitted automatically from the stepping switch over the output leg of the duplex circuit inviting the next station. If the station which failed to acknowledge were the last station on the chain, then the character transmitted from the stepping switch would be Space, which terminates the half-duplex condition of the circuit, resumes outgoing transmission if there were any, and releases the request buttons on all sending stations on the circuit.

*Premature termination of a message.*—This condition is recognized by a timer in the input system which generates an alarm signal whenever a predetermined interval of time has elapsed after the receipt of one character without receipt of the next. The alarm signal initiates the following sequence of events. First, it sets the input demand flip-flop 230, FIG. 28, associated with that circuit and the program interrupt flip-flop of FIG. 34. It then causes the contents of the input rate converter to be transferred to the input buffer. While the transfer is taking place, the two bit code "11" is inserted into cells $p0$ and $p1$ of the buffer which indicates to the program that the partially received message is to be rejected. Both incoming and outgoing transmission are stopped.

The program now transfers the contents of the input buffer to program store and inspects the code in positions $p0$ and $p1$ of the word. Recognizing the code 11 in these positions as the designation for an automatic reject, it performs the following operations: First, it inserts two control characters into the rate converter associated with the outgoing leg. These are transmitted by Mode 2 transmission and initiate a new invitation cycle. The program then locates and erases each message unit of the message to be rejected in message store. Finally, it corrects the entry in the Input Transfer Table for the circuit and enters into the Input Log the circuit number, the station designator of the station that was transmitting the rejected message, the time, and other pertinent information which will identify the message and the reason for rejection. If desired this information may also be printed out to the supervisor to advise him of the difficulty and the action taken.

*Improper message headings.*—Errors in messages received over tributary circuits vary in their significance according to where they occur in a message. For example, errors in text that are generated either by the way-station operator, the way-station transmission equipment, or by the transmission process itself will not, in general, be detected by the switching center equipment. These errors will not result in the loss of a message so that they have little or no significance in the subsequent handling of a message. However, if the errors occur in the heading or control parts of a message (such as end-message-character sequence) the situation is otherwise and special precautions must be taken to detect such errors whenever they occur and to take appropriate action. In general these errors will take one of three forms: (*a*) errors in input sequence numbers, (*b*) errors in routing indicators, and (*c*) errors in punctuation such as improper begin-message character sequence, end-address character sequence, etc.

*Errors in input sequence numbers.*—It will be recalled that sequence numbers were checked when the first message unit of a message was transferred from the input buffer to message store and that a station was not disconnected from the line until the sequence number had been checked. Sensing end-of-message character sequence on the input circuit sets the demand flip-flop so that if a message is equal to, or less than, one message unit, the program can attend to it immediately and check its sequence before the transmitting station is disconnected from the circuit. If the sequence number does not check, two control characters are inserted in the control portion of the output rate converter; such insertion automatically stops Mode 1 transmission and the control characters are transmitted via Mode 2. These two characters automatically disconnect the transmitting station, thus rejecting the incoming message, and initiate a new invitation cycle. The first message unit is erased and an entry is made in the input log which contains the station designator, the message sequence number, the correct sequence number, and other pertinent information. In addition, an error printout may be made on the supervisor's printer.

*Improper routing indicators.*—Errors in routing indicators will usually result in invalid routing indicators rather than valid routing indicators which designate improper stations. Detection of the error(s) will take place during the routing indicator decoding process, and since this occurs after the transmitting station has been disconnected, the message can not be rejected. In general, the error will be discovered by an unsatisfactory search of the routing indicator directory. Whenever this occurs, an error word indicating the type of error is formed by the program. The error word, followed by the complete message, is printed out at the supervisor's station. Also, the complete message may be punched in tape at the supervisor's reperforator, and the message then erased from message store. The supervisor can then correct the routing indicator if the error is obvious and reenter the message into the system, or enter a canned message addressed to the transmitting station which designates the message, indicates the source of difficulty, and requests that the originating station either correct the routing indicator and rerun the message or cancel the message.

If the routine indicators all contain the same number of characters, then it is possible to detect errors in the routing indicator separators or even the absence of separators and still clear the message through the switching center, providing that the errors do not result in invalid routing indicators. On the other hand, if routing indicators do not all contain the same number of characters so that the separators are essential to the separation of the routing indicators, then errors in routing indicator separators can not in general be detected by the program because they will be interpreted as part of a routing indicator. However, such an error will result in an invalid routing indicator and the procedure followed in processing invalid routing indicators will be followed. The error type will most probably be picked up by the supervisor, corrected, and the message rerun through the supervisor's input equipment.

Errors in the end-of-address sequence will result in the program interpreting the sequence as part of a routing indicator so that this contingency is handled by the same procedures as those for invalid routing indicators. Improper end-of-message character sequence will be detected by the input equipment since transmission will probably stop without end-of-message character sequence being recognized by the input system. This will result in the same procedure as followed when a message is prematurely terminated, i.e., by automatically rejecting the message.

*Errors in trunk transmission.*—Trunk transmission is checked by modulo 32 check sum. The automatic control equipment automatically retransmits a message unit whenever the receiving center rejects the message unit. If the retransmission is also rejected, then the output demand flip-flop associated with that trunk circuit is set to "1". The program then assigns the complete message to the supervisor and the message with an error prefix is punched and printed at the supervisor's station. At the receiving station, two consecutive rejections of a message unit results in an automatic rejection of the entire message. The procedure involved is essentially the same as the automatic rejection of a message transmitted from a way-station. The code 11 appears in the message unit in the input buffer. Recognizing this, the program erases the message fragment and records information pertinent to the rejection in the input log.

*Selected station failing to acknowledge receipt of a message.*—After a message has been transmitted over a way-circuit, it is followed by the termination sequence. If a station fails to acknowledge after receiving its call letter, the output demand flip-flop is set. The program transfers the control portion from the output rate converter to program store. The last character is the call letter of the station failing to respond. The message is prefixed with an error word which contains the station call letter and the source of difficulty, and the message with its prefix may be printed and punched out at the supervisor station.

*Overflow.*—There are two possible reasons for overflowing message store. These are failure of one or more output circuits and abnormally heavy loading on one or more output circuits. In the first case, all messages addressed to an inoperative output circuit may be diverted to tape store where they can be recovered and retransmitted when the output circuit has been repaired. This is a programmed operation. The only supervisory attention required is to specify the circuit numbers whenever output circuits fail so that messages will be recorded on magnetic tape. To recover the messages from tape after the circuits have been repaired, the supervisor must erase these circuit numbers. Recovery of the tape-stored message is then accomplished by the program, and is fully automatic.

The second type of overflow is recognized and accommodated by the program so that it is fully automatic. A record of circuit loading (i.e., queue length measured in message units) is maintained for each output circuit. A threshold number is assigned so that whenever queue length for a circuit is less than the threshold, the entire queue for that circuit is stored on the magnetic drum according to the random access method. Whenever the queue length exceeds the threshold (i.e., an overflow situation exists) for the circuit, the excess may be stored on magnetic tape. It is then necessary for the message processor to scan the tapes for periodically transferring data from tape to drum whenever drum queue is less than its threshold to insure that part of the queue stored on the drum is not fully depleted while there are still messages on tape for that circuit. As the message processor is able to maintain a queue on the drum, there will be no machine delay of messages.

*Tracing a message.*—The Output Log makes it possible to trace a message to the point of origination. If the requesting station can specify the output sequence number of the message, a programmed search of the output log on the basis of the sequence number will recover all information necessary to identify the message, i.e., the source designation and its sequence number. If the requesting station can not specify the output sequence number of the message, it can specify the output sequence number of the last message it received. A programmed search of the output log will then recover the identification of every message assigned to the requesting station with output sequence numbers greater than the one specified by the requesting station.

CIRCUIT DESCRIPTION

In view of the comparatively large number of drawings required to illustrate the circuitry of the instant system it has not been feasible, except in certain instances, to extend connections between the various sheets of the drawings. Therefore, many of the signal input and output circuits of the units depicted on the drawings are identified by abbreviations and symbols, and there is attached hereto an Appendix in which are listed such abbreviations and symbols when they appear on more than one figure of the drawings, the Appendix also listing the figures of origin of the signals.

In practice, conventional emitter followers and buffer amplifiers will be employed, particularly at the outputs of various gate circuits, in known manner to amplify and prevent overloading and degeneration of signal levels, but for simplicity such elements are not shown on the drawings. The letters "FF" indicate well-known flip-flops, or bistable multivibrators, which may comprise either vacuum tubes or transistors; each flip-flop has two outputs which are complementary, i.e., the signal on one output is complementary to the signal on the other output. Such a flip-flop is caused to change its state by applying a signal level to the appropriate input in such manner that the fall of a clock pulse and the signal level occur simultaneously or concurrently, so that the flip-flop is triggered by the fall of a clock pulse. If a signal level is applied to both inputs simultaneously the fall of each clock pulse will cause the flip-flop to change its state and thus it may be used for a stage in a counter. The letter "I" in a rectangle indicates a signal inverter.

The timing control tracks are diagrammatically indicated in the circuit drawing of the timing generator counters in FIGS. 14 and 15. The timing control tracks, FIG. 14, from which timing pulses in the message processor are derived, are as follows: The master sync track 30 contains a single "1," and is used to reset the long word "octal" counter and as a beginning and end marker for transfers between tape and drum tracks, and occurs at a pulse rate of 200 p.p.s. The long word sync (LWS) track 32 contains eight "ones" evenly spaced about the drum with one of these coincident with that of the "1" in the master sync (MS) track (wave forms seen in FIG. 21). These eight pulses LWS are used to control the transfer of long words, to advance the long word counter, and to reset the short word (decimal) counter, FIG. 14. The time between these pulses is called a "major cycle." The long word sync pulses SWS occur at a pulse rate of 1600 p.p.s. The short word sync (SWS) track 34 contains 80 pulses evenly spaced about the drum, with eight of them coincident with those in the long word sync track 32. These SWS pulses (wave form seen in FIG. 20) are used to control the transfer of short words to advance the short word counter of FIG. 14, and to reset the $t$-pulse generator seen in FIG. 15. The time between the SWS pulses is called a "minor cycle." Short word sync pulses occur at a pulse rate of 16,000 p.p.s.

*Timing Generator*

The timing generator counters comprise the long word counter (octal) and the short word counter (decimal), FIG. 14, and the $t$-pulse generator and clock pulse-formers, FIG. 15; the associated decoding matrices are shown in FIGS. 16, 17, 18 and 19.

The clock and timing pulse trains are shown on FIG. 20. The clock pulses (CP) are short pulses with rapid rise and fall times, durations of approximately 0.3 microsecond, and a repetition rate of 512 kc./s. They are used to synchronize the setting and resetting of flip-flops and the shifting of registers. There are three series of clock pulses: CPA, CPB and CPC. The CPA series is a continuous chain of pulses with a repetition rate of 512 kc./s. CPA constitutes the clock pulse input to the L-word and S-word counters, and the $t$-pulse generator. The CPB series is generated in the same fashion as the CPA train except that every thirty-second pulse is deleted, as shown. The deletion is coincident with the occurrence of the short word sync pulse SWS obtained from track 34 of the drum, FIG. 14. The CPB pulse train is used as input to the parity checker hereinafter described.

The CPC pulse train is like the CPB train except that every thirty-first pulse is deleted (i.e., the pulse that occurs before the blank in the CPB train). The CPC train is used to set and reset the flip-flops through the Message Processor.

*t-Pulses.*—There are $t$-pulses, $t_0 \ldots t_{29}$ and $g$, which appear on the 31 output lines from the $t$-pulse generator decoding matrix shown in FIG. 18. The repetition rate for a given $t_1$ pulse train, FIG. 20, is approximately 16 kc./s. The duration of a single $t$-pulse is approximately 1.9 microseconds. The t-pulses are derived from the digit sync track 36, FIG. 14, and L-word sync pulses from track 32, of the drum. Pulse $t_0$ is generated by the coincidence of an S-word sync (SWS) pulse and the fall of a CPA. Pulse $t_1$ is generated from the first digit sync after the short word sync and the fall of CPA, etc. The $t$-pulses are used to open and close control gates.

*T-pulse codes.*—There are 8 T-pulse codes $T^0 \ldots T^7$, FIG. 16, which are represented on three of the parallel output lines from the L-word Sync Counter as the 3-digit binary numbers 000, 001 ... 111, respectively. $T^1$ is generated by the coincidence of the Master Sync Pulse and the fall of CPA. $T^2$ is generated by the first L-word sync pulse after the master sync pulse and the fall of CPA, etc. T-pulse codes are used for drum octant selection. At any given time, the number of the available drum octant is one less than the counter registered in the L-ward Sync Counter, i.e., if octant number $i$ is available, the T-pulse code registered in the L-word sync counter will be $T^{i+1}$. The drum timing the reference to the T-pulse codes is shown in FIG. 21.

*Minor cycles and major cycles.*—A minor cycle (FIG. 20) is equal to 32 CPA times and begins with the coincidence of a $t_0$ pulse and the fall of a pulse from the CPA train. A minor cycle is divided into three periods. The first period extends for 30 CPC times; i.e., from the coincidence of the fall of a CPC with $t_0$ until the coincidence of the fall of a CPC and $t_{29}$. This is the productive part of the minor cycle. The second period in the minor cycle extends from the end of the first period until the coincidence of the fall of a CPB and the $t$-pulse $g$, or one CPA time. During this period, the contents of the parity flip-flops are tested. The last period of the minor cycle extends for one CPA time, from the end of the second period to the coincidence of a CPA and $t_0$. This is a dead period for the instruction processing unit and the data processing unit and no significant Instruction Processing Unit or Data Processing Unit operations occur during this period.

A major cycle is defined as eight minor cycles. It begins with the concidence of the first $t_0$ pulse after the L-word Sync and the fall of CPA and lasts for 320 CPA times. A major cycle is the transfer time of one L-word.

The octal counter receives all clock pulses, but receives an input from the long word sync read amplifier 39, FIG. 14, only eight times per revolution. The counter is a well known 3-stage binary counter which is reset each revolution of the drum by the master sync pulse from track 30; it is composed of conventional flip-flops with various well known control gates hereinafter referred to. The gates preferably embody crystal diodes. The stages of the counter are identified as FF1, FF2 and FF4 to indicate their denominational values. The outputs of the flip-flops are identified by numerals 1, 2, 4, 1', 2' and 4'. The signals appearing at the outputs of the stages designated by the numerals with prime marks represent the complements, or opposite signal conditions, of those appearing at the outputs designated by the numerals without prime marks. The octal counter also includes a series of gates which are designated by segments of circles; the "and" gates, for example, gate 31, FIG. 14, are distinguished by the fact that the lead connections thereto do not extend within the segments, whereas the "or" gates, for example, gate 33, are distinguished by the fact that the lead connections thereto extend into the segments.

The input to the counter is a pulse over output 1 of read amplifier 39 applied to the "and" gate 31 at the entrance to the counter and is effective only when a pulse over output 0 from read amplifier 38 also appears. The coincidence of these input pulses set stage FF1 of the counter. The following coincidence of these pulses resets stage FF1 and causes the output 1 to the next "and" gate to set stage FF2. Similarly, the succeeding occurrence of the coincidence of these pulses causes a pulse to appear on output 2 of stage FF2 and through the adjacent "and" gate set stage 4 of the counter. The counter is reset each revolution by the master sync pulse from track 30 which causes an output 1 from amplifier 38 to appear at the first "or" gate 33 and causes the output of the gate to be applied to stage FF1 to reset the counter coincident with the pulse from output 1 of read appliver 39. The outputs from the three stages of the counter are decoded to eight lines $T^0$ to $T^7$ of the decoding matric of FIG. 16. The level outputs of these lines are hereinafter referred to as $T^k$ where $k$ represents a digit 0 to 7. These are used in the message processor to determine what bin, or octant, is under the read and write heads of a track at any time.

The decimal counter of FIG. 14 also receives all clock pulses from the digit sync track 36 and receives an input from the short word sync read amplifier 40 eighty times per revolution, or ten times during each long word. The counter is reset by each long word sync pulse appearing at output 1 of read amplifier 39. This counter is a conventional 4-stage binary counter, the stages being labelled 1, 2, 4 and 8. The output of the counter is decoded to ten lines ($t^0$ to $t^9$) shown in the decoding matrix of FIG. 16. The level outputs of these lines are hereinafter referred to as $t^h$ where $h$ represents a digit 0 to 9, and are used in the message processor to define any one out of ten short words in a long word. By combining the $T^k$ and $t^h$ levels, it is possible to define any one out of the eighty short words in a track.

The $t$-Pulse generator, FIG. 15, is used to count the 31 clock pulses in each group. It comprises a 5-bit circulating shift register and a 7-bit circulating shift register, both of known types. The stages of the 5-bit shift register are designated FF—$A_0$ to FF—$A_4$, and the stages of the 7-bit register are designated FF—$B_0$ to FF—$B_6$. A "1" is inserted in the low order stage $A_0$ or $B_0$ of one of the shift registers by the pulse from the short word sync track 34, and the output 1 of the read amplifier 40, and all other stages are cleared (set to "0"). At each of the 31 clock pulses, the "1" advances by one stage, and continues to circulate for 31 bit-times. By choosing outputs from a stage in each register, any one of 31 combinations may be generated to define any cell of the 31, as is indicated in the $t$-Pulse decoding matrix of FIG. 18. The input designation $A_0$ to $B_6$ of FIG. 18 correspond to outputs $A_0$ to $B_6$ of the $t$-Pulse generator counters which are connected by a cable 50 to the matrix. The formula for choosing the $m$ and $n$ for $A_m$ and $B_n$ to get the $t_i$th pulse is:

$$m \equiv i (\text{MOD } 5) \quad 0 \leqslant m \leqslant 4$$
$$n \equiv i (\text{MOD } 7) \quad 0 \leqslant n \leqslant 6$$

For example, if $t_{19}$ is desired, $$m \equiv 19 (\text{MOD } 5) = 4$$
$$n \equiv 19 (\text{MOD } 7) = 5$$

and $t_{19}$ would be obtained as the output of an "and" gate with inputs $A_4$ and $B_5$.

Each of the cells in a drum track can be specified by some combination of $T^k$, $t^h$, and $t_i$ signals. Any combining for special purposes is shown on a drawing where the particular combination is needed, except that $T_j$ pulses are shown in FIG. 19, where "$j$" represents a digit 0 to 299. The letter "$h$" represents the largest integer less than or equal to $j$ divided by 30.

Figure 23:
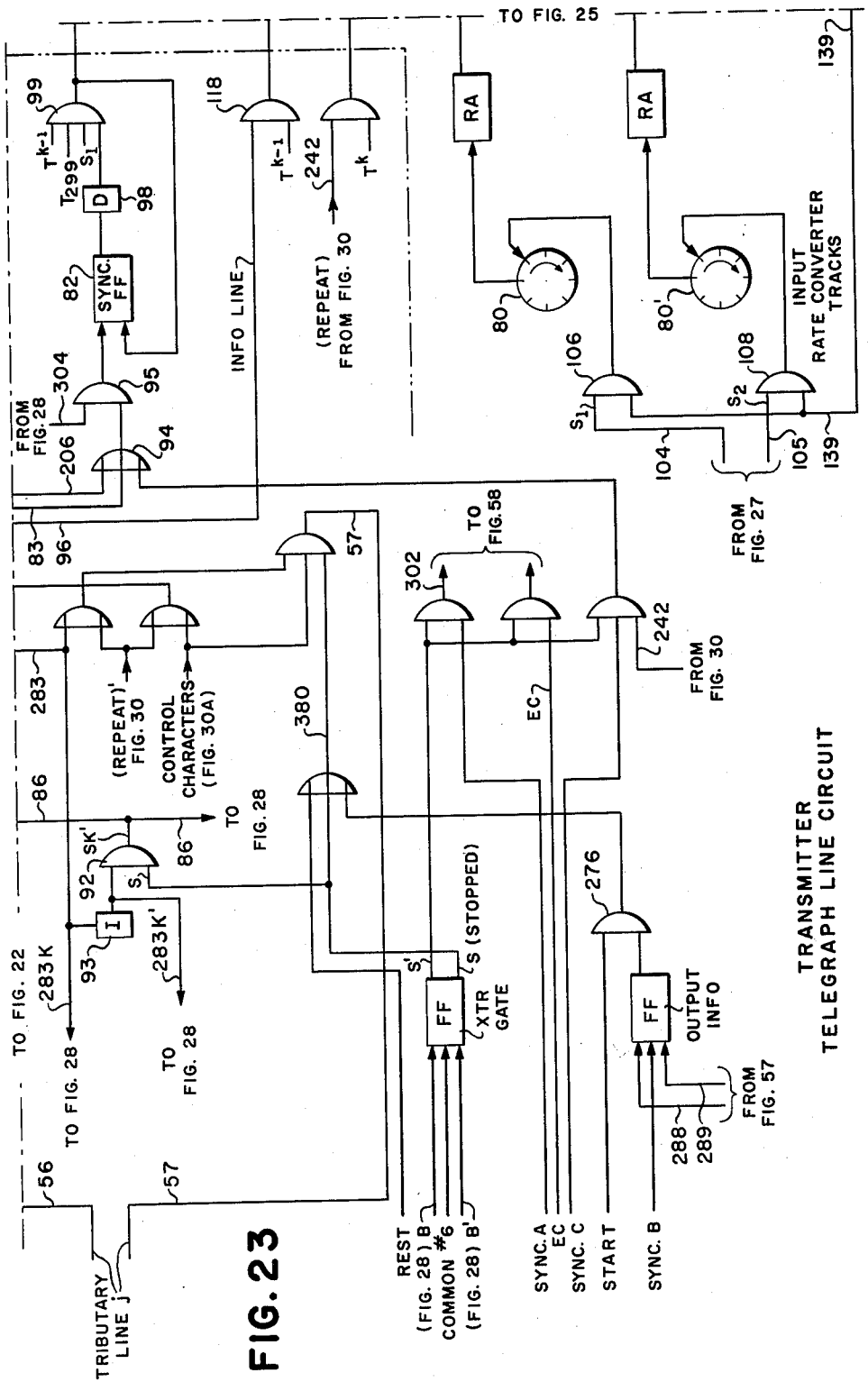

*Tributary input circuit.*—The tributary input circuit is principally shown on FIGS. 22 to 25. Referring to FIGS. 22 and 23, there is seen a circuit $j$, for example, a way station circuit, with the incoming leg of the circuit identified by reference numeral 56, and the outgoing leg by reference numeral 57. Consider the situation when a particular way station on circuit $j$ has obtained access to the switching system in well known manner, and the first bit of a new message unit is about to be received over the incoming leg 56. The contents of the $j$th bin of the input rate converter is as seen in FIG. 6(a). It will be recalled that in FIG. 6(a) only data bits are indicated in pulse positions $p0$ to $p299$, and the contents of the bin are continually being inserted into the 317 bit precessing loop hereinbefore referred to, which is precessing one bit each revolution, and read from the loop 319 bit-times later, for the reason hereinafter described, with all information advanced by one cell. It is not rewritten on the input rate converter track unless the Insert Flip-Flop 60, FIG. 25, is set, and it is not transferred to the input buffer bin unless the Transfer Flip-Flop 61 of FIG. 25 is set.

During an idle line period the condition of the receiving apparatus is as follows: (1) The 3-stage counter 1FF, 2FF, 4FF, FIG. 22, is set 124. (2) An "and" gate 63 is open, presenting a Stop level to a start-stop oscillator 64. (3) An input information flip-flop 66 is set to the state existing on the way station circuit $j$ at the time the last Rest pulse should have been received. During an idle line period the flip-flop 66 will usually be set to 1; however, if a long open signal had preceded the idle condition, the flip-flop 66 could be set to 0. (4) Since the 3-stage counter is in the condition 124, an "and" gate 67 causes an "or" gate 68 to produce a signal level at the point $EC_I$ (end character, incoming) which indicates that no character is being received.

The mark-space transition of the first received start pulse over incoming leg 56 is applied to an inverter 70 and the output is differentiated to cause a spike $s$ to appear at the input of gate 71 which starts a range pulse generator 72, such as a multivibrator. Referring to FIG. 26, a typical incoming telegraph signal is shown by wave form A; the spike $s$ is shown in wave form B and the range pulse generated thereby is shown in wave form C which represents the output of the generator 72. The negative (trailing) edge of the range pulse drives the 3-stage counter of FIG. 22 to its reset state $1'2'4'$. The removal of the oscillator stop level which was produced in the state 124 of the counter, initiates the pulse trains OSC and $(OSC)'$ seen in wave forms D and J, respectively, of FIG. 26. The negative (trailing) edge of each subsequent OSC pulse adds one to the counter setting. The wave forms produced by the stages of the 3-stage counter are shown in the wave forms 1FF, 2FF and 4FF of FIG. 26, and the end-character level is indicated by the wave form $EC_I$ in the figure.

The pulse obtained at the output of an "or" gate 74 of FIG. 22 is depicted by the wave form E (FIG. 26) in the set condition of the 3-stage counter, and the pulse obtained at the output of gate 75 is shown by the wave form F in the figure. The complementary output of the oscillator 64 over conductor 76 is depicted by the wave form J, and the negative (leading) edges of pulses are used to center-trip the input information flip-flop 66, forcing it to assume the state of the incoming leg 56 at roughly the center of each received bit. Thus, the output of the flip-flop 66 is a regenerated copy of the incoming signals as seen in wave form K of FIG. 26, delayed by the length of the range pulse C.

Two of the input rate converter tracks are diagrammatically indicated at 80 and 80' in the lower right hand portion of FIG. 23, and the input rate converter is informed of the presence of each regenerated information bit by means of a synchronizing flip-flop 82 which is set five times each character (once for each information bit). The flip-flop 82 is set over conductor 83 by the output from a gate 84, FIG. 22, the wave form of this output being shown at H in FIG. 26.

Simultaneously with the setting of the input information flip-flop 66 of FIG. 22 to the fifth information bit, the end-character static voltage pulse level $EC_I$ appears at the output of the gate 68 and is applied to an input of a gate 88. One and one-half bit lengths later, the 3-stage counter reaches 124, shown by wave form M of FIG. 26; this state is detected by gate 63 and the oscillator 64 of FIG. 22 is stopped. The receiving portion of the circuit is now idle, and another mark-space line transition will initiate a new character cycle. If the signal condition of the incoming leg 56 is spacing in character when the $1'24$ level (wave form L in FIG. 26) is present, a long open condition is signalled by a pulse LO appearing at the output of a gate 90, FIG. 22. This pulse is applied to a stepping switch SW shown in FIG. 30–A hereinafter described.

When the first telegraph bit is sampled, the synchronizing flip-flop 82, FIG. 23, is set by a pulse from the output of gate 84, FIG. 22, over conductor 83, through an "or" gate 94 and an "and" gate 95, FIG. 23, and an information line 96, FIGS. 22, 23, is set to 1 or 0 according as the telegraph bit was 1 or 0. The rise of the synchronizing flip-flop 82 is delayed one bit by a delay unit 98 to allow the information line 96 to change. Access to the kth octant of an input rate converter track can be made only during alternate revolutions of the drum since 16 octants are being serviced concurrently. Referring to FIGS. 24 and 25, it will be seen that a number of pyramids 100 are provided to accommodate 16 incoming legs or channels. These pyramids may comprise well known arrangements of crystal diodes all poled to pass pulses in the same direction and to prevent pulses from passing in the opposite direction to obviate feedbacks. A track selection flip-flop 102, FIG. 27, has its outputs ($S_1$, $S_2$) connected by conductors 104 and 105 respectively leading to the inputs of gates 106 and 108, FIG. 23.

The track selection flip-flop 102 is set to $S_1$ during an entire revolution starting at time $T_0^0$, as determined by the outputs of the decoding matrices of FIGS. 16 and 19. The flip-flop 102 is set to $S_2$ during the next following revolution, etc. An octant phasing flip-flop 110, FIG. 27, enables two levels $S_A$ and $S_B$ to be gated to the circuitry. Outputs $S_A$ and $S_B$ of FIG. 27 extend to the inputs, respectively, of gates 112, 113 of FIG. 25, and end one octant earlier than $S_1$ and $S_2$, as determined by the timing pulses $T^6$, $T^7$ and $T_{299}$ applied to the "and" gates at the inputs of flip-flops 102 and 110 of FIG. 27. This enables an octant of information to be operated on at the input to the 317 bitloop 115 diagrammatically shown in FIG. 25 (input controlled by $S_A$ and $S_B$) and at the output $S_1$ and $S_2$, FIG. 23. When $$T_{299}^{k-1}$$

of $S_1$ occurs at gate 99 it is gated by the delayed output of the synchronizing flip-flop 82, FIG. 23, to (1) set the insert flip-flop 60, FIG. 25, and (2) reset the synchronizing flip-flop 82. Depending upon the condition of the information line 96, a "1" or "0" is written on the loop 115 at $$T_{299}^{k-1}$$

A "1" is written on the loop at each $T_0$. This is effected by a circuit comprising a gate 118, FIG. 23, the associated pyramid 100, FIG. 25, a gate 119, an "or" gate 120, a differentiator 121 and a two-stage flip-flop circuit comprising flip-flops 123, 124, a gating circuit comprising gates 125, 126, 127, 128, 129, 130, to a write amplifier 131 for writing on the precessing loop 115.

Adjacent groups of 30 bits are separated by two cells in the input rate converter bins, and the actual length of a rate converter bin is 320 cells, and hence the total delay in the precessing loop, if one cell precession is desired must be 319 cells. Since the two "holes" or blank positions between adjacent groups of 30 bits must remain stationary in the input rate converter bins 80 and 80', FIG. 23, these must not be precessed along with the information. Instead, the information must be effectively precessed "around" the holes. This is done by making the precessing loop on the drum 317 bits in length and by providing two units of delay with the two flip-flops 123, 124, FIG. 25, at the entrance to the loop. Henceforth the precessing loop will be regarded as including the two flip-flops and thus will be 319 bits in length. All information pulses are fed to these flip-flops, but position $p0$ is inserted in the loop by means of conductor 140 in a manner to bypass the flip-flops, while at the same time the output from the 2-unit delay is inhibited. This is caused by reason of the fact that timing pulses are not present at the inputs $t'_0$ of gates 125 and 127 at time $t_0$, and hence there will be no outputs from the gates 125 andd 127 at time $t_0$. The result of this process is that all information has been advanced by one cell in the input rate converter bin and that $p0$ has been advanced by three cells and thus has been "jumped" around the blank positions. Position $p0$ also appears as the second "blank," but this is irrelevant, since the value of bits in the blank positions is not important.

The output of the insert flip-flop 60, FIG. 25, at a gate 135 gates the information being read from the loop 115 to the selected one of the input rate converter bins 80 or 80', the circuit comprising the read amplifier 136, conductor 159, gate 135, gate 137, write amplifier 138, and conductor 139 and one or the other gates 106, 108, FIG. 23, to the selected input rate converter track. Since the effective loop length is one bit shorter than a long word, a one bit precession occurs, after which the contents of the selected input rate converter bin are as seen in FIG. 6b. The insert flip-flop 60 is reset by means of gates 143 and 144 at $T_{299}$.

The succeeding information is recorded in the same manner, each new bit being written at $$T_{299}^{k-1}$$

at the input of the loop and being precessed to appear at $p298$ in the input rate converter bin. The marker bit, the old information, and the new information, are moved up toward $p0$ as each new bit is recorded. When the last bit of the 56th (last) code character of a message unit is about to be received, and assuming that the end-of-message sequence does not occur within the message unit and that the associated input buffer bin is empty as indicated by the input buffer status flip-flop 146, FIG. 24, being in a reset state, the contents of the rate converter bin will be as seen in FIG. 6(c).

*Transfer to the input buffer.*—When the insert flip-flop 60, FIG. 25, is set (for the 280th bit) pulses will be applied over conductors 158, 159, 160 and 161 to four of the inputs of a gate 148, FIG. 24, and all conditions are satisfied at the input of the gate so that the marker bit emerging from the loop 115, FIG. 25, at time $T_0$ will be gated by the gate 148 to (1) set the transfer flip-flop 61, FIG. 25, and a "clear" flip-flop 166 over conductor 164, and (2) enable the input buffer write amplifier 168, FIG. 25, over conductor 169 so that a "0" is written in $p0$ of a selected input buffer bin in one of the input buffer tracks 170 or 170'. The proper buffer track is selected under control of gates 171 and 172 which in turn are controlled over conductors 104, 105 from the track selection flip-flop 127.

The transfer flip-flop and the clear flip-flop remain set from $T_1$ to $T_{299}$, and the following operations result: (1) if there is an output from gate 173, FIG. 24, indicating the first message unit of a message a "1" is written on the buffer in position $p1$ in the proper octant. (2) If there is no output from gate 173, a "0" is written on the buffer in $p1$. (3) The contents of the loop 115 between $p2$ and $p299$, which would normally be written in the input rate converter bin, are transferred to the input buffer via a gate 174 over a circuit comprising conductor 176, gate 177, conductor 178, gates 179, 180, FIG. 25, the write amplifier 168, and gate 171 or 172, as the case may be. (4) "Zeros" are written in the input rate converter bin from $p1$ to $p279$, inclusive, since the clear flip-flop 166 remains set during this interval. (5) The marker bit is written in $p280$ of the input rate converter bin since the octant divider flip-flop 184 of FIG. 27 is set at $T_{280}$ and is not reset until $T_{299}$. (6) The contents of the loop 115 between $p281$ and $p299$ are precessed to the input rate converter bin via a gate 182 to become "old information." This interval ($T_{281}$–$T_{299}$) is defined by the octant divider flip-flop 184, FIG. 27, connected by conductor 185 to the gate 182 of FIG. 25. The octant divider flip-flop is not shown in FIG. 25, but appears on FIG. 27 since it is part of the common timing control. (7) The input buffer status flip-flop 146 of FIG. 24 is set via gate 186, a pyramid 188, and gate 189. A shift flip-flop enabling signal received over conductor 190 (incoming from FIG. 41) is an interlock to prevent the input buffer status flip-flop 146 from being set while the input buffer status register, hereinafter referred to, is being shifted. Since the shift can occupy, at most, 30 bit periods, the output from gate 186 can occur several times while the transfer flip-flop 61 of FIG. 25 is set.

After the transfer, the contents of the input rate converter bin will be again as in FIG. 6(a), and the contents of the input buffer bin will be as in FIG. 7(a). The information in the positions p0, p1 are used to designate the type of message unit in the buffer, as hereinbefore stated.

*End message recognition.*—If an end-of-message sequence (figure shift, H, letter shift) is received it will first occur at the input of the loop 115, as hereinafter described. Even if the sequence is split between two message units it will still appear as an uninterrupted sequence at the input of the loop because more than two characters of old information are always preserved in the input rate converter bins. Thus the last three characters received are always available for comparison.

The end-of-message comparator is shown in the upper portion of FIG. 27. The end-of-message sequence is recognized at the input of the loop 115 of FIG. 25 by comparing the last three characters received to the contents of a control track 194, FIG. 27, which is on the drum. In the figure, immediately below the diagrammatic showing of the control track, is a developed plan of the track, and reading from right to left, it will be seen that in position p0 there appears a marker bit "1" which is permanently recorded on the track. Immediately following the "1" bit is a blank space, and this is followed by a repeated sequence of end-of-message character code combinations. The figure shift signal is indicated by a vertical arrow pointing upward and the letter shift signal by a vertical arrow pointing downward. All of these signals are likewise permanently recorded in each octant of the end-of-message comparator track 194.

For the present we are interested only in the last appearing sequence on the track, which characters appear from p285 to p299 inclusive. If the comparison is favorable, the end-of-message comparator flip-flop 196, FIG. 27, will remain set $$P_{285}^{k-1}$$

to $P_1^k$. A pulse at $T_0^k$ at a point 198, FIG. 24, at the output of a gate 210 requires that: (1) the end-of-message comparator flip-flop 196 be set, and (2) the $EC_I$ signal be present at an input of gate 88 of FIG. 22, since the end-of-message sequence could occur elsewhere by splitting characters. When the pulse appears at the point 198 at the output of the gate 210, FIG. 24, several alternatives are possible. If the input buffer status flip-flop 146 (shown in the upper right portion of FIG. 24) is set, as detected at the output of gate 201, or if the output circuitry is not prepared to send a control sequence, as detected at the output of a gate 209, then nothing external is allowed to happen. Instead, a pulse is gated to point 212 at the output of gate 202. This resets the insert flip-flop 60 of FIG. 25 at $T_0$, over conductor 204 so that the message unit remains unchanged in the input rate converter bin. It it also gated out over a circuit comprising conductor 204, gate 205, FIG. 24, conductor 206, gate 94, FIG. 23, and gate 95, to the synchronizing flip-flop 82, so that at the next $$T_{299}^{k-1}$$

of $S_1$, the insert flip-flop 60 is again set.

The same last bit of the message unit is inserted again and again at $$T_{299}^{k-1}$$

because the information line 96 remains unchanged.

This cycle is repeated over and over again until the output circuit is ready to send a control sequence, as indicated by the signal designated SK′ appearing at the input of gate 87 of FIG. 22, and the input buffer is empty. The manner in which the signal SK′ is generated and transmitted over conductor 86 is explained hereinafter in connection with the output circuit for a way station.

When these conditions are satisfied, a pulse appears at point 214 at the output of gate 215, FIG. 24. This now causes a transfer for clearing of the input rate converter as hereinbefore described when the input rate converter became full, with one exception: The pulse at point 214 at $T_0$ is written as "1" in p0 of the input buffer, FIGS. 7(c) to 7(f), to give the code 01 as required by the last message unit of a message.

*Full warning and alarm.*—If the input rate converter bin were to fill up before the input buffer is emptied by the Message Processor, then part of the incoming message would be mutilated and the entire message would have to be rejected. This is prevented by a "full warning sensor" gate 220, FIG. 25, which gives an output if the input rate converter bin is within 5 characters of being full when the input buffer is full. This is effected by reason of the fact that one of the inputs of gate 220 receives over conductor 223 a pulse from a "full warning" flip-flop 222, FIG. 27; another of the inputs of gate 220 comes from conductor 159 leading from the read amplifier 136 associated with the bit loop 115 of FIG. 25, and the third input is a conductor 224 over which a pulse is applied when the input buffer is full, as determined by the condition of gate 200, FIG. 24. The output from gate 220 through gate 225 and conductor 226 to the way circuit control equipment shown in FIG. 28 is a "full warning" (FW) and will stop outgoing traffic, causing the sending station to stop in a manner hereinafter described. The input demand flip-flop 230, FIG. 28, to be discussed later, is set to hasten the emptying of the input buffer. If there is no outgoing traffic, then the input demand flip-flop is set by the "full warning" pulse over conductor 226 when the pulse first occurs, and the input buffer will be emptied before the input rate converter can fill up. In either case, the message processor, after emptying the input buffer will send a restart character (Space) which will cause the sending station to resume transmission.

If something is wrong at the sending way station so that it does not stop when the outgoing traffic at the switching center is stopped, then the input rate converter bin may fill up before the input buffer is emptied, despite the full warning provision. A gate 232, FIG. 24, senses the conditions necessary for rejection due to this event (insert flip-flop 60 set, a "1" at p0 from the loop 115, the input buffer full, and the message not ended), and a "full alarm" signal is gated out from a gate 233, FIG. 24, over conductor 234 to the control circuitry of FIG. 28. There it sets the rejection flip-flop 236 through a gate 237. When the signal designated SK′ appears on conductor 86 of FIG. 23, this signal and the level at the output 238 from the rejection flip-flop 236 of FIG. 28, over conductor 238 to FIG. 23, will gate $T_0$ and $T_1$ to a point 239 at the output of the gate 240, FIG. 24. This will cause a transfer to the input buffer whether or not it has been emptied, and p0, p1 will be marked "11" as desired for a message unit to be erased and rejected. Other rejection conditions are handled in the same manner and will be described hereinafter in connection with the way station control circuit.

The Repeat function, which is gated from the stepping switch, FIG. 30-A, over conductor 242 to FIG. 23 is described hereinafter in the description of the way station control circuit. When it is present, an incoming Space character will be sensed at a gate 244, FIG. 25, and the clear flip-flop 166 will be set. The incoming rate converter bin will be cleared of all but the "old information" bits and the marker bit, and will then be as in FIG. 6(a). This serves to clear unwanted characters from the input rate converter bin without transferring them to the buffer bin.

*Head selection switch.*—An illustrative selection circuit for the various read-write heads or transducers, can be seen in FIG. 61, in which each of the read-write heads is indicated by two coils. The head selection switch shown is like the one described in an article by L. D. Seader, entitled "Magnetic Recording-Head Selection Switch" in the IBM Journal of Research and Development, Volume 2, No. 1, pp. 36–42, published January 1958, by the International Business Machines Corp., N.Y., N.Y. The circuit shown in FIG. 61 corresponds to the circuit described in the foregoing article, except in the instant case the switch is enlarged to accommodate a 15 x 16 matrix. Any other suitable head selection switch circuit may, of course, be used. The associated drum read and write gating circuit is shown in FIG. 69 in which a write amplifier (WA) and a read amplifier (RA) are controlled by the selection circuit of FIG. 61.

*Drum status circuit.*—This circuit is shown in diagrammatic form in FIG. 50 and in detail in FIGS. 51 and 52. The horizontal broken lines seen in the right hand portion of FIG. 51 and the left hand portion of FIG. 52 indicate intervening stages. In general, the reference characters seen in this group of figures identify the various conductors or units in the different figures of the group, except those characters in regard to which the origins of certain signals are listed in the attached Appendix. A drum status track 432, FIG. 50, is provided on which entries are made as to the current status of all drum bin addresses. If a drum bin is full, the cell on the status track corresponding to the address of the bin contains a "1"; if empty, a "0." If we let $a$ equal the number represented by the address, and $p_k$ be the position on the track, where $k$ is equal to or greater than 0 and is equal to or less than 2399, then $pa$ is the position of the cell corresponding to address $a$. The circuit that keeps this track updated and furnishes the message processor with addresses of empty bins is seen in FIGS. 50 to 52, inclusive. The message processor will transfer to and from the drum status register (DSR) only if a signal level is present at point B, FIG. 50, to signify that the circuitry is idle and that the address in the drum status register is that of an empty bin.

When the message processor releases a drum bin, it will transfer the address $a_e$ of this bin to the drum status register of FIGS. 51 and 52, and pulse the line marked "Address to Register," FIG. 50. This will set the flip-flop To FF and effect a non-destructive parallel transfer of the complement of the contents of the drum status register $(a_e)'$ to the 12-bit status counter. With the To FF set, the next master sync pulse will set the Count Control FF and all digit sync pulses will be counted. The contents of the counter will thus be $a_{e+k}$ as the read-write head enters the $p_k$ cell. As the read-write head enters the $pa_e$ cell, the counter will contain $$a'_e + a_e = \text{"all 1's"}$$

This condition is sensed by the "All Ones" gate, FIG. 52, which via conductor 430 causes a "0" to be written in the $pa_e$ cell. The count of the $pa_e$ cell is inhibited so that the counter is left containing all ones, and the To FF and Count Control FF are reset. A signal level appears on the B signal line, FIG. 50, to signify that the address in the drum status register (DSR) is that of an empty bin. The time taken to update the track and present the address of an empty bin is less than two revolutions of the drum.

When the message processor requires the address of an empty bin, it inspects the B signal line and if it is high, effects a non-destructive serial transfer of the address $a_f$ from the DSR. At the end of the transfer it pulses the "Address From Register" line; then the From FF is set, $(a_f)'$ is transferred to the counter, and at the master sync, the Count Control FF is set. The counting proceeds as before, and as the head enters the $pa_f$ position, the "all ones" gate will cause a "1" to be written in $pa_f$ to mark it full. While the "1" is being written on the track, the count is inhibited and the uncomplemented contents of the DSR $(a_f)$ is transferred to the counter, so that now the counter contains the actual count $(k=a_f)$ of position $pa_f$ under the head. While the "1" is being written, the Search FF is set and the From FF is reset. Thus, when the head enters $pa_{f+1}$, the counter contains $a_f$, the To FF and From FF are reset and the Count Control and Search FF's are set.

The circuit is now searching for a "0" on the track so that the address of an empty bin may be placed in the DSR. Assume that $p_z$ is the first position after $pa_f$ that contains a "0." As the head has passed over $pa_{(f+1)}$, $pa_{(f+2)} \ldots p_{z-2}, p_{z-1}$, the counter has been counting, and as the head enters the $p_z$ position the counter holds $z-1$. When the "0" is read by the head, the Search and Count Control FF's are reset, but the counter counts the $p_z$ cell so that the counter is stopped with its contents at $z$, the address of the empty bin as desired. The number $z$ is transferred to the DSR and the signal appears on B.

OPERATION OF THE INSTRUCTION AND DATA PROCESSING UNITS

Initially the series of instructions which constitute the Program are entered into the various storage units as hereinbefore referred to in the description of the Input-Output Station, and may thus be adapted and changed, if desired, to meet the particular needs and traffic conditions of the system.

*Programming instructions.*—An instruction is written as a 10-digit octal number, $I_0I_1 \ldots I_9$. It is prepared, in well known manner, on punched tape in telegraph code so that each octal digit is represented by one of the 5-bit figures 0 . . . 7. The read-in process converts the sequence of ten teleprinter characters into a pure 30-bit binary number. The instruction is stored internally as a binary sequence $i_{29} \ldots i_0$ where $i_j$ is stored in cell $j$ of an 8-word storage bin. There are many different instructions possible. They are divided into five basic types according to the way the digits are grouped and interpreted by the Instruction Processing Unit.

The types of instructions are: (1) Bracket Instructions, (2) Positioning Instructions, (3) Transfer Instructions, (4) Table Maintenance Instructions, and (5) Control Instructions.

*Bracket instructions—composition.*—There are twelve Bracket Instructions. The composition of instructions in this group are diagrammatically seen in FIG. 29(a). These are single address instructions so that the first operand is always stored in the Data Accumulator (FIGS. 11, 44 and 45) except in a "load" operation, and the results of the operation are stored in the data accumulator except in a "store" operation. An exception to the above is the "Accumulate Bits" operation, in which case the operand is stored in the Data Accumulator and is left unchanged. The address of the second operand is specified by the digits in positions $i_9 \ldots i_{17}$. $a$ (i.e., digits $i_9 \ldots i_{17}$) will always be the address of a bin in core store (FIG. 31) or the address of one of the special storage registers. If $i_6=0$, $a$ designates the bin containing the operand directly. If $i_6=1$, $a$ is "relative to the base counter" (FIG. 33) and the contents of the base counter must be added to $a$ to obtain the true address of the storage bin containing the operand. This is done automatically in the instruction processing unit, FIGS. 32 and 33.

Digit $i_7$ of FIG. 29(a) is the Program-Interrupt Control Digit. The purpose of this digit is to designate places in a program where the program may be interrupted for the execution of a demand function. If $i_7=1$ in an instruction and the Program Interrupt Flip-Flop PIF, FIG. 34, is set to "1," the instruction is processed in the normal way. However, instead of extracting the next instruction in the program, the instruction processing unit will extract the instruction stored in bin 007, without altering the contents of the instruction counter, FIG. 33. Unless the instruction in 007 is a control instruction which alters the contents of the instruction counter, the next instruction executed will not be the instruction 010 but the instruction following the point of interruption in the program. Digit $i_8$ is the Break-Point Control digit. If $i_8=1$ and the Break-Point Selector Switch in the Control Console is set to "break-point," the Message Processor will halt after executing the instruction. If either $i_8=0$ or if $i_8=1$, and the selector switch is not set to "break-point," the instruction processing unit will complete the operation and proceed automatically to the next instruction in the program. Digits $i_6 i_7 i_8$ are collectively referred to as the Control Digits.

Digits $i_{18} \ldots i_{23}$ and $i_{24} \ldots i_{29}$ are the two Bracket Numbers, $B_1$ and $B_2$, respectively, which designate the subsequence of digits in $a$ and the Lower Accumulator that are arctually to be operated on. Ranges for the two numbers are: $B_1$ is in the range of 0 to 29, inclusive, and $B_1$ plus $B_2$ is in the range 1 to 30, inclusive (both decimal). The first digit of the subsequence in program store is stored in cell $B_1$ of bin $a$. $B_2$ is the number of consecutive cells, beginning with $a_{B_1}$, whose contents are used in the operation. Subscripts on addresses are used to designate cells; e.g., $a_0$ designates the 1st cell in bin $a$; $a_{25}$ designates the 26th cell in bin $a$, etc. Digits $i_1 \ldots i_5$ contain the operation code.

Figure 29:
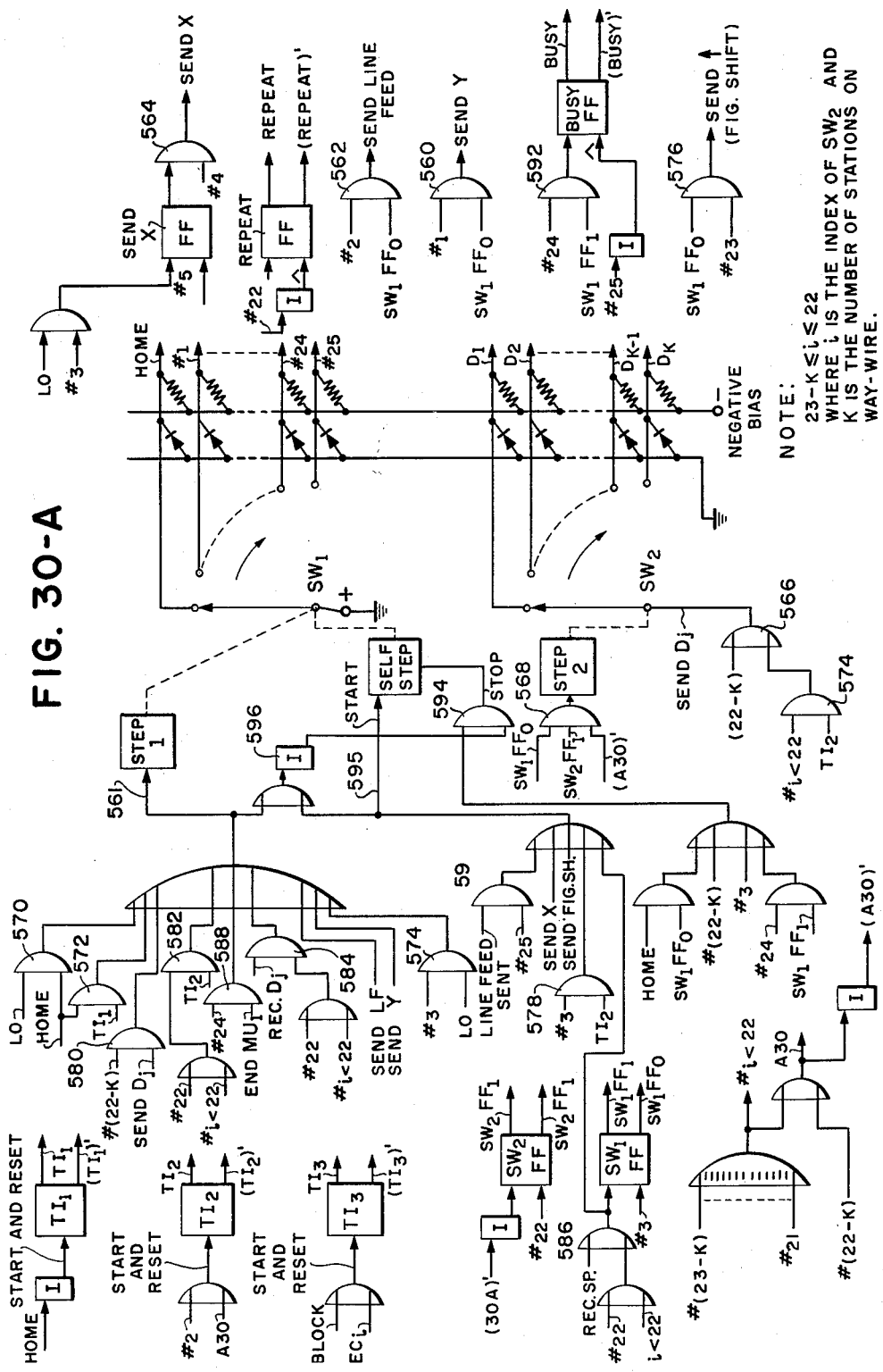

The $i_0$ position in the OC part of the instructions, seen in FIGS. 29($a$) to 29($e$) serves a special purpose. Since this position is not decoded, as hereinafter described, for convenience in programming it may be considered as "0," and the 32 possible instructions may be written as 2-digit octal numbers all of which are even numbers. However, if the $i_0$ position of an instruction is a "1" the Instruction Processor halts at the termination of the instruction. The Instruction Processing Unit proceeds to operate again only if a start switch is manually closed by an attendant.

*Description of the bracket instructions.*—In the descriptions that follow, all operations (unless explicitly noted) will be executed only on those parts of the operands specified by the Bracket Numbers $B_1$ and $B_2$. The contents of the Accumulator outside this range are unaltered by the operation. The prime on $a$ in the following description signifies that if $a$ is relative to the base counter, the operand is in the bin whose address is $a+$the contents of the base counter. Also, all Bracket Operations use only the Lower Accumulator of FIG. 44. 1 is added to the Instruction Counter, FIG. 33, at the completion of each operation, unless specified otherwise.

| Octal code | Operation | Description |
|---|---|---|
| 00 | Add (AD) | Add the contents of $a'$ to the contents of the Lower Accumulator and store the results in the Lower Accumulator (Fig. 44). Addition is modulo-$B_2$. |
| 02 | Subtract (SU) | Subtract the contents oa $a'$ from the contents of the lower accumulator and store the results in the lower accumulator. Subtraction is mod-$B_2$. |
| 04 | Logical sum (OR) | Take the logical sum of the contents of $a'$ and the contents of the lower accumulator and store the results in the lower accumulator. |
| 06 | Logical product (AN) | Take the logical product of the contents of $a'$ and the contents of the lower accumulator and store the results in the lower accumulator. |
| 10 | Load lower (LL) | Copy the contents of $a'$ in the lower accumulator, leaving contents of $a'$ unchanged. |
| 12 | Store lower (SL) | Copy the contents of the lower accumulator in $a'$ leaving contents of the lower accumulator unchanged. |
| 14 | Load address (LA) | Copy the contents of $a'$ in the Address Accumulator (Fig. 46) leaving the contents of $a'$ unchanged. ($B_1$ is equal to or greater than 18, and $B_1+B_2$ is equal to or less than 30.) |
| 16 | Store address (SA) accumulator. | Copy the contents of the address accumulator in $a'$, leaving the contents of the address accumulator unchanged. ($B_1$ is equal to or greater than 18, and $B_1+B_2$ is equal to or less than 30.) |
| 20 | Clear (CL) | Insert $B_2$ consecutive 0's in $a'$ beginning with cell $a'B_1$. |
| 22 | Prime (PR) | Insert $B_2$ consecutive 1's in $a'$ beginning with cell $a'B_1$. |
| 24 | Equality (CE) comparison. | If the contents of the lower accumulator are equal to the contents of $a'$, advance the Instruction Counter (Fig. 33) by 2; if the contents of the lower accumulator are not equal to the contents of $a'$ advance the instruction counter by one. |
| 26 | Threshold (CT) comparison. | If the contents of the lower accumulator are equal to or greater than the contents of $a'$ advance, the instruction counter by two; otherwise advance the instruction counter by one. |

*Positioning instructions.*—There are six positioning instructions: (1) Shift, (2) Normalize, (3) Character Search, (4) Move Tape Forward, (5) Move Tape Back, and (6) Accumulate Bits.

*Composition.*—The composition of the instructions is seen in FIG. 29($b$) where OC, $i_7$ and $i_8$ are as before. $i_6$ (relative address bit) is not used. $a$ is not used in the shift, normalize, character search and accumulate bit operations; N designates the number of places to shift the Accumulator or the number of 2400-bit tape blocks to move the tape, or in the case of accumulate bit instructions N is broken up into $B_1$ and $B_2$ as in the case of the bracket instructions. N is not used in the Normalize operation. $i_{18} \ldots i_{22}$ contain a 5-bit telegraph character in the Character Search Operation. In tape operation, hereinafter described, $a$ is the address of a tape unit.

Description of the Instructions

| Octal code | Operation | Description |
|---|---|---|
| 30 | Shift (SH) | Right circular shift the contents of the 60-bit Accumulator N cells. (N is equal to or less than 60; $a$ and $i_1$ not used.) |
| 32 | Normalize (NR) | Right circular shift the contents of the 60-bit accumulator (FIGS. 44, 45) until a 1 appears in cell $A_0$ and accumulate the number of places shifted in the Address Accumulator (FIG. 46). If contents of the address accumulator less than 60, increase Instruction Counter by two; otherwise increase increase IC by 1. ($a$, $i_1$, and N are not used.) |
| 34 | Character search (CS) | Right circular shift the contents of the Accumulator five places. If (Data Accumulator Register$_{55}$ ... DAR$_{59}$) = $i_{18} \ldots i_{22}$, stop. Otherwise, repeat until either comparison satisfied or until repeated 12 times. Accumulate number of places shifted in address accumulator. Increase Instruction Counter by two if search satisfied; otherwise, increase IC by one. |
| 40 | Move tape forward (TF). | Move the magnetic tape whose address is $a$, N block-positions forward (one block of information on tape equals 2400 bits). |
| 42 | Move tape back (TB) | Move the magnetic tape whose address is $a$, N block-positions back. |

*Transfer instructions.*—Composition: There are six transfer instructions. Each of these instructions will have the form seen in FIG. 29($c$). $d$ is always the address of a drum bin. $a$ is either the address of a Program Store Bin or of a tape unit; in two instructions, it is unused. $i_6$ is unused. $i_7$, $i_8$, and OC are as before.

| Octal code | Operation | Description |
|---|---|---|
| 50 | Transfer one (LI) L-word in. | Copy the L-word in drum bin $d$ into 10 consecutive bins in program store, beginning with bin $a$. Lower Accumulator will contain the last 30 bits of the L-word at the completion of the operation. |
| 52 | Transfer one (LO) L-word to drum store. | Copy the contents of 10 consecutive program storage bins, beginning with $a$, into the drum bin $d$. The lower accumulator (FIG. 44) will contain the last 30 bits of the L-word at the completion of the operation. |
| 54 | Control word in (CI). | Copy the contents of the first 19 cells of drum bin $d$ into the first 19 cells of the lower accumulator. ($a$ unused.) |
| 56 | Control word out (CO). | Copy the contents of the first 19 cells of the lower accumulator into the first 19 cells of the drum bin $d$. ($a$ unused.) |
| 44 | Tape word in (TI). | Copy one 2400-bit tape word on tape $a$ onto the Tape Transfer Track, beginning with the first bin on the track. ($d$ unused.) |
| 46 | Tape word out (TO). | Copy the entire contents of the tape transfer track, beginning with the first bin, onto Tape $a$. ($d$ unused.) |
| 76 | Accumulate bits (AB). | Accumulate the sum of the "1" bits in the Data Accumulator positions $B_1$ to $(B_1+B_2)$. The sum is accumulated, Modulo 32, and stored in the Bit Accumulator Register Counter, FIG. 46-A. ($a$ is not used.) |

*Table maintenance instructions.*—The Long Word transfer instructions make data on the drum accessible only when its address is known in advance. In many operations (such as adjusting sequence numbers, decoding routing indicators) it is convenient to be able to find information when the drum addresses are not known and to insert less than 300 bits of information into arbitrary drum cells. The four Table Maintenance Instructions are designed to fill this need.

*Composition.*—The composition of the table maintenance instructions is seen in FIG. 29($d$). All four operations are essentially search operations, differing only in what is done if the search is satisfied. $t$ is the address of the drum track to be searched. The key is stored in the cells of the Accumulator specified by the bracket numbers, $B_1$ and $B_2$.

In the two Insert Instructions, the contents of cells $A_{B_1+B_2} \ldots A_{29}$ or $A_{B_1+B_2} \ldots A_{59}$ of the Accumulator (according as the instruction was single or double precision) are copied on the drum in cells immediately following the key. In the Search Operations, a 30-bit or 60-bit word (according as the search was single or double precision) is copied in the accumulator. OC and C are as in Bracket Instructions.

| Octal code | Operation | Description |
|---|---|---|
| 60 | Search (single (SS) Precision). | Search drum track $t$ for a 30-bit word on the basis of a key stored in cells $A_{B_1} \ldots A_{B_2+B_1-1}$ of the Accumulator. If a word is found, store it in the accumulator and advance the instruction counter by two. If no word is found, advance the instruction counter by one. |
| 62 | Search (Double (SD) Precision). | Same as Single Precision except that the search is for a 60-bit word. |
| 64 | Insert (Single (IS) Precision). | Search drum track $t$ on the basis of a key stored in cells $A_{B_1} \ldots A_{B_2+B_1-1}$ of the accumulator. If the search is satisfactory, copy contents of cells $A_{B_2+B_1} \ldots A_{29}$ of the accumulator into the corresponding digit positions in the selected 30-bit word on the drum and advance the instruction counter by two. Otherwise, advance the instruction counter by one. |
| 66 | Insert (Double (ID) Precision). | Same as Single Precision except that the contents of cells $A_{B_2+B_1} \ldots A_{50}$ of the accumulator are copied in the selected 60-bit word on the drum. |

*Control instructions.*—There are three control instructions: (1) File, (2) Set, and (3) Base. These instructions are used, respectively, to store the contents of the instruction and base counters in the program store; to set the two counters to any desired combination of values, and to repeat a selected sequence of instructions.

In the two comparison instructions, Character Search and Normalize Instructions, and the four Table Maintenance Instructions, the instruction counter was advanced by two or by one according as the comparison (or search) was satisfied or not. In general, these eight instructions will be followed by a control instruction which will set the counters to the first instruction of a subroutine or another part of the program if a comparison or search is not satisfied. For example, an invalid routing indicator is discovered when a search of the Routing Indicator Directory is unsatisfactory; the control instruction will then transfer control to an error subroutine.

*Composition.*—The composition of the Control Instructions is seen in FIG. 29($e$). In the File and Set operations $a_1$ and $a_2$ are addresses of bins in program store. The Base Operation, $a_1$ and $a_2$ are integers. $C_1$ is not used. Bits in $C_2$ are special control digits and will be discussed separately with the instructions below. The meaning of OC is as before.

| Octal code | Operation | Description |
|---|---|---|
| 70 | File Counters (FI). | If $i_{18}=1$, store the contents of the Base Counter (FIG. 33) in cells $a_9 \ldots a_{17}$ of the program storage bin whose address is $a_1$; if $i_{20}=1$, store the contents of the instruction counter$+1$ in cells $a_{21} \ldots a_{29}$ of the program storage bin whose address is $a_1$. Set instruction counter to $a_2$ unconditionally. Also, set base counter to zero if $i_{19}=1$. |
| 72 | Set Counters (SC). | If $i_{19}=1$, set contents of the base counter to $a_1$; if $i_{20}=1$, set contents of the instruction counter to $a_2$. If $i_{20}=0$, advance instruction counter by one, $i_{18}$ is not used. |
| 74 | Base (BA). | Add $a_1$ to the contents of the base counter. If the contents of the base counter are equal to or greater than $a_2$, advance instruction counter by two and set base counter to zero if $i_{19}=1$. If contents of the base counter are less than $a_2$, advance instruction counter by one and do not set base counter to zero. (If $i_{19}=0$, base counter is not set to zero on exit. $i_{18}$ is not used.) |

*Instruction cycle.*—The following description will be more easily understood by reference to the timing charts shown in FIGS. 38–A to 38–D. FIGS. 38–A and 38–B should be placed in alignment with each other in order that the phasing of the operations depicted in FIG. 38–B will be apparent, and likewise with respect to FIGS. 38–C and 38–D. The charts are, in general, self-explanatory. As hereinbefore set forth, the sequence of elementary operations required to process a single instruction is called an instruction cycle which is divided into four phases, i.e., Phase I (instruction access phase), Phase II (instruction read-in phase), Phase III (operand access phase), and Phase IV (operand read-in phase). During Phase I the next instruction to be processed is located in core store diagrammatically shown in FIG. 11 and in greater detail in FIG. 31, and is transferred to the Exchange Register, FIGS. 11 and 37. The instruction is also recopied in core store since transfers from the core stores are destructive. The core store is of a type well known in the art and commercially available from various supply sources.

Phase I lasts 9 CPA pulse times, i.e., from $t_9$ to $t_{17}$ inclusive, as seen from the timing chart FIG. 38–A. The timing details for the execution of each instruction are depicted in FIGS. 38–A to 38–D in which the ruled scales at the top of the charts FIG. 38–A and 38–C represent the clock pulse train CPC. The places for the two missing CPC's (which are the "holes" previously mentioned) have not been represented so that the first CPC in a minor cycle appears to follow the last CPC of the previous minor cycle immediately, while the two CPC's are, in fact, separated by an interval equal to two CPA times. The CPA pulses have heretofore been referred to in connection with FIG. 20. The significant t-pulses of FIG. 36 are represented as occurring between CPC pulses, but it should be understood that a t-pulse is derived from the output of a flip-flop which is set by the fall of one CPA pulse and reset by the next CPA pulse. The arrows appearing on the chart mean only that a t-pulse has risen to full value some time after one CPC pulse and remains at this usable value until the fall of the next CPC pulse.

On the timing charts comprising FIGS. 38–A and 38–C the instruction access phase I is abbreviated FIA; the instruction read-in phase II is abbreviated FIR; the operand access phase III is abbreviated FOA; and the operand read-in phase IV is abbreviated FOR.

During Phase II the instruction is shifted serially out of the Exchange Register, FIGS. 11 and 37, into the Instruction Register (which comprises registers OC, C, $a$ and $b$, shown in FIGS. 10, 32 and 33, the register $b$ also being shown in detail in FIG. 39, at the 512 kc./s. rate. The various parts of the instruction are interpreted during the shifting operation so that all of the control flip-flops for executing the instruction have been set up when the transfer of the instruction from the Exchange Register to the Instruction Register has been completed. Phase II lasts 30 CPA times, i.e., from $t_{18}$ (FIGS. 38–A and 38–C) of the first minor cycle of the instruction cycle through $t_{17}$ of the second minor cycle.

The elementary operations carried out during Phase III (FOA) and Phase IV (FOR) vary from instruction to instruction and will be discussed in detail hereinafter. Usually the operand is selected from program (or drum) store during Phase III, and the operation specified by the instruction is carried out during Phase IV. The duration of Phase III varies from 12 CPC to 2370 CPC times, i.e., approximately 5.0 milliseconds. The duration of Phase IV varies from 39 CPC times to 2409 CPC times. During the last 9 CPC times of Phase IV the instruction counter is advanced by one (or two) in preparation for Phase I of the next instruction cycle.

*Phase I and Phase II operations.*—The elementary operations carried out during Phase I and Phase II of an operation cycle are basically the same for each of the various instructions hereinafter referred to. At the beginning of Phase I the instruction counter contains the address of the next instruction to be extracted from core store. The coincidence between $t_8$ and a CPC pulse sets the Phase I flip-flop during the period designated as FIA in FIG. 40 (except under circumstances which will be described below). Phase I remains set until $t_{17}$, FIGS. 38–A and 38–C, the last t-pulse occurring in Phase I. The pulse at $t_8$ is actually the last t-pulse of Phase IV but is used to set the flip-flop so that its output will be available at $t_9$, the first t-pulse in Phase I. The address of the core storage bin appears as a parallel input to the core selection matrix diagrammatically shown in FIG. 31. At $t_{11}$ a read pulse is gated to core store and the contents of the selected core bin are transferred in parallel into the exchange register. Because the transfer from cores is destructive, it is necessary to recopy the contents of the exchange register into the core bin. This is accomplished at $t_{15}$ by gating a write pulse to core store and non-destructively transferring the contents of the exchange register in parallel to core store.

*Phase II.*—The set output of a flip-flop FIA, FIG. 40, is gated to set a flip-flop FIR in anticipation of the first t-pulse $t_{18}$ of phase II. The FIR flip-flop will remain set for 30 CPC times (the duration of phase II) and its output is gated directly (or directly via other FIRX flip-flops, for example, flip-flops FIRS to FIRH of FIG. 40) to all of the elements that are operative during Phase II. During this phase, the contents of the Exchange Register of FIGS. 11 and 37 will be transferred serially into the instruction processing unit of FIGS. 32 and 33. This is accomplished by using the flip-flop FIR as the shift control for the Exchange Register and the control which opens a gate G80, FIG. 11, allowing the contents of the exchange register to pass onto the Instruction Bus.

The instruction register of FIGS. 10, 32 and 33 is divided into four parts. These are (1) the OC Register which receives the 6-bit operation code over conductors 246 and 247 from the exchange register of FIG. 37; (2) the Control Bit Register C which receives three control bits C; (3) the $a$ Register, FIGS. 10 and 33, which receives the 9-bit program store addresses; and (4) the $b$ Register, FIGS. 10, 32 and 39, which receives the last 12 bits of the instruction. The decomposition of the instruction into four parts and the insertion of these four parts into the proper registers is accomplished by means of the four flip-flops FIRO, FIRS, FIRA and FIRH, respectively, of FIG. 40. The flip-flop FIRO is set for the same time as FIR. It remains set for 6 CPC times, i.e., until $t_{23}$. This is the time required to shift the 6 low-order bits of the exchange register into the OC (operation code) register. The output of FIRO, over conductor 249, is used directly as the shift control for the OC register (seen in detail in FIG. 41) and opens a gate G1, FIGS. 10 and 41, from $t_{18}$–$t_{23}$, allowing the first 6 bits which appear on the bus between the exchange register and the instruction register to pass into register OC. Immediately after the 6th bit has been inserted into the register, flip-flop FIRO of FIG. 40 is reset and gate G1, FIGS. 10 and 41, is closed, so that the contents of the OC register are undisturbed for the remaining part of Phase II.

Flip-flop FIRS, FIG. 40, is set by $t_{23}$ and remains set for three CPC pulse times. The output from the flip-flop, over conductor 252, is used as the shift and insert control for gate G2 of FIG. 10 and the control bit register C of FIG. 32, so that the three bits of C (control) in an instruction are inserted into the control bit register during this period. FIRS is reset and the gate G2 closed by $t_{26}$ so that the contents of the control bit register are undisturbed for the remainder of Phase II.

Flip-flop FIRA, FIG. 40, is set by $t_{26}$ in anticipation of the first bit in $a$ which will appear on the bus as the first CPC pulse after $t_{26}$. The flip-flop opens gate G19 of FIG. 10 allowing the 9 bits of $a$ to pass through the instruction processing unit adder, FIG. 42. The signal from flip-flop FIRA over conductor 254 is also used as a shift and insert control for the $a$ register, FIGS. 10 and 33, so that the output of the adder over conductors 256 and 257 is inserted into the $a$ register via gate G12, FIG. 10. If $i_6$ in the control bit register is "1" so that $a$ is relative to the base counter, FIGS. 10 and 33, the number in the base counter is gated to the adder via gate G18 and added to $a$; the output of the adder is then $a$ plus $bC$ and the $a$ register receives the true address of the operand in core store. The shift and recirculation control for the base counter in this operation is also FIRA so that the contents of the base counter and $a$ are properly in phase at the instruction process unit adder input gates. The gate G13 of FIG. 10 is also open during this operation so that the contents of the base counter are replaced.

If $i_6$ equals "0," the second input to the adder receives a string of 0's. The adder output is then $a$ plus 0 and the unmodified $a$ is inserted into the $a$ register via gate G12. FIRA of FIG. 40 is reset by pulse $t_5$ of the second minor cycle in Phase II. FIRH is set by $t_5$ and FIR in anticipation of the first bit in the $b$ part of an instruction. The output of FIRH, over conductor 262, opens gate G3, FIG. 10, and shifts the contents of the exchange register serially into the $b$ register of FIGS. 10 and 32. Flip-flops FIR and FIRH are both reset and gate G3 is closed by $t_{15}$, the last t-pulse in Phase II.

At the completion of Phase II, the contents of the exchange register have been transferred serially into the instruction register so that the operation code of the instruction is stored in the OC register, the three control digits C are in the control bit register; $a$ or $a$ plus (BC)

is in the $a$ register; and $b$ is in the $b$ register. Also, since shifting of the exchange register has been circular, the contents of the exchange register at the end of Phase II are equal to its contents at the beginning of Phase II.

*Bracket Instructions*

*Add (AD-octal code 00).*—In Phase III, FOA of FIG. 40 is set at $t_{17}$ of Phase II in anticipation of the first CPC pulse of Phase III. If the $a$ register contains the address of a bin in core store (i.e., its contents lie in the range 000–757), the contents of the $a$ register are transferred in parallel to the core store selection matrix seen in FIG. 31. A read pulse is generated at $t_{20}$ and the contents of the selected bin in core store are transferred in parallel to the exchange register, FIG. 37. (The transfer data will not be regenerated in the selected core bin until the end of Phase IV.)

If the $a$ register contains the address of a special register (i.e., a sum in the range 760–773) the control is set so that the contents of a special register are available during Phase IV instead of the contents of the exchange register. At the end of Phase III the low-order digit of the operand will be available at $t_0$ of Phase IV. Phase III lasts eleven CPC pulse times, i.e., from $t_{18}$ through $t_{29}$.

*Phase IV operations.*—Flip-flop FOR of FIG. 40 is set at $t_{29}$ of Phase III in anticipation of the first $t$-pulse of Phase IV. Also, the shift controls SDA and SXR, FIG. 36, for the lower data accumulator, FIGS. 10 and 44, and the exchange register, FIGS. 11 and 37 (or one of the special registers) are set at $t_{29}$. For the remainder of this description, all discussion will be referred to the operation of the exchange register of FIG. 37, although it will be understood that similar remarks apply to the operation of the special registers unless otherwise noted.

Gates G4–G9, FIG. 10, are opened at $t_0$ and the contents of the $b$ register of FIG. 39 are transferred in parallel into the bracket counter, FIGS. 10 and 43, at $t_0$ of Phase IV. Gates G80, G26 and G30, FIG. 11, are opened. The contents of both the lower data accumulator of FIG. 44 and the exchange register are shifted circularly to the right at the CPC pulse rate. Also, the contents of the bracket counter are decreased by one each CPC pulse time. When the contents of the bracket counter equal "0," the bracket control flip-flop BFF, FIG. 32, is set. The output of BFF opens the arithmetic unit input gates G25 and G26a, FIGS. 11 and 49, so that the contents of both the exchange register and the lower data accumulator appear as arithmetic unit inputs. At the same time gates G4–G9 are opened; the contents of the $b2$ register of FIG. 37 are transferred in parallel into the bracket counter; and the counting down of $b2$ begins. Also, gate G31 is closed and gate G30 is opened, FIG. 11, inhibiting recirculation of the lower data accumulator and allowing the output of the arithmetic unit (the sum of the two inputs) to pass into the high-order end of the lower data accumulator. Gate G26 is not closed, however, so that recirculation of the exchange register is continued.

With each CPC pulse the contents of the Bracket Counter are decreased by one. When the contents of the bracket counter equal "1" (i.e., after the operations have proceeded for $b_2$ CPC times) the BFF flip-flop is reset. This, in turn, closes gates G30, G25, and G26a and re-opens G-31, FIG. 11, so that recirculation of the contents of the lower data accumulator is resumed and addition is inhibited. Gates G26, G31 and G30 are closed and the shift controls SDA and SXR for the accumulator and the exchange register are reset at $t_{29}$. The results of these operations are: (1) the contents of the exchange register at $t_0$ of the second minor cycle in Phase IV are the same as they were at $t_0$ of the second minor cycle in Phase IV. (2) The contents of cells $b_1 - 1 \ldots 0$ and $$30 \ldots b_1 + b_2$$

of the lower data accumulator are also unchanged. (3) Cells $b_2 + b_1 - 1 \ldots b_1$ of the accumulator contain the sum (MOD $2^{b_2}$) of the original contents of these cells and the contents of the corresponding cells of the exchange register.

At $t_{29}$ of Phase IV, FORE of FIG 40 is set and gates G10 and G16 are opened. The contents of the instruction counter are then shifted serially beginning with $t_0$ through the Adder where "1" is added. The sum passes through gate G10 and back into the instruction counter. This operation takes 9 CPC pulse times and is completed at $t_8$.

A write pulse is generated at $t_4$ of this minor cycle and the contents of the exchange register are copied into the bin (whose address is still contained in the $a$ register) in core store. This operation regenerates the information that was transferred to the exchange register during Phase III.

At the end of Phase IV, the instruction counter contains the address of the bin containing the next instruction to be processed; the lower data accumulator contains the sum of the bracketed contents of the exchange register and the original contents of the accumulator; and the information destroyed in core store during Phase III has been restored. At $t_8$ of Phase IV, FIA of FIG. 40 is set in anticipation of the first $t$-pulse of Phase I, and at $t_9$, Phase I and a new instruction cycle is begun.

*Subtract (SU-octal code 02).*—Phase III Operations are the same as for the addition above described. Phase IV Operations are the same as for the addition operations except that there is a "one" level only on the Operation Line SU of FIG. 48 so that the MOD $2^{b_2}$ difference (lower data accumulator minus exchange register) is generated by the arithmetic unit, FIG. 49, instead of the sum (lower data accumulator plus exchange register) and inserted into the lower data accumulator.

*Logical sum (OR-octal code 04).*—The logical sum of two binary digits $x$, $y$, is defined by the table

| $y$ \ $x$ | 0 | 1 |
|---|---|---|
| 0 | 0 | 1 |
| 1 | 1 | 1 |

For example, the logical sum of the two binary numbers 0111 and 0101 is 0111. During Phase III the operations are the same as in addition. During phase IV the operations are the same as in addition except that a level "one" appears on the Operation Line (OR) which is not shown separately but is included in the 32 Operation Lines of FIG. 48, and the arithmetic unit generates the logical sum instead of the arithmetic sum.

*Logical product (AN-octal code 06).*—The logical product of two binary digits $x$, $y$ is defined as

| $y$ \ $x$ | 0 | 1 |
|---|---|---|
| 0 | 0 | 0 |
| 1 | 0 | 1 |

For example, the logical product of two binary numbers 0111 and 0101 is 0101. Phase III operations are the same as for addition. Phase IV operations are the same as for addition except that the logical product Operation Line (AN) is activated so that the arithmetic unit output is the logical product instead of the arithmetic sum; this Operation Line (AN) is not shown separately but is included in the 32 Operation Lines of FIG. 48.

*Load Lower Accumulator (LL-octal code 10).*—Phase III and Phase IV operations required by this instruction are essentially the same as for add, subtract, logical sum and logical product, except that the information passes through gate G29 and proceeds directly to the high-order end of the lower data accumulator instead of through the arithmetic unit and into the lower data accumulator via gate G18. The recirculation path of the lower data accumulator is closed during the insertion of the new data.

*Store Lower Accumulator (SL-octal code 12).*—Phase III operations are the same as for the preceding instructions. During Phase IV, when the flip-flop BFF of FIG.

32 is set, (i.e., when $b_1$ has been counted down to zero) control gate G28, FIG. 11, is opened and the exchange register recirculation gate G26 is closed so that the output from the lower data accumulator is allowed to pass into the exchange register until BFF is reset (i.e., when $b_2$ has been counted down to "1"). Recirculation of the lower data accumulator is not inhibited during this operation so that the contents of the lower data accumulator are unaltered. The contents of the exchange register are copied into the selected bin in core store at $t_4$ of FORE of FIG. 40. Remaining parts of the instruction cycle are as before.

*Load address accumulator (LA-octal code 14).*—The load address operation is the same as the load lower accumulator operation except that the input gate G35 to the address accumulator register is opened and information is allowed to pass into the address accumulator, FIG. 46, instead of into the lower data accumulator. Shift control is supplied by the address accumulator register shift flip-flop. Shifting begins with $t_{18}$ and continues until $t_{29}$. For the loading operation to work properly, it is necessary that $b_1$ is equal to or greater than 12 in the load instruction. The Operation Line (LA) embodied in the 32 Operation Lines is the only one open during this operation.

To avoid further detailed description in regard to which of the 32 operation lines shown in the decoder of FIG. 48 is energized for the hereinafter described operations, it will be noted that each instruction is uniquely identified by a 5-bit binary number stored in the OC register of FIG. 32. (The 6th position $i_0$ allows each instruction to be considered as two octal numbers.) In the event that 64 instructions should be desired, the $i_0$ position can be used. It will be noted on FIG. 32 that both sides of each flip-flop embodied in the OC register, with the exception of the $i_0$ position, extend through cable 264 to the operation decoder of FIG. 48. The four combinations of stages 1 and 2 are decoded in the four gates whose outputs are identified as $B_0$, $B_2$, $B_4$ and $B_6$. The 8 combinations represented by flip-flops IR3, IR4 and IR5, which comprise the 3rd, 4th and 5th stages of the OC register, are decoded by the eight gates whose outputs are labeled $A_0$ through $A_7$. The outputs of these two groups of gates are then gated two by two, giving a total of 32 outputs, or operation lines, corresponding to the binary numbers 0 to 76 octal, of which only even numbers are decoded; the $i_0$ stage of the OC register is used to halt the Message Processor at the completion of the instruction containing a "1" in the $IR_0$ stage of the OC Register. Only one of these 32 outputs is energized during the processing of a particular instruction. The numbers identified with each operation line correspond to the octal code representing the OC part of the instructions (FIG. 12) and which are stored in the OC Register of FIG. 32. The letters AD, SU, etc., identify the particular operation lines and for convenience are the abbreviations used to identify the various instructions.

*Store address accumulator (SA–octal code 16).*—This operation is the same as the store lower accumulator operation except that the address accumulator register is stored instead of the lower data accumulator by opening gate G83 of FIG. 11 instead of gate G81 and allowing the contents of the address accumulator register to pass through gate G28. Also, as in the load address accumulator operation, $b_1$ is equal to or greater than 12 since the shift control flip-flop is not set until $t_{18}$. The Operation Line (SA) is the only one open.

*Clear (CL-octal code 20).*—The clear operation is like a store operation with the following exception: In Phase IV, during the shifting of the exchange register, recirculation gate G26 is inhibited for $b_2$ pulse times beginning with $t_{b_1}$, but nothing is entered during this period so that the contents of the selected cells are erased, i.e., replaced by zeros.

*Prime (PR-octal code 22).*—Prime operation is like the clear operation except that 1's are inserted while the contents of the selected register are being shifted. This is accomplished by gating the output from the prime (PR) Control Line into the high-order part of the selected register for $b_2$ pulse times beginning with $t_{b_1}$, and inhibiting gate G26.

*Compare equality (CE-octal code 24).*—Phase III operations are the same as all preceding bracket instructions. In Phase IV operations, beginning with $t_0$, control gates G26, G31, FIG. 11, and G10, FIG. 10, are opened and the shift control set. The contents of the exchange register and lower data accumulator are circularly shifted for 30 CPC times; i.e., until $t_0$ of the next minor cycle. When the bracket control flip-flop BFF is set, G25 and G26a are opened and the $b_2$ bits of the lower data accumulator and exchange register are shifted through the arithmetic unit and compared bit by bit. If all of the $b_2$ bits of the lower data accumulator agree with their corresponding bits in the exchange register, the favorable comparison flip-flop FCDA is set. At $t_0$ of the second minor cycle in Phase IV, gates G10 and G16 of FIG. 10 are opened and the contents of the instruction counter pass through the Adder. $t_1$ is added to the contents of the insruction counter instead of $t_0$ (as is normally the case) which advances the number in the instruction counter by 2 instead of by 1.

If the bracketed portions of the exchange register and lower data accumulator are not equal, FCDA is not set, so that $t_0$ instead of $t_1$ is added to the instruction counter. The remaining operations of this Phase are the same as for addition.

*Compare threshold (CT-octal code 26).*—Phase III and Phase IV operations are as Equality Comparison except that FCDA is set only if the bracketed contents of the lower data accumulator are equal to, or greater than, the contents of the corresponding cells of the exchange register.

Positioning Instructions

*Shift (SH-octal code 30).*—At $t_{29}$ of Phase III the contents of the $b_1$ register are transferred in parallel into the bracket counter; the shift control flip-flop SDA for the lower data accumulator and the upper data accumulator is set; gates G33 and G31a are opened and flip-flop FOR is set. At $t_0$ of Phase IV, the contents of the lower data accumulator are shifted serially through G33 into the upper data accumulator. At the same time, the contents of the upper data accumulator are shifted serially through gate G31a into the lower data accumulator. With each CPC pulse, beginning at $t_0$, the contents of the bracket counter are decreased by 1. When the contents of the bracket counter equal "0" the shift control flip-flop SDA for the lower data accumulator and the upper data accumulator is reset and gates G31a and G33 are closed. If $b_1$ is equal to or less than 30, the shifting operation will require one minor cycle; if $b_1$ is greater than 30 and equal to or less than 60, the shifting operation will require two minor cycles. At $t_0$ after the completion of the shift, 1 is added to the contents of the instruction counter and Phase I of the next operation cycle is initiated at $t_9$ as usual.

*Accumulate bits (AB-octal code 76).*—The only difference between this operation and the shift operation above described occurs in the FOR part of Phase IV. The DA REG FF of FIG. 36 is set for the entire duration of FOR. Hence the lower data accumulator is right circular shifted 30 calls and hence left unchanged. The output AB of the Operation Lines of the Operation Decoder of FIG. 48 is included among the bracket and table maintenance operation codes as applied to gate 287, FIG. 32, and hence activating the bracket control circuitry. During the FOR part of the instructions, the "1" bit contents of the lower data accumulator are counted, Modulo 32, in the Bit Accumulator Register Counter of FIG. 46-A. The count control of the latter Counter is derived from gate 460, the inputs of which are seen to be the output of $LDR_1$ of the lower data accumulator and the control signals $BFF_1$ (Bracket FF), the operation line AB, and the shift data Accumulator (SDA), FIG. 36. The details of the Register Counter of FIG. 46–A are seen in the Address Accumulator Register Counter of FIG. 46, except that only five stages are employed instead of twelve stages. Stage 4 of the Bit Accumulator Register corresponds to Stage 11 of the Address Accumulator Register and the "0" stages correspond.

*Normalize (NR–octal code 32).*—This operation is similar to the shift operation. At $t_{29}$ of Phase III shift control flip-flop SDA for the upper data accumulator and the lower data accumulator is set and the gates G31a and G33 are opened. At $t_0$ of Phase IV, the contents of the upper data accumulator and lower data accumulator are shifted through gates G31a and G33 respectively. The low-order cell of the lower data accumulator is sampled after each shift. If it equals "0," the shifting continues. If it equals "1," the shift control SDA is reset, shifting stops, and G31a and G33 are closed. The shifting operation continues until either a "1" appears in the low-order cell of the lower data accumulator or the contents of the data accumulator have been shifted 60 places with no "1" appearing in the low-order cell of the lower data accumulator. The contents of the address accumulator register are advanced by 1 with each CPC pulse during the shifting so that at the end of the operation the address accumulator register contains the number of places the contents of the data accumulator were shifted. This is so if the original contents were "0." If they were not "0," the count registered will be equal to the arithmetic sum of the original contents and the number of places shifted.

At the first $t_0$ pulse after the completion of the shifting operation, the contents of the instruction counter are inserted into the instruction processing unit adder through gate G16. If there is "1" in the low-order cell of the lower data accumulator, FCDA is set and 2 is added to the contents of the instruction counter. If there is a zero in the low-order cell of the lower data accumulator, FCDA is not set and 1 is added to the contents of the instruction counter. Phase I of the next operation cycle starts at $t_9$.

*Character search (CS–octal code 34).*—The $b_1$ register contains the 5-bit key. At $t_{29}$ of Phase III, gates G31a and G33 are opened; the shift control flip-flop SDA for the lower data accumulator and upper data accumulator is set; the shift control flip-flop for the low-order 5 bits of the $b_1$ register is set; and gates G24, G25a and G26a are opened. G24 is the gate which allows the recirculation of the low-order 5 bits of $b_1$. G25a and G26a are the gates which allow the contents of the lower data accumulator and the 5-bit key to pass into the comparator circuit seen in the upper portion of FIG. 53. The five bits of $b_1$ are compared serially against each group of 5 bits shifted out of the lower data accumulator LDA. When the 5 bits of $b_1$ agree with the last group of 5 bits shifted out of the lower data accumulator, the shift control flip-flops are reset and the shifting action stops. The 5 bits in the five high-order cells of the upper data accumulator equal the low order 5 bits of $b_1$. Also, beginning with $t_0$, the contents of the address accumulator register are advanced with each CPC pulse so that at the end of the operation the contents of the register have been increased by the number of bit-positions the contents of the upper data accumulator and lower data accumulator have been shifted.

If the search is successful, flip-flop FCDA of FIG. 53 is set and 2 is added to the contents of the instruction counter. If the search is unsuccessful, the flip-flop is not set and 1 is added to the contents of the instruction counter. The operation lasts one or two minor cycles according as the search was completed in less than or more than 30 CPC times.

*Move tape forward (TF–octal code 40).*—In Phase III operations, flip-flops FOA and FOAM, FIG. 40, are set at $t_{17}$ of Phase II in anticipation of the first $t$-pulse of Phase III. At $t_{18}$ the contents of the $a$ register are used to select the tape transport. The N portion of the instruction, FIG. 29(b), (the contents of the $b$ register) is transferred to the tape control register. The remaining tape operations are under control of the tape control equipment. Flip-flop FORE is set at the first $t_0$ pulse of Phase IV and 1 is added to the contents of the instruction counter.

*Move tape back (TB–octal code 42).*—Phases III and IV operations in the instruction processing unit are the same as above. The differences occur in the tape control equipment.

Transfer Instructions

*Tape word in (TI–octal code 44).*—During Phase III, the contents of the $a$ register are used to select the tape transport. The transfer control flip-flop in the Tape Control Unit is set, and when the tape has accelerated to normal playback speed, 2400 bits are transferred from the selected tape to the tape transfer track on the drum. Since control of the transfer process is localized in the tape control unit, instruction processing unit operations are completed at the end of Phase III. Flip-flop FORE, FIG. 40, is set at $t_{29}$ of Phase III which causes an output to appear on SIC, FIG. 36, and opens gates G10 and G16, FIG. 10. The number in the instruction counter, FIG. 33, passes through gate G16 into the instruction processing unit adder where 1 is added to it. The sum is inserted into the instruction counter via gate G10. FORE is reset and Phase I of the next instruction cycle is initiated at $t_9$, etc.

*Tape word out (TO–octal code 46).*—Phase III and Phase IV operations involving the instruction processing unit are the same as above. The differences occur in the tape control unit.

*Transfer one L-word in (LI–octal code 50).*—In Phase III flip-flops FOA and FOAM are set by $t_{17}$ and FIR of Phase II. At $t_{18}$ (the first $t$-pulse of Phase III), the high-order 9 bits in the $b$ register are gated to the track and special register address decoder, FIG. 55. The low-order 3 bits in in the $b$ register are gated to the Octant Comparator, FIG. 47. FOAM is reset at $t_{29}$ of Phase III. FOA will remain set until the desired drum bin is accessible. The octant comparator compares, in parallel, the contents of the L-word counter against the 3 low-order digits of the $b$ register. If they agree, output from the octant comparator conjoined with the next L-word sync pulse, resets FOA and initiates Phase IV. If they do not agree, Phase III is extended another minor cycle and the comparison is repeated. The minimum duration of Phase III is 12 CPC pulse times; maximum duration is 79 minor cycles (plus the 12 CPC pulse times).

*Phase IV.*—Flip-flop FOR is set at the same time that FOA is reset and will remain set for 10 minor cycles (300 CPC times). The output from FOR and Operation Line LI open the read gate G90 and the lower data accumulator input gate G29, FIG. 11, and sets SDA, FIG. 36.

At $t_0$ the contents of the lower data accumulator are shifted one position to the right, and the first bit of information from the drum passes through gate G90 onto the Information Bus, through G29 into the high-order cell of the lower data accumulator. At $t_1$ the contents of the accumulator are shifted right one digit position and the second bit of drum information passes through G29 into the high-order cell of the accumulator. The process continues until 30 bits of drum information have been accumulated in the lower data accumulator (i.e., until $t_{29}$). At $t_{23}$ contents from the selected core bin are copied into the exchange register so that the bin is prepared to receive the transferred data. At $t_0$ of the second minor cycle in Phase IV, the contents of the lower data accumulator are transferred in parallel through gates G50–G79, FIG. 11, into the exchange register. At the same time the first bit of the second group of 30 bits from the drum is entered into the high-order cell of the accumulator.

The address of the first core storage bin to receive the transferred data is contained in the $a$ register. At $t_4$ of the second minor cycle in Phase IV, a write pulse is gated to core store and the contents of the exchange register are transferred in parallel into the selected core storage bin. At $t_9$ gates G12 and G17 are opened, conductor SaR, FIG. 36, is energized, and the address in the $a$ register is shifted through the adder (where 1 is added) and back into the $a$ register. The addition is completed at $t_{18}$ at which time the $a$ register contains the address of the bin in which the next group of 30 bits received from the drum will be stored.

By $t_{18}$, 19 bits will have been accumulated in the lower data accumulator. The accumulation continues until $t_{29}$.

At $t_0$ of the third minor cycle in Phase IV, the contents of the accumulator are again transferred in parallel into the exchange register. At $t_4$ the contents of the exchange register are transferred into core store; and 1 is again added to the address in the $a$ register.

The process continues in this fashion until $t_{29}$ of the 10th minor cycle of Phase IV at which time the 300 bits received from the drum will have been divided into 10 groups of 30 bits each. 9 groups of 30 bits will have been stored, in order, in 9 consecutive bins in core store. At $t_{29}$ of the 10th minor cycle FOR is reset; the transfer gates G90 and G29 of FIG. 11 are closed; and FORE of FIG. 40 is set. Gates G10 and G16 of FIG. 10 are now opened and "1" is added to the number in the instruction counter. At $t_0$ the last group is transferred from the lower data accumulator into the exchange register and at $t_4$ it is copied into core store. At $t_8$ of the 11th minor cycle in Phase IV, FORE is reset; FIA of FIG. 40 is set in anticipation of the first $t$-pulse in Phase I of the next instruction cycle; and the L-word transfer instruction is complete.

*Transfer one L-word out (LO-octal code 52).*—During Phase III, flip-flops FOA and FOAM of FIG. 40 are set by the conjunction of $t_{17}$ and FIR during Phase II. (FOAM is reset at $t_{29}$ but FOA remains set for the duration of Phase III.) At $t_{18}$ (the first $t$-pulse of Phase III), the 9 high-order bits in the $b$ register are gated to the track selection matrix. At $t_{25}$ the contents of the core storage bin, whose address is contained in the $a$ register, are transferred in parallel into the exchange register in preparation for the transfer to the drum. At $t_{29}$ the contents of the exchange register are copied in parallel via gates G50–G79 of FIG. 11 into the lower data accumulator.

The low-order 3 bits of the $b$ register are gated to the octant comparator, FIG. 47, where they are compared against the number in the L-word sync counter. When these two numbers agree, the output flip-flop from the octant comparator, in conjunction with the next L-word sync pulse, sets FOR and SDA, resets FOA, and opens gates G48 and G81, thus initiating Phase IV. The minimum length of Phase III is 12 CPC times; the maximum length is 79 minor cycles (plus 12 CPC times).

In phase IV, at $t_0$ the first bit of data to be transferred is shifted out of the lower data accumulator via G81 on the information bus, passes through G48, and is recorded on the drum. At $t_1$ the second bit is shifted onto the information bus, through G48, and recorded on the drum. Recording continues with each CPC pulse. At $t_4$ (while the accumulator is still being shifted) the contents of the exchange register are recopied in the bin in core store where they originated so that the transfer operation does not destroy the transferred data in core store. At $t_8$, gates G12 and G17 are opened, and a signal appears on SaR, FIG. 36. At $t_9$ the number in the $a$ register is shifted through G17 into the instruction processing unit adder, where it is increased by "1," and reinserted into the $a$ register via G12. This operation takes 9 CPC times.

G12 and G17 are closed and the signal is removed from SaR at $t_{17}$.

At $t_{23}$ the next 30 bit group to be transferred to the drum (i.e., the information stored in the core storage bin with address $a+1$) is transferred in parallel into the exchange register.

At $t_{29}$, 30 bits (originally stored in the bin whose address is $a$) have been recorded in the first 30 cells of the drum bin whose address is stored in the $b$ register. The next thirty bit group is copied into lower data accumulator in preparation for transfer; and at $t_0$ of the second minor cycle of Phase IV, the first bit of the second 30-bit group is shifted onto the information bus, passes through G43, and is recorded on the drum.

The sequence of operations is repeated ten times until the 300 bits stored in bins $a$, $a+1$ ..., $a+9$ of core store have been copied in the drum bin whose address is stored in the $b$ register. At $t_{29}$ of the 10th minor cycle of Phase IV, FOR is reset; gates G48 and G81 are closed; FORE and SIC are set; and gates G10 and G16 are opened. At $t_0$ of the 11th minor cycle of Phase IV, the number in the instruction counter is shifted through the instruction processing unit adder where 1 is added and the sum is reinserted into the counter. The addition is completed by $t_8$; FORE is reset; and FIR is set, initiating the Phase I of the next instruction cycle.

*Control word in (CI-octal code 54).*—In Phase III the flip-flops FOA and FOAM, FIG. 40, are set by $t_{17}$ and FIR. At $t_{18}$ the 9 high-order bits of the $b$-register are gated to the track selection matrix. At $t_{29}$, FOAM is reset; FOA will remain set until the desired drum bin is accessible.

The Octant Comparator, FIG. 47, compares (in parallel) the contents of the L-word sync counter against the three low-order digits of the $b$ register. When they agree, the output from the octant comparator conjoined with the L-word sync pulse and $t_{29}$ resets FOA and Phase III is complete. Minimum length of Phase III is 12 CPC times; maximum length is 79 minor cycles (plus 12 CPC times).

In Phase IV, FOR and SDA are set and gates G29 and G90 are opened at the last $t_{29}$ pulse of Phase III. At $t_0$ of Phase IV the first bit of the 19 bit-control word passes through G90 onto the information bus, through G29 into the high-order cell of the lower data accumulator. At $t_1$, the contents of the lower data accumulator are shifted one place to the right, and the second bit of the control word is inserted into the high-order cell of the lower data accumulator.

This process continues until $t_{18}$ at which time the high-order 19 cells of the lower data accumulator contain the 19-bit control word. G20 and G29 are now closed so that no more information is received from the drum. The recirculation path through G31 is opened. SDA is not reset until $t_{29}$ so that the control word is shifted until it occupies the 19 low-order cells of the lower data accumulator. FORE is set at $t_{29}$ and "1" is added to the number in the instruction counter. Phase I of the next instruction cycle is initiated at $t_9$, etc.

*Control word out (CO-octal code 56).*—In Phase III FOA and FOAM are set by the conjunction of $t_{17}$ and FIR of Phase II. FOAM will be reset by $t_{29}$, but FOA will remain set for the duration of Phase III. At $t_{18}$, the high-order 9 bits in the $b$ register are gated to the track selection matrix and the contents of the low-order 3 cells of the $b$ register are compared (in parallel) against the contents of the L-word sync counter. If they agree, the output flip-flop of the octant comparator of FIG. 47, in conjunction with the next L-word sync, sets FOR and SDA, resets FOA, and opens G48, G81, and G31. Phase III is then complete. If the low-order three bits in the $b$-register do not equal the contents of the L-word sync counter, Phase III is extended another minor cycle. This is accomplished by leaving FOA, FIG. 40, set and not setting FOR. Minimum duration of Phase III is 12

CPC times; maximum duration is 79 minor cycles (plus 12 CPC times).

In Phase IV, at $t_0$ the lower data accumulator is shifted right so that the first bit of the control word passes through G81 and onto the information bus, through G48, and is recorded on the drum in the first cell of the selected drum bin. At $t_2$ the lower data accumulator is shifted right one digit position; the second bit of the control word passes through G81 onto the information bus, through gate G48 and is recorded in the second cell of the selected drum bin.

This process is continued until $t_{18}$, at which time the 19 bits originally stored in the 19 low-order cells of the lower data accumulator have been recorded, in order, in the 19 low-order cells of the selected drum bin. Gates G81 and G48 are closed at $t_{19}$. SDA is not reset and G31 is not closed until $t_{29}$, however, so that the control word is replaced in its original position in the lower data accumulator. FOR is reset and FORE is set at $t_{29}$ initiating the last operation of Phase IV. "1" is now added to the number in the instruction counter and Phase IV operations are completed at $t_8$ with the resetting of FORE.

Table Maintenance Instructions

*Search single precision (SS-octal code 60).*—At the beginning of Phase III, the lower data accumulator contains the search key; the $a$ register contains the address of the track to be searched; and the $b$ register contains the two bracket numbers which specify the location of the key in the accumulator. Flip-flops FOA and FOAM are set by the conjunction of FIR and $t_{17}$ of Phase II, initiating Phase III. The contents of the $a$ register are gated, in parallel, to the track selection matrix. At $t_{29}$, FOAM is reset and the output of the read amplifier associated with the L-word sync track is sampled. If an L-word sync pulse occurs at this time, FOA is reset; FOR and SDA are set; gates G90, G25, G26a and G29 are opened; $b_1$ is transferred in parallel into the bracket counter; and the timer is set. If, on the other hand, an L-word sync pulse is not available at this time, Phase III is extended for another minor cycle. Minimum duration of Phase III is 12 CPC times; maximum duration is 9 minor cycles (plus 12 CPC times).

At $t_0$ of Phase IV, the contents of the lower data accumulator are shifted right one digit position; the first bit from the drum passes through G90, onto the information bus, through G29 and into the high-order cell of the accumulator; and the contents of the bracket counter are decreased by "1." When the contents of the bracket counter equal "0," G29 is closed so that information from the drum will not be inserted into the accumulator; G31 is opened to allow the key to recirculate; G26a is opened allowing the key to pass into the arithmetic unit; the comparison control flip-flop is set so that the contents of the key will be compared, bit by bit, against the drum output; and $b_2$ is transferred in parallel into the bracket counter. The comparison and recirculation of the key will continue for $b_2$ CPC times; i.e., until the contents of the bracket counter have been counted down to "1." Gate G31 is now closed to inhibit recirculation of the lower data accumulator; G29 is opened allowing the drum output to pass again into the accumulator; and the comparison control flip-flop is reset. The shifting of the accumulator and the entering of information from the drum will continue until $t_{29}$.

At $t_{29}$ the favorable comparison of the FCDA flip-flop in the arithmetic unit is sampled. If it is set, indicating that there was agreement between the key in the lower data accumulator and the key read from the drum, FOR is reset; FORE is set; and gates G25, G26a, G90 and G29 are closed. If at $t_{29}$ FCDA is not set, indicating that the desired information was not found, $b_1$ is again copied in parallel from the $b$ register into the bracket counter, and the process described above is repeated for another minor cycle.

The search will continue until either the desired information has been found and read into the lower data accumulator or until 5 milliseconds have elapsed, as signalled from the timer which was set at the beginning of Phase IV. If FCDA, FIG. 53, is set at $t_0$ of FORE of FIG. 40, $t_1$ is gated to the instruction processing unit adder so that 2 is added to the number in the instruction counter. If the timer is reset, $t_0$ is gated to the IPU adder so that "1" is added to the number in the instruction counter. FORE is reset at $t_8$ and FIA is set at $t_8$ in anticipation of the first CPC pulse in Phase I of the next instruction cycle.

The results of the operation are: If the search was satisfied, the lower data accumulator (LDA) cells 29 ... $LDA(b_1+b_2)$ and $LDA(b_1-1)$ ... $LDA(0)$ will contain information read from the drum. Cells $LDA(b_1+b_2-1)$ ... $LDA(b_1)$ will contain the original key that was stored in the lower data accumulator at the beginning of Phase III. The instruction counter will have been advanced by 2. If the search was not satisfied, cells $LDA(b_1+b_2-1)$ ... $LDA(b_1)$ will contain the original key; cells LDA 30 ... $LDA(b_1+b_2)$ and $LDA(b_1-1)$ ... $LDA(0)$ will contain the last information read from the drum, and the instruction counter will have been advanced by "1." Minimum duration of Phase IV is 1.3 minor cycles, maximum duration is 5 milliseconds.

*Search double precision (SD-octal code 62).*—At the beginning of Phase III, the data accumulator contains the search key; the $a$ register contains the address of the track to be searched; and the $b$ register contains the two bracket numbers which specify the location of the key in the accumulator. FOA and FOAM are set by the conjunction of FIR and $t_{17}$, thus initiating Phase III. The contents of the $a$ register are gated, in parallel, to the track selection matrix. At $t_{29}$ FOAM is reset and the output of the Read Amplifier associated with the L-word sync track is sampled. If an L-word sync pulse occurs at this time, FOA is reset; FOR and SDA are set; gates G90, G31a and G25 are opened, $b_1$ is copied, in parallel, into the bracket counter; and the Search Timer is set. If an L-word sync pulse is not available at this time, Phase III is extended for another minor cycle. Minimum duration of Phase III is 12 CPC times; maximum duration is 9 minor cycles (plus 12 CPC times).

At $t_0$ of Phase IV, the contents of the data accumulator are shifted right one digit position; the first bit from the drum passes through G90, onto the information bus, through G33a and into the high-order cell of the upper data accumulator; and the contents of the bracket counter are decreased by "1." When the contents of the bracket counter equal "0," G33a is closed so that information from the drum will not be inserted into the upper data accumulator; G33 is opened allowing recirculation of the key; G25 and G26a are opened, allowing the key from the data accumulator and from the drum to pass into the arithmetic unit; the comparison control flip-flop is set so that the contents of the key will be compared, bit by bit, against the drum output; and $b_2$ is transferred in parallel into the bracket counter.

The recirculation of the key will continue for $b_2$ CPC times; i.e., until the contents of the bracket counter have been counted down to "1." G33 is now closed to inhibit recirculation of the data accumulator; G33a is opened allowing the drum output to pass in the upper data accumulator, and the comparison control flip-flop, seen in the upper portion of FIG. 53, is reset. The shifting of the data accumulator and the entering of information from the drum will continue until $t_{29}$ of the second minor cycle after the beginning of Phase IV. At this time, FCDA in the arithmetic unit is sampled. If it is set, indicating that there was agreement between the key in the data accumulator and the key read from the drum, FOR is reset, FORE is set, and G31a, G33a, and G90 are closed. If FCDA is not set, indicating that the desired information was not found, $b_1$ is again copied into the bracket counter, and the search is continued for two more minor cycles.

The process will be terminated when either the search has been satisfied and the desired information read into the data accumulator or until 5 milliseconds have elapsed, as signalled from the timer which was set at the beginning of Phase IV. If FCDA is set at $t_0$ of FORE, $t_1$ is gated into the instruction processing unit adder so that the instruction counter is advanced by 2. If the timer is reset, $t_0$ is gated to the adder so that the instruction counter is advanced by 1. FORE is reset and FIA is set at $t_8$ completing Phase IV.

The results of the operation are: If the search was satisfied, data accumlator (DA) cells 59 ... $DA(b_1+b_2)$ and $DA(b_1-1)$ ... $DA(0)$ will contain information read from the drum; cells $DA(b_1+b_2-1)$ ... $DA(b_1)$ will contain the original key; and the instruction counter will have been advanced by 2. If the search was not satisfied, cells $DA(b_1+b_2-1)$ ... $DA(b_1)$ will contain the original key; cells DA59 ... $DA(b_1+b_2)$ and $DA(b_1-1)$ ... $DA(0)$ will contain the last information read from the drum; and the instruction counter will have been advanced by 1. Minimum duration of Phase IV is 2.3 minor cycles; maximum duration is 5 milliseconds.

*Insert single precision (IS-octal code 64).*—At the beginning of Phase III, the lower data accumulator contains the search key and the data to be inserted; the $a$ register contains the address of the track to be searched, and the $b$ register contains the two bracket numbers which specify the location of the key in the lower data accumulator. FOR and FOAM have been set by $t_{17}$ and FIR of Phase II.

At $t_{18}$ of Phase III the contents of the $a$ register $(aR)$ are gated in parallel to the track selection matrix. At $t_{29}$, flip-flop FOAM is reset and the output of the Read Amplifier associated with the L-word sync track is sampled. If an L-word sync pulse appears at this time, FOA is reset; FOR and SDA are set; the contents of $b_1$ register $(b_1R)$ are copied in parallel into the bracket counter; G31, G25, G26a, and G90 are opened; and the Search Timer is set. If an L-word sync pulse does not appear at this time, Phase III is extended another minor cycle and the output of the L-word sync amplifier is tested again. Minimum duration of Phase III is 12 CPC times; maximum duration is 9 minor cycles (plus 12 CPC times).

At the beginning of Phase IV, SDA and FOR have been set; gates G31, G25, G26a and G90 have been opened; and the bracket counter contains $b_1$. If the bracket counter contains "0", the contents of the $b_2$ register $(b_2R)$ are copied, in parallel, into the bracket counter; the Compare Control for the arithmetic unit (AU) is set, and the output from the lower data accumulator (LDA) and the selected drum track will be compared for $b_2$ CPC times in the AU. If $b_1$ does not equal "0", 1 is subtracted from the bracket counter, and the contents of LDA are shifted right each CPC time until the bracket counter contains "0".

The contents of FCDA is sampled when $b_2$ has been counted down to "1". If FCDA is set, G48 and G81 are opened; G90 closed; and for the remaining CPC times in the minor cycle the contents of LDA will be shifted out through G81 onto the information bus, through G48, and recorded on the drum. The contents of LDA are not destroyed by this operation because the LDA recirculation gate G31 was open. Gates G81, G31 and G48 are closed at $t_{29}$; SDA and FOR are reset; and FORE and SIC are set. If FCDA was not set when $b_2$ had been counted down to "1", recirculation of LDA continues. At $t_{29}$ the contents of the $b_1$ register $(b_1R)$ are again copied into the bracket counter, and the above process is repeated for another minor cycle.

The search will continue until either the desired cells have been found on the drum and the information recorded in them, or until 5 milliseconds have elapsed (as signalled from the Search Timer which was set at the beginning of Phase IV). Under the first alternative, FORE will be set at $t_{29}$, 2 will be added to the number in the instruction counter, and Phase IV will be terminated after $t_8$ with the resetting of FORE and the setting of FIA. Under the second alternative, the contents of the instruction counter are advanced by 1 instead of 2. Phase IV is completed in the usual way. Minimum duration of Phase IV is 1.3 minor cycles; maximum duration is 5 milliseconds.

*Insert double precision (ID-octal code 66).*—At the beginning of Phase III, the data accumulator (DA), FIGS. 44 and 45, contains the key and the data to be inserted; $aR$ of FIG. 33 contains the address of the track to receive the data; and $bR$ of FIG. 32 contains the two bracket numbers which specify the location of the key in DA. FOA and FOAM were set by the conjunction of FIR and $t_{17}$, thus initiating Phase III. The contents of the $a$ Register are gated, in parallel, to the track selection matrix.

At $t_{29}$ FOAM is reset and the output of the read amplifier associated with the L-word sync track is sampled. If an L-word sync pulse occurs at this time, FOA is reset; FOR and SDA are set; gates G90, G33, G31a, G25 and G26a are opened, and the contents of $b_1R$ are copied, in parallel, into the bracket counter of FIG. 32. If an L-word sync pulse does not occur at this time, Phase III is extended another minor cycle, and the output of the L-word sync read amplifier is sampled again at $t_{29}$. Minimum duration of Phase III is 12 CPC times; maximum duration is 8 minor cycles (plus 12 CPC times).

At $t_0$ of Phase IV, the contents of DA are shifted right one digit position; the first bit from DA appears at the Arithmetic Unit (AU) of FIG. 49 at the same time that the first bit from the drum does. If the contents of the bracket counter equal "0" at this time, the contents of $b_2R$ are copied, in parallel, into the bracket counter; the Compare Control Flip-Flop, seen in the upper portion of FIG. 53, for the AU is set, and the output from DA and the selected drum track will be compared for $b_2$ CPC times. If the contents of the bracket counter do not equal "0", 1 is subtracted from the contents of the bracket counter each CPC time until they do.

The output of FCDA is sampled when $b_2$ has been counted down to 1. If FCDA is set, G48 and G81 are opened; G90 is closed; and for $60-(b_1+b_2)$ CPC times, the contents of DA are shifted through G81 onto the information bus, through G48, and recorded on the drum. The contents of DA are not destroyed by this operation because the DA recirculation gates G33 and G31a were open. At $t_{29}$ of the second minor cycle after the beginning of the insertion, G81, G31 and G48 are closed; SDA and FOR are reset; and FORE of FIG. 40 is set and an output appears on conductor SIC of FIG. 36. If FCDA was not set when $b_2$ had been counted down to "1", recirculation of DA continues. At $t_{29}$ of the second minor cycle after the beginning of Phase IV, $b_1$ is again transferred into the bracket counter, and the above process is repeated for two more minor cycles.

The search continues until either the desired cells have been found on the drum and information recorded in them, or until 5 milliseconds have elapsed (as signalled from the Search Timer of FIG. 40 which was set at the beginning of Phase IV). FORE will be set at $t_{29}$. If the search was successful, 2 is added to the number in the instruction counter; if the search was unsuccessful, 1 is added to the number in the counter. Phase IV is then terminated in the usual way. The minimum duration of Phase IV is 2.3 minor cycles; the maximum duration is 5 milliseconds.

*Control Instructions*

*File (FI-octal code 70).*—The File Instruction Operation Line was activated at $t_{23}$ and FOAM was set at $t_{17}$ of Phase II. At $t_{20}$ of Phase III, a read pulse is gated to core store and the contents of the bin whose address is contained in the $a$ register are transferred in parallel into the exchange register. FOAM of FIG. 40 is reset and FOR is set, and an output appears on conductor SX at $t_{29}$, thus ending Phase III and initiating Phase IV.

*Phase IV.*—At $t_0$, gate G26 of FIG. 11 is opened and the circular shifting of the exchange register (XR) begins. XR will be shifted for 30 CPC times. FORC of FIG. 40 is set and the content of cell 18 in the $b$R is sampled at $t_8$. If cell 18 contains a "1," gates G23 and G27, FIGS. 10 and 11, are opened; G26 is closed; and SBC of FIG. 36 has a signal level thereon. For 9 CPC times, beginning with $t_9$, the contents of the bracket counter (BC) are shifted serially through G23 into the instruction bus and through G27 into XR. If at $t_8$, $b$R$_{19}$ contained a "0," gate G13 will also be opened so that the contents of BC recirculate through G13 and are not erased by the transfer. If, on the other hand, $b$R$_{19}$ contained a "1," G13 will not be opened at $t_8$ and the transfer will erase the contents of BC. The transfer will continue until $t_{18}$. SBC is then reset; G13, G23, and G27 are closed; and G26 is reopened allowing the contents of XR to recirculate. Shifting of XR still continues.

At $t_{20}$, the contents of cell $b$R$_{20}$ is sampled. If the cell contains a "1," gates G16, G22 and G27 are opened; G26 is closed; and the add control for the IPU adder and conductor SIC appears. Beginning with $t_{21}$ the contents of the instruction counter (IC) are shifted serially through the IPU adder where "1" is added, through G22 onto the instruction bus, through G27 into XR. The add-1 and transfer is completed at $t_{29}$. Always at $t_{17}$, an output appears on conductor S$b$R of FIG. 36, and $b$R is shifted from $t_{18}$ through $t_{29}$. At $t_{21}$, gate G11 is opened so that contents of the high-order nine bits of $b$R are transferred into IC from $t_{21}$ through $t_{29}$.

FOR is reset, and the outputs on S$b$R, SIC and SXR come down; gates G11, G16, G22, and G27 are closed; and FORE is set by $t_{29}$. At $t_4$ of the next minor cycle a write pulse is gated to core store and the contents of XR are copied in parallel into the bin in core store whose address is contained in $a$R. Phase IV is completed at $t_8$ when FORE is reset and FIA is set in anticipation of the first CPC pulse in Phase I of the next instruction cycle.

*Set counters (SC-octal code 72).*—There are no Phase III operations other than the resetting of FOA and FOAM and the setting of FOR at $t_{29}$.

*Phase IV.*—The content of cell $b$R$_{19}$ is sampled at $t_8$. If it equals "1," G14 is opened; FORC of FIG. 40 is set, and an output appears on conductors S$a$R and SBC of FIG. 36. From $t_9$ through $t_{17}$ the contents of $a$R are shifted serially through G14 and into BC. G14 is closed and the signals on S$a$R and SBC come down by $t_{17}$.

At $t_{17}$, S$b$R has an output and, beginning at $t_{18}$, the contents of $b$R are shifted serially. The output from $b$R is tested and appears on SIC at $t_{20}$. If the output is "1" (that is, if $i_{20}$ in the instruction stored in the instruction register was 1), G11 is opened and from $t_{21}$ through $t_{29}$ the high-order 9 bits in the $b$ register will be transferred into IC. If, on the other hand, the output of $b$R equalled "0" at $t_{20}$, G11 remains closed and nothing is done until $t_{29}$.

If the contents of $b$R did not replace the contents of IC, 1 is added to the number in IC from $t_0$ through $t_8$ and the sum inserted in IC. If the contents of $b$R did replace the contents of IC, nothing is done from $t_0$ until $t_8$ when FORE is reset and FIA is set, thus completing Phase IV.

*Base (BA-octal code 74).*—Phase II operations are the same as for all other instructions with the following exceptions: (*a*) At $t_{26}$ of Phase II, an output appears on SBC and gates G18, G19, and G15 are opened. From $t_{27}$ until $t_6$ the $a$ part of the instruction passing along the instruction bus is added to the contents of the base counter (BC) in the instruction processing unit adder, and the sum is inserted into the base counter via G15. Gates G18, G19 and G15 are closed and the signal on SBC is down by $t_6$. (*b*) SBC is up and G20, G21 and G13 are opened by $t_8$. From $t_9$ until $t_{18}$ the contents of the BC (now increased by $a_1$) are compared against the $a_2$ part of the instruction which appears on the instruction bus from $t_9$ until $t_{18}$. At $t_{17}$ the results of the comparison are stored in FCBA; G13, G20 and G21 are closed; SBC is brought down and FIRP is reset; and FOA and FOAM are set, signalling the end of Phase II and the beginning of Phase III. Nothing is done during Phase III other than the resetting of FOA and FOAM and the setting of FOR.

*Phase IV.*—The content of $b$R$_{19}$ is sampled at $t_8$. If it equals "1," SBC comes up and the base counter is shifted from $t_9$ until $t_{18}$. Since the recirculation gate G13 is not open, the shifting erases the contents of BC. If at $t_8$ the contents of $b$R$_{19}$ equalled "0," nothing is done until $t_{29}$. At $t_{29}$ FOR is reset; FORE is set and SIC comes up; gates G16 and G10 are opened; and the contents of FCBA are sampled (FCBA contains the results of the comparison made in Phase II). If FCBA contains a "1," add control for the instruction processing unit adder is set to add 2; otherwise it is set to add 1. From $t_0$ through $t_8$, the contents of IC pass through the IPU adder where 1 (or 2) is added and the sum proceeds through G10 into IC. FORE is reset and FIA is set at $t_8$ signalling the end of Phase IV and the beginning of a new instruction cycle.

TRIBUTARY OUTPUT SYSTEM

*General.*—FIGS. 57, 58 and 59 show the output rate converter (ORC) and output buffer (OB) circuitry. Much of the equipment is time-shared by 16 circuits. The telegraph transmitter of FIG. 23 provides sync signals and is started and stopped by the associated control circuitry. Provision is made for two modes of transmission: In Mode 1 transmission, up to 56 characters of a message or selection and termination sequences may be sent; in Mode 2 transmission, sequences of from one to three control characters are sent.

Figure 60:
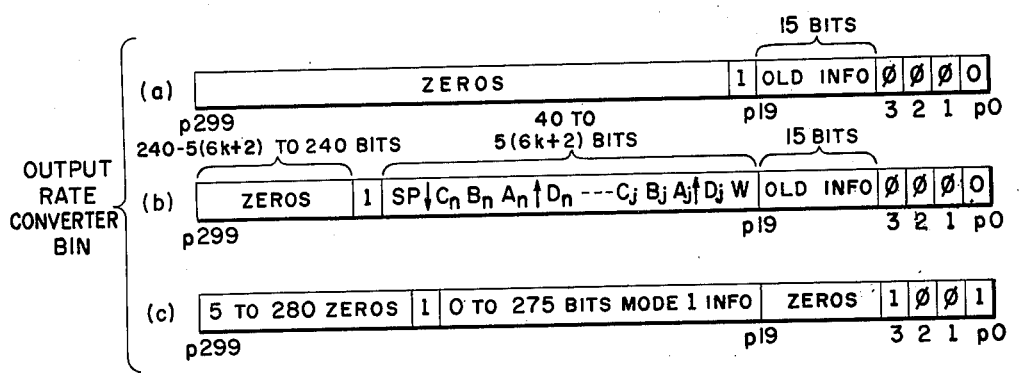

*Mode 1 transmission.*—Consider the situation when the output circuit 57 of FIG. 23 is idle and a new message is about to be sent. The contents of the $j$th octant of the ORC track are seen in FIG. 60(*a*). "Ones" that are read from the ORC bin are fed to the gates from gate 320, FIG. 57, and "zeroes" from gate 321. Since there is a zero at $p0$ in the ORC bin, the Mode Control FF$_1$ of FIG. 58 will not be set over conductor 324 and Mode 2 will not be initiated. At $T_{19}$ the Zero Sense FF, FIG. 57, will be set via gate 327, FIG. 57. Since there are no "ones" between $p20$ and $p299$ in FIG. 60(*a*), no pulse will appear at point 329, FIG. 57, during the octant, and the zero sense flip-flop will remain set. At $t_0$, just as the first bit of the $k$th octant is emerging from the loop 330, FIG. 59, the output of the zero sense flip-flop is sampled and a pulse appears at point 332, FIG. 57. This is gated out to form the marker sense pulse from the output (MS)$_0$ Mode 1 of a gate 334 seen in the right hand portion of FIG. 57. A pulse is also formed at point 336, FIG. 58, to set the Transfer FF if: (1) the output buffer bin is full, as indicated by a signal J' appearing at an input of a gate 338 seen in the lower left hand corner of FIG. 58; and (2) the Output Demand FF of FIG. 28 is not set, as indicated by the presence of a signal (OD)' at an input of gate 338 of FIG. 58. An indication of the coincidence of the two foregoing conditions is gated in at a point 340 at an input of a gate 342, FIG. 58.

Assume now that the output buffer has just been filled with the selection sequence and that the output demand flip-flop FIG. 28 is not set. The marker sense pulse from point 336, FIG. 58, at $T_0$ will set the transfer flip-flop via gate 342, allowing the information at $p0$ and *p19–p229*, FIG. 60(*b*), of the output buffer to be transferred to the output rate converter 344 or 344', FIG. 59, via a gate 346, FIG. 58. Note that the positions *p1* and *p2* of the input rate converter bin are never altered by this circuitry and that during the transfer the positions *p4–p18* are not altered. This is to enable end-of-message recognition even if the end-of-message characters are split between two message units. The contents of the output rate converter bin after the transfer are seen in FIG. 60(*b*).

The $(MS)_0$ Mode 1 pulse from gate 334, FIG. 59, will now cease to appear in the control circuitry and the transmitter will start. The first sync pulse will be gated in at a point 348, FIG. 58, and the Precess FF will be set just as *p1* of the *j*th octant is emerging from the loop 330, FIG. 59, advanced one bit from the position shown in FIG. 60(*b*). The information will be precessed to the output rate converter bin via gate 340, FIG. 58, and a "0" written at *p299*. The first bit of information to be transmitted will appear at *p18* and will be gated via gate 342, FIG. 57, if it is a "1" or gate 344 if it is "0." The information in the output rate converter bin, now advanced one bit position from that shown in FIG. 60(*b*), remains unchanged until the next sync pulse. This precessing cycle is repeated over and over until the last bit is sent to a Digit FF, FIG. 57. The contents of the output rate converter bin are again as in FIG. 60(*a*) and an $(MS)_0$ pulse is generated at the output of gate 334. If the output buffer is full, an immediate transfer takes place, and sending is continued. If the output buffer is empty the transmitter will stop.

*End of message recognition.*—It wil be noted that the input to the ORC bin 344 or 344' at gate 340 of FIG. 58 is continually being compared to the contents of the control track 194 of FIG. 27 so that the end-of-message characters (figure shift, H, letter shift) may be recognized. The end-of-message sequence (EM) will appear at this point only once. In addition, if the figure shift character appears in the "about to be sent" position *p19–p23*, this will be recognized and used in the control circuitry to prevent stopping the transmitter for control character transmission. This will avert any possible interruption of an EM sequence which, if allowed, would render the sequence unrecognizable at the way station or other tributary. If the three characters beginning with figure shift are indeed the end-of-message sequence, then the fact will be recognized; if not, normal operation will be resumed. When the signal $EM_0$ appears at the output of the flip-flop 196 of FIG. 27, the control circuitry operates the transmitter on a one-character-at-a-time basis for sending the termination sequence. The termination sequence will often be included in the same drum word that contains the last message unit. If not, then it will be totally contained in the succeeding drum word and will be in the output buffer when the signal $EM_0$ is sensed. When the termination sequence is completely transmitted, the output demand flip-flop of FIG. 28 is set so that the message processor can dispose of the old message and start a new message.

*Mode 2 transmission.*—This facility is provided so that the message processor can send control sequences of from one to three characters without disturbing any unsent contents of the output rate converter bin. The positions in the ORC bin used for Mode 2 are *p0–p18*. Unless a "one" appears in *p0* of the ORC bin, operation is in Mode 1. To switch to Mode 2 operation, a "one" is inserted into the ORC bin at *p0* by a separate write head addressable by the processor. The positions *p1* and *p2* are reserved for control bits to notify the control circuitry as to what has been sent in Mode 2.

The "one" in *p0* emerging at gate 346, FIG. 58, will set the mode Control FF1. This will remain set throughout the octant and at *p299* Mode Control FF2 will be set. It is seen that the Mode Control flip-flop FF1 acts on information entering the precessing loop 330, while Mode Control FF2 acts on the same information as it is read from the loop, advanced by one bit position.

A signal is gated out via gate 348, FIG. 59, at $T_1$ to indicate that the operation is Mode 2, and the Zero Sense FF of FIG. 57 is now set via gate 350 at $T_3$ and reset via gate 352 only during the Clear Gating Interval $T_4$–$T_{18}$. If all "zeros" occur in this interval, Mode 2 is ended by writing a zero at *p0* on the output rate converter via gates 354 and 340, FIG. 58. While the Mode Control flip-flop FF2 is set, the bit emerging from the loop at *p2* is gated to a Digit FF, FIG. 57, by a gate 356 if it is a "one" or gate 358 if it is a "zero" when a bit is requested by the transmitter. This bit is then erased, and the next information bit takes its place in *p3* of the ORC bin. The level from Mode Control Flip-Flop FF2 is used to gate $T_{17}$ via gate 360, FIG. 58, to reset the Precess FF, thus removing the enable signal from the ORC write amplifier and protecting Mode 1 information.

When the control characters are sent, the contents of the ORC between *p0* and *p18* are as in FIG. 60(*c*). As this enters the loop it will cause the Zero Sense FF to remain set. As it emerges from the loop, advanced by one position, the Mode Control Flip-Flop FF2 is set and at $T_0$ a pulse is gated out via gate 362 of FIG. 57 to give the $(MS)_0$ Mode 2 indication, and the pulse output of gate 362 is gated over gate 368 to the Enable Gate 364, FIG. 58, of the ORC bin write amplifier to erase the "one" at *p0* and return the circuit to Mode 1.

The positions *p1* and *p2* on the ORC bin will now emerge at $T_0$ and $T_1$ from the loop. If a "one" emerges at $T_0$ it will be gated out via gate 370, FIG. 57, to signal "LF sent" to the control circuitry. If a "one" emerges at $T_1$, it will be gated out via gate 372 to signal "Space sent" to the control circuitry. Thus the following code is used for positions *p0*, *p1*, *p2* when a character sequence to be sent via Mode 2 is transferred by the message processor to the ORC bin:

| Contents of p0p1p2 | Control characters just sent | Signal to control circuit |
|---|---|---|
| 110 | $C_5LF$ or $C_6LF$ | LF Sent. |
| 101 | SPACE | SPACE Sent. |
| 100 | Any character which is irrelevant to the operation of the control circuit. | None. |

The message processor cannot insert control characters into the ORC for transmission via Mode 2 unless the transmitter is stopped so that information is stationary in the ORC. All conditions that lead to sending control characters are detected by the control circuit and the transmitter is stopped before the message processor is modified by the condition.

*Output demand conditions.*—Three conditions may occur on the output that require special attention by the message processor. When one of these occurs the Output Demand FF of FIG. 28 is set and the message processor picks up the contents of positions *p0–p18* of the ORC.

*Condition 1.*—When sending the termination word, a station D*j* does not acknowledge. The positions *p14–p18* of the output rate converter are addressable by the message processor, by means of read-write heads connected by conductors 374, 375, FIG. 59, to a Head Selection Switch seen in detail in FIG. 61, and when the message processor finds D*j* in these positions, it notifies the supervisor. It restarts transmission by inserting a dummy control sequence which starts and immediately ends Mode 2, but furnishes a Mode 2 signal to the control circuit for use in restarting the transmitter. This sequence is:

$$\longleftarrow \text{Zeros} \longrightarrow \quad 1 \quad 0 \quad 0 \quad 1$$
$$p18 \qquad\qquad\qquad\qquad p3\ p2\ p1\ p0$$

The $(MS)_0$ Mode 2 signal is prevented from stopping the transmitter as it normally would.

*Condition 2.*—The termination word is completely sent.

The message processor, under the control of the instruction processing as hereinbefore set forth, finds the positions $p0$ to $p18$, inclusive, in the output rate converter bin by use of the Instruction CI-Octal 54, and proceeds to test for the message acknowledgement character "Space" by means of the appropriate use of the Equality Comparison Instruction (CE-Octal 24) within the program. If the character Space is present in positions $p14$ to $p18$, inclusive, the message processor disposes of the old message, and initiates sending of another message when it is available.

*Condition 3.*—The output rate converter and output buffer are both empty. The message processor finds any character including $Dj$ and Space, but finds on examining the Output Schedule that the last message unit of the message has not been sent. It will transfer the sequence in which a "1" appears in position $p0$, "0" in positions $p1$ and $p2$, the Space character in positions $p3$–$p7$, a "1" in $p8$, followed by ten zeros, for Mode 2 transmission and will fill the output buffer with the next message unit. This will cause no trouble if the end-of-message sequence was not interrupted in the process. If it was, no acknowledgement will come from the way station and the message will be retransmitted.

*Telegraph transmitter circuit.*—The outgoing transmission of start-stop telegraph characters involves a two-way exchange of information between the output rate converter of FIG. 59 and the Telegraph Transmitter of FIG. 23. The output rate converter must notify the telegraph transmitter that characters are to be sent; the transmitter initiates transmission by gating a start pulse from the Telegraph Pulse Generator of FIG. 56 to the outgoing line, and at the same time requests the output rate converter to deliver the first bit. Since a new bit can be delivered from the output rate converter within 10 ms. (two drum revolutions) it is the function of the telegraph transmitter to request the appearance of new bits to conform with the outgoing telegraph rate. For example, at 100 w.p.m., the telegraph transmitter requests are at 13.5 ms. intervals. After the fifth bit has been sent, the telegraph transmitter gates a 1.5 unit Rest pulse from the telegraph pulse generator to the line. Once started, the telegraph transmitter will always transmit one complete character; when notified that transmission is to be stopped, it will continue to the end of the character in progress and then inhibit further bit requests.

FIG. 62 shows the various wave forms applicable to the telegraph transmitter, and FIG. 63 shows the wave forms applicable to the telegraph pulse generator of FIG. 56. The B input, applied over conductor 290 to an input of the transmitter gate flip-flop seen in the left hand portion of FIG. 23 is the telegraph transmitter "go-stop" control. Since the telegraph pulse transmitter is asynchronous with respect to the output rate converter, the "go" level at B may appear during the telegraph "Start" pulse interval; consequently, the transmitter gate flip-flop is set during the Rest interval if the "go" level is present at the point B. Gate 302 of FIG. 23 is now open and the first $SYNC_A$ pulse emerging at gate 302 sets the Output Sync FF of FIG. 58 in the output rate converter circuit at a time indicated at point $a$ in the fifth wave form of FIG. 62, causing a one-cell precession and delivery of the first bit to the output digit flip-flop of FIG. 57. At the end of the Rest interval during which the transmitter gate flip-flop of FIG. 23 was set, the Start pulse will be delivered to conductor 380 and thence through gate 382 to the outgoing line 57.

The output sync flip-flop of FIG. 58 will be reset within 10 ms. after the first $SYNC_A$ set pulse appears at point $b$ in FIG. 62. Several microseconds later the first information bit will appear at the input to the output information flip-flop of FIG. 23 from the output digit flip-flop of FIG. 57. The first negative transition on the $SYNC_B$ bus, seen in the lower left hand portion of FIG. 23, will set the output information flip-flop to "1" (in this case assume that the character to be sent is 10010, the telegraph character "D"). After the start pulse and for the remainder of the character, the signal level on conductor 380 at the output is determined by the output information flip-flop and the gates 276 and 278. Simultaneously with the setting of the output information flip-flop to the first information bit, the second $SYNC_A$ pulse emerges on conductor 302 and sets the output sync flip-flop for the second time. Reset of the latter flip-flop occurs at point $c$ of the wave form seen in FIG. 62; this is exactly two drum revolutions (10 ms.) after the first resetting.

The second information bit ("0") is delivered to the output digit flip-flop of FIG. 57 and eventually is sampled by $SYNC_B$ to set the output information flip-flop of FIG. 23. However, the drum completes another two revolutions at the point $d$ seen in FIG. 62 before the output sync flip-flop can be set for the third time, so that even through a new information bit could have been extracted from the output rate converter several microseconds after the time $d$, the actual bit request does not occur until time $e$. As a result, the output sync flip-flop is set at $e$ and reset at $f$, four revolutions after the previous reset, and the third information bit set the output digit flip-flop several microseconds later. The fourth bit is delivered 10 ms. later at $g$ and at $h$; the output sync flip-flop is set for the last bit; reset occurs at $i$, two revolutions after $g$.

The output of the digit flip-flop is sampled by $SYNC_B$ pulses to set the output information flip-flop for each of the five information bits, and the latter flip-flop remains set for the fifth information bit while the Rest pulse is being sent. The "go" level is still present at the end of the character so that the #6 pulse over conductor 291 can not reset the transmitter gate flip-flop. Another Start pulse S is sent and another train of $SYNC_A$ pulses emerges at 302 for the next character. The next #6 pulse, however, finds a "stop" level at B and resets the transmitter gate flip-flop which then displays a "stopped" level at the point S. For each character sent through the telegraph transmitter, an end-character pulse ($EC_0$) is gated by gate 384 of FIG. 23 to the output rate converter. This pulse appears while the fourth information bit is being sent to the line and corresponds to the setting of the output sync flip-flop for the fifth bit request.

CONTROL CIRCUITRY

The control circuitry is the per-circuit wired-in equipment for effecting tributary station control. A schematic diagram of the equipment is shown in FIG. 28. The functions of the units of the equipment are described below.

*Transmitter Control.*—There are four flip-flops associated with the control of the telegraph transmitter, and these are the: (1) Stop Request FF, (2) Allow Stop FF, (3) Transmitter Control FF, and (4) Start Inhibit FF.

*Stop Request FF.*—Several events that occur in connection with incoming traffic require that outgoing traffic be stopped. It is desirable to stop the outgoing traffic if either the end-of-message sequence or the termination sequence is being sent. Therefore, when any of the events that require stopping the transmitter occur, the fact is not used directly for stopping, but is stored in the Stop Request FF, FIG. 28. The events that set the flip-flop are:

(a) The Reject FF being set by an output on conductor 238 of FIG. 28.

(b) The incoming message ends $(EM)_1$ at gate 390, FIG. 28.

(c) The input rate converter bin is nearly full and the input buffer is full, as indicated by a signal FW on conductor 226, FIG. 25.

(d) An interrogation cycle is to be started, as initiated by conductor (#1) on the switchbank of FIG. 30–A.

The Stop Request FF is reset when the need for stopping has ended, which events are:

(e) A message is being received (Busy) at gate 392.

(f) The message processor has sent Space via Mode 2 after an FW signal (Space sent via Mode 2) from an output level on gate 394 of FIG. 57.

(g) The incoming line is idle; the switch of FIG. 30–A is in its Home position.

*Allow Stop FF.*—In order for the Stop Request FF, FIG. 28, to be effective in stopping the transmitter, the Allow Stop FF must be set. The condition of both flip-flops being set is sensed at gate 396, and the Start Delay FF and Transmitter Control FF are set. The Allow Stop flip-flop is normally set, so that a Stop Request will be immediately effective, i.e., the outgoing traffic will stop at the end of the character being sent. However, if the figure shift character is sensed in the "about to be sent" position of the output rate converter, a pulse will appear at gate 398, resetting the Allow Stop FF. When the figure shift character appears in positions $p4$–$p9$ of the output rate converter, indicating the three character sequence, figure shift, X, X, has been sent, the Allow Stop FF is again set at $T_0$ from gate 400 of FIG. 28. If the sequence is actually an end-of-message sequence, then at $T_{19}$ a pulse will appear at gate 402, again resetting the Allow Stop FF. In this event the latter flip-flop will be set between $T_9$ and $T_{19}$, allowing the Stop Request to be effective. This is tolerable because the $(EM)_0$ pulse from gate 402 will also cause the transmitter to stop, and since the $EM_0FF$ will be set with the K output activated, only termination word functions will be carried out.

*Transmitter Control FF.*—The outputs B and B' of this flip-flop, FIG. 28, control, over conductors 290 and 291, the transmitter directly, FIG. 23. When it is set by any of the inputs to gate 404 of FIG. 28, the transmitter will stop at the end of the character being sent. When it is reset by either of the inputs to gate 406, the transmitter will start at the first Start pulse from the telegraph signal pulse generator, FIG. 1–A, which is common to all of the outgoing line circuits.

The output of gate 408 will reset the Transmitter Control flip-flop directly, and also the Start Inhibit flip-flop. The transmitter control flip-flop will be reset later when the inputs to gate 414 are satisfied. This insures a one-character delay between stopping and starting the transmitter and with this in mind it is convenient to think of an input on gate 404 as stopping the transmitter and an input on gate 410 as starting it.

*Start Inhibit FF.*—This flip-flop is set and the transmitter stopped by:

(a) The output of gate 418 which occurs during the termination word as established by the signal K from the output of the $EM_0$ FF when a character is sent from the output (set output sync FF, FIG. 58). This effects the one-character-at-a-time procedure necessary for acknowledgment.

(b) The output of gate 420 of FIG. 28 which occurs when both the output buffer (J) and the output converter bin ($MS_0$ Mode 1) became empty.

(c) The output of gate 422, which signals that Mode 2 has ended ($MS_0$ Mode 2) at some time other than during a termination word (K'). During the termination word, the only function of Mode 2 is to allow the message processor to restart the transmitter after a non-acknowledgment, by inserting the dummy sequence hereinbefore described. In this event, it is necessary to inhibit the stepping of the transmitter when Mode 2 ends, as is done by requiring 233K' at gate 422.

(d) The output of gate 396 indicating that both the Allow Stop FF and Stop Request FF are set, as described previously.

(e) An outgoing message ends $(EM)_0$, which pulse comes from gate 402.

The Start Inhibit FF is reset by:

(f) The output of gate 416 when the combination $TI_2K$ just occurs. This is indicated by the differentiated signal (indicated by the spike 409) on the input wire to gate 410.

(g) The output of gate 408, which implements the starting of the transmitter during the termination word ($TI_2K$) when an acknowledgment character is received from a way station $(EC)_1$.

(h) The output of gate 412 which produces an output at $T_0$ only if all of the following conditions are met:

(i) The output rate converter bin is full as indicated by the presence of a signal ($MS_1$ Mode 1)'.

(ii) The termination word is not being sent (283K').

(iii) The Stop Request FF is not set (M').

Thus gate 412 provides the pulse that starts the transmitter when the first word of a message is transferred to the output rate converter bin or when the stop request is removed. The flip-flops associated with the transmitter control provide fully automatic control of the transmitter.

*Stepping switches.*—The way station interrogation cycle is controlled by the stepping switches seen in FIG. 30–A; the functional operation of the switching circuit is depicted by the transition diagram, FIG. 30–B. Referring to FIG. 30–A, there are shown two switches $SW_1$ and $SW_2$. The bank of $SW_1$ has 26 contacts, labelled "Home" and #1 to #25. When the input line is idle the switch $SW_1$ is on the Home position. It is to be understood, however, that the way station interrogation cycle and the particular operating procedure may be varied as desired; various well-known procedures have heretofore been employed in switching centers in conjunction with way station circuits, as disclosed in numerous U.S. patents, including Bacon et al. Patent No. 2,766,318, issued October 9, 1956, for a Printing Telegraph Automatic Switching System; and in pending U.S. applications assigned to the assignee of the instant case, viz., G. G. Light, Serial No. 530,571, filed August 25, 1955, for a Telegraph System; Light and Wichtendahl, Serial No. 683,624, filed September 12, 1957, for a Telegraph Way Station System; and Light and Wichtendahl, Serial No. 703,899, filed December 19, 1957, for a Telegraph Way Station Selector.

The "Step 1" magnet will step switch $SW_1$ one step at a time in response to an input signal on conductor 561; the "Self Step" unit will cause its self-interrupting circuit to continually step the switch in response to a start pulse on the input conductor 595 to the self-step unit and will stop the self-stepping operation in response to the output of gate 594. Whenever it is desired to either single-step the switch or to self-step the switch, gate 594 is inhibited by means of the inverter 596. For example, if $SW_1$ is self-stepping from #25 to #3, as soon as the switch arm engages #3 a signal level appears and remains at the output of gate 594. Now the switch will remain on position #3 until either the timer $TI_2$ runs out or a long open is received. When the timer runs out a plus level is applied to conductor 595 and the output of gate 594 is inhibited by the inverter 596. If a long open is received before the timer $TI_2$ runs out, an output level appears on conductor 561 and the ouptut of gate 594 again is inhibited by the inverter 596.

After a long open occurs, or if $TI_1$ (which was started when the line became idle) runs out, the switch steps to level #1 via gate 570 or 572. On this point the character Y level is wired in and is sent, as indicated by the level on gate 560. The "Send Y" conductor leads to a set of coding relays or a matrix (not shown) which, in well known manner, will cause the marking and spacing pulses representing the character Y to be set up for transmission by a distributor over the associated way station circuit. The switch SW1 then steps to point #2 where a Line Feed character is wired in and is sent, as indicated by a signal level on gate 562, to an assembly which will set up the marking and spacing conditions for transmitting the line feed over the way station circuit. Alternatively, the five mark and space signal pulse conditions comprising the character to be sent may be set up by contacts on five banks of the switch in known manner for transmission. The switch then steps to point #3. When the switch leaves point #2 the timer $TI_2$ of FIG. 30–A is started. If a long open is received before timer $TI_2$ runs out, the switch steps to point #4 via gate 578 where the character X is wired in. This character is sent out and the switch self-steps by means of the self-stepping unit to point #22–K, where K is the number of stations on the way circuit. When the switch is on position #3 and timer $TI_2$ runs out before the long open is received, the switch self-steps to point #22–K via gate 578.

At this point a "Send $D_j$" signal is gated to stepping switch $SW_2$ via gate 566. On this switch are wired the designation character $D_j$'s for all the stations on the way wire. When $SW_2$ receives a "Send $D_j$" signal, the character $D_j$ under the wipers at that particular time is sent. The switch $SW_1$ is caused to step to #23–K via gate 580. Also, when the switch $SW_1$ reaches point #22–K, the flip-flop $SW_2FF$ is set. As the switch $SW_1$ leaves the point #22–K, a signal level appears at $(A30)'$ which causes switch $SW_2$ to be stepped via gate 568.

The circuitry is now waiting for a response from the station interrogated by $D_j$. If the station has no message to send, it sends the $D_j$ of the next station on the line to interrogate that station. When the $D_j$ is received at the switching center, both $SW_1$ and $SW_2$ are tsepped one point if $SW_1$ is on a point prior to #22. This is accomplished via gate 584, the $SW_2$ switch being stepped by the presence of signal $(A30)'$ appearing on gate 568. Now the circuitry is again waiting for a response. If the station interrogated fails to respond, the timer $TI_2$ will run out, and if $SW1$ is on a point prior to #22, the $D_j$ now under the wipers of $SW_2$ will be sent to restart the chain of responses. $SW_1$ and $SW_2$ are then both stepped one point via gates 582 and 568, the send $D_j$ signal level having been generated by gate 574.

If, after a $D_j$ goes out over the outgoing leg, $SW_1$ steps to point #22, it means that all but one station have responded negatively. If the last station responds negatively with the character $D_j$, or fails to respond (timer $TI_2$ runs out) the interrogation cycle is ended and the switch $SW_1$ will step to point 23 via gate 582 or 584. When $SW_1$ reaches #23, a request release signal (Figure shift) appears at the output of gate 576 which causes a Figure Shift character to be sent to all stations on the line. The switch $SW_1$ self-steps to its Home position and the timer $TI_1$ is started to prevent the line remaining idle too long.

If any station on the line responds with a Space signal, $SW_1$ self-steps to point 24 via gate 586 and flip-flop $SW_1FF$ is set. The Space character returns to the line via the Repeat connection and acts to initiate the sending of the message from the ready station. The character Figure Shift was inhibited on gate 576 due to the absence of the $SW_1FF_0$ signal.

At the end of the first message unit of the message, $SW_1$ steps to point #25 via gate 588 and remains there throughout the message. Thus, point #24 serves to mark the period during which a first message unit is being received, so that this message unit can be marked upon transfer to the input buffer.

$SW_1$ which stays on #25 until the message processor either accepts or rejects the message by sending $C_5LF$ or $C_6LF$. When either sequence is sent via Mode 2, a signal "LF sent" causes $SW_1$ to self-step to point No. 3 via gate 590 and the cycle repeats. The absence of signal on $SW_1FF_0$ on gates 562 and 560 inhibits the sending of a Line Feed and the character Y.

Whenever $SW_1$ is on a point from #5 to #22, a "repeat" level exists on the output of the repeat flip-flop to effect the repeat function. The details of this connection are shown in FIG. 23. A "busy" level is presented at the output of the "Busy" flip-flop when $SW_1$ is on #24 or #25, although the "set" signal to the Busy FF is inhibited at gate 592 by the absence of the signal $SW_1FF_1$ when the switch is self-stepped from the position #23 to home.

*Termination word procedure.*—When the end-of-message signal (EM) is sensed on the output, the $EM_0$ FF, FIG. 28, is set (K). When incoming traffic stops, timer $TI_2$, FIG. 30, will run out, the input will be blocked, and the transmitter will be started from gate 416. One character is sent, and the transmitter is stopped by gate 418. An incoming character will cause another character to be sent from gate 408. If an incoming character does not occur, timer $TI_4$ will run out, and the output demand flip-flop will be set. When the message processor inspects the contents of $p0$–$p18$ of the output rate converter bin, it will insert the dummy Mode 2 sequence described previously to restart the transmitter. When the restart character Space at the end of the termination sequence is sent, the output rate converter bin will be emptied, as will the output buffer bin. Gate 420 will be enabled, the $EM_0$ FF will be reset, and the transmitter will be stopped. The output demand flip-flop will be set and the message processor will transfer a new selection sequence to the output buffer bin. When the $EM_0$ FF is reset, the Allow-Stop FF is set to allow any input "stop Request" signals to be effective.

*Timers.*—The timers $TI_1$, $TI_2$, $TI_3$, FIG. 30, and $TI_4$, FIG. 28, are single input, complementary output devices that are started on the trailing edge of a positive input pulse or level. When the positive input is present a timer presents a positive output on $(TI)'$. An interval of time after the input signal disappears, the positive signals will appear on the TI output, unless in the interval the input becomes positive. The timers may comprise any of various well known types having the proper time constants. For example, $TI_2$ and $TI_4$ may be delay lines or a cascaded arrangement of one-shot multivibrators or clock timers; $TI_1$ and $TI_3$ preferably are clock timers because of the comparatively long delay times required.

Timer $TI_1$ of FIG. 30 insures that an input circuit will remain idle no longer than $TI_1$ seconds without an interrogation cycle. This is to insure that malfunction of the request mechanism at a way station or other tributary will not prevent the sending of a message. Its time interval is about five minutes. Timer $TI_2$ is used in two ways. During the interrogation cycle it is used to restart a chain of responses after a station fails to respond. When $(EM)_0$ occurs, $TI_2$ runs out when incoming traffic stops, to signal that the termination sequence may be sent. Its time interval is about that of two telegraph characters.

Timer $TI_3$ is used to detect a long pause in incoming traffic. Its time interval is about 30 seconds. Timer $TI_4$, FIG. 28, is used to detect a nonacknowledgement during the termination word. Its interval is about that of two telegraph characters.

*Demand procedure.*—The Input Demand FF 230, FIG. 28, is set only if the transmitter is stopped some time other than during the termination word, as indicated by the signal $SK'$. This is because an input demand causes the message procedure to send a control character via Mode 2, and Mode 2 can not be initiated unless the transmitter is stopped. An interlock (Shift Input Demand Register $FF_0$, FIG. 36) also prevents setting of the input demand flip-flops while the register of which it is a part is being shifted.

The input demand FF 230 is set, under the above conditions, when:

(a) An EM occurs on the input circuit $(EM)_1$ or a Full Warming (FW) is generated at gate 424.

(b) The reject FF of FIG. 28 is set (Q) and at the proper time $(T_1, S_1, T^k)$ at the gate 426. The output of this gate also resets the reject FF. The latter flip-flop is set via gate 237 when the incoming line is busy and either a Long Open (LO) a Full Alarm (FA) or an improper pause $(TI_3)$ occur.

The output demand FF is also furnished with an interlock (Shift Output Demand Register $FF_0$) over conductor 266 to prevent its being set during shifting of its register. The output demand FF is set if:

(c) $TI_4$ runs out during the termination sequence.

(d) The output rate converter and output buffer are both empty either during the termination word or after the transmitter control FF is reset. The latter provision insures that the output demand FF is not set twice when the output rate converter and output buffer run dry.

TRUNK CIRCUIT INPUT-OUTPUT SYSTEM AND CONTROL

*Input system.*—The input circuitry for trunks is shown in FIGS. 64 and 65, and the control equipment therefor in FIG. 66. The operation is similar to that of the way circuit equipment hereinbefore described.

Consider the conditions that exist when the trunk input circuit is idle. In the control circuitry, timer $TM_1$ of FIG. 66 will be run out and the input will be blocked so that no trash can accumulate in the input rate converter 482 or 482′ of FIG. 65. The input rate converter contains all zeros except in bit position $p285$ where a marker bit "1" is written. The insert flip-flop, the erase flip-flop, and the transfer flip-flop, FIG. 64, are reset.

When a long open (LO) is received on the line, the timer $TM_1$ is reset. This will unblock the input via gate 486 and gate 488, FIG. 64, if no alarm condition exists. The sync flip-flop will be set when the first sync pulse arrived from the receiver, and this output will gate $$T^{k-1}_{290}$$

to set the insert flip-flop via gate 488 and reset the sync flip-flop. At the same time the information line is sampled at gate 490, and a bit written on the 319-bit loop via conductor 442, FIGS. 64 and 65. The insert flip-flop will gate, via gate 492 of FIG. 65, the contents of the loop to the input rate converter bin 482 or 482′ and the contents of the input rate converter will now be the marker bit at $p284$, the information bit at $p298$ and a "1" at $p299$. The next sync pulse sets the sync flip-flop again, and the action is repeated, with the marker bit and information bits moving up toward $p0$, the new information bit always being recorded in $p298$ of the rate converter, and $p299$ being written as a "1".

Assume that the input rate converter bin fills up or an end-of-message (EM) is detected as the last bit of a message unit recorded. In the first case the marker bit will be $p1$ of the input rate converter bin. When the insert flip-flop is set for the last bit, the marker bit emerging from the loop at $T_0$ will cause a pulse to appear at point 496, FIG. 64. In the latter case the EM COMP FF will be reset and a pulse will appear at 496.

If there is a "0" on the line from the sum checker, FIG. 65, indicating an incorrect check sum, then a pulse will appear at point 498, via conductor 458. This will: (1) cause a pulse to be gated out from gate 500 on the "Not OK" line, and (2) set the erase flip-flop via gate 502. The erase flip-flop being set will cause zeros to be written in the rate converter 482 or 482′, except at $p285$. The initial idle condition now exists.

If there is a "1" on the line 458 from the sum checker, indicating a correct check sum, and the input buffer is empty, then a pulse appears at point 504, FIG. 64. This will: (1) set the transfer flip-flop via gate 502, (2) set the erase flip-flop, and (3) be gated out on the OK line via gate 506. The erase flip-flop causes the input rate converter to be cleared for the next message word while the transfer flip-flop gates the message unit from the loop to the input buffer. Both flip-flops are reset at $T_{299}$ and the idle condition exists.

If there is a "1" on the line 458 from the sum checker, but the input buffer has not yet been emptied by the message processor, a transfer cannot be made to the input buffer. Neither can the control $C_5$ character be sent immediately for fear of initiating a new message unit before the input rate converter is cleared. A pulse appears at point 508 to be gated out to set the input demand flip-flop of FIG. 66. The message processor will quickly empty the input buffer and reset the input buffer status flip-flop, FIG. 64, and the input demand flip-flop, FIG. 66.

Until the input buffer is emptied, the insert flip-flop must be continually set so that an empty input buffer may be detected. This is done by gating the pulse from point 510, FIG. 64, to set the sync flip-flop. This will insure that the insert flip-flop is set each time $$T^{k-1}_{299}$$

and $S_1$ (previously referred to in regard to the tributary output circuit) occur, until the buffer is empty. It is further necessary to prevent the insert flip-flop from remaining set throughout the octant and thereby precessing the message unit to the input rate converter. By using the pulse at point 510 to reset the insert flip-flop, this is prevented, and the information in the input rate converter remains unchanged until the input buffer becomes empty. The information line stays at its last level so that the last bit of the message unit is continually being presented to the circuitry at $$T^{k-1}_{299}$$

and $S_1$. When the input buffer is emptied, a pulse will appear at point 504, the transfer and erasure will take place, and an OK pulse will be gated out, as previously described.

*Operation of the sum checker.*—The sum checker, FIG. 65, is a 5-bit adder comprising a 5-bit shift register, a carry flip-flop, and gates. Each flip-flop introduces a unit delay. The carry from each 4th order addition is suppressed, so that the sum, Modulo 32, of the characters is inserted at $p299$, and always appears as a "1" in the 1st order (i.e., in $p1+5M$, where $57-M$ is the number of characters received, including the check sum).

When the check sum complement incoming from a sum checker at the remote sending end of the trunk enters the adder, the adder should be at the actual sum, so that the sum of the complement and the characters will be 11111. The 00010 character containing the marker bit may occur at any position between $p0-p4$ and $p260-p265$, and all bits between it and the check sum are "zeros." The register could be preset to 11110 at $$T^{j-1}_{299}$$

so that the 00010 marker bit character would leave it containing all zeros. It is easier to preset at $T_0$ to 01111. The carry suppress pulse $T_4+5n$, where 0 is equal to or less than $n$, and $n$ is equal to or less than 59, is taken directly from the 5-bit register of the T-generator. As $p299$ of a complete message unit enters a loop, the sum check being correct, all "ones" will appear in the sum checker register and the output of the "and" gate will be at "1" at $T_0$ to generate an OK signal.

*Input control equipment.*—One of three signals may be sent to control circuitry at the end of a message unit: An OK signal, a "Not OK" signal, or an input buffer and input rate converter full signal. The Not OK signal will set the $(EMU)_1$ FF, FIG. 66, and the transmitter control flip-flop, and will reset the OK FF and Timer $TM_2$. When the transmitter stops, the timer $TM_1$ is started and runs out. This is necessary to insure that the timer $TM_1$ at the other end of the line runs out so that the predetermined control character $C_6$ will be recognized. When $TM_1$ runs out, the next $$T^{k-1}_{299}$$

and $S_1$ will gate a pulse into the output system to send the character $C_6$ and to reset timer $TM_1$.

At the end of the character, the $(EMU)_1$ FF is reset. If other conditions are favorable, a resetting flip-flop will cause a long open to be sent and traffic on the outgoing line will be restarted. An OK signal will set the $(EMU)_1$ FF, the transmitter control flip-flop and the OK FF, and will reset timer $TM_1$. The same procedure is followed to send $C_5$ as was employed to send $C_6$. The full output buffer and input rate converter signal sets the input demand flip-flop, FIG. 66, and timer $TM_2$. As soon as the input buffer is emptied the OK Signal will be generated as previously described and $C_5$ will be sent.

*Functions of demand flip-flops.*—The input demand flip-flop is used to increase circuit utilization. It will more often be set when the last message unit of a message is very short. The input buffer may not have been emptied during the regular cycle of message processor operation and will receive special attention when the input demand flip-flop is set, thereby speeding up operation of that circuit. There is no need to notify the message processor by way of the input demand flip-flop when an erasure of a partial message is necessary, as this will be done automatically if a start message sequence is detected following a message unit not containing an end message sequence. The demand is handled like the way circuit demand, and the code used is $p0p1=10$.

The output demand flip-flop is set to notify the message processor that the message to be sent was rejected. The message processor will print out the information about the rejected message to the supervisor and will effect the sending of the next message.

*Output system and control.*—The output circuitry for the trunks is shown in FIGS. 67 and 68, and is similar to that of the tributary circuits except that: (1) there is no need to recognize the end-of-message signal at the output for a trunk circuit. (2) A Secondary Output Buffer (SOB), FIG. 67, which is located in the output buffer store on the drum, is needed to store a message unit while it is being sent so that it will be immediately accessible for retransmission if necessary. The output buffer status flip-flop is set only when a transfer is made from the primary output buffer (POB). (3) The message unit plus the check sum extends from $p14$ to $p18+5N$, where N is the number of characters in a full message unit, not including the check characters. The control circuitry is shown in FIGS. 67 and 68.

Consider the situation when the output line is idle and a message is to be sent. The output buffer status flip-flop, FIG. 68, is set, the buffer select flip-flop, FIG. 66, is set, and no sync pulse is coming from the transmitter. The message procedure transfers the message unit to the $k$th octant of the POB track and resets the output buffer status flip-flop. Prior to transferring each message unit to the primary and secondary output buffer bins, the message processor having determined that the message (1) arrived from a tributary station, and (2) is destined to be sent over an outgoing trunk circuit, inserted the 5-bit check sum through the appropriate use of the AB (Accumulate Bits) Instruction in the instruction cycle. The check sum will represent the complement of the sum obtained by the Accumulate Bit Register Counter of FIG. 46-A.

A long open is sent by the control circuitry since all inputs to its "and" gate are not present. A "1" is present in $p14$ of the $k$th octant of the ORC. When the signal arrives which indicates that the long open has been sent, the transfer flip-flop of FIG. 67 is set and the message unit will be transferred from the POB to the SOB and to the ORC. At the end of the octant, the $T_{299}$ pulse will do several things:

The transfer flip-flop gates the $T_{299}$ pulse via gate 518 to gate 520, FIG. 68. Since the buffer select flip-flop is set, over conductor M, the output buffer status flip-flop OBS FF1 FIG. 68, will be set. The buffer select flip-flop is now reset by the output of gate 520, designated End Transfer, and the transfer flip-flop is now reset by $T_{299}$.

When the first shift pulse arrives from the transmitter, the sync flip-flop of FIG. 64 is set. Up to two drum revolutions may occur before a $T_0^k$ pulse and $S_1$ occur. At $T_0^k$ and $S_1$, $p0$ of the message unit is the read head of the loop 522, FIG. 68, and the precessor flip-flop of FIG. 67 is set. This gates, via gates 524 and 526, FIG. 67, the message unit to the output rate converter track where it is written one bit in advance of its original position. A "0" is written at $p299$ of the ORC. Also, if $p13$ is a "1", it is gated to set the digit flip-flop via gates 528, 530 and 532, FIG. 68. The precessor flip-flop is reset at $T_{299}$. The first Sync B pulse which coincides with the second shift pulse, samples the state of the digit flip-flop and resets it via gate 534 of FIG. 68. Five such cycles occur per character.

Since a "1" marker bit is always present in the transferred message unit at $p19+5N$ (where N represents the number of characters) and the positions $p20+5N$ to $p299$ are zeros, and since a "0" is written at $p299$ each time the unit is precessed, then when the last bit of the last character has been entered in the digit flip-flop, FIG. 68, the entry on the output rate converter will be the marker bit at $p14$ followed by zeros. This will cause the zero sense flip-flop to be set at the next $T_0$ and a marker sense pulse $(MS)_0$ at gate 536, FIG. 68, will be generated, which will stop the transmitter. The $(MS)_0$ pulse will be generated each time the $k$th octant is read from the octant rate converter, and when another long open is sent, will initiate another transfer.

If the message unit was acknowledged, then the buffer select flip-flop of FIG. 66 and the transfer control flip-flop of FIG. 67 will be set via gate 538, and the transfer will be made from the primary output buffer as with the first message unit. If the message unit was rejected, the buffer select flip-flop and the transfer control flip-flop will remain reset and the transfer will be made from the secondary output buffer which contains the rejected message unit.

Referring to the control equipment of FIG. 56, consider the process of receiving acknowledgment or rejection of a message unit just sent. The $(MS)_0$ pulse will set both the $(EMU)_0$ FF and the transmitter control flip-flop. If there is no incoming traffic, the timer $TM_1$ will run out. If there is incoming traffic, then after it stops the timer will run out. Timer $TM_2$ is started when $TM_1$ is, but its time interval is much longer.

The control character $C_5$ or $C_6$ will be recognized by a character recognizer circuit of a type well known in the telegraph art and indicated diagrammatically by the rectangle labeled Char. Recog'n in FIG. 66, and a pulse will appear at either of the two outputs. If $C_5$ is recognized before $TM_2$ runs out, then a pulse will appear at point 516, FIG. 66, and will: (1) reset $TM_2$ via gate 540, (2) reset the output counter via gate 542, (3) set the buffer select flip-flop via gate 542, and (4) reset the $(EMU)_0$ FF via gate 544.

If $C_6$ is recognized before $TM_2$ runs out, then a pulse will appear at point 545, and will: (1) reset $TM_2$ via gate 540, and (2) add one to the output counter via conductor 544 directly. In addition, if the counter is below $N-1$, then $(EMU)_0$ FF will be reset via gates 546 and 544.

If the counter is a $N-1$, then the rejection is the $N$th rejection and the output demand flip-flop is set via gate 548, and the counter advances to N. When the message processor attends to the output rate converter and buffer, it will reset the output demand flip-flop and at $T_{299}$ a pulse will appear at point 549. This will: (1) reset the $(EMU)_0$ FF via gate 544, (2) reset the output counter via gate 542, and (3) set the buffer select flip-flop via the gate 542.

If $TM_2$ runs out before $C_5$ or $C_6$ is recognized, then the output counter and the buffer select flip-flop are reset and an alarm is regenerated. All traffic on the circuit ceases until the cause of the failure is discovered and corrected. Once $TM_2$ has run out, it can be reset only manually via the input designated Manual Reset at gate 540.

The transmitter is restarted in all cases by the long open being sent. This also allows a transfer to the output rate converter, as previously described. The long open will be sent, assuming the other conditions are satisfied, when the $(EMU)_0$ FF is reset.

While the invention has been described with reference to particular embodiments thereof, it is not to be regarded as limited thereto since various equivalents, modifications, substitutions and improvements will occur to those skilled in the art without departing from the spirit and scope of the invention as set forth in the appended coded claims.

What is claimed is:

1. In a telegraph switching system, a switching center having a plurality of incoming channels, first storage means fed by said incoming channels to store temporarily coded signal pulses representing each of the characters of telegraph messages as the pulses are received at telegraph input pulse rates, signal storage and repeating equipment having input pulse storage sections and output pulse storage sections, first precessor means for cyclically feeding to said input pulse storage sections the information stored in said first storage means, means to read serially and convert the information in said input pulse storage sections to signals having higher pulse rates, means for feeding serially to said output pulse storage sections said signals having higher pulse rates, a second storage means, and second precessor means to read cyclically and convert the information in said output pulse storage sections to signals having telegraph pulse rates coupled to feed said second storage means, and outgoing channels fed by said second storage means.

2. In a telegraph switching system, a switching center having a plurality of incoming channels, first storage devices fed by said incoming channels to store temporarily the coded signal pulses representing each of the characters of telegraph messages as the pulses are received at telegraph input pulse rates, signal storage and repeating equipment having cyclically moving input pulse storage sections and output pulse storage sections, first precessor means for cyclically feeding to said input pulse storage sections the information stored in said first storage devices, means to read serially and convert the information in said input pulse storage sections to signals having higher pulse rates, means for feeding serially to said output pulse storage sections said signals having higher pulse rates, second storage devices, and second precessor to read cyclically and convert the information in said output pulse storage sections to signals having telegraph pulse rates coupled to feed said second storage devices, and outgoing channels fed by said second storage devices.

3. A system according to claim 2, in which said means for cyclically feeding binary signals to the input pulse storage sections includes means for sequentially testing said first storage devices continuously to determine which have incoming signal pulses stored therein.

4. In a telegraph switching center, a switching center having a plurality of incoming channels, over which are transmitted start-stop permutation code characters each comprising start and rest pulses with intervening coded intelligence pulses, first storage means fed by said incoming channels to store temporarily coded signal pulses representing each of the characters of telegraph messages as the pulses are received at telegraph input pulse rates, means for deleting the start and rest pulses from each code character, signal storage and repeating equipment having cyclically moving input pulse storage sections and output pulse storage sections, first precessor means for cyclically feeding to said input pulse storage sections the coded intelligence signal pulses stored in said first storage means, means to read serially and convert the information in said input pulse storage sections to signals having higher pulse rates, means for feeding serially to said output pulse storage sections said signals having higher pulse rates, a second storage means, second precessor means to read cyclically and convert the information in said output pulse storage sections to signals having telegraph pulse rates coupled to feed said second storage means, outgoing channels fed by said second storage means, and means for reinserting start and rest pulses to form outgoing start-stop permutation code characters.

5. In a telegraph switching system, a switching center having a plurality of incoming channels, a first plurality of pulse storage elements fed by said plurality of incoming channels to store temporarily coded signal pulses representing each of the characters of telegraph messages as the pulses are received at telegraph input pulse rates, signal storage and repeating equipment having an input rate converter storage section, an input buffer storage section, and an output buffer storage section and an output rate converter storage section, first precessor means for cyclically feeding to said input rate converter storage section pulses corresponding to those stored in said first plurality of pulse storage elements, means to read serially and convert the information in said input rate converter storage section to signals having higher pulse rates coupled to feed said information to said input buffer storage section, means for feeding to said output buffer storage section said signals having higher pulse rates, means for reading serially the signals in said output buffer storage sections and feeding them to the output rate converter storage section, a second plurality of pulse storage elements, and second precessor means to read cyclically and convert the information in said output rate converter storage section to signals having telegraph pulse rates coupled to feed said second plurality of pulse storage elements, and outgoing channels fed by said last mentioned means.

6. A system according to claim 5, in which each input rate converter storage section may contain signal pulses remaining therein which represent old information in regard to a previously received message, and said means for precessing the signal pulses causes the pulses representing said old information to be precesesd along with the new incoming signal pulses of a message being currently received.

7. In a telegraph switching system, a switching center having a plurality of incoming channels, a first plurality of pulse storage elements fed by said plurality of incoming channels to store temporarily the coded signal pulses representing each of the characters of telegraph messages as the pulses are received at telegraph input pulse rates, signal storage and repeating equipment having a rotatable storage member having a magnetizable surface and coacting transducer heads for magnetically applying binary pulse signals thereto and reading stored signals therefrom during rotation of the member, said magnetizable surface having an input pulse rate converter storage bin and an input buffer storage bin and an output buffer storage bin and an output rate converter storage bin, first precessor means including particular ones of said transducer heads for cyclically recording in said input rate converter storage bin during rotation thereof signal pulses corresponding to those stored in said first plurality of pulse storage elements, means including others of said transducer heads to read serially and convert the information in said input rate converter storage bin to signals having higher pulse rates coupled to feed said information to said input buffer storage bin, means for recording in said output buffer storage bins said signals having higher pulse rates, means for reading serially the signals in said output buffer storage bins and feeding them to the output rate converter storage bins, a second plurality of pulse storage elements, and second precessor means to read cyclically and convert the information in said output rate converter bin to signals having telegraph pulse rates coupled to feed said second plurality of pulse storage elements, and outgoing channels fed by said last mentioned means.

8. A telegraph switching system comprising a switching center having a plurality of incoming and out-going start-stop permutation code teleprinter channels, teleprinter stations connected to said incoming channels and adapted to transmit to the switching center messages including destination address characters, message text characters and end-of-message characters, each of said characters including start and rest pulses, said switching center including signal storage devices responsive to each incoming message from any of said teleprinter stations for storing the character pulses as they are received, means for deleting the start and rest pulses, a constantly rotating magnetic storage medium having a plurality of signal storage bins, certain of said bins being respectively individual to the incoming channels and others of said bins being general storage bins common to the incoming channels, means for generating pulses in synchronism with the rotating storage medium, electronic circuit precessor means fed by said last mentioned means coupled to transfer cyclically the character pulses stored in said first named signal storage devices to an individual storage bin and then serially to the general storage bins until a complete message is stored in general storage, other signal storage bins in which are stored signals representing a directory of address characters for the outgoing channels of the switching system, circuit means for comparing the destination address characters in the received message with those in said directory, selection circuits controlled in accordance with the result of such comparison and effective after said end-of-message characters have been received for selecting an outgoing channel corresponding to said destination address characters, means for automatically reinserting start and rest pulses in each character, and means for automatically retransmitting over the selected outgoing channel start-stop permutation code characters comprising the stored message.

9. A telegraph switching system comprising a switching center having a plurality of incoming and outgoing circuits and signal pulse storage and repeating equipment, teleprinter stations connected to said incoming circuits coupled to transmit to the switching center messages including at least one routing indicator, message text characters and end-of-message characters, input pulse buffer storage bins at the switching center coupled to said incoming channels for storing at any one time a message unit having a group of successive intelligence bits which form a portion of each of the incoming telegraph messages, random access pulse storage bins common to said incoming and outgoing circuits to store general messages, means for storing signals representing a routing indicator directory of all routing indicators together with the appropriate outgoing circuit numbers and station designators relating thereto, means for storing signals representing a program for controlling the operations of the switching center, input transfer table storage means for storing the bin address of the first message unit of an incoming message and the bin address for each successive incoming message unit of the message, means for causing the bin addresses of said first message unit and last message unit to be retained in the input transfer table, means for storing signals representing routing indicator decoding schedules and means for transferring thereto the bin addresses of said first and last message units from said input transfer table, said decoding schedules each including the order number in which the programming equipment will look at the messages to be routed, means effective when the lowest order number stored in the routing indicator decoding schedules is selected for routing by the stored program, means for transferring to said program storage means said first message unit of the message, means for comparing the routing indicator in said first message with the routing indicators in said routing indicator directory, means operative in the event that said comparison is favorable for determining from said directory which of the output circuits is to be selected for transmission and also which station on the output circuit is to be selected, means for storing signals representing output schedules and controlled by the decoding of said routing indicator in the message to determine which output schedules are to be updated and for entering the general bin addresses of the first and last message units and the station designator into the output schedule for the appropriate channel, and means in said program storage means controlled by said output schedules for causing the messages to be read from general bin storage and inserted in the output buffer bins one message unit at a time in appropriate order for successive transmission over the selected outgoing circuit.

10. A system according to claim 9, in which an incoming message includes a plurality of routing indicators, including means for comparing each of the routing indicators in a message unit with the routing indicators in said routing indicator directory, and means operative in the event that each such comparison is favorable for determining from said directory which of the output circuits is to be selected and also which station on the output circuit is to be selected.

11. A system according to claim 9, including means operative in the event that no favorable comparison between the routing indicator in said message unit and the routing indicators in the routing directory is obtained for producing a signal to indicate that the message contains an improper routing indicator.

12. A system according to claim 9, in which an incoming message includes a group routing indicator, and said routing indicator directory includes means for determining which of a plurality of output circuits are to be selected as a group for transmission of the message thereover.

References Cited in the file of this patent
UNITED STATES PATENTS

| | | |
|---|---|---|
| 2,805,278 | Van Duuren | Sept. 3, 1957 |
| 2,918,526 | Wright | Dec. 22, 1959 |
| 2,932,688 | Wright et al. | Apr. 12, 1960 |
| 2,952,731 | Wright et al. | Sept. 13, 1960 |
| 2,952,732 | Wright et al. | Sept. 13, 1960 |